(12) United States Patent
He et al.

(10) Patent No.: US 12,404,452 B2
(45) Date of Patent: Sep. 2, 2025

(54) LIQUID-CRYSTAL MEDIUM COMPRISING POYLMERIZABLE COMPOUNDS

(71) Applicant: Merck Patent GmbH, Darmstadt (DE)

(72) Inventors: Sunny He, Shanghai (CN); Lynne Guo, Shanghai (CN); Shuo (Fisher) Yu, Shanghai (CN); Yen-Kai Huang, Shanghai (CN)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/102,128

(22) Filed: Jan. 27, 2023

(65) Prior Publication Data

US 2023/0242817 A1 Aug. 3, 2023

(30) Foreign Application Priority Data

Jan. 30, 2022 (CN) .......................... 202210113187.0

(51) Int. Cl.
*C09K 19/34* (2006.01)
*C09K 19/54* (2006.01)
*C09K 19/58* (2006.01)
*G02F 1/1334* (2006.01)

(52) U.S. Cl.
CPC ........ *C09K 19/3491* (2013.01); *C09K 19/542* (2013.01); *C09K 19/586* (2013.01); *G02F 1/1334* (2013.01); *C09K 2019/548* (2013.01)

(58) Field of Classification Search
CPC ...................................................... C09K 19/54
See application file for complete search history.

(56) References Cited

U.S. PATENT DOCUMENTS

2016/0208170 A1\* 7/2016 Hirschmann .......... C09K 19/54
2019/0390112 A1\* 12/2019 Hirschmann ...... C09K 19/3066

FOREIGN PATENT DOCUMENTS

EP 3587536 A1 1/2020

OTHER PUBLICATIONS

Office Action in corresponding EP 23153573.3 dated Jun. 5, 2023 (pp. 1-6).

\* cited by examiner

*Primary Examiner* — Chanceity N Robinson
(74) *Attorney, Agent, or Firm* — Csaba Henter

(57) ABSTRACT

A liquid-crystal (LC) medium containing polymerizable compounds, its use for optical, electro-optical and electronic purposes, in particular in LC displays, especially in LC displays of the PSA (polymer sustained alignment) or SA (self-aligning) mode, to an LC display of the PSA or SA mode containing the LC medium, and to a process of manufacturing the LC display using the LC medium, especially an energy-saving LC display and energy-saving LC display production process.

22 Claims, No Drawings

LIQUID-CRYSTAL MEDIUM COMPRISING POYLMERIZABLE COMPOUNDS

The present invention relates to a liquid-crystal (LC) medium comprising polymerizable compounds, to its use for optical, electro-optical and electronic purposes, in particular in LC displays, especially in LC displays of the PSA (polymer sustained alignment) or SA (self-aligning) mode, to an LC display of the PSA or SA mode comprising the LC medium, and to a process of manufacturing the LC display using the LC medium, especially an energy-saving LC display and energy-saving LC display production process.

The popularity of 8K and gaming monitors leads to an increased need for LC display (LCD) panels having higher refresh rates and thus for LC media having faster response times. Many of these LCD panels are using polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1%, of one or more polymerizable mesogenic compounds, also known as reactive mesogens or RMs, is added to the LC medium. After filling the LC medium into the display panel the RMs are then polymerized in situ by UV photopolymerization, while a voltage is applied to the electrodes of the display. Thereby a small tilt angle (often also referred to as "pre-tilt angle") is generated in the LC molecules of the LC medium, which is then stabilized by the polymerized RMs. This process of generating a tilt angle is also known as the "PSA (or PSVA) process", and is an important part of the manufacturing process of PSA displays.

In the SA-VA mode the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerised under similar conditions as the RMs used in the PSA process. The LC medium may in addition to the SA additive also contain one or more RMs.

The PSA process is usually carried out in two steps. In a first step, also known as "UV1 step", a voltage is applied to the LC medium in the panel to generate the tilt angle, and at the same time the LC medium is exposed to UV light for a certain, usually short time interval to polymerize the RM and stabilise the tilt angle. In a second step, also known as "UV2 step", the LC medium in the panel is again exposed to UV light for a certain, usually longer time interval without application of a voltage to complete the polymerization of the RMs and keep the amount of unreacted residual RMs as low as possible. The UV2 step is necessary because unreacted RMs can lead to undesired effects like a reduced VHR or increased image sticking in the display. To keep the residual RM concentration in the LC medium after the PSA process as low as possible is thus an important criterion to ensure a good display performance.

Especially in times where the overall market situation is critical due to reduced production and/or transport capabilities or shortage of certain components or raw materials, the demand for LC panels can exceed the production capability. It is therefore of great interest for LC panel makers to improve their production capability to meet the demand. Preferably this is done by shortening the tact time of the production process without applying other changes to the running production process or equipment, and without negatively affecting the LC panel performance. Moreover, it is generally of interest to have an LC panel production process which is time- and cost-effective and energy saving.

In the PSA process, one possibility to effectively reduce the tact time is by shortening the time interval for the UV2 step. However, this could lead to an increase of the residual RM concentration and thus cause a higher risk of image sticking as explained above. In order to avoid this, one could decrease the initial amount of RM employed. However, it could be shown that a lower initial RM concentration does not necessarily correlate with a lower residual RM concentration after the PSA process, but instead a low level of unreacted RM is reached quickly even when starting from different initial RM concentrations, and a further reduction is then only difficult to achieve.

It has also been proposed to add compounds with increased UV absorption, for example terphenyls, to polymerizable LC media in order to enhance the UV photopolymerization of the RMs. However, these compounds can cause problems with the reliability and voltage holding ratio (VHR) of the LC media.

Therefore, there is a still need for polymerizable LC media for use in PSA displays, which enable a quick and complete polymerization of the RMs in the PSA process with a low amount of residual RM while still ensuring good generation of a tilt angle, and do thus allow a reduction of the UV2 exposure time. The polymerizable LC media should also enable a high stability of the tilt angle after UV or electrical stress, and enable to reduce or prevent the occurrence of undesired image sticking in the display.

Moreover, the polymerizable LC media should preferably have a high specific resistance as well as a large working-temperature range, short response times even at low temperatures, a low threshold voltage, high reliability and high values for the VHR after UV exposure, and enable a multiplicity of grey shades, high contrast and a broad viewing angle in the display. The RMs used in the polymerizable LC media should have a low melting point and a high solubility in the LC host mixtures and preferably enable good polymerization even at longer UV wavelengths. In displays for mobile applications, it is especially desired to have available polymerizable LC media that show low threshold voltage and high birefringence.

Another problem of state of the art LC media used in PSA displays is that the achieved response times may not be fast enough or the driving (or operating) voltage may still be too high. This is especially critical in case of LC media and PSA displays for use in high resolution devices like 8K and 4K TV sets. A low driving voltage is also favourable as it enables energy-saving displays.

It is therefore desirable to have available polymerizable LC media which enable PSA displays with fast response times and a low driving voltage.

To overcome this problem it has been proposed to use LC media with benzodithiophene compounds. It could be shown that these compounds can lead to a low viscosity which enables faster response times, and a low threshold voltage which enables a reduced driving voltage. Moreover they can lead to a low ratio $\gamma_1/K_3$ of the viscosity $\gamma_1$ to the bend elastic constant $K_3$ which contributes to improved switching behaviour especially at low driving voltages. However, these compounds are sensitive to reliability issues and a reduction of the VHR, inter alia due to interaction with the polyimide alignment layer.

Therefore, polymerizable LC media comprising such benzodithiophene compounds can be especially sensitive to the addition of further compounds with increased UV absorption, like terphenyls, with the aim to enhance polymerization of the RMs as described above.

The present invention provides novel and suitable polymerizable LC media for use in PSA or polymer stabilized SA displays, which show at least some of the desired properties as described above, especially a quick and complete polymerization of the RMs in the PSA process with a low amount of residual RM, fast response times, a low driving voltage, a high reliability and a high and stable VHR.

The invention further provides novel polymerizable LC media for optical, electro-optical and electronic applications, and of suitable processes and intermediates for the preparation thereof.

Thus, it was surprisingly found that, by adding a small amount of a terphenyl dopant of formula IA to a polymerizable LC medium with negative dielectric anisotropy that preferably comprises a benzodithiophene compound of formula IB, it is possible to achieve an improved polymerization of the RMs with a reduced residual RM concentration after the PSA process, which allows a reduction of the UV2 exposure time, without the need to change the basic mixture concept including LC host mixture and RMs, and leaving the other mixture properties largely unaffected.

In particular, it was found that the LC media after addition of the terphenyl dopant of formula IA, especially LC media containing a benzodithiophene compound of formula IB, can maintain a favourably low viscosity which enables faster response times, a low threshold voltage which enables a reduced driving voltage, and a low ratio $\gamma_1/K_3$ which contributes to improved switching behaviour especially at low driving voltages.

This should allow to easily replace currently existing polymerizable LC media used in LC panel production without the need to modify or adopt the production process to new materials.

The above-mentioned advantageous effects are also useful to enable energy-saving displays and display production processes.

The invention thus relates to an LC medium having negative dielectric anisotropy and comprising one or more polymerizable compounds and one or more dopants of formula IA

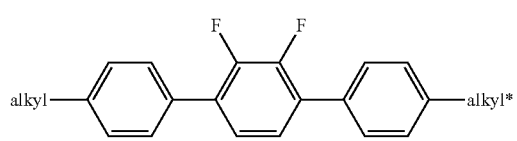

IA wherein alkyl and alkyl* each, independently of one another, denote a straight-chain, branched or cyclic alkyl radical having 1-6 C atoms, wherein the total proportion of the dopants of formula IA in the LC medium is from 0.01 to 0.8% by weight.

Preferably the LC medium further comprises one or more compounds of formula IB

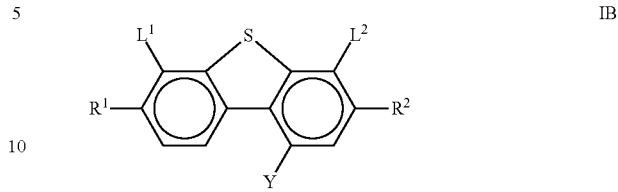

IB in which the individual radicals, on each occurrence identically or differently, and each, independently of one another, have the following meaning:

$R^1$, $R^2$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, —$CR^0$=$CR^{00}$—, —C≡C—,

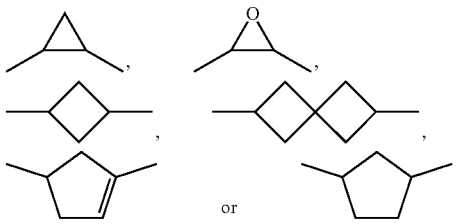

in such a manner that O- and/or S-atoms are not directly connected with each other, and wherein one or more H atoms are each optionally replaced by F or Cl, preferably alkyl or alkoxy having 1 to 6 C atoms, $R^0$, $R^{00}$ H or alkyl having 1 to 12 C atoms, $L^1$, $L^2$ F or Cl, preferably F, Y H, F, Cl, $CF_3$, $CHF_2$ or $CH_3$, preferably H or $CH_3$.

The invention further relates to the use of the LC medium as described above and below in LC displays of the PSA or SA mode.

The invention furthermore relates to a process for preparing an LC medium as described above and below, comprising the steps of mixing one or more polymerizable compounds with one or more compounds of formulae IA and IB and optionally with further LC compounds and/or additives.

The invention furthermore relates to an LC display comprising an LC medium according to the invention as described above and below, which is a PSA or SA display, preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

The invention furthermore relates to an LC display of the PSA type comprising two substrates, at least one which is transparent to light, an electrode provided on each substrate or two electrodes provided on only one of the substrates, and located between the substrates a layer of an LC medium as described above and below, wherein the polymerizable compounds are polymerized between the substrates of the display by UV photopolymerization.

The invention furthermore relates to a process for the production of an LC display as described above and below, comprising the steps of providing an LC medium as described above and below between the substrates of the display, and exposing the LC medium to UV light causing photopolymerization of the polymerizable compounds, preferably while a voltage is applied to the electrodes of the display at least during a part of the UV exposure time.

In a preferred process for the production of an LC display as described above and below the LC medium is exposed to UV light in a two-step process, including a first UV exposure step where a voltage is applied to the electrodes, and a second UV exposure step where no voltage is applied to the electrodes.

In particular, the LC media according to the present invention allow to achieve one or more of the following advantageous effects:
- a low viscosity which enables fast response times.
- a favourably low ratio of rotational viscosity to the bend elastic constant $\gamma_1/K_3$, which contributes to improved switching behaviour especially at low driving voltages and is useful to enable energy-saving displays,
- a low threshold voltage which is useful to reduce the driving voltage and enable energy-saving displays,
- a faster and more effective polymerization in polymerizable LC media used in LC panel production, without changing the basic mixture concept like the LC host mixture or RM, while maintaining other physical properties of the polymerizable LC media like the viscosity and elastic constants, and maintaining a good tilt angle generation in the UV1 step, a high tilt stability, a low VHR value and low image sticking,
- enable a reduction of the residual RM amount after a given UV exposure time, thereby giving space to a reduction of the UV exposure time, in particular in the UV2 step,
- enable an LC panel production process which is time- and cost-effective and energy saving.

Furthermore the LC media according to the present invention show one or more of the following advantageous properties when used in PSA displays:
- high transmittance,
- high contrast ratio,
- reduced image sticking,
- reduced ODF mura,
- reduced rotational viscosity,
- high reliability and high VHR value after UV exposure and/or heat treatment,
- fast response times,
- good UV-photopolymerization even when using UV light sources with low radiation intensity and/or long UV emission wavelengths, such as UV LED lamps or green UV lamps, which allows minimization of production cost and energy saving,
- fast polymerization leading to minimal residues of RM after the UV-process,
- good tilt stability.

An alkenyl group in the compounds of formula IB, II or other components of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the polymerizable compounds and the compounds of formula II are preferably selected from achiral compounds.

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of λ, and in case of a cut-off filter means the wavelengths above (below) the given value of λ.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilized mode as it contains, or is manufactured by use of, an LC medium containing RMs like those described below. Consequently as used herein, the term "SA-VA display" when referring to a display according to the present invention will be understood to refer to a polymer stabilized SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

denotes a trans-1,4-cyclohexylene ring, and

denotes a 1,4-phenylene ring.

In a group

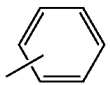

the single bond shown between the two ring atoms can be attached to any free position of the benzene ring.

If in the formulae shown above and below a group $R^{1-12}$, $R^Q$, R or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If in the formulae shown above and below a group $R^{1-12}$, $R^Q$, R or L denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If in the formulae shown above and below a group $R^{1-12}$, $R^Q$, R or L denotes an alkoxy or oxaalkyl group it may also contain one or more additional oxygen atoms, provided that oxygen atoms are not linked directly to one another.

In another preferred embodiment, one or more of $R^{1-12}$, $R^Q$, R or L are selected from the group consisting of

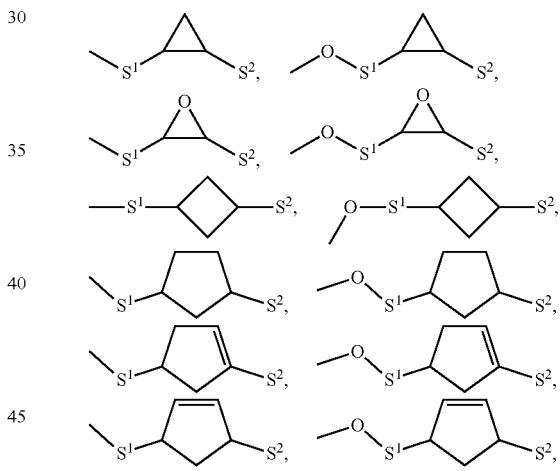

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

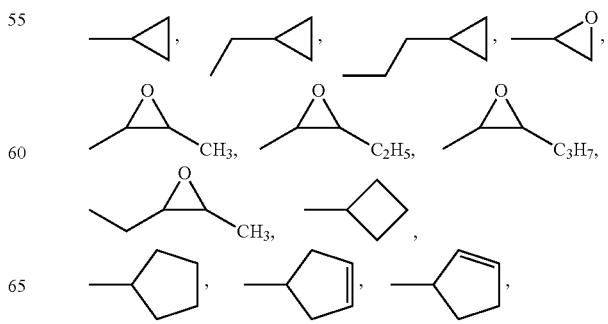

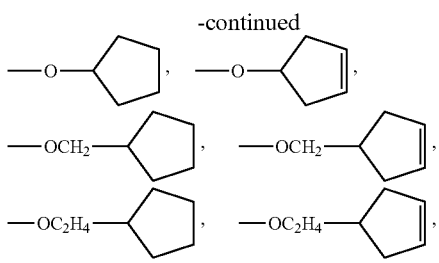

—OCH₂OCH₃, —O(CH₂)₂OCH₃, —O(CH₂)₃OCH₃, —O(CH₂)₄OCH₃, —O(CH₂)₂F, —O(CH₂)₃F, —O(CH₂)₄F.

If in the formulae shown above and below a group $R^{1-12}$, $R^Q$, R or L denotes an alkyl radical in which one CH₂ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If in the formulae shown above and below a group $R^{1-12}$, $R^Q$, R or L denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position but is preferably in the w-position.

Halogen is preferably F or Cl, very preferably F.

The group —CR⁰=CR⁰⁰— is preferably —CH=CH—.

—CO—, —C(=O)— and —C(O)— denote a carbonyl group, i.e.

Preferred substituents L, are, for example, F, Cl, Br, I, —CN, —NO₂, —NCO, —NCS, —OCN, —SCN, —C(=O)N(R^x)₂, —C(=O)Y¹, —C(=O)R^x, —N(R^x)₂, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent CH₂-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

Particularly preferred substituents L are, for example, F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, furthermore phenyl.

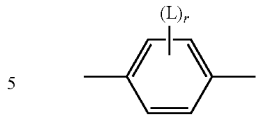

is preferably

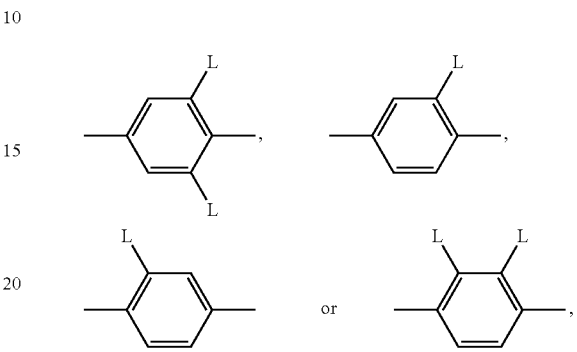

in which L has one of the meanings indicated above.

The dopants of formula IA are preferably selected from the group consisting of the following subformulae:

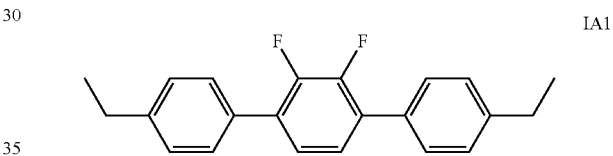

IA1

IA2

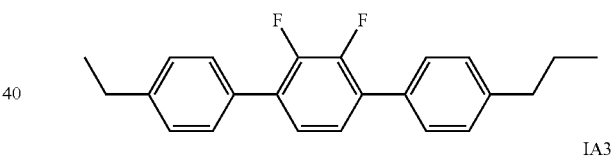

IA3

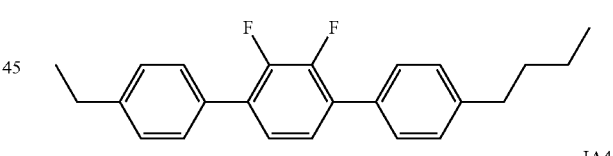

IA4

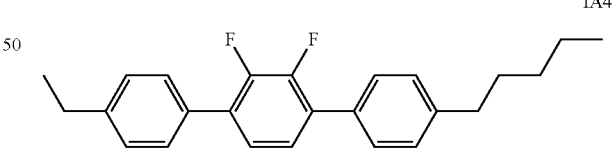

IA5

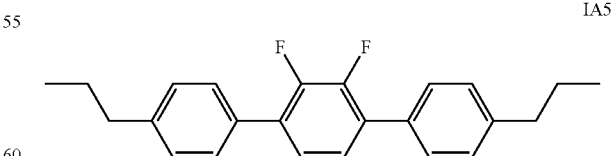

IA6

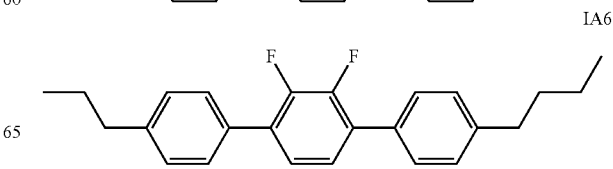

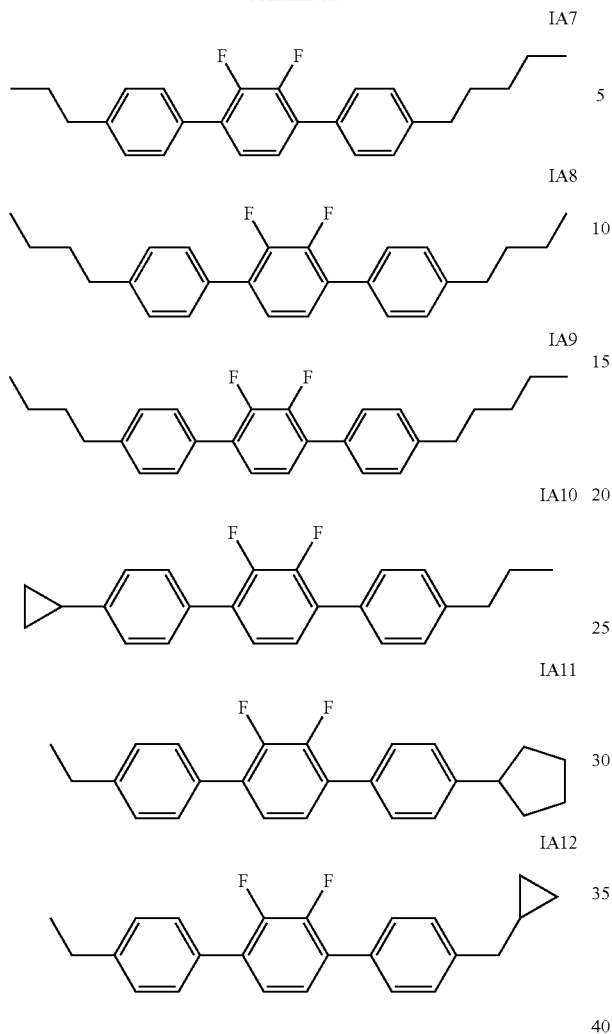

Very preferred are the dopants of formulae IA1 to IA6 and IA10 to IA12, especially those of formula IA2, IA5, IA10 and IA11, most preferably that of formula IA2.

Preferably the LC medium contains 1, 2 or 3, very preferably 1, dopants of formula IA or its subformulae.

Preferably the total proportion of the dopants of formula IA is from 0.02 to 0.6%, very preferably from 0.05 to 0.5%, most preferably from 0.05 to 0.3% by weight of the LC medium.

Preferred compounds of formula IB are selected from the group consisting of the following subformulae:

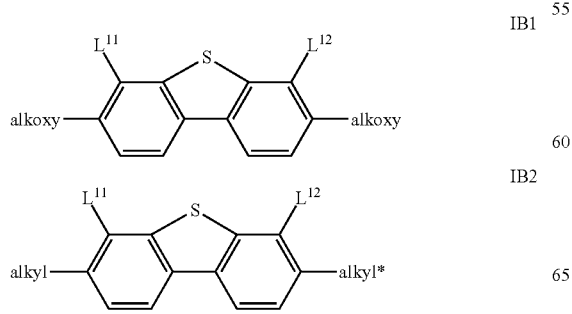

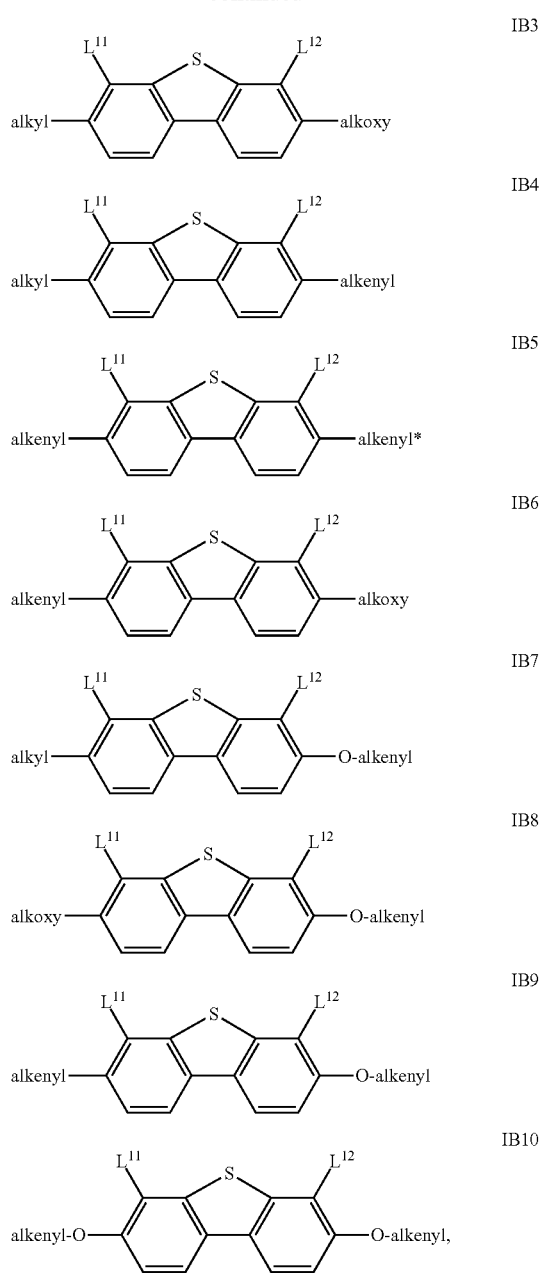

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

Very preferred are compounds of formula IB1, especially those wherein $L^{11}$ and $L^{12}$ denote F.

Very preferred compounds of formula IB and IB1 are selected from the group consisting of the following subformulae:

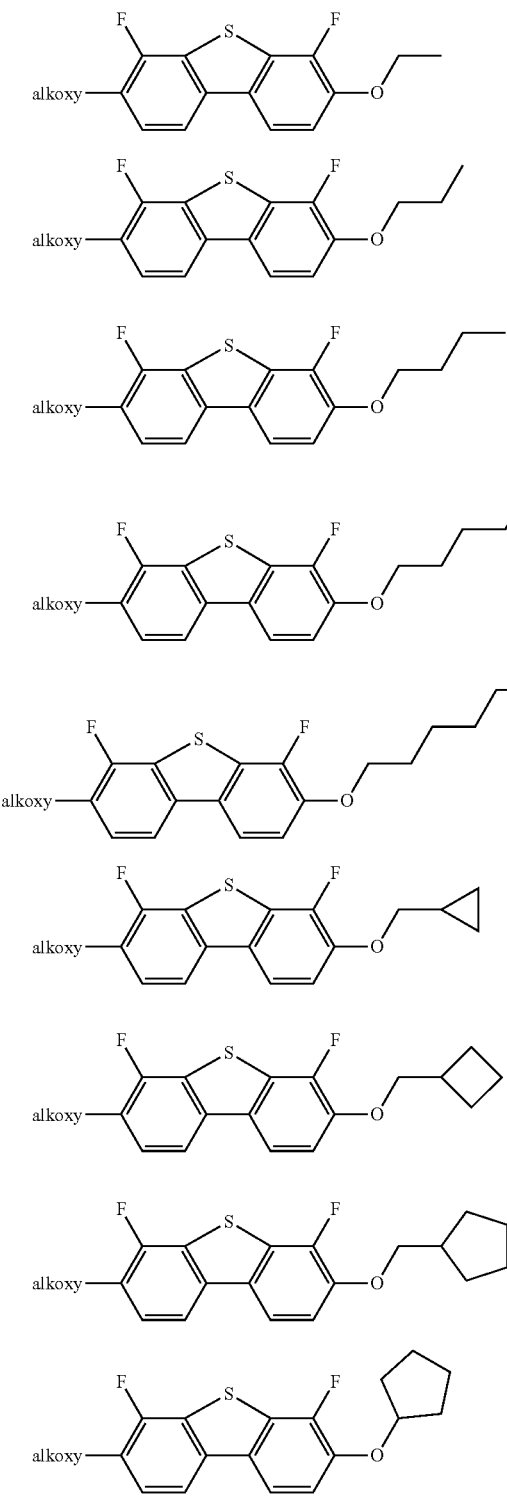

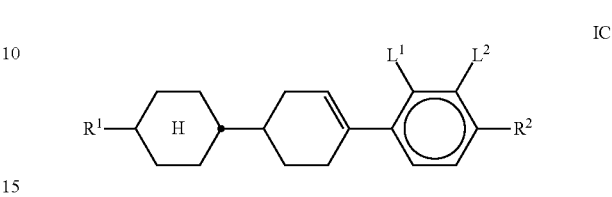

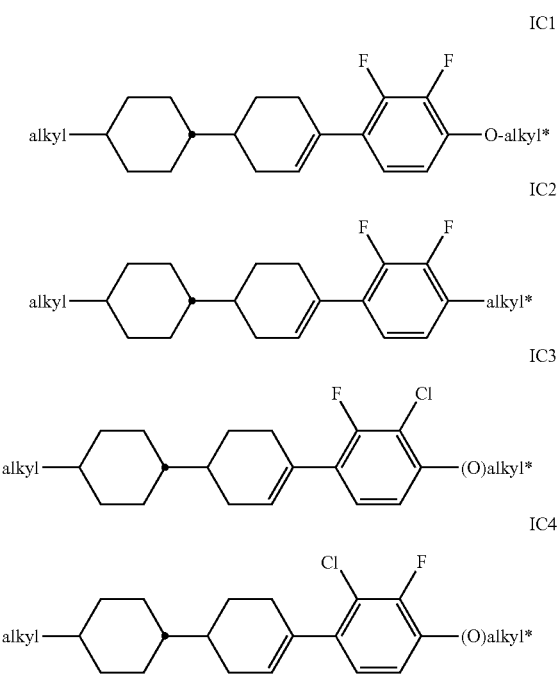

in which alkoxy denotes a straight-chain alkoxy radical having 1-6 C atoms, preferably ethoxy, propoxy, butoxy or pentoxy, very preferably ethoxy or propoxy.

Especially preferred are the compounds of formulae IB1-1 to IB1-5.

Preferably the LC medium contains 1, 2 or 3 compounds of formula IB or its subformulae.

Preferably the total proportion of the compounds of formula IB and its subformulae in the LC medium is from 0.2 to 30%, very preferably from 0.3 to 20 by weight, most preferably from 0.5 to 15% by weight.

In another preferred embodiment the LC medium additionally comprises one or more compounds of formula IC wherein $R^1$, $R^2$, $L^1$ and $L^2$ have the meanings given in formula IB or one of their preferred meanings as given above and below.

Preferred compounds of formula IC are selected from the group consisting of the following subformulae:

in which alkyl and alkyl* independently of each other denote a straight-chain alkyl radical having 1-6 C atoms, preferably ethyl, n-propyl or n-butyl, and (O) denotes an oxygen atom or a single bond, preferably an oxygen atom.

Very preferred are compounds of formula IC1 and IC2, most preferred are compounds of formula IC1, especially those wherein alkyl denotes ethyl, n-propyl or n-butyl, preferably n-propyl, (O) denotes an oxygen atom, and alkyl* denotes ethyl, n-propyl or n-butyl, preferably ethyl.

Preferably the LC medium contains 1, 2 or 3, very preferably 1, compounds of formula IC or its subformulae.

Preferably the total proportion of the compounds of formula IC and its subformulae in the LC medium is from 0.5 to 8%, very preferably from 0.5 to 5% by weight, most preferably from 0.5 to 2% by weight.

Further preferred embodiments of the LC medium according to the present invention are listed below, including any combination thereof:

The LC medium contains one or more compounds of formula II

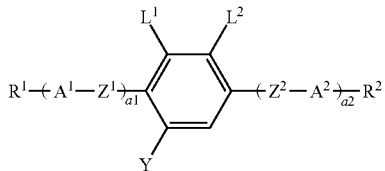

II wherein the individual radicals, independently of each other and on each occurrence identically or differently, have the following meanings $R^1$ and $R^2$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$=$CR^{00}$—, —C≡C—,

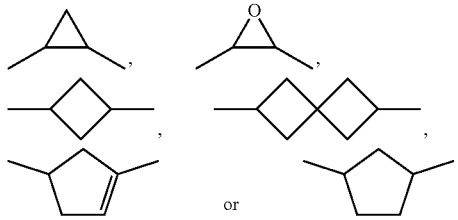

or in such a manner that O- and/or S-atoms are not directly connected with each other, and wherein one or more H atoms are each optionally replaced by F or Cl, preferably alkyl or alkoxy having 1 to 6 C atoms, $R^0$, $R^{00}$ H or alkyl having 1 to 12 C atoms, $A^1$ and $A^2$ a group selected from the following formulae

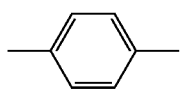
A1

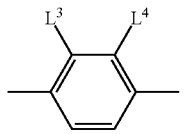
A2

A3

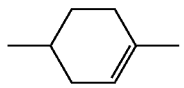
A4

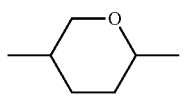
A5

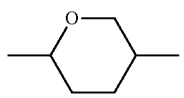
A6

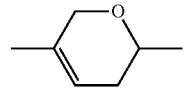
A7

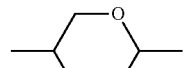
A8

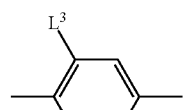
A9

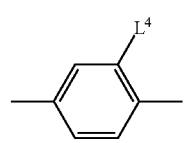
A10

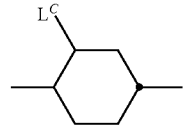
A11

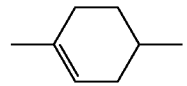
A12

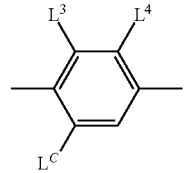
A13

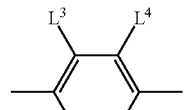
A14

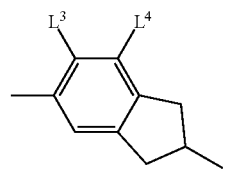
A15

A16 preferably from formulae A1, A2, A3, A4, A5, A6, A9 and A10, very preferably from formulae A1, A2, A3, A4, A5, A9 and A10, $Z^1$ and $Z^2$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 1 or 2, a2 0 or 1.

Preferably the LC medium contains one or more compounds of formula II selected from the group consisting of compounds of the formulae IIA, IIB and IID and optionally one or more compounds of formula IIC which are different from formula IA

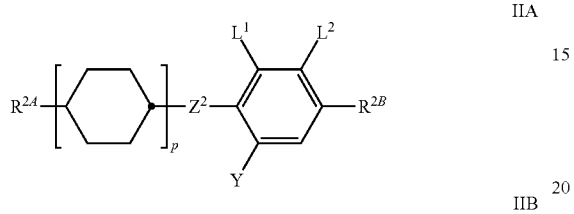

IIA

IIB

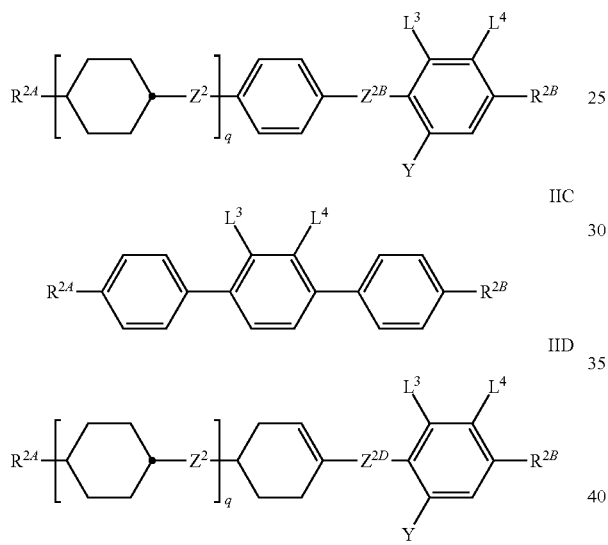

IIC

IID in which $R^{2A}$ and $R^{2B}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

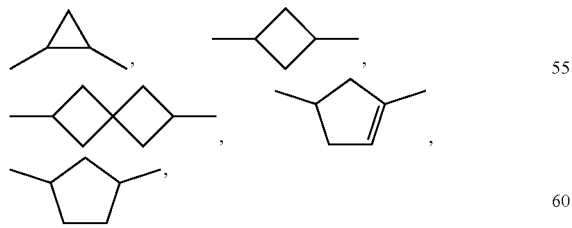

—C≡C—, —$CF_2$O—, —O$CF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, preferably H or $CH_3$, particularly preferably H, $Z^2$, $Z^{2B}$ and $Z^{2D}$ each, independently of one another, denote a single bond, —$CH_2CH_2$—, —CH=CH—, —$CF_2$O—, —O$CF_2$—, —$CH_2$O—, —O$CH_2$—, —CO—O—, —OCO—, —$C_2F_4$—, —CF=CF—, —CH=CH$CH_2$O—, P denotes 0, 1 or 2, and q on each occurrence, identically or differently, denotes 0 or 1.

Preferred compounds of the formulae IIA, IIB, IIO and IID are those wherein $R^{2B}$ denotes an alkyl or alkoxy radical having up to 15 C atoms, and very preferably denotes (O)$C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{2A}$ or $R^{2B}$ denotes or contains cycloalkyl or cycloalkoxy radical, preferably selected from the group consisting of

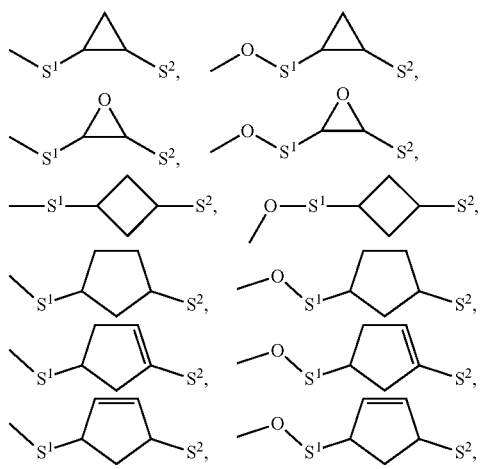

wherein $S^1$ is $C_{1-5}$-alkylene or $C_{2-5}$-alkenylene and $S^2$ is H, $C_{1-7}$-alkyl or $C_{2-7}$-alkenyl, and very preferably selected from the group consisting of

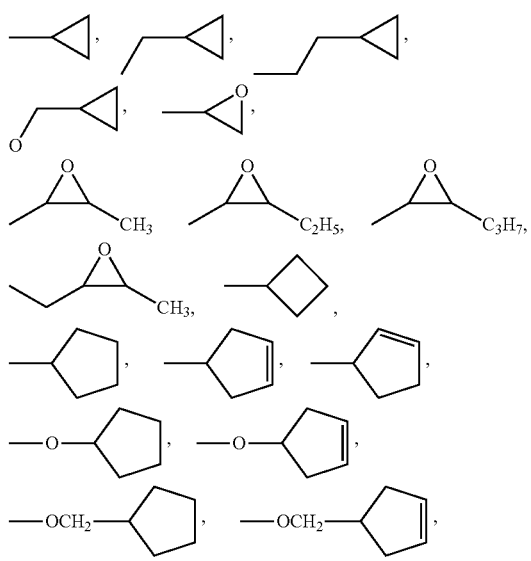

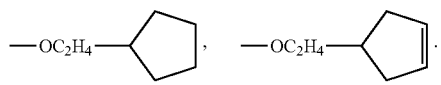
Further preferred compounds of the formulae IIA, IIB, IIC and IID are indicated below:
IIA-1
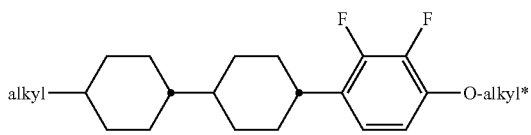
IIA-2
IIA-3
IIA-4
IIA-5
IIA-6
IIA-7
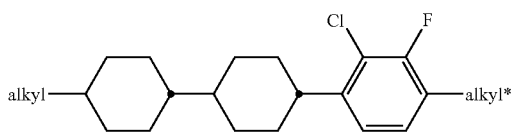
IIA-8
IIA-9
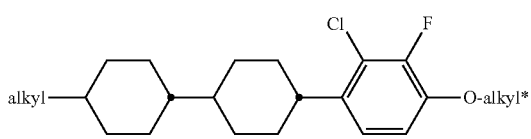
IIA-10
IIA-11
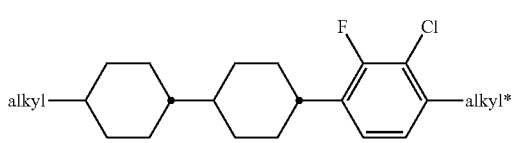
IIA-12
IIA-13
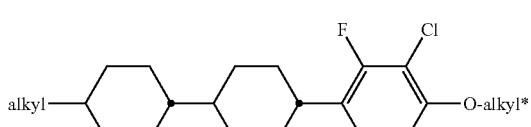
IIA-14
IIA-15
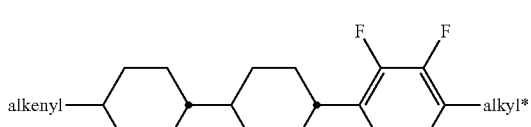
IIA-16
IIA-17
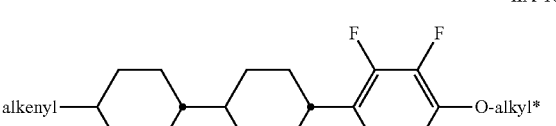
IIA-18
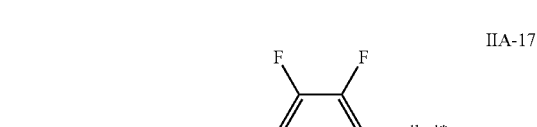
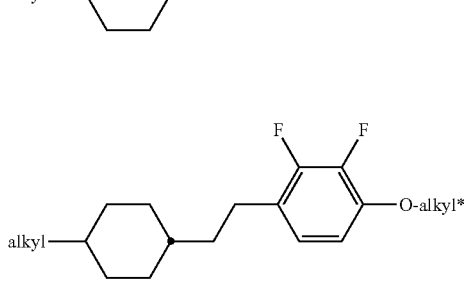

IIA-19 through IIA-37: chemical structure formulas.

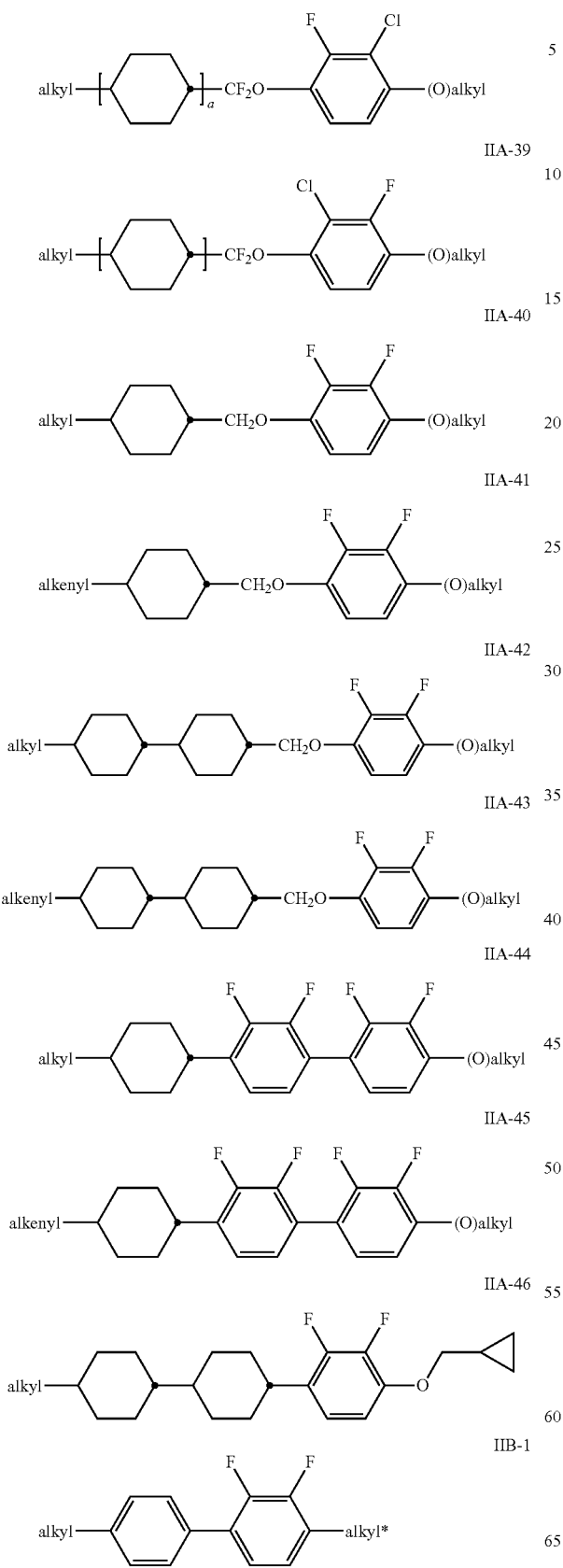
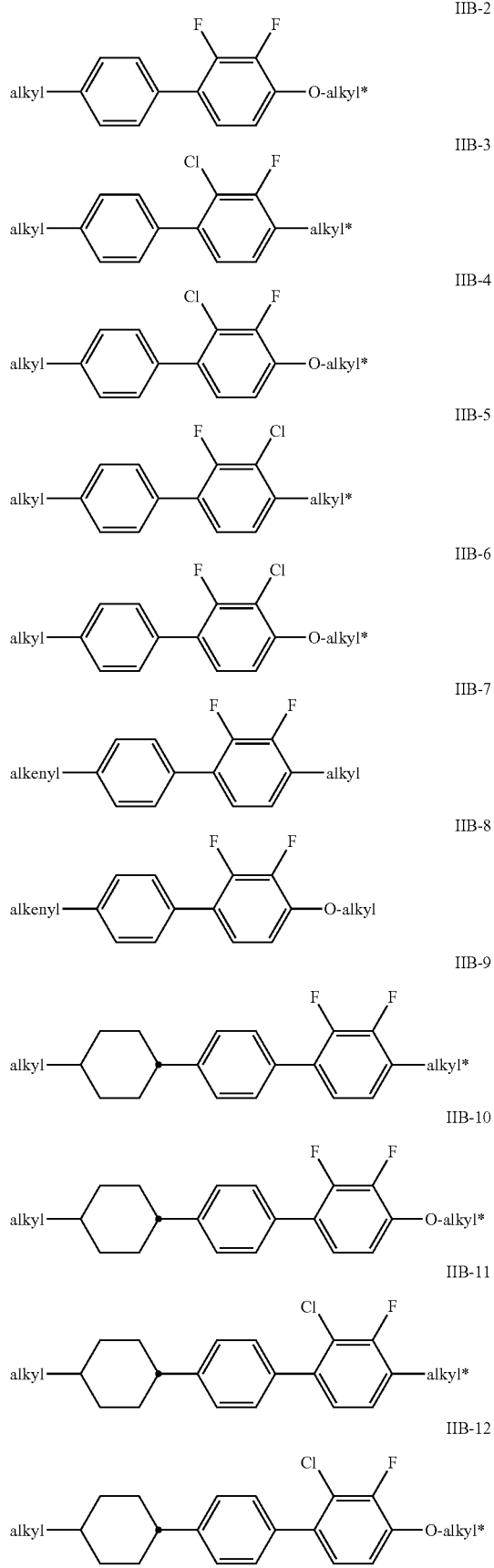

IIB-13
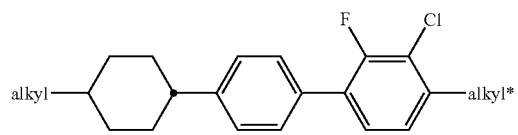

IIB-14
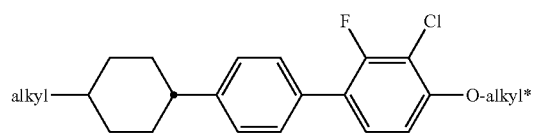

IIB-15
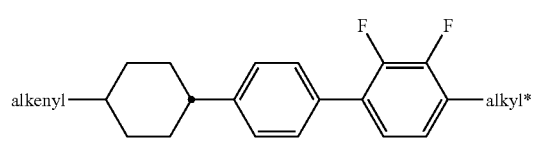

IIB-16
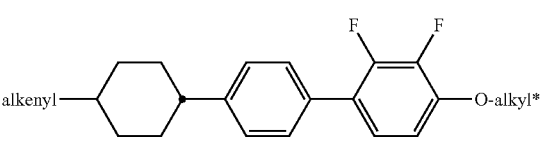

IIB-17
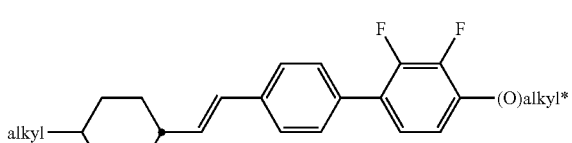

IIB-18

IIB-19

IIB-20
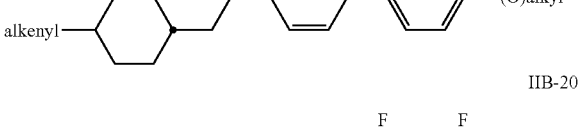

IIB-21
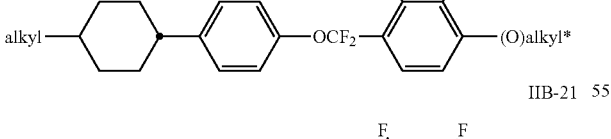

IIB-22
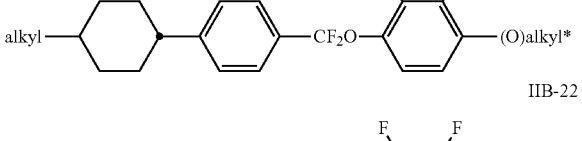

IIB-23
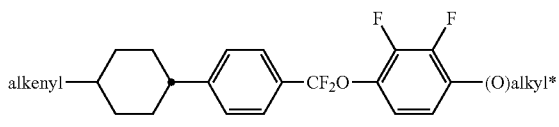

IIB-24
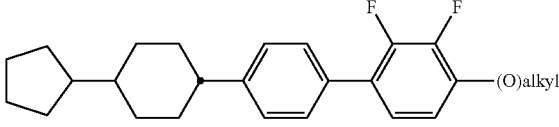

IID-1
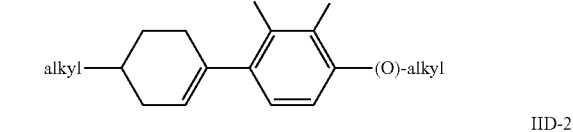

IID-2
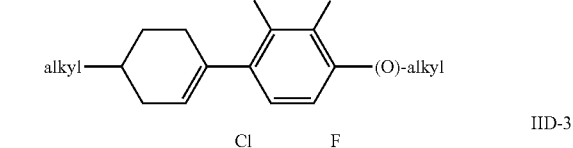

IID-3
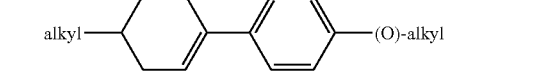

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred LC media according to the invention comprise one or more compounds of the formulae IIA-2, IIA-8, IIA-10, IIA-16, II-18, IIA-40, IIA-41, IIA-42, IIA-43, IIB-2, IIB-10, IIB-16, IIC-1, and IID-4.

The proportion of compounds of the formulae IIA and/or IIB in the mixture as a whole is preferably at least 20% by weight.

In another preferred embodiment the LC medium comprises one or more compounds of formula III which are different from formula IB:

III
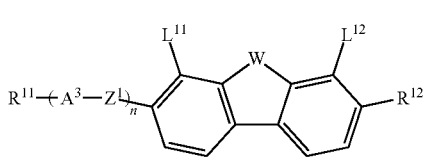

in which $R^{11}$ and $R^{12}$ each, independently of one another, denote H, an alkyl or alkoxy radical having 1 to 15 C atoms, where one or more $CH_2$ groups in these radicals may each be replaced, independently of one another, by

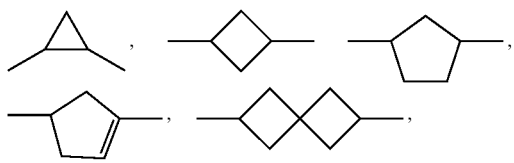

—C≡C—, —OF₂O—, —OCF₂—, —CH═CH—, by —O—, —CO—O— or —O—CO— in such a way that O atoms are not linked directly to one another, and in which, in addition, one or more H atoms may be replaced by halogen, $A^3$ on each occurrence, independently of one another, denotes a) 1,4-cyclohexenylene or 1,4-cyclohexylene radical, in which one or two non-adjacent CH₂ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —CF₂O—, —OCF₂—, —CH₂O—, —OCH₂—, —CH₂—, —CH₂CH₂—, —(CH₂)₄—, —CH═CH—CH₂O—, —C₂F₄—, —CH₂CF₂—, —CF₂CH₂—, —CF═CF—, —CH═CF—, —CF═CH—, —CH═CH—, —C≡C— or a single bond, and $L^{11}$ and $L^{12}$ each, independently of one another, denote F, Cl, CF₃ or CHF₂, preferably H or F, most preferably F, and W denotes O or S.

In a preferred embodiment of the present invention the LC medium comprises one or more compounds of the formula III-1:

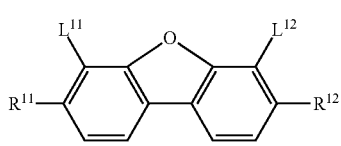

III-1 in which the occurring groups have the same meanings as given under formula III above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group of compounds of formulae III-1-1 to III-1-10, preferably of formula III-1-6,

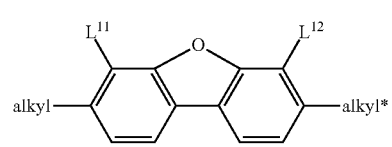

III-1-1

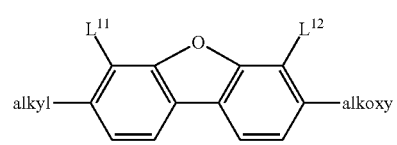

III-1-2

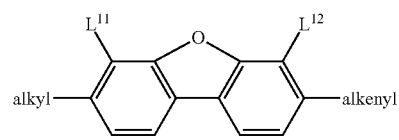

III-1-3

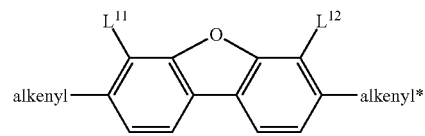

III-1-4

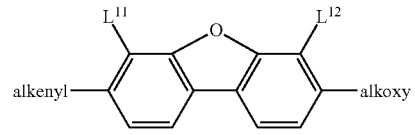

III-1-5

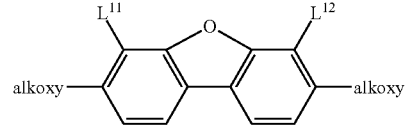

III-1-6

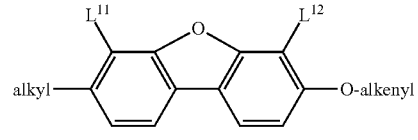

III-1-7

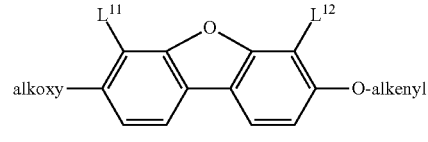

III-1-8

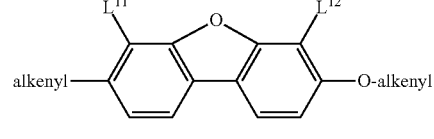

III-1-9

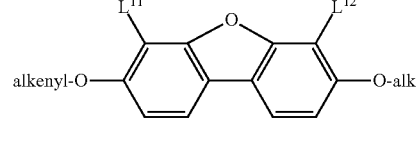

III-1-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment of the present invention the LC medium comprises one or more compounds of the formula III-3-1

III-3-1

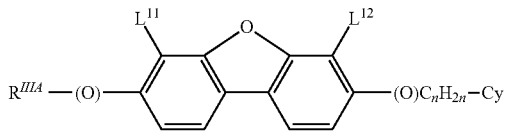

in which $L^{11}$ and $L^{12}$ have the same meanings as given under formula III, (O) denotes O or a single bond, $R^{IIIA}$ denotes alkyl or alkenyl having up to 7 C atoms or a group $Cy\text{-}C_mH_{2m+1}\text{—}$, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula III3-1 are contained in the LC medium either alternatively or additionally to the compounds of formula III, preferably additionally.

Very preferred compounds of the formula III3-1 are the following:

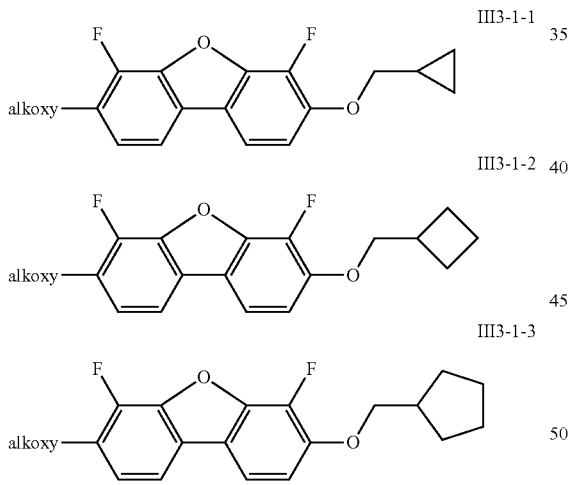

in which alkoxy denotes a straight-chain alkoxy radical having 1-6 C atoms.

In another preferred embodiment of the present invention, the LC medium comprises one or more compounds of the formulae III-4 to III-6, preferably of formula III-5,

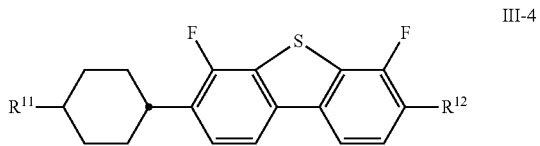

III-5

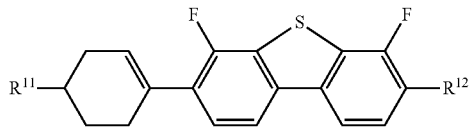

III-6

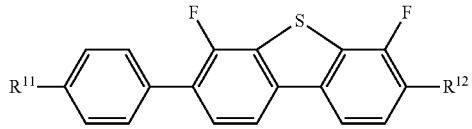

in which the parameters have the meanings given above, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group of compounds of formulae III-7 to III-9, preferably of formula III-8,

III-7

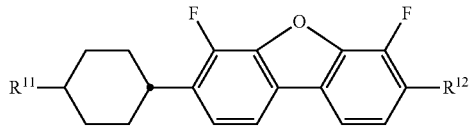

III-8

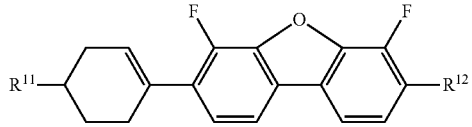

III-9

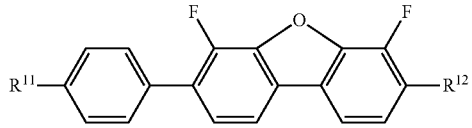

in which the parameters have the meanings given above, $R^{11}$ preferably denotes straight-chain alkyl and $R^{12}$ preferably denotes alkoxy each having 1 to 7 C atoms.

In a preferred embodiment, the medium comprises one or more compounds of the formula IV,

IV

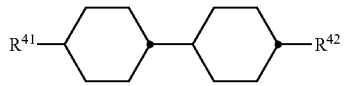

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R_{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

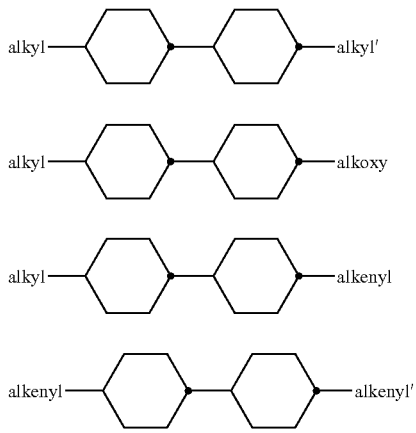

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-4

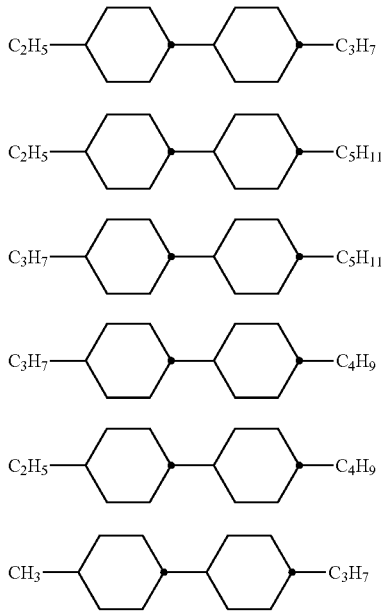

Very preferably, the LC medium according to the invention comprises one or more compounds of the formulae IV-2-1 and/or IV-2-2

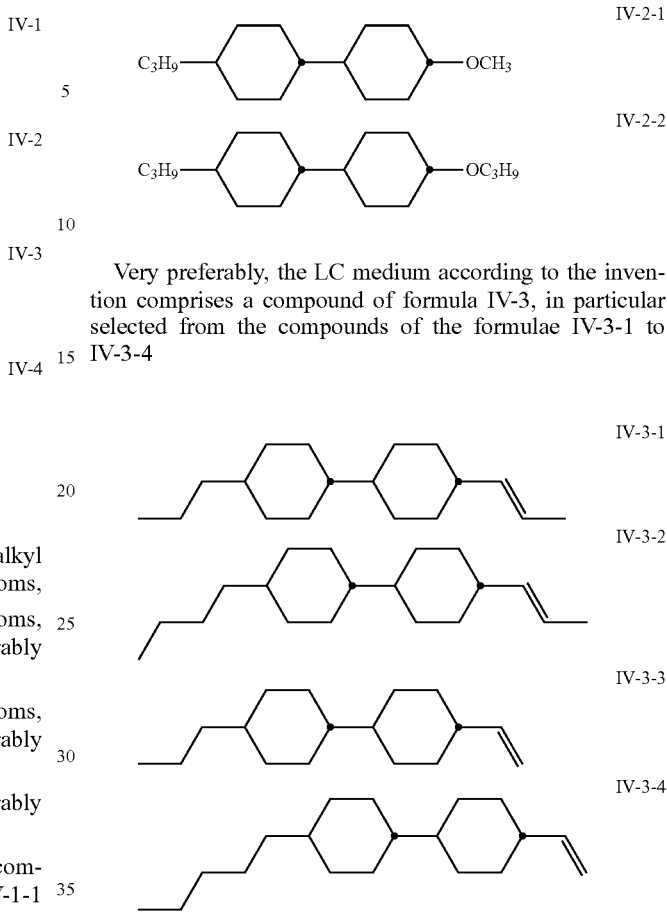

Very preferably, the LC medium according to the invention comprises a compound of formula IV-3, in particular selected from the compounds of the formulae IV-3-1 to IV-3-4

Very preferably, the LC medium according to the invention comprises a compound of formula IV-4, in particular selected from the compounds of the formulae IV-4-1 and IV-4-2

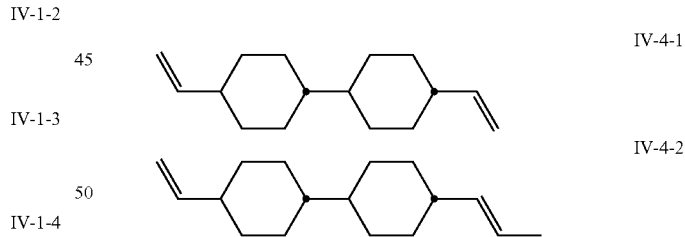

The LC medium preferably additionally comprises one or more compounds of the formula IVa,

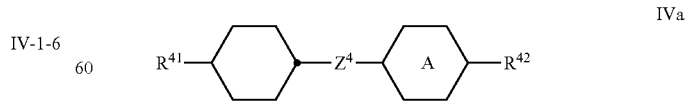

in which $R^{41}$ and $R^{42}$ each, independently of one another, denote a straight-chain alkyl, alkoxy, alkenyl, alkoxyalkyl or alkoxy radical having up to 12 C atoms, and

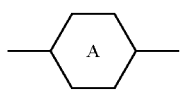

denotes

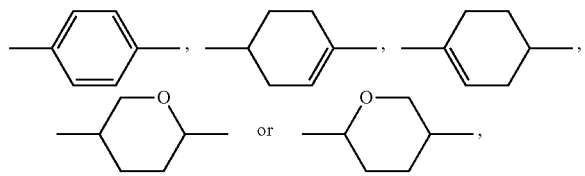

$Z^4$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$— or —CF═CF—.

Preferred compounds of the formula IVa are indicated below:

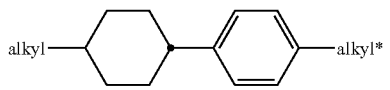

IVa-1

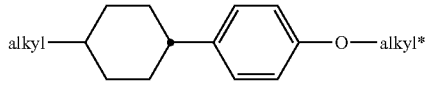

IVa-2

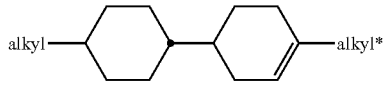

IVa-3

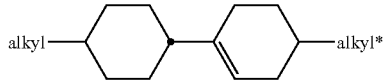

IVa-4 in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula IVb-1 to IVb-3

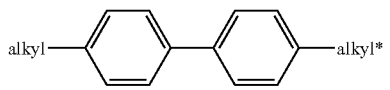

IVb-1

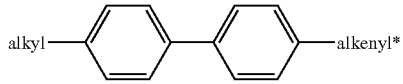

IVb-2

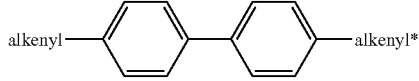

IVb-3 in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular ≥5% by weight.

Of the compounds of the formulae IVb-1 to IVb-3, the compounds of the formula IVb-2 are particularly preferred.

Particularly preferred biphenyls are

IVb-1-1

IVb-2-1

IVb-2-2

IVb-2-3 in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

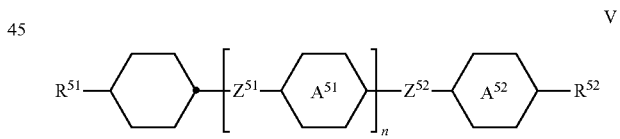

V in which $R^{51}$ and $R^{52}$ independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

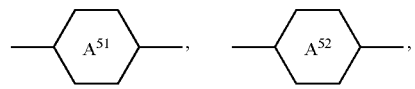

identically or differently, denote

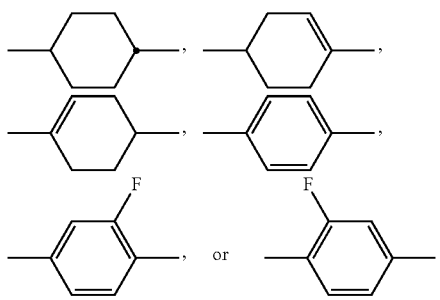

in which

preferably denotes

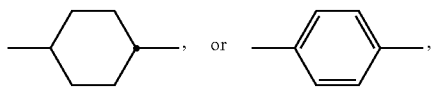

$Z^{51}$, $Z^{52}$ each, independently of one another, denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably a single bond, and
n is 1 or 2.

The compounds of formula V are preferably selected from the compounds of the formulae V-1 to V-16:

V-1
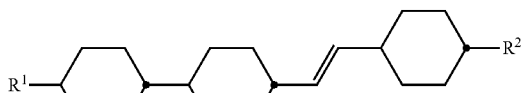

V-2

V-3

V-4

V-5

V-6
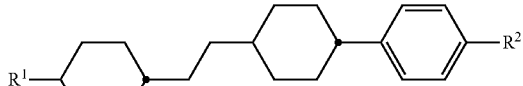

V-7
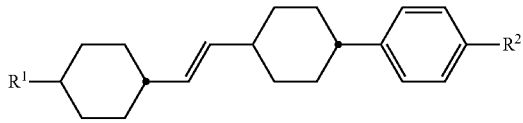

V-8

V-9
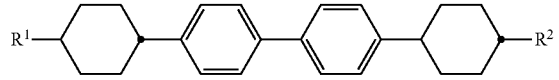

V-10
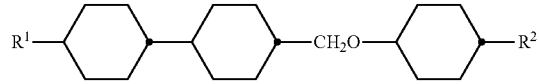

V-11
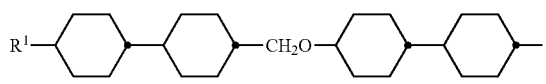

V-12
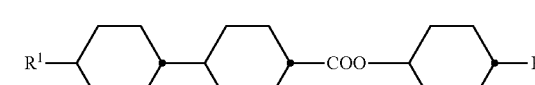

V-13
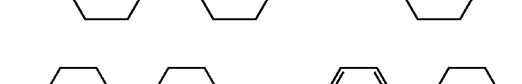

V-14
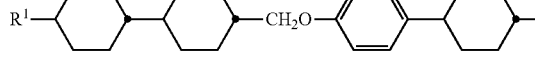

V-15
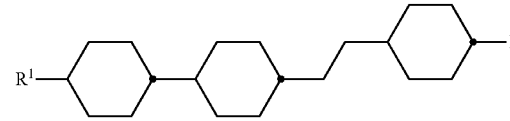

V-16 in which $R^1$ and $R^2$ have the meanings indicated for $R^{2A}$ above. $R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

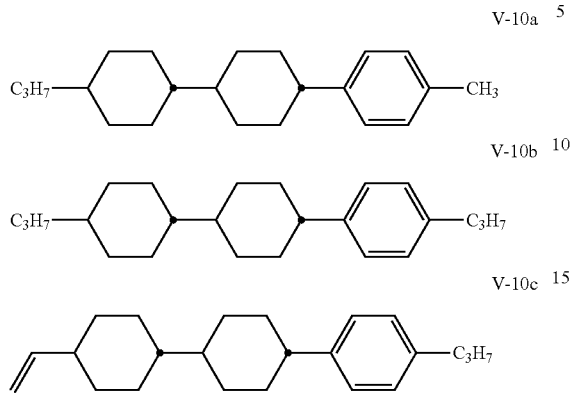

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and IV-1-1

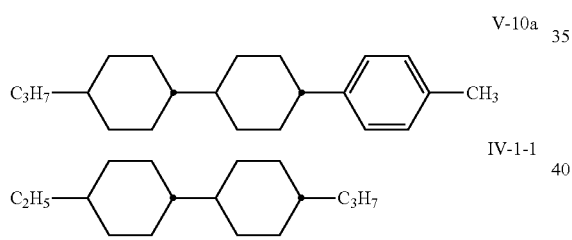

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

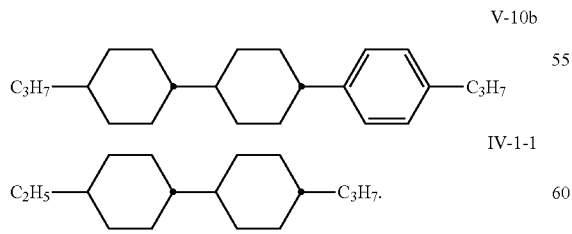

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise the following three compounds:

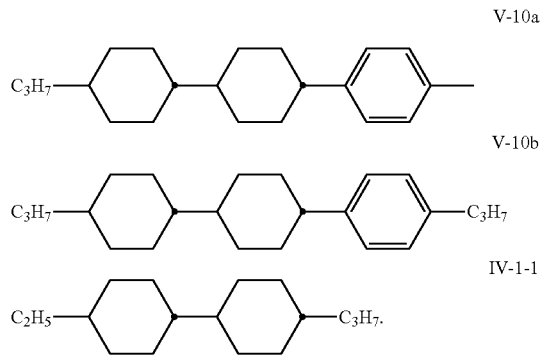

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group of the compounds

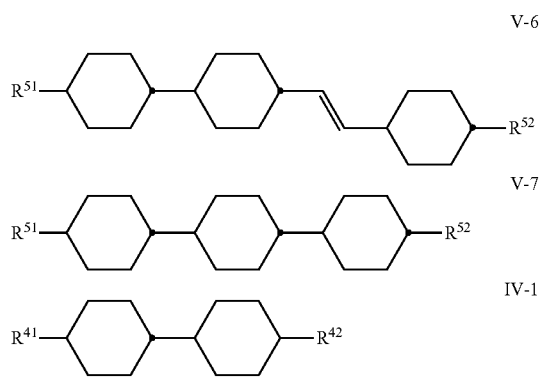

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

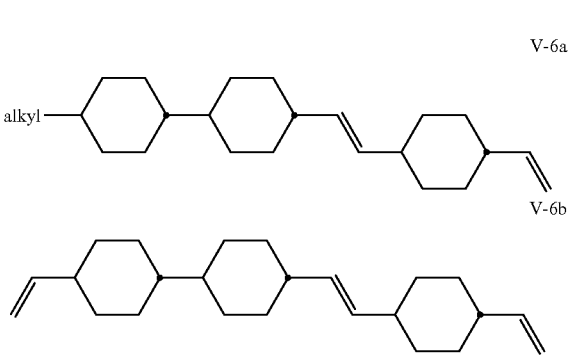

-continued

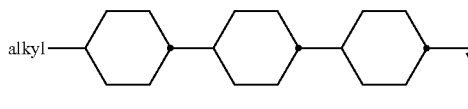
V-7a

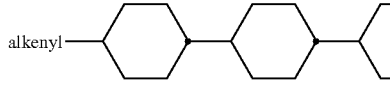
V-7b

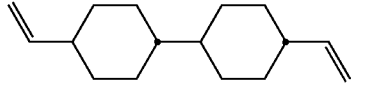
IV-4-1

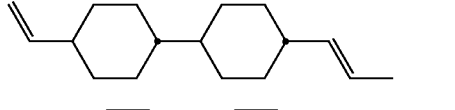
IV-4-2

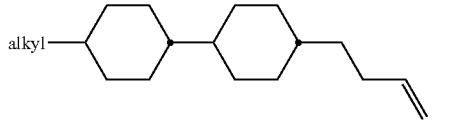
IV-3a

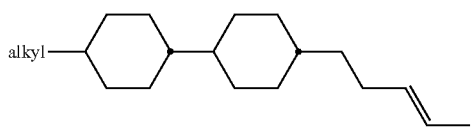
IV-3b in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds of the formulae VI-1 to VI-9

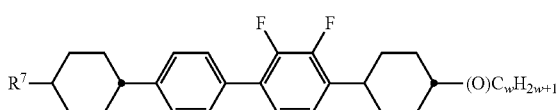
VI-1

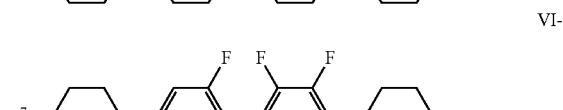
VI-2

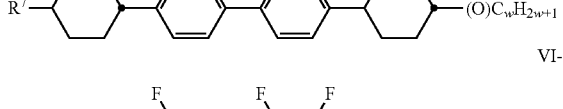
VI-3

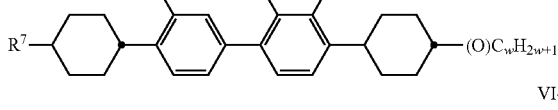
VI-4

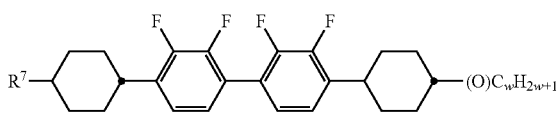
VI-5

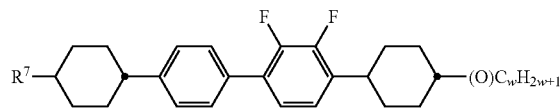
VI-6

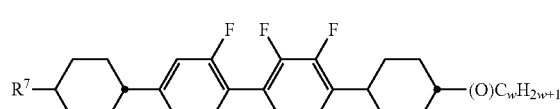
VI-7

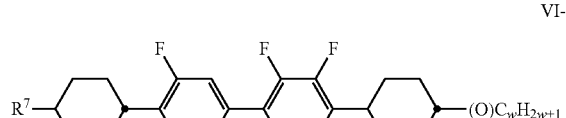
VI-8

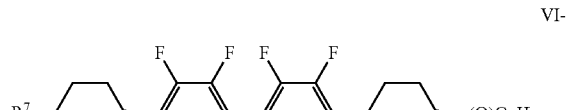
VI-9 in which
$R^7$ each, independently of one another, have one of the meanings indicated for $R^{2,4}$ in formula IIA, and
w and x each, independently of one another, denote 1 to 6.

Particular preference is given to LC media comprising at least one compound of the formula V-9.

In a preferred embodiment of the present invention the LC medium additionally comprises one or more compounds of the formulae VII-1 to VII-25,

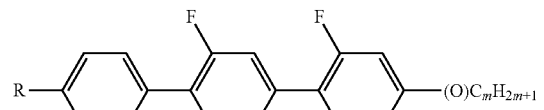
VII-1

VII-2

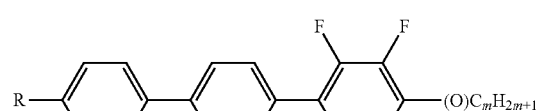
VII-3

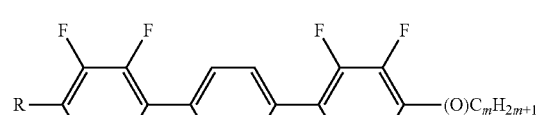
VII-4

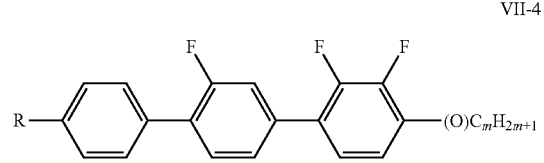

VII-5
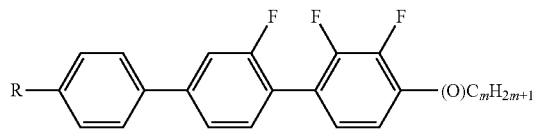
VII-6
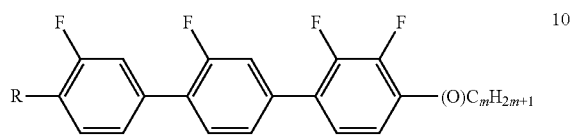
VII-7
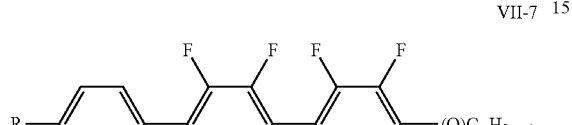
VII-8
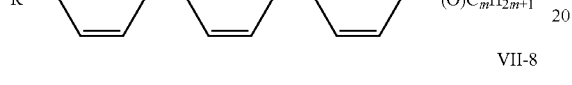
VII-9
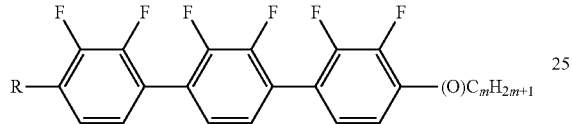
VII-10
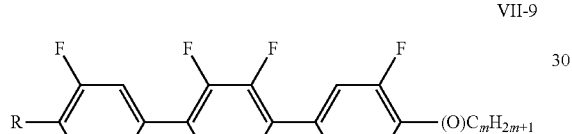
VII-11
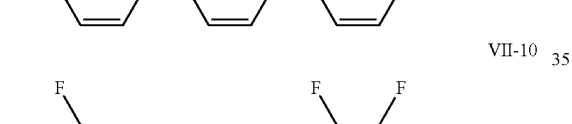
VII-12
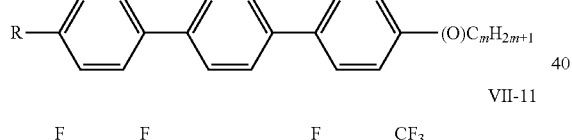
VII-13
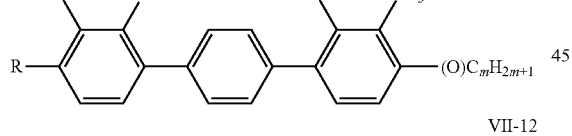
VII-14
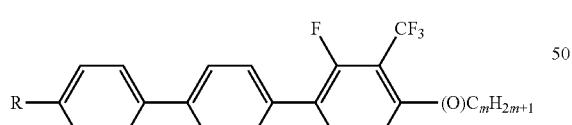
VII-15
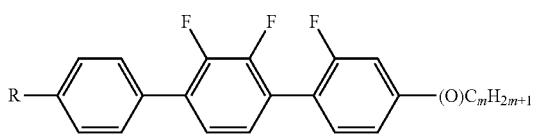
VII-16
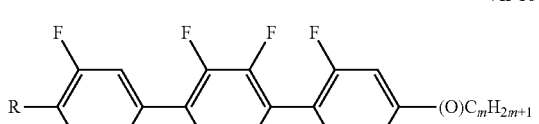
VII-17
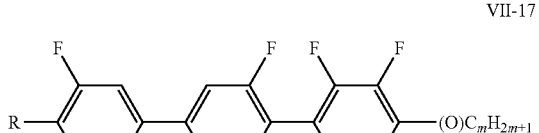
VII-18
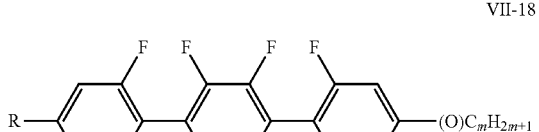
VII-19
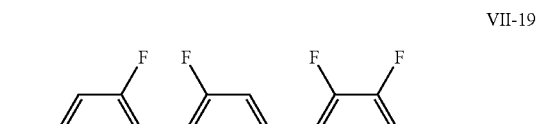
VII-20
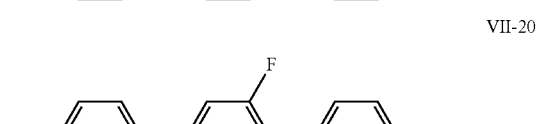
VII-21
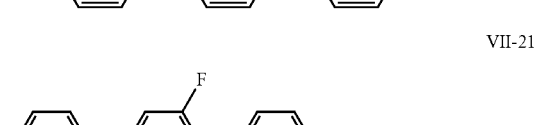
VII-22
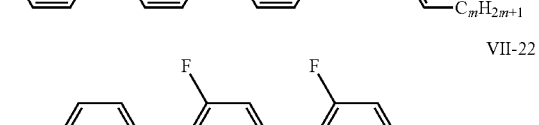
VII-23
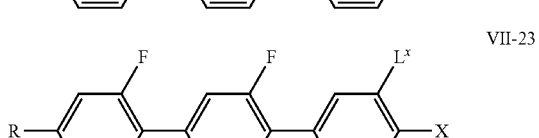
VII-24
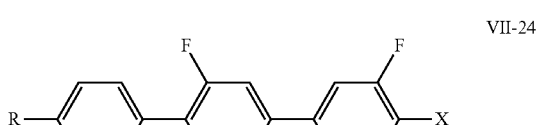

VII-25

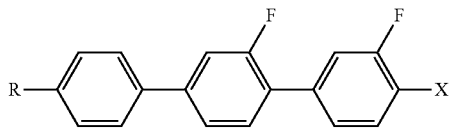

in which

R denotes a straight-chain alkyl or alkoxy radical having 1 to 6 C atoms, (O) denotes —O— or a single bond, X denotes F, Cl, $OCF_3$ or $OCHF_2$, $L^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or $OCH_3$, very preferably F.

The LC medium according to the invention preferably comprises the terphenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the Δn value of the mixture is to be 0.1. Preferred LC media comprise 2 to 20% by weight of one or more terphenyl compounds selected from the group of the compounds of formulae VII-1 to VII-25.

Further preferred embodiments are listed below:

a) LC medium comprising at least one compound of the formulae Z-1 to Z-7,

Z-1

Z-2
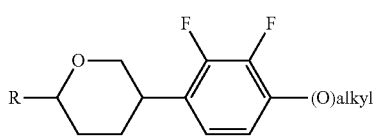

Z-3
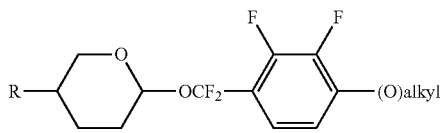

Z-4
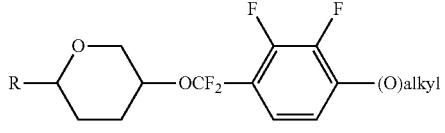

Z-5
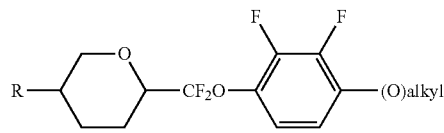

Z-6
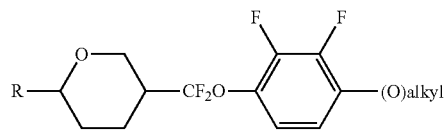

Z-7
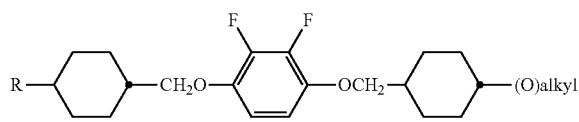

in which R, (O) and alkyl have the meanings indicated above for formula III.

b) Preferred LC media according to the invention comprise one or more substances which contain a tetrahydronaphthyl or naphthyl unit, such as, for example, the compounds of the formulae N-1 to N-5, N-1
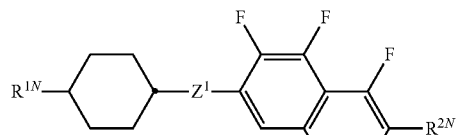

N-2
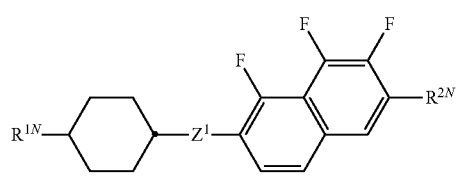

N-3
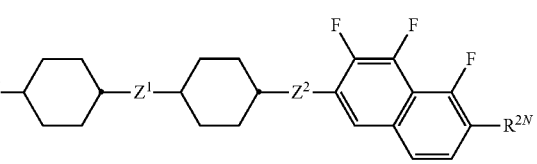

N-4
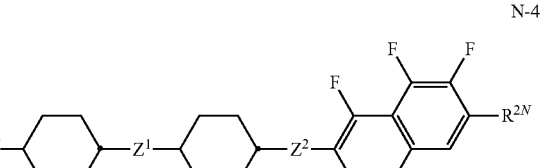

N-5
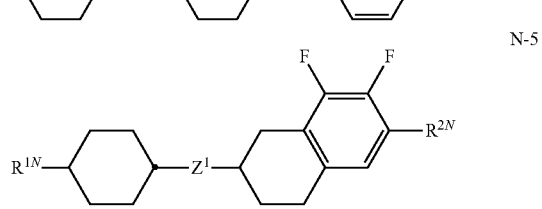

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

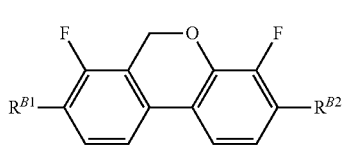
BC

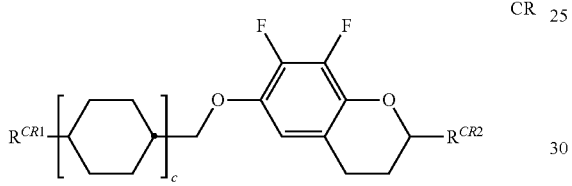
CR

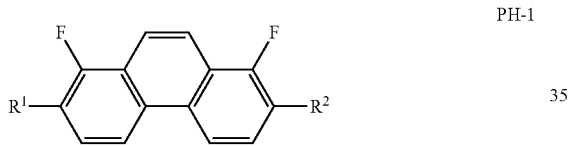
PH-1

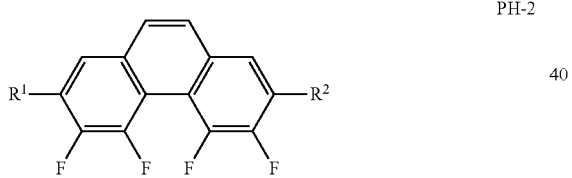
PH-2 in which $R^{B1}$, $R^{B2}$, $R^{CR1}$, $R^{CR2}$, $R^1$, $R^2$ each, independently of one another, have the meaning of $R^{2A}$. c is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

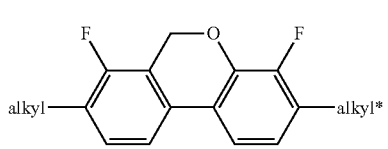
BC-1

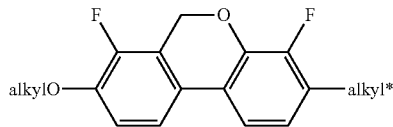
BC-2

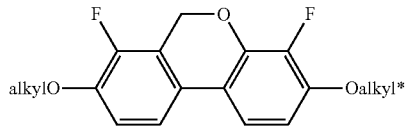
BC-3

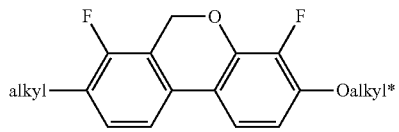
BC-4

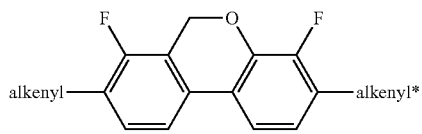
BC-5

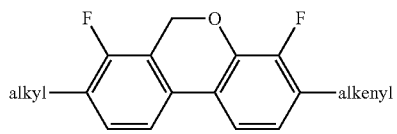
BC-6

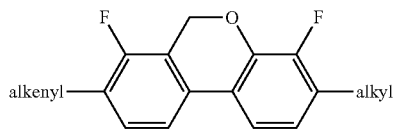
BC-7

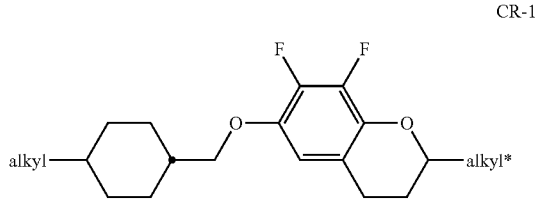
CR-1

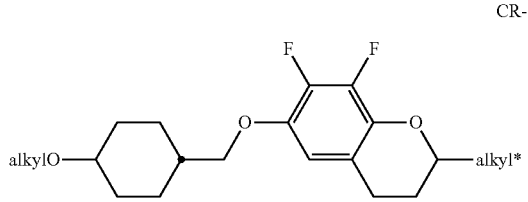
CR-2

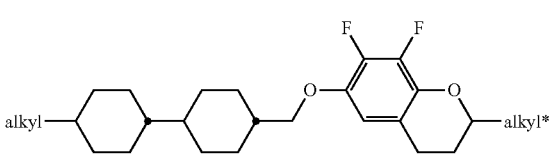
CR-3

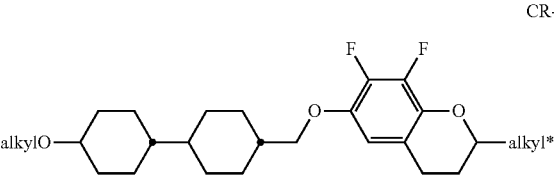
CR-4

-continued

CR-5

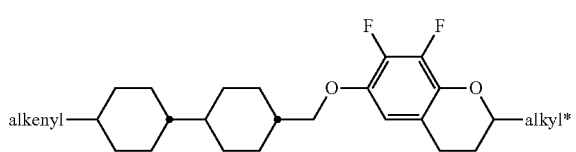

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to LC media comprising one, two or three compounds of the formula BC-2, BF-1 and/or BF-2.

d) Preferred LC media comprise one or more indane compounds of the formula In,

In

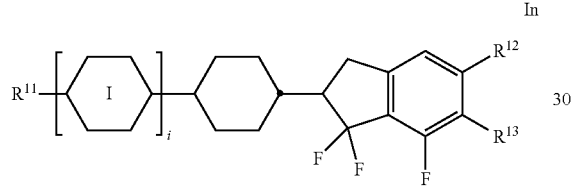

in which

R$^{11}$, R$^{12}$,

R$^{13}$ each, independently of one another, denote a straight-chain alkyl, alkoxy, alkoxyalkyl or alkenyl radical having 1 to 6 C atoms, R$^{12}$ and R$^{13}$ additionally denote halogen, preferably F,

denotes

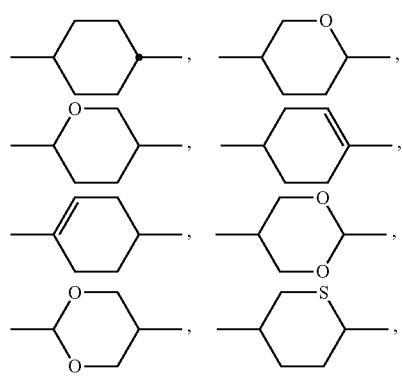

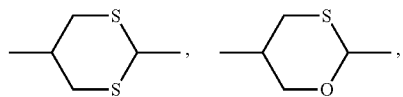

i denotes 0, 1 or 2.

Preferred compounds of the formula In are the compounds of the formulae In-1 to In-16 indicated below:

In-1

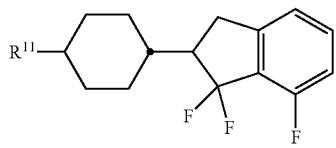

In-2

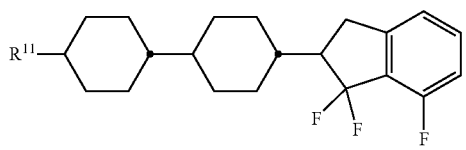

In-3

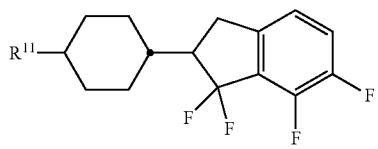

In-4

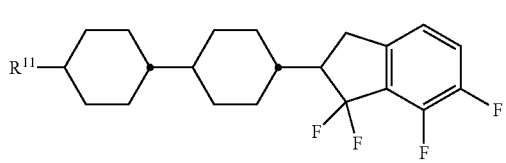

In-5

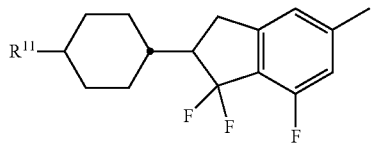

In-6

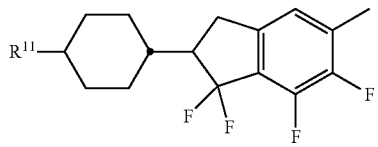

In-7

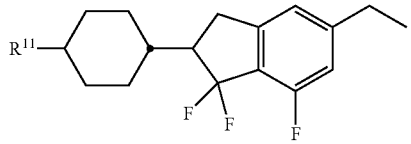

In-8

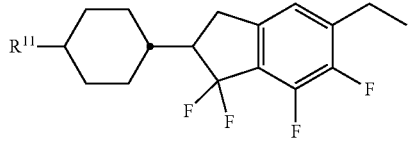

-continued

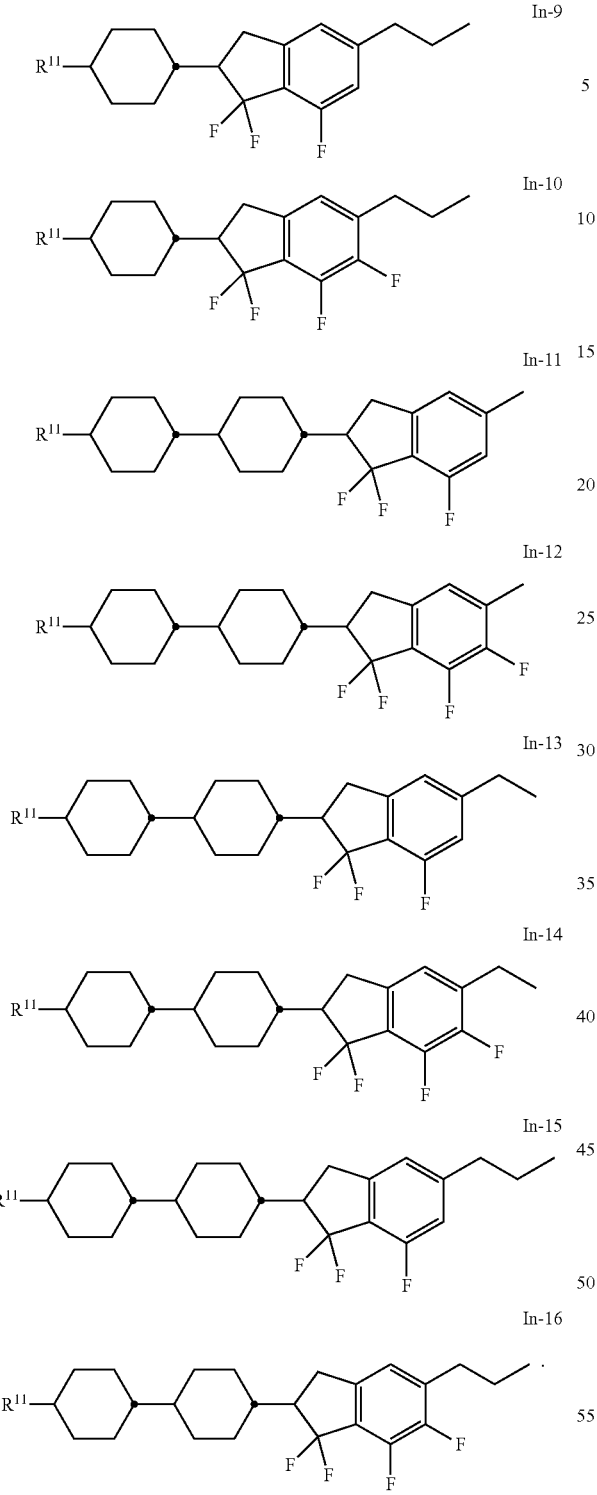

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) Preferred LC media additionally comprise one or more compounds of the formulae L-1 to L-5,

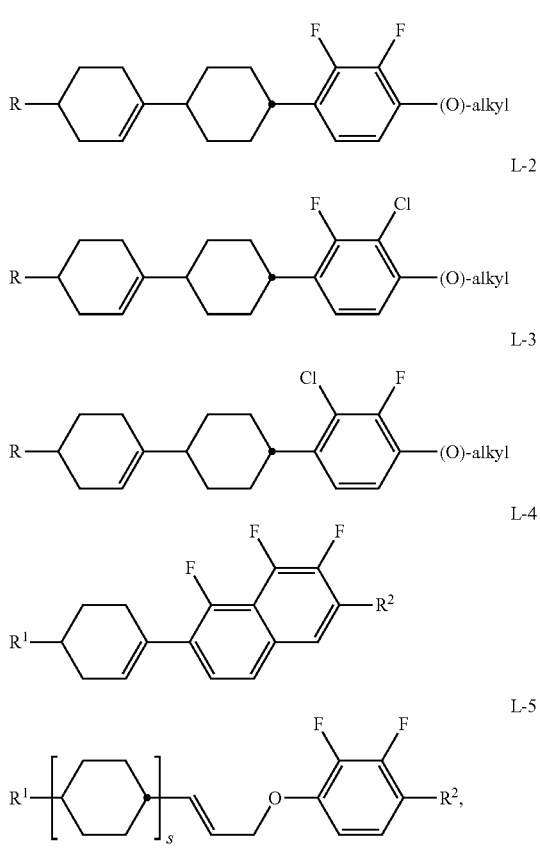

in which

R, $R^1$ and $R^2$ each, independently of one another, have the meanings indicated for $R^{2A}$ in formula IIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

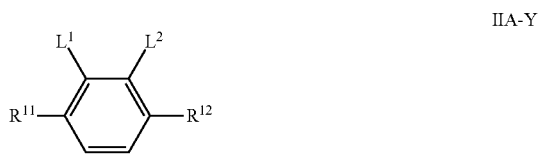

in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following subformulae

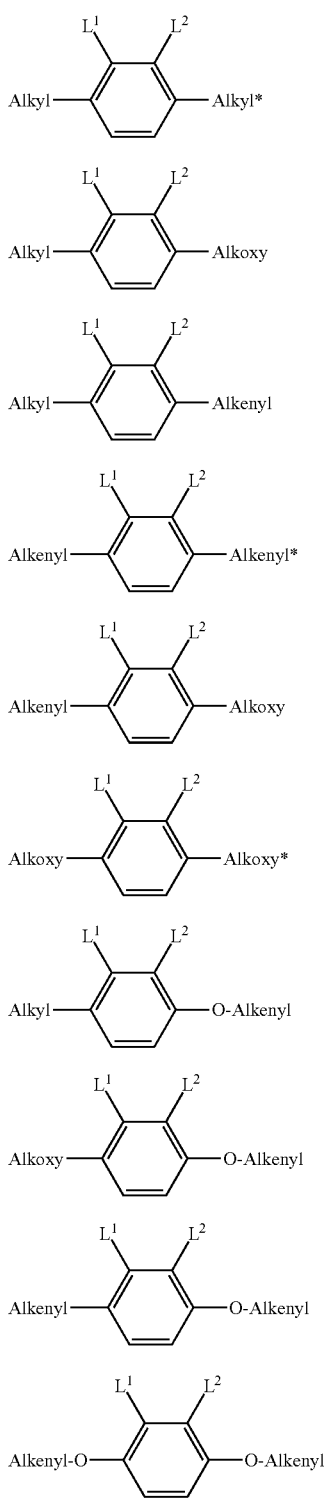

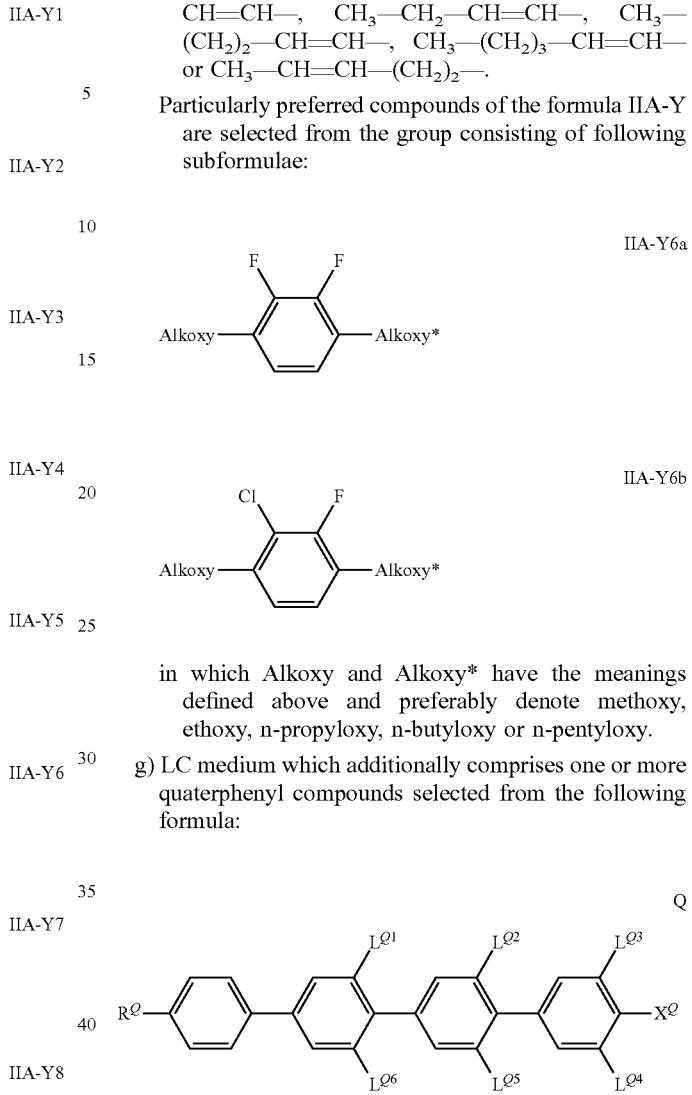

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula IIA-Y are selected from the group consisting of following subformulae:

in which Alkoxy and Alkoxy* have the meanings defined above and preferably denote methoxy, ethoxy, n-propyloxy, n-butyloxy or n-pentyloxy.

g) LC medium which additionally comprises one or more quaterphenyl compounds selected from the following formula:

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

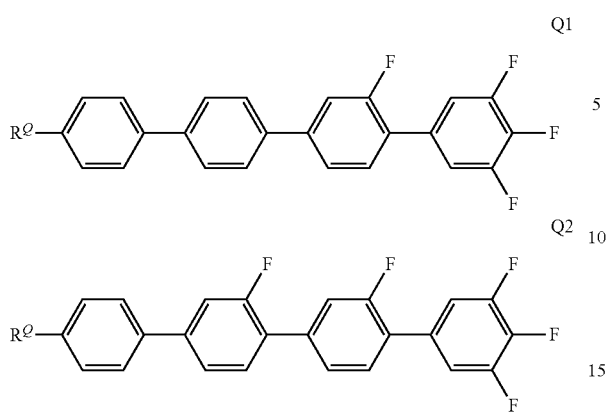

wherein $R^Q$ has one of the meanings of formula Q or one of its preferred meanings given above and below, and is preferably ethyl, n-propyl or n-butyl.

Especially preferred are compounds of formula Q1, in particular those wherein $R^0$ is n-propyl.

Preferably the proportion of compounds of formula Q in the LC host mixture is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking.

The LC media according to the invention preferably comprise one or more compounds of formula IA or its subformulae, preferably of formula IA2 or IA6, preferably in a concentration in the range from 0.02 to 0.5%, very preferably from 0.05 to 0.3%;

one or more compounds of formula IB or its subformulae, preferably of formula IB1, very preferably selected from formulae IB1-1 to IB1-5, preferably in a concentration in the range from 1 to 30%, very preferably from 2 to 20% by weight, most preferably from 2 to 15%;

one or more compounds of formula IC or its subformulae, preferably selected from formulae IC1 to IC4, very preferably of formula IC1, preferably in a concentration in the range from 0.5 to 8%, very preferably from 0.5 to 5% by weight, most preferably from 0.5 to 2%;

and/or one or more compounds of formulae IIA and IIB, preferably in a total concentration in the range of from 30% to 45%;

and/or one or more compounds of formula IV, preferably in a total concentration in the range of from 35% to 60%, more preferably from 40% to 55%, particularly preferably from 45% to 50%;

and/or one or more compounds of formula IIA and/or IIB, preferably in a total concentration in the range of from 30% to 65%, more preferably from 35% to 60%, particularly preferably from 40 to 55%.

In particular, the medium comprises one or more compounds CY-n-Om, in particular CY-3-O4, CY-5-O4 and/or CY-3-O2, preferably in a total concentration in the range of from 5% to 30%, preferably 10% to 20%;

one or more compounds PY-n-Om, in particular PY-1-O2, PY-2-O2 and/or PY-3-O2, preferably in a total concentration in the range of from 5% to 40%, preferably 10% to 30%;

and/or

CPY-n-Om, in particular CPY-2-O2, CPY-3-O2 and/or CPY-5-O2, preferably in concentrations >5%, in particular 7% to 20%, based on the mixture as a whole, and/or one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or

CPY-n-Om and CY-n-Om, preferably in concentrations of 10 to 80%, based on the mixture as a whole, and/or CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole, and/or the compound(s) of the formula CC-3-V1 and/or CC-4-V1, in a total concentration in the range of from 5 to 40%, more preferably from 15% to 35%, particularly preferably from 20% to 30%, and/or one or more compounds of formula B-nO—Om and/or B(S)-nO—Om, in particular the compound B(S)-2O-O5, preferably in a concentration in the range of from 2 to 10%, and the compound CC-3-V1 in a total concentration in the range of from 4 to 30%, preferably 5 to 20%.

and/or 0.1% to 3% of the compound PPGU-3-F.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 70° C. or more, preferably of 74° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2 \cdot$s$^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14. In a preferred embodiment of the present invention, the medium has a birefringence in the range of from 0.090 to 0.110, preferably from 0.095 to 0.108, in particular from 0.102 to 0.107.

The liquid-crystal mixture according to the invention has a dielectric anisotropy Δε of −1.5 to −8.0, preferably of −2.0 to −4.0, in particular −2.5 to −3.6, The rotational viscosity $\gamma_1$ at 20° C. is preferably 120 mPa·s, in particular 105 mPa·s. In a preferred embodiment, the rotational viscosity $\gamma_1$ at 20° C. is 100 mPa·s, in particular 95 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≥−0.5. Besides one or more compounds of the formula IA and IB, it preferably comprises the compounds of the formulae IIA, IIB and/or IIC, furthermore one or more compounds of the formula IV-1.

The proportion of component A is preferably between 45 and 100%, in particular between 60 and 85%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

A multiplicity of suitable materials is known to the person skilled in the art from the literature. Particular preference is given to compounds of the formula O-17.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of sup-pression of smectic phases that is achieved.

The mixture may optionally also comprise a component C, comprising compounds having a dielectric anisotropy of Δε 1.5. These so-called positive compounds are generally present in a mixture of negative dielectric anisotropy in amounts of 20% by weight, based on the mixture as a whole.

Besides one or more compounds of the formula IA and IB, the medium preferably comprises 4 to 15, in particular 5 to 12, and particularly preferably <10, compounds of the formulae IIA, IIB and/or IIC and optionally one or more compounds of the formula IV-1

Besides compounds of the formula IA and IB and the compounds of the formulae IIA, IIB and/or IIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyl-dioxanes, optionally halogenated stilbenes, benzyl phenyl ethers, tolanes and substituted cinnamic acid esters.

The most important compounds which are suitable as constituents of liquid-crystal phases of this type can be characterised by the formula OC

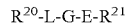

$R^{20}$-L-G-E-$R^{21}$     OC in which L and E each denote a carbo- or heterocyclic ring system from the group formed by 1,4-disubstituted benzene and cyclohexane rings, 4,4'-disubstituted biphenyl, phenyl-cyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline,

| G denotes | —CH=CH— | —N(O)=N— |
| --- | --- | --- |
| | —CH=CQ— | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO—Phe—COO— |
| | —CF$_2$O— | —CF=CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The LC medium has preferably a nematic LC phase.

Preferably the LC medium comprises one or more polymerizable compounds selected from formula M $$R^a—B^1—(Z^m—B^2)_m—R^b \quad M$$

in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^m$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—COO—, —OCO—CH=CH—, —CH$_2$CH$_2$—CO—O—, O—CO—CH$_2$—CH$_2$—, —CR$^0$R$^{00}$— or a single bond, $R^0$ and $R^{00}$ H or alkyl having 1 to 12 C atoms, m 0, 1, 2, 3 or 4, n1 1, 2, 3 or 4, L P, P-Sp-, OH, CH$_2$OH, F, Cl, Br, I, —CN, —NO$_2$, —NCO, —NCS, —OCN, —SCN, —O(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, $Y^1$ halogen, $R^x$ P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of CH$_2$=CW$^1$—CO—O—, CH$_2$=CW$^1$—CO—,

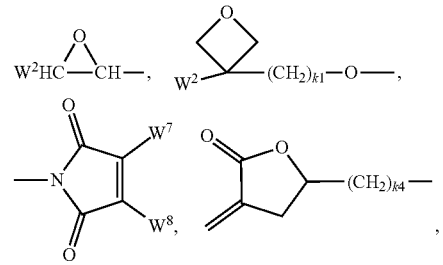

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1—CO—O—$, $CH_2=CW^1—CO—$,

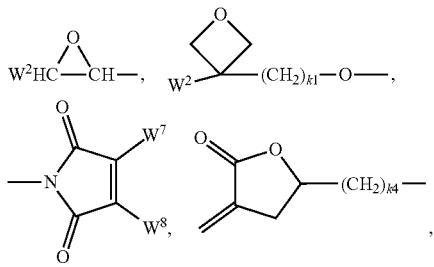

$CH_2=CW^2—O—$, $CH_2=CW^2—$, $CW^1=CH—CO—(O)_{k3}—$, $CW^1=CH—CO—NH—$, $CH_2=CW^1—CO—NH—$, $(CH_2=CH)_2CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $CH_2=CW^1—CO—NH—$, $CH_2=CH—(COO)_{k1}$-Phe-$(O)_{k2}—$, $CH_2=CH—(CO)_{k1}$-Phe-$(O)_{k2}—$, Phe-$CH=CH—$ and $W^4W^5W^6Si—$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1—CO—O—$, in particular $CH_2=CH—CO—O—$, $CH_2=C(CH_3)—CO—O—$ and $CH_2=CF—CO—O—$, furthermore $CH_2=CH—O—$, $(CH_2=CH)_2CH—O—CO—$, $(CH_2=CH)_2CH—O—$,

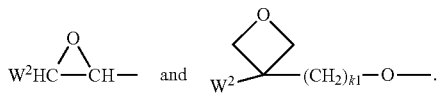

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably all polymerizable groups in the polymerizable compound have the same meaning.

If the spacer group Sp is different from a single bond, it is preferably of the formula Sp"-X", so that the respective radical P-Sp- conforms to the formula P-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R$^0$)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —COO—, —O—COO—, —CO—NR$^0$—, —NR$^0$—CO—, —NR$^0$—CO—NR$^{00}$— or a single bond.

Typical spacer groups Sp and -Sp"-X"— are, for example, —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, —(CH$_2$CH$_2$)$_{p1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

In a preferred embodiment of the invention the polymerizable compounds contain a spacer group Sp that is substituted by one or more polymerizable groups P, so that the group Sp-P corresponds to Sp(P)$_s$, with s being (branched polymerizable groups).

Preferred polymerizable compounds according to this preferred embodiment are those wherein s is 2, i.e. compounds which contain a group Sp(P)$_2$. Very preferred polymerizable compounds according to this preferred embodiment contain a group selected from the following formulae:

| | |
|---|---|
| —X-alkyl-CHPP | S1 |
| —X-alkyl-CH((CH$_2$)$_{aa}$P)((CH$_2$)$_{bb}$P) | S2 |
| —X—N((CH$_2$)$_{aa}$P)((CH$_2$)$_{bb}$P) | S3 |
| —X-alkyl-CHP—CH$_2$—CH$_2$P | S4 |
| —X-alkyl-C(CH$_2$P)(CH$_2$P)—C$_{aa}$H$_{2aa+1}$ | S5 |
| —X-alkyl-CHP—CH$_2$P | S6 |
| —X-alkyl-CPP—C$_{aa}$H$_{2aa+1}$ | S7 |
| —X-alkyl-CHPCHP-C$_{aa}$H$_{2aa+1}$ | S8 | in which P is as defined in formula M, alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where R⁰ has the meaning indicated above,
aa and bb each, independently of one another, denote 0, 1, 2, 3, 4, 5 or 6,
X has one of the meanings indicated for X", and is preferably O, CO, SO$_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

—CHPP                              S1a

—O—CHPP                            S1b

—CH$_2$—CHPP                       S1c

—OCH$_2$—CHPP                      S1d

—CH(CH$_2$—P)(CH$_2$—P)            S2a

—OCH(CH$_2$—P)(CH$_2$—P)           S2b

—CH$_2$—CH(CH$_2$—P)(CH$_2$—P)     S2c

—OCH$_2$—CH(CH$_2$—P)(CH$_2$—P)    S2d

—CO—NH((CH$_2$)$_2$P)((CH$_2$)$_2$P)  S3a

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —(CH$_2$)$_{p1}$—, —(CH$_2$)$_{p2}$—CH═CH—(CH$_2$)$_{p3}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, preferably 2 or 3, p2 and p3 are independently of each other 0, 1, 2 or 3 and, if Sp is —O—(CH$_2$)$_{p1}$—, —O—CO—(CH$_2$)$_{p1}$ or —CO—O—(CH$_2$)$_{p1}$ the O-atom or CO— group, respectively, is linked to the benzene ring.

Further preferably at least one group Sp is a single bond.

Further preferably at least one group Sp is different from a single bond, and is preferably selected from —(CH$_2$)$_{p1}$—, —(CH$_2$)$_{p2}$—CH═CH—(CH$_2$)$_{p3}$—, —O—(CH$_2$)$_{p1}$—, —O—CO—(CH$_2$)$_{p}$i, or —CO—O—(CH$_2$)$_{p}$i, wherein p1 is 2, 3, 4, 5 or 6, preferably 2 or 3, p2 and p3 are independently of each other 0, 1, 2 or 3 and, if Sp is —O—(CH$_2$)$_{p1}$—, —O—CO—(CH$_2$)$_{p1}$ or —CO—O—(CH$_2$)$_{p1}$ the O-atom or CO— group, respectively, is linked to the benzene ring.

Very preferably Sp is different from a single bond, and is selected from —(CH$_2$)$_2$—, —(CH$_2$)$_3$—, —(CH$_2$)$_4$—, —O—(CH$_2$)$_2$—, —O—(CH$_2$)$_3$—, —O—CO—(CH$_2$)$_2$ and —CO—O—(CH)$_2$—, wherein the O atom or the CO group is attached to the benzene ring.

Particularly preferred compounds of the formula M are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which B$^1$ and B$^2$ each, independently of one another, denote 1,4-phenylene, 1,3-phenylene, naphthalene-1,4-diyl or naphthalene-2,6-diyl.

Further preferred compounds of the formula M are those in which the group —B$^1$—(Z$^m$—B$^2$)$_m$— in formula M is selected from the following formulae

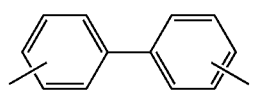
A1

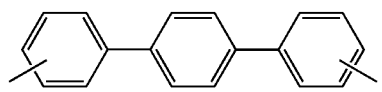
A2

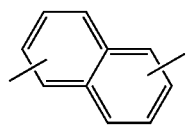
A3

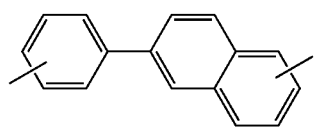
A4

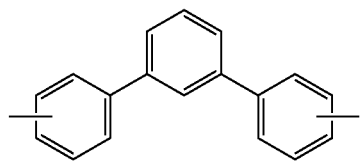
A5

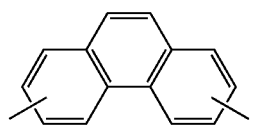
A6 wherein at least one benzene ring is substituted by at last one group L and the benzene rings are optionally further substituted by one or more groups L or P-Sp-.

Preferred compounds of formula M and its sub-formulae are selected from the following preferred embodiments, including any combination thereof:

All groups P in the compound have the same meaning,
—B$^1$—(Z$^m$—B$^2$)$_m$— is selected from formulae A1, A2 and A5,
the compounds contain exactly two polymerizable groups (represented by the groups P),
the compounds contain exactly three polymerizable groups (represented by the groups P),
P is selected from the group consisting of acrylate, methacrylate and oxetane, very preferably acrylate or methacrylate,
P is methacrylate,
all groups Sp are a single bond,
at least one of the groups Sp is a single bond and at least one of the groups Sp is different from a single bond, Sp, when being different from a single bond, is —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the 0-atom or the CO— group, respectively, is connected to the benzene ring, Sp is a single bond or denotes -(CH$_2$)$_{p2}$—, —(CH$_2$)$_{p2}$—O—, —(CH$_2$)$_{p2}$-CO-O—, —(CH$_2$)$_{p2}$—O—CO—, wherein p2 is 2, 3, 4, 5 or 6, and the O-atom or the CO— group, respectively, is connected to the benzene ring, R denotes P-Sp-, R does not denote or contain a polymerizable group, R does not denote or contain a polymerizable group and denotes straight chain, branched or cyclic alkyl having 1 to 25 C atoms, wherein one or more non-adjacent CH$_2$-groups are optionally replaced by —O—, S—, —CO—, —CO—O—, —O—CO—, —O—CO—O— in such a manner that O- and/or S-atoms are not directly connected with each other, and wherein one or more H atoms are each optionally replaced by F, Cl or L$^a$, L or L' denote F, Cl or CN, L is F.

Very preferred compounds of formula M are selected from the following formulae:

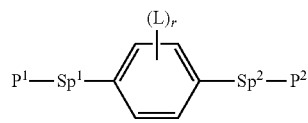
M1

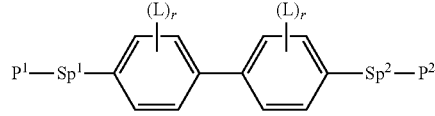
M2

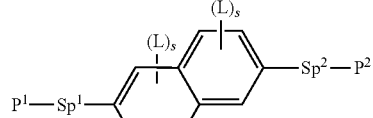
M3

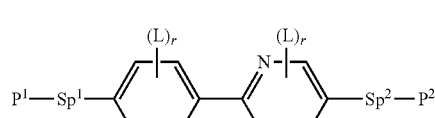
M4

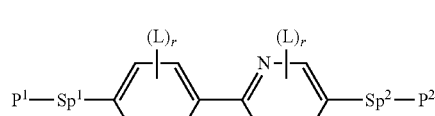
M5

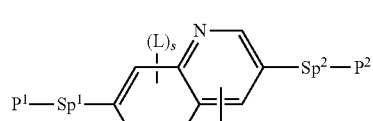
M6

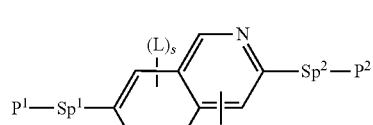
M7

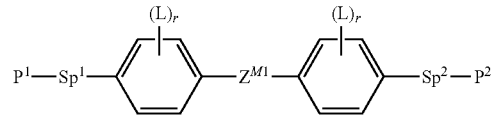
M8

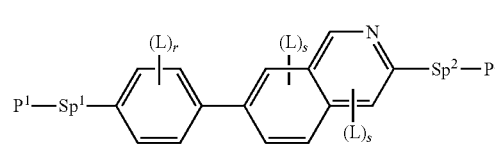
M9

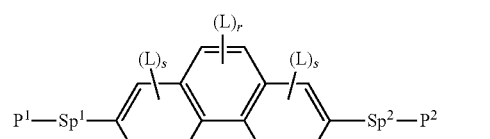
M10

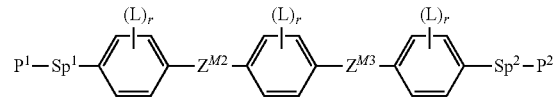
M11

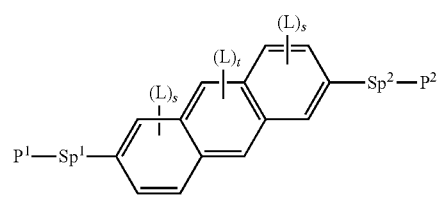
M12

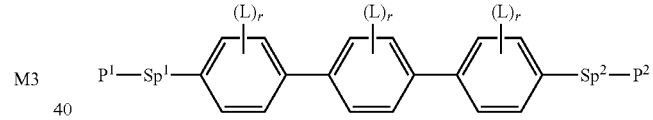
M13

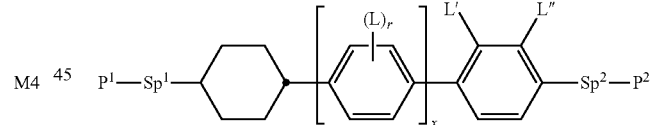
M14

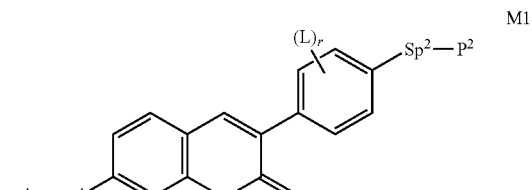
M15

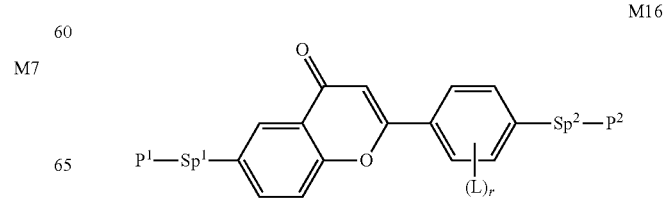
M16

M17
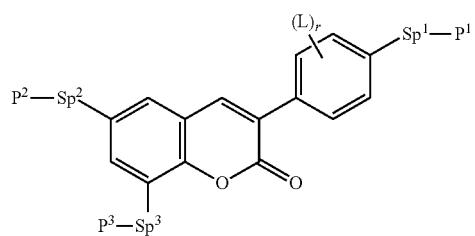
M18
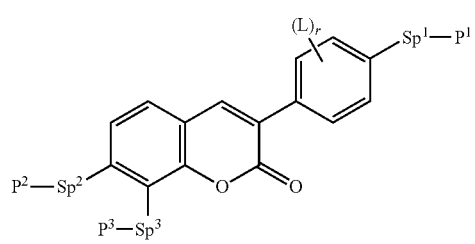
M19
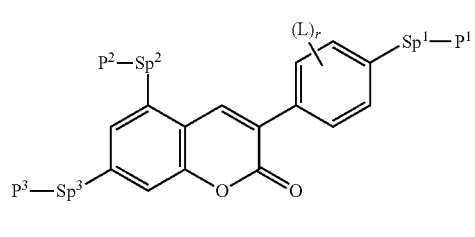
M20
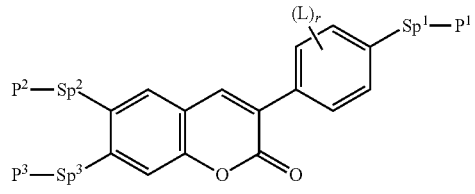
M21
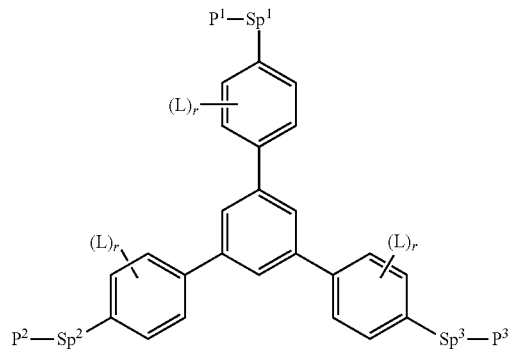
M22
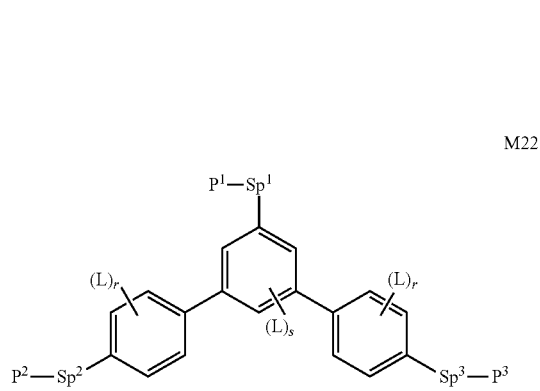
M23
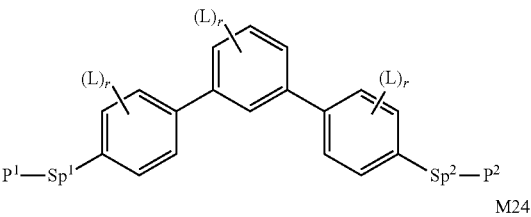
M24
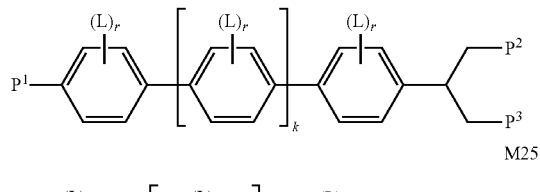
M25
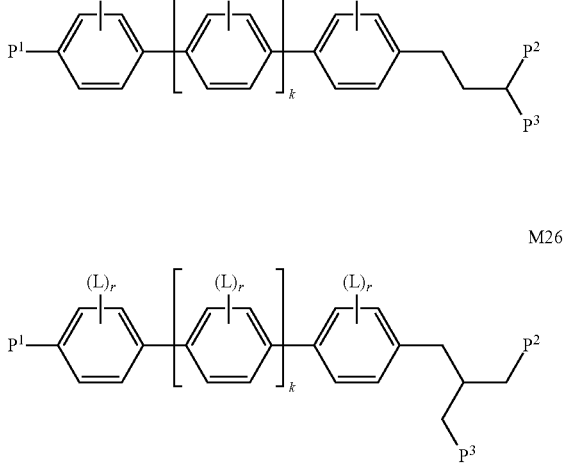
M26
M27
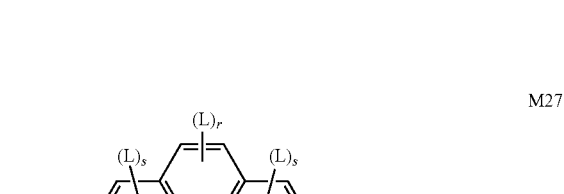
M28
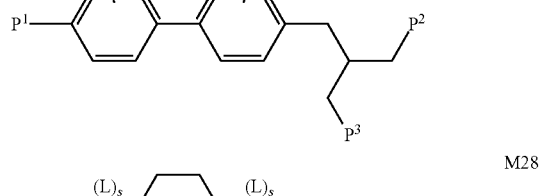
M29
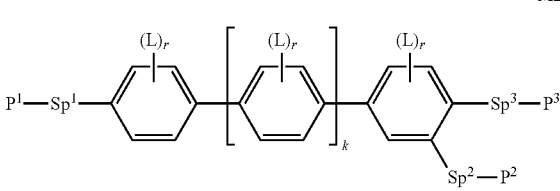

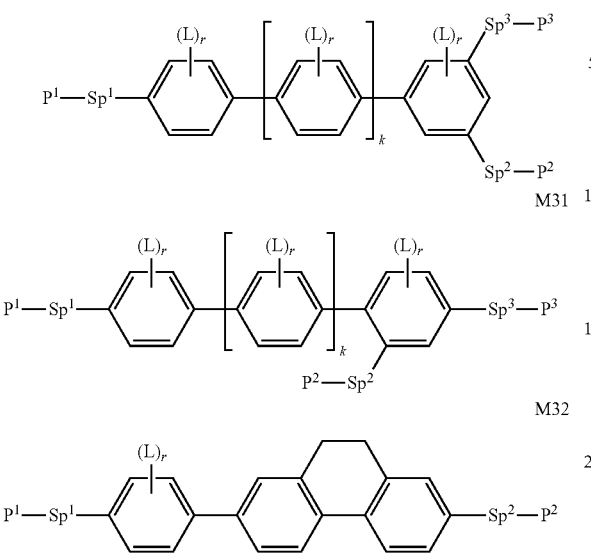

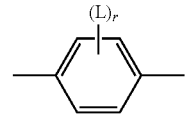

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, very preferably acrylate or methacrylate, $Sp^1$, $Sp^2$, Spa a single bond or a spacer group where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, preferably having one of the preferred meanings of Sp as given above, very preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by —O($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein $R^{aa}$ does not denote or contain a group $P^1$, $P^2$ or $P^3$, $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, —C($R^y R^z$)— or —$CF_2CF_2$—, $Z^{M2}$, $Z^{M3}$ —CO—O—, —O—CO—, —$CH_2O$—, —$OCH_2$—, —$CF_2O$—, —$OCF_2$— or —$(CH_2)_n$—, where n is 2, 3 or 4, L F, Cl, CN or straight-chain or branched, optionally mono- or polyfluorinated alkyl, alkoxy, thioalkyl, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2, M13 and M32, especially direactive compounds containing exactly two polymerizable groups $P^1$ and $P^2$.

Further preferred are compounds selected from formulae M17 to M31, in particular from formulae M20, M22, M26, M29 and M31, especially trireactive compounds containing exactly three polymerizable groups $P^1$, $P^2$ and $P^3$.

In the compounds of formulae M1 to M32 the group

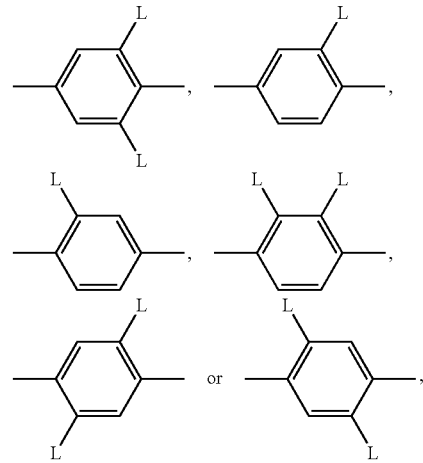

is preferably wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, —CH=$CH_2$, C($CH_3$)=$CH_2$, $SCH_3$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, —CH=$CH_2$, C($CH_3$)=$CH_2$, $SCH_3$, $OCH_3$, $COCH_3$, $OCF_3$ or P-Sp-, more preferably F, Cl, $CH_3$, —CH=$CH_2$, C($CH_3$)=$CH_2$, $SCH_3$, $OCH_3$, $COCH_3$ or $OCF_3$, most preferably F, $SCH_3$ or $OCH_3$.

Preferred compounds of formulae M1 to M32 are those wherein $P^1$, $P^2$ and $P^3$ denote an acrylate, methacrylate, oxetane or epoxy group, very preferably an acrylate or methacrylate group, most preferably a methacrylate group.

Further preferred compounds of formulae M1 to M32 are those wherein $Sp^1$, $Sp^2$ and $Sp^3$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Further preferred compounds of formula M and M1 to M32 are selected from Table D, especially selected from the group consisting of formulae RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-150 to RM-156, RM-162, RM-163 and RM-164 to RM-176.

Particularly preferred are LC media comprising one, two or three polymerizable compounds of formula M.

Further preferred are LC media comprising two or more direactive polymerizable compounds of formula M, preferably selected from formulae M1 to M16 and M32, very preferably selected from formulae M2, M13 and M32.

Further preferred are LC media comprising one or more direactive polymerizable compounds of formula M, preferably selected from formulae M1 to M16 and M32, very preferably from formulae M2, M13 and M32, and one or more trireactive polymerizable compounds of formula M, preferably selected from formulae M17 to M32, very preferably from formulae M20, M22, M26, M29 and M31.

Further preferred are LC media comprising one or more polymerizable compounds of formula M wherein at least one r is not 0, or at least one of s and t is not 0, very preferably selected from formulae M2, M13, M22, M24, M27, M29, M31 and M32, and wherein L is selected from the preferred groups shown above, most preferably from F, $OCH_3$ and $SCH_3$.

Further preferred are LC media comprising one or more polymerizable compounds which show absorption in the wavelength range from 320 to 380 nm, preferably selected from formula M, very preferably from formulae M1 to M32.

Particular preference is given to LC media comprising one, two or three polymerizable compounds selected from formula M or formulae M1 to M32.

The combination of compounds of the preferred embodiments mentioned above with the polymerized compounds described above and below causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

For use in PSA displays the total proportion of the polymerizable compounds, like those of formula M or M1 to M32, in the LC medium is preferably from 0.01 to 2.0%, very preferably from 0.1 to 1.0%, most preferably from 0.2 to 0.8%.

For use in SA-VA displays the total proportion of the polymerizable compounds, like those of formula M or M1 to M32, in the LC medium is preferably from >0 to <3%, very preferably from >0 to <2%, more preferably from 0.05 to 2.0, most preferably from 0.05 to 1.0%.

The compounds of the formulae M and its subformulae can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'ethylcarbodiimide (EDC) or N-(3-dimethylaminopropyl)-N'-ethylcarbodiimide hydrochloride and DMAP.

The invention furthermore relates to an LC medium or LC display as described above, wherein the polymerizable compounds, like those of formula M and its subformulae, are present in polymerized form.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The the LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (Ciba AG), such as, for example, Irganox® 1076. If stabilizers are employed, their proportion, based on the total amount of RMs or the polymerizable component (component A), is preferably 10-50,000 ppm, particularly preferably 50-5,000 ppm.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilizers, preferably selected from the the group consisting of the following formulae S1
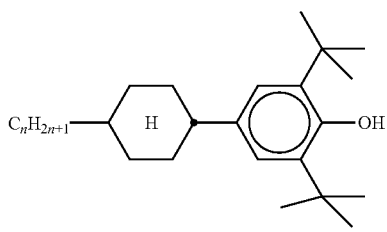

S2
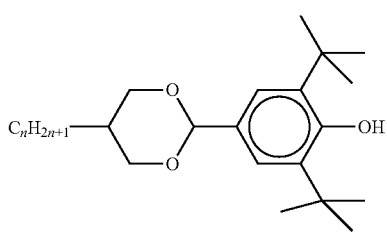

S3
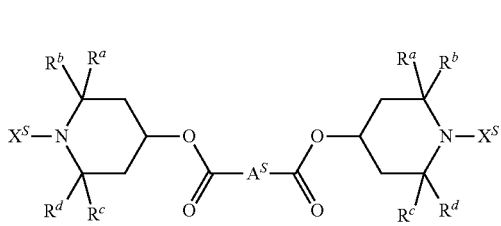

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, CH$_3$, OH or O•, $A^S$ straight-chain, branched or cyclic alkylene with 1 to 20 C atoms which is optionally substituted, n an integer from 1 to 6, preferably 3.

Preferred stabilizers of formula S3 are selected from formula S3A

S3A
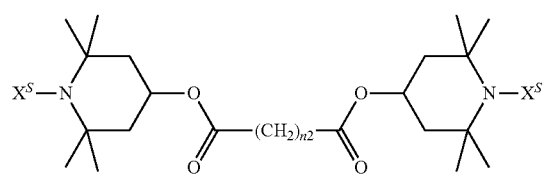

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilizers are selected from the group consisting of the following formulae S1-1
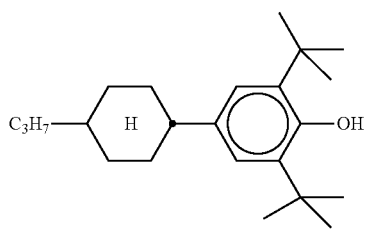

S1-2
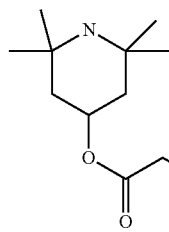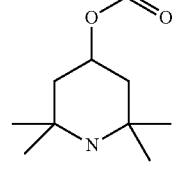

S3-1
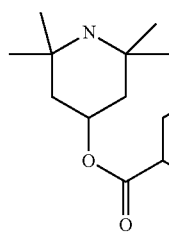

S3-2
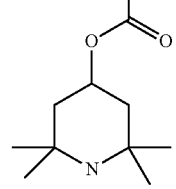

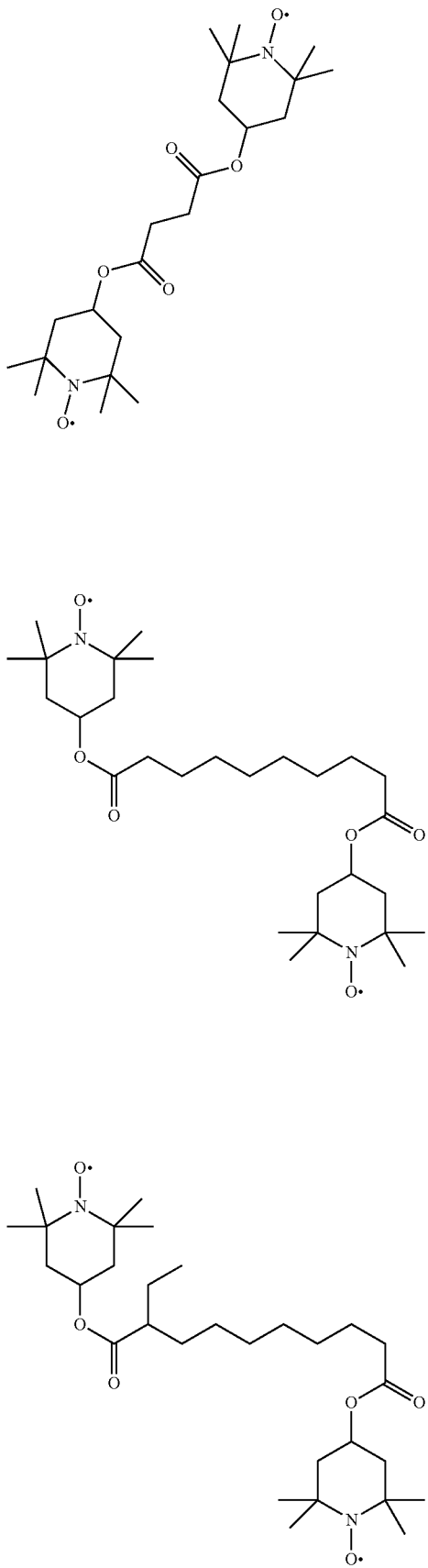

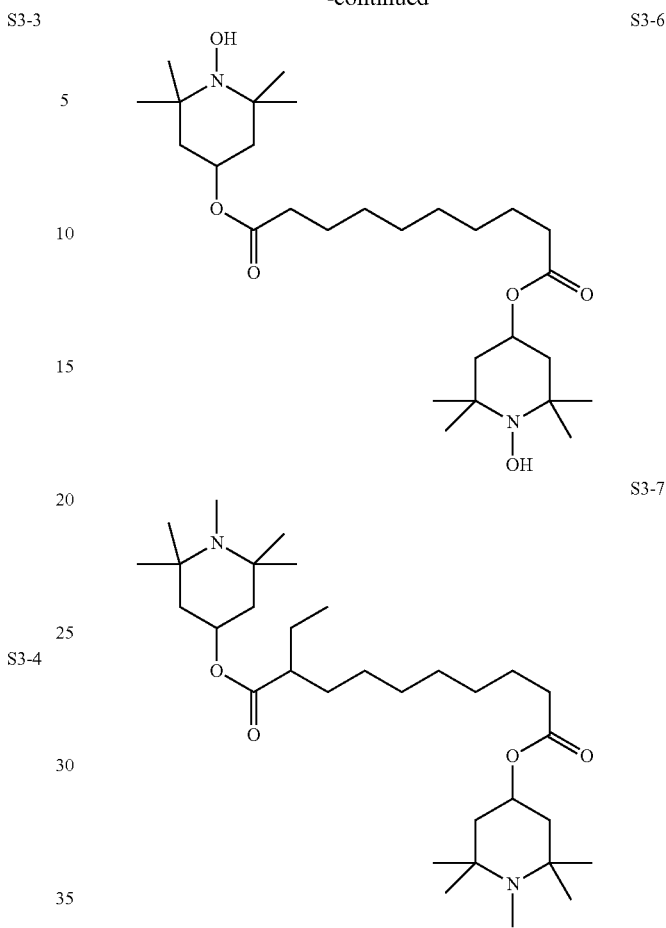

In a preferred embodiment the liquid-crystalline medium comprises one or more stabilizers selected from the group consisting of formulae S1-1, S2-1, S3-1, S3-1 and S3-3.

In a preferred embodiment the liquid-crystalline medium comprises one or more stabilizers selected from Table C below.

Preferably the proportion of stabilizers, like those of formula S1-S3, in the liquid-crystalline medium is from 10 to 500 ppm, very preferably from 20 to 100 ppm.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilized SA-VA display according to the present invention contains one or more self alignment additives selected from Table E below.

In another preferred embodiment the LC medium according to the present invention contains one or more SA additives, preferably selected from Table E, in a concentration from 0.1 to 5%, very preferably from 0.2 to 3%, most preferably from 0.2 to 1.5%.

The invention furthermore relates to an LC display comprising an LC medium according to the invention as described above and below, which is a preferably a PSA or SA display, very preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

For the production of PSA or polymer stabilized SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:
 a first substrate including a pixel electrode defining pixel areas, the pixel electrode being connected to a switching element disposed in each pixel area and optionally including a micro-slit pattern, and optionally a first alignment layer disposed on the pixel electrode,
 a second substrate including a common electrode layer, which may be disposed on the entire portion of the second substrate facing the first substrate, and optionally a second alignment layer,
 an LC layer disposed between the first and second substrates and including an LC medium as described above and below, wherein the polymerizable compounds may also be present in polymerized form.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

The polymerizable compounds of formula M and its subformulae do in particular show good UV absorption in, and are therefore especially suitable for, a process of preparing a PSA display including one or more of the following features or any combination thereof:
 the polymerizable medium is exposed to UV light in the display in a 2-step process, including a first UV exposure step ("UV1 step"), with application of a voltage to the electrodes of the display, to generate the tilt angle, and a second UV exposure step ("UV2 step"), without application of a voltage to the electrodes of the display, to complete polymerization of the polymerizable compounds,
 the polymerizable medium is exposed to UV light in the display generated by an UV-LED lamp, preferably at least in the UV2 step, more preferably both in the UV1 and UV2 step,
 the polymerizable medium is exposed to UV light in the display generated by an energy-saving UV lamp (also known as "green UV lamps"). These lamps are characterized by a relative low intensity ($\frac{1}{100}$-$\frac{1}{10}$ of a conventional UV1 lamp) in their absorption spectra from 300-380 nm, and are preferably used in the UV2 step, but are optionally also used in the UV1 step when avoiding high intensity is necessary for the process,
 the polymerizable medium is exposed to UV light in the display generated by a UV lamp with a radiation spectrum that is shifted to longer wavelengths, preferably 340 nm, more preferably from 350 to <370 nm, very preferably from 355 to 368 nm, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features or any combination thereof:

- the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization of the polymerizable compounds,
- the polymerizable LC medium is irradiated by UV light generated by a UV lamp having an intensity of from 0.5 mW/cm$^2$ to 10 mW/cm$^2$ in the wavelength range from 300-380 nm, preferably in the UV2 step, and optionally also in the UV1 step,
- the polymerizable LC medium is irradiated by UV light having a wavelength of ≥340 nm, and preferably ≤420 nm, very preferably in the range from 340 to 380 nm, more preferably in the range from 350 to <370 nm, most preferably in the range from 355 to 368 nm,
- the polymerizable LC medium is irradiated by UV light while a voltage is applied to the electrodes of the display,
- irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

Preferably UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 340 to 380 nm. UV-LED lamps emitting UV light with a wavelength of 365 nm are especially preferred.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
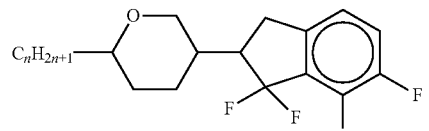
AlK-n-F
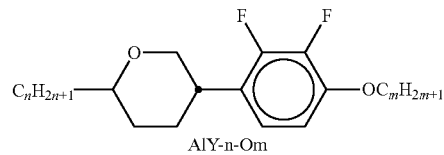
AlY-n-Om
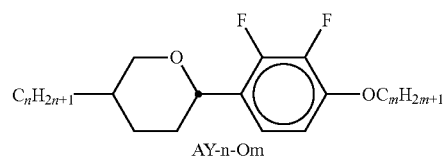
AY-n-Om
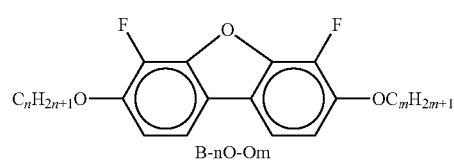
B-nO-Om
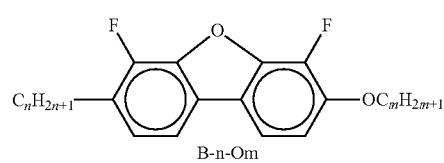
B-n-Om
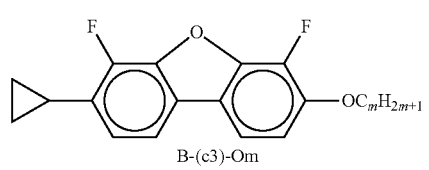
B-(c3)-Om
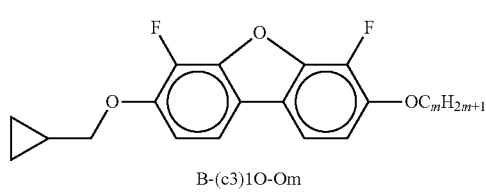
B-(c3)1O-Om
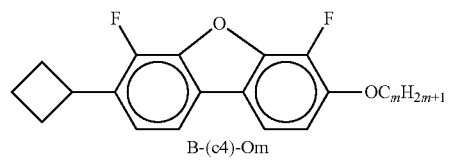
B-(c4)-Om
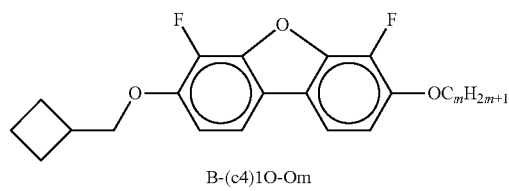
B-(c4)1O-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
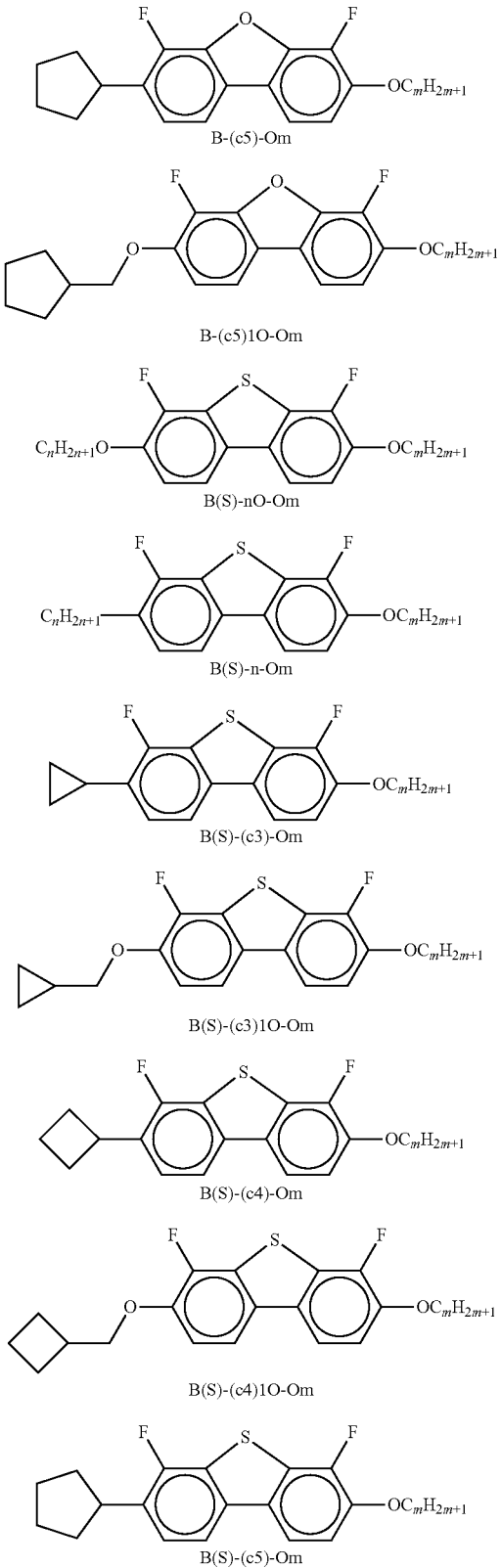

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
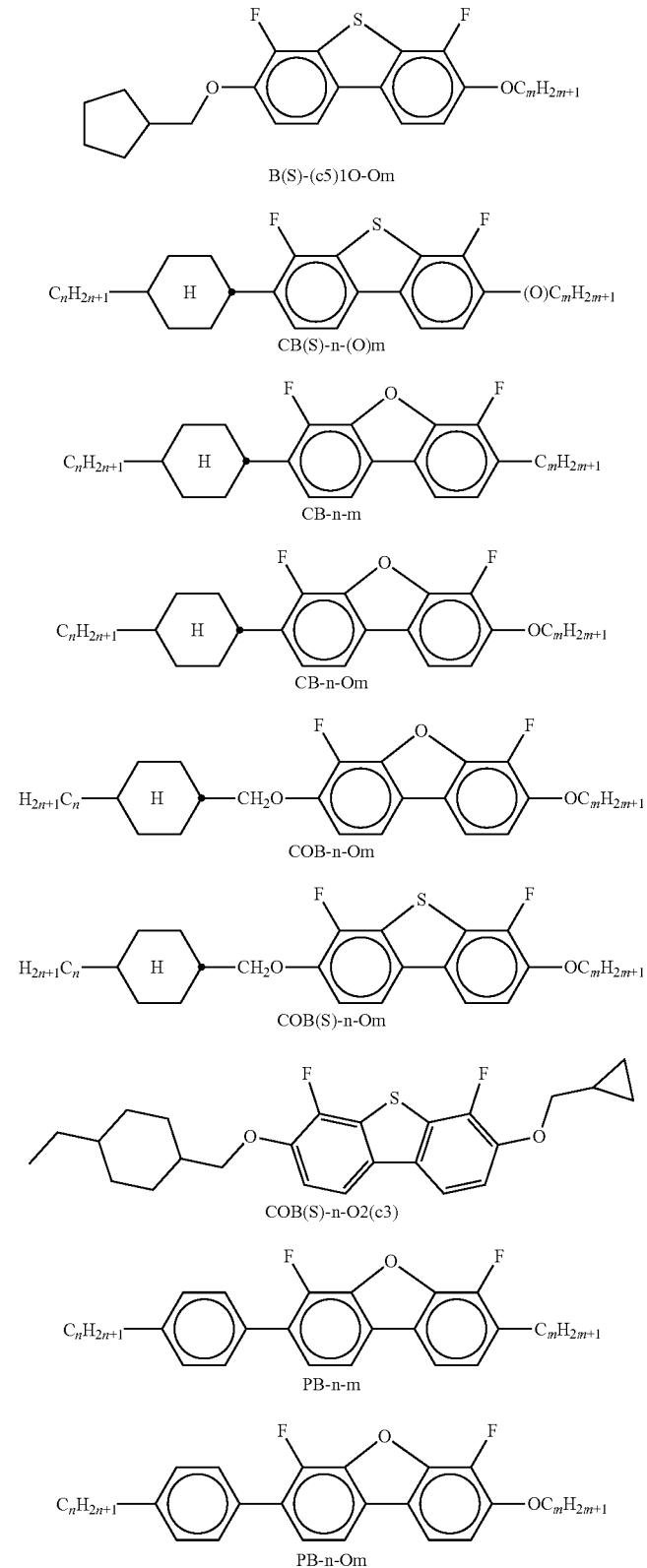

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
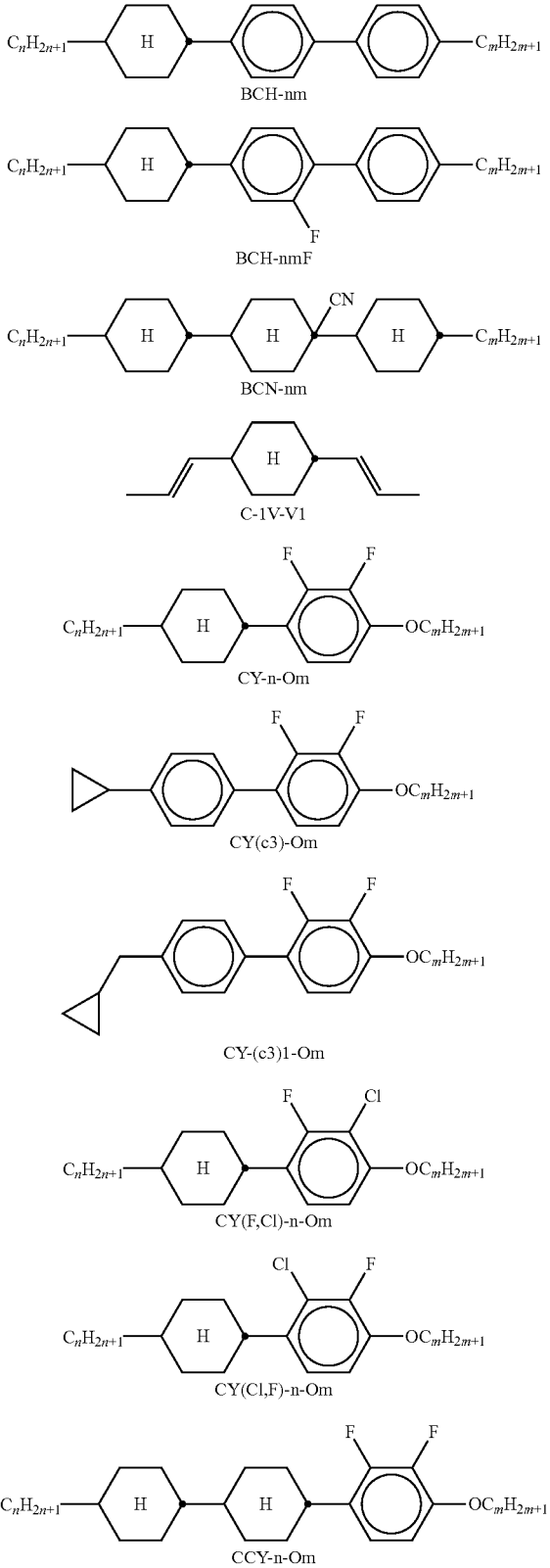

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
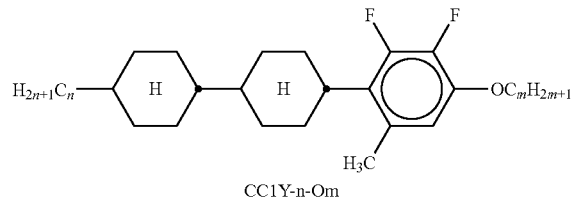
CC1Y-n-Om
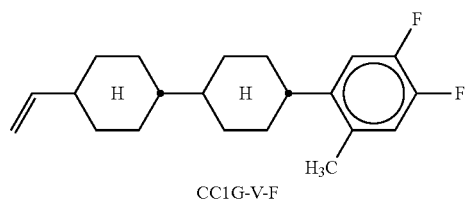
CC1G-V-F
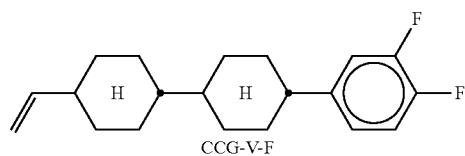
CCG-V-F
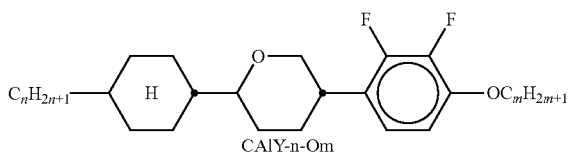
CAIY-n-Om
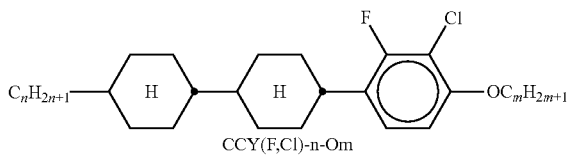
CCY(F,Cl)-n-Om
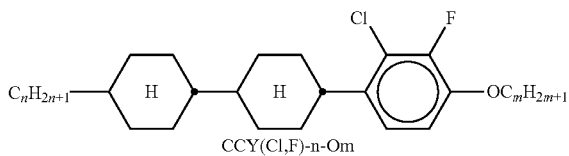
CCY(Cl,F)-n-Om
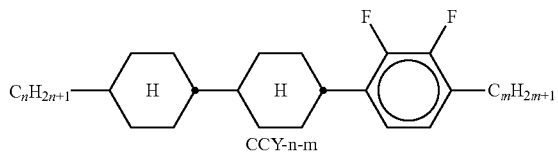
CCY-n-m
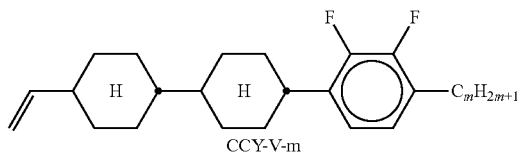
CCY-V-m
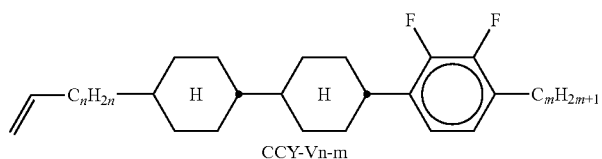
CCY-Vn-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
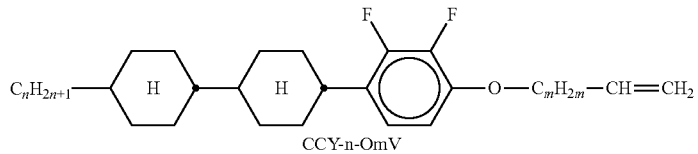
CCY-n-OmV
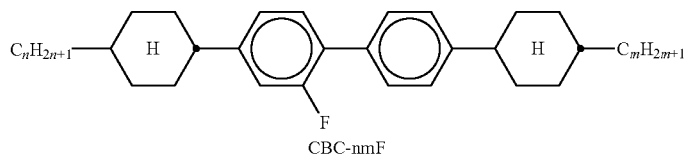
CBC-nmF
CBC-nm
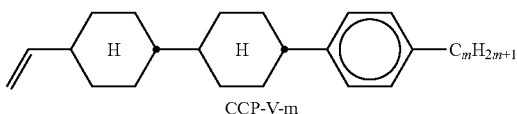
CCP-V-m
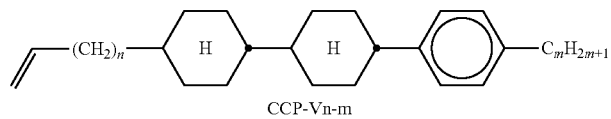
CCP-Vn-m
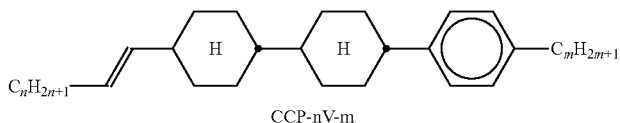
CCP-nV-m
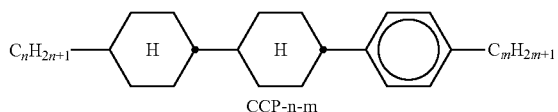
CCP-n-m
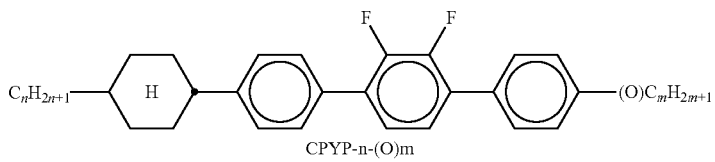
CPYP-n-(O)m
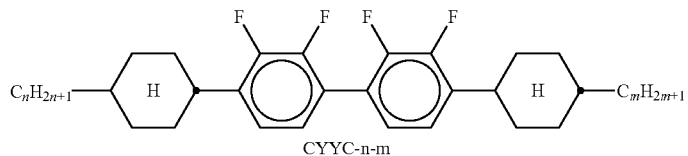
CYYC-n-m
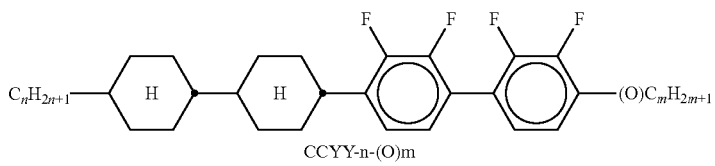
CCYY-n-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
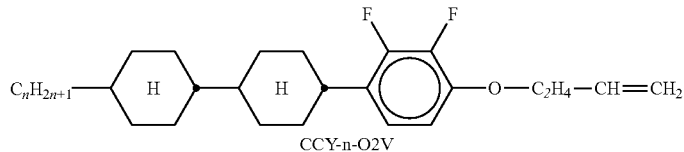
CCY-n-O2V
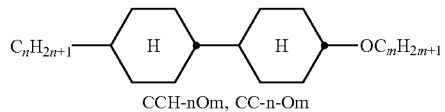
CCH-nOm, CC-n-Om
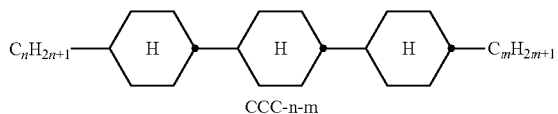
CCC-n-m
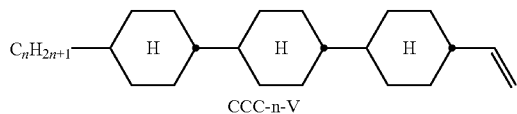
CCC-n-V
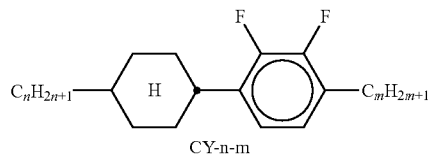
CY-n-m
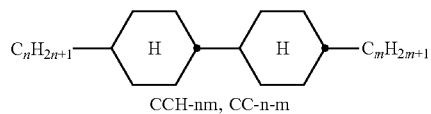
CCH-nm, CC-n-m
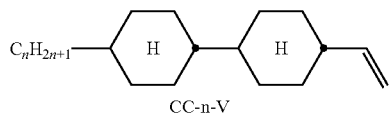
CC-n-V
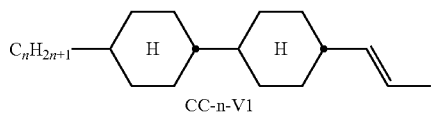
CC-n-V1
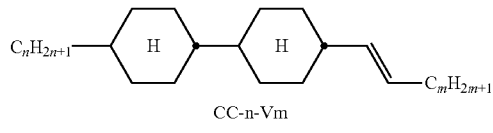
CC-n-Vm
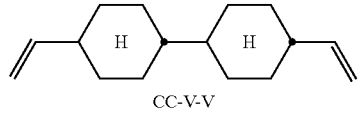
CC-V-V
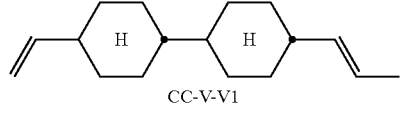
CC-V-V1

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
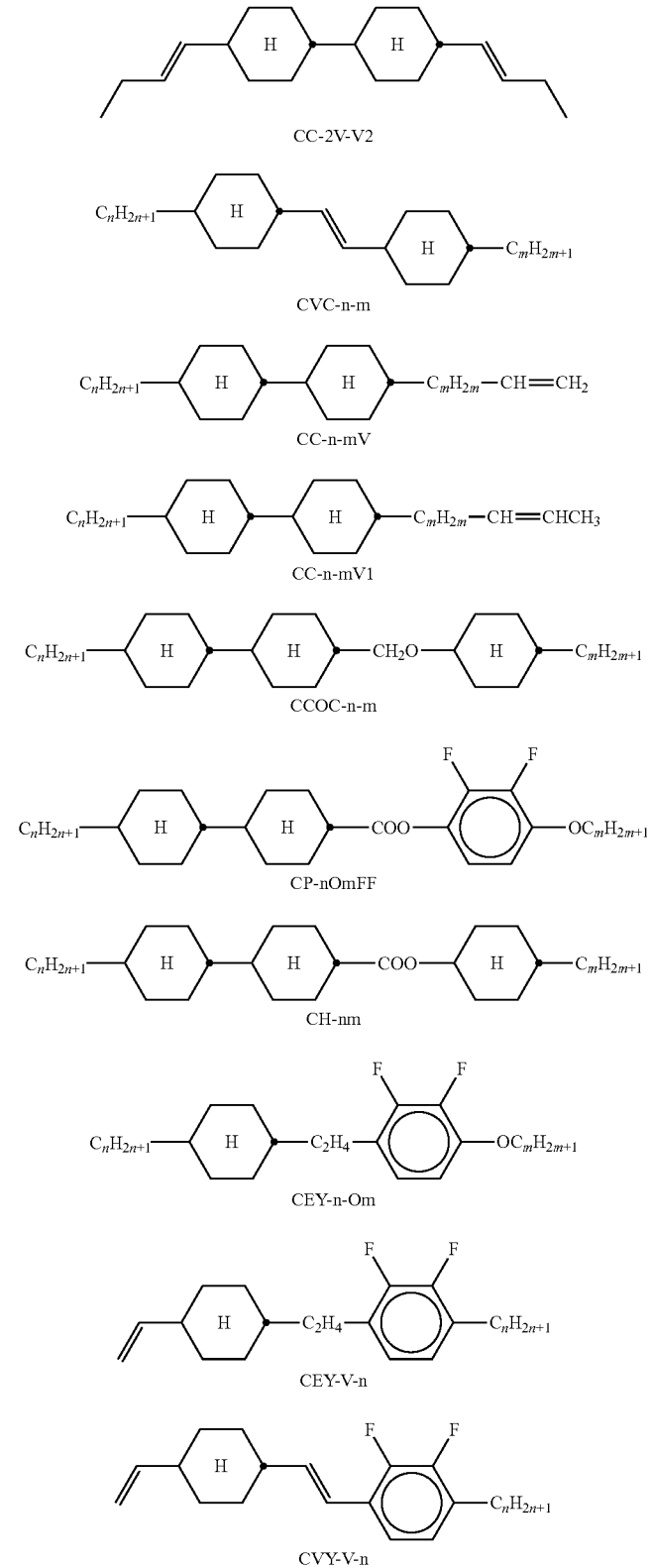

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
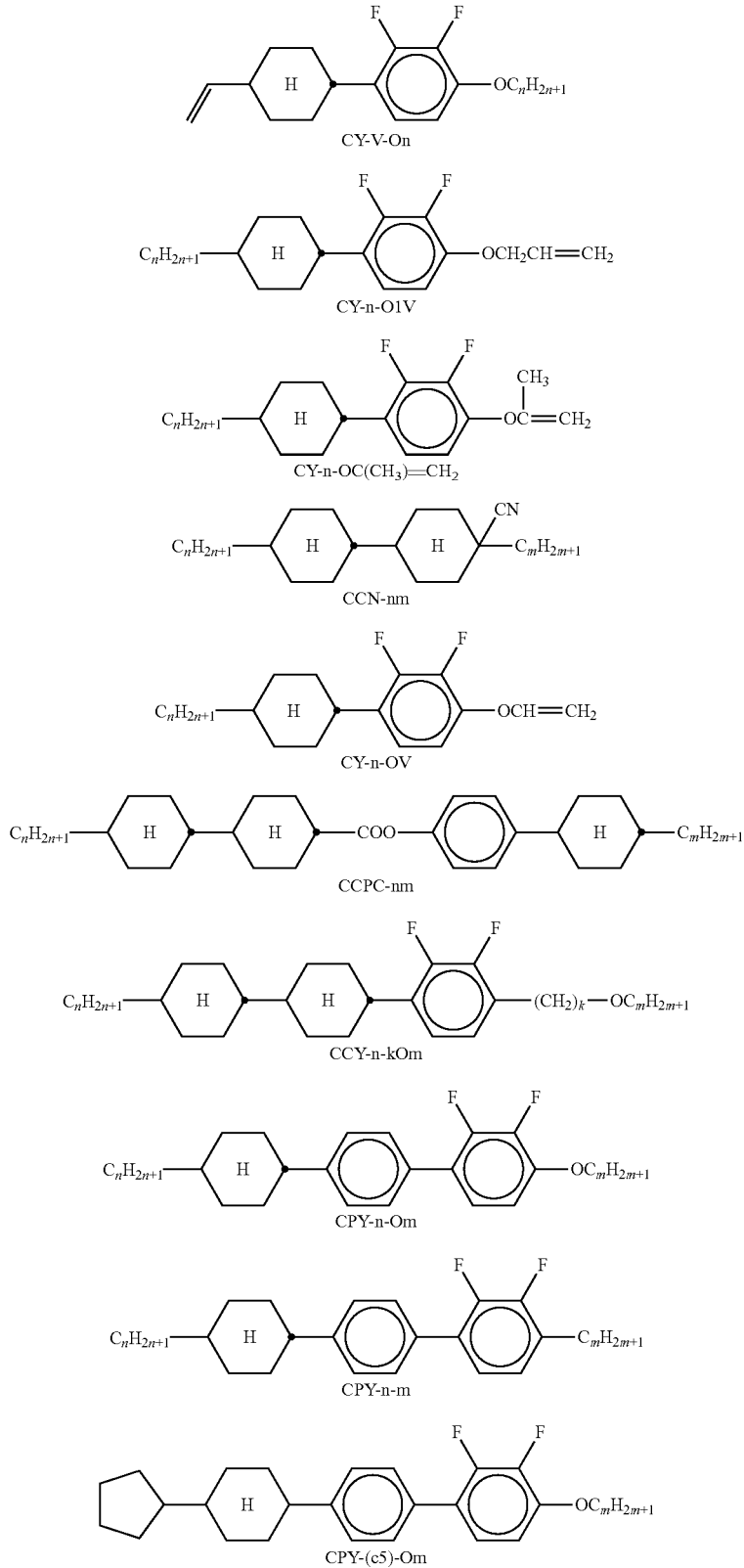

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
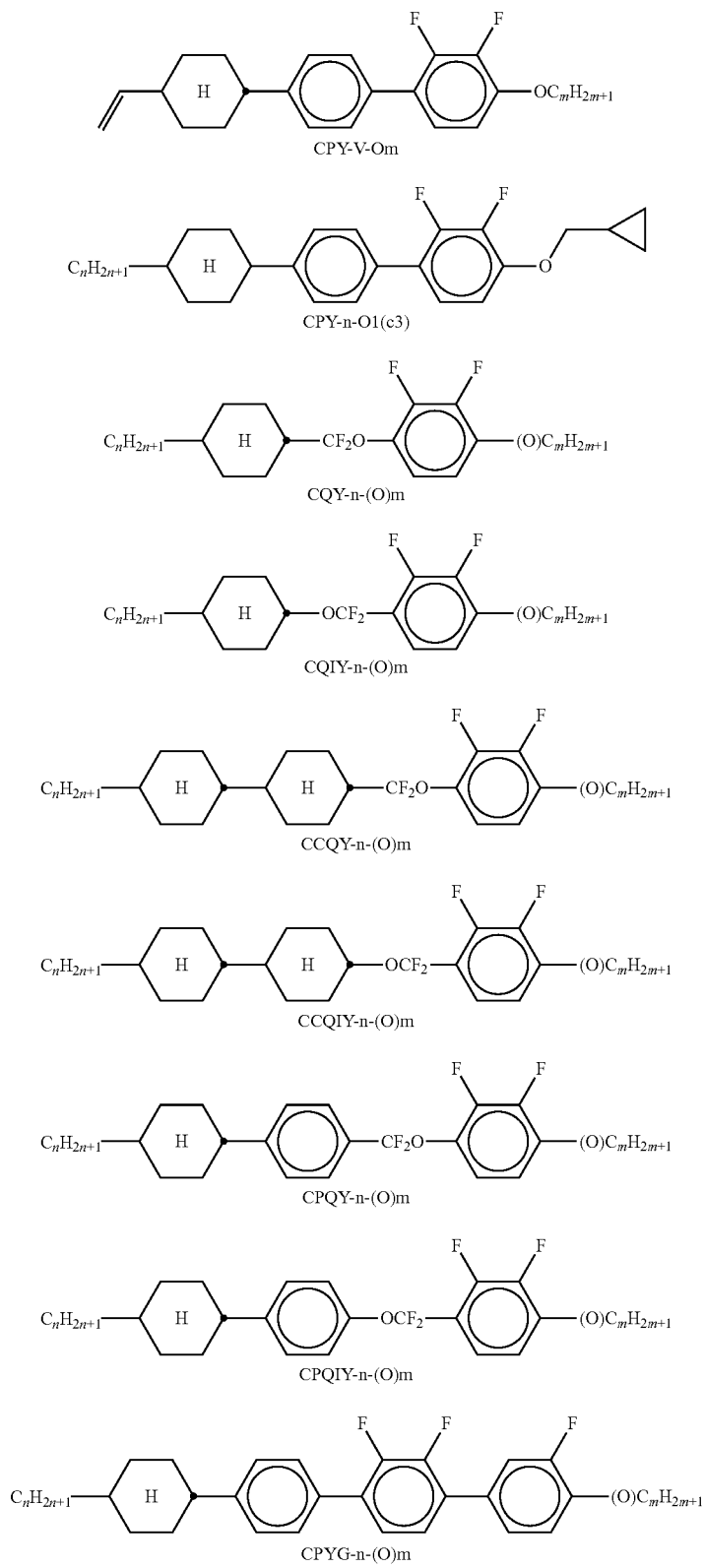

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
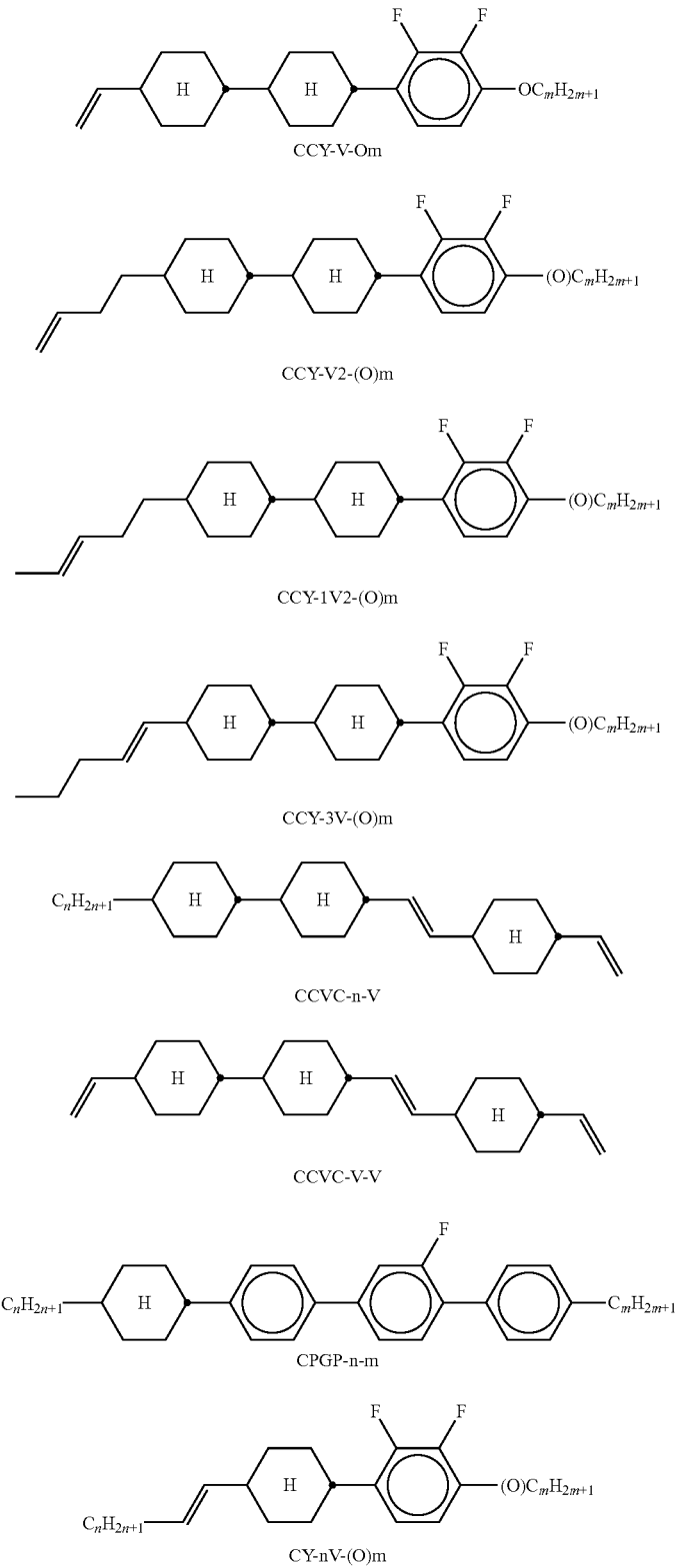

TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
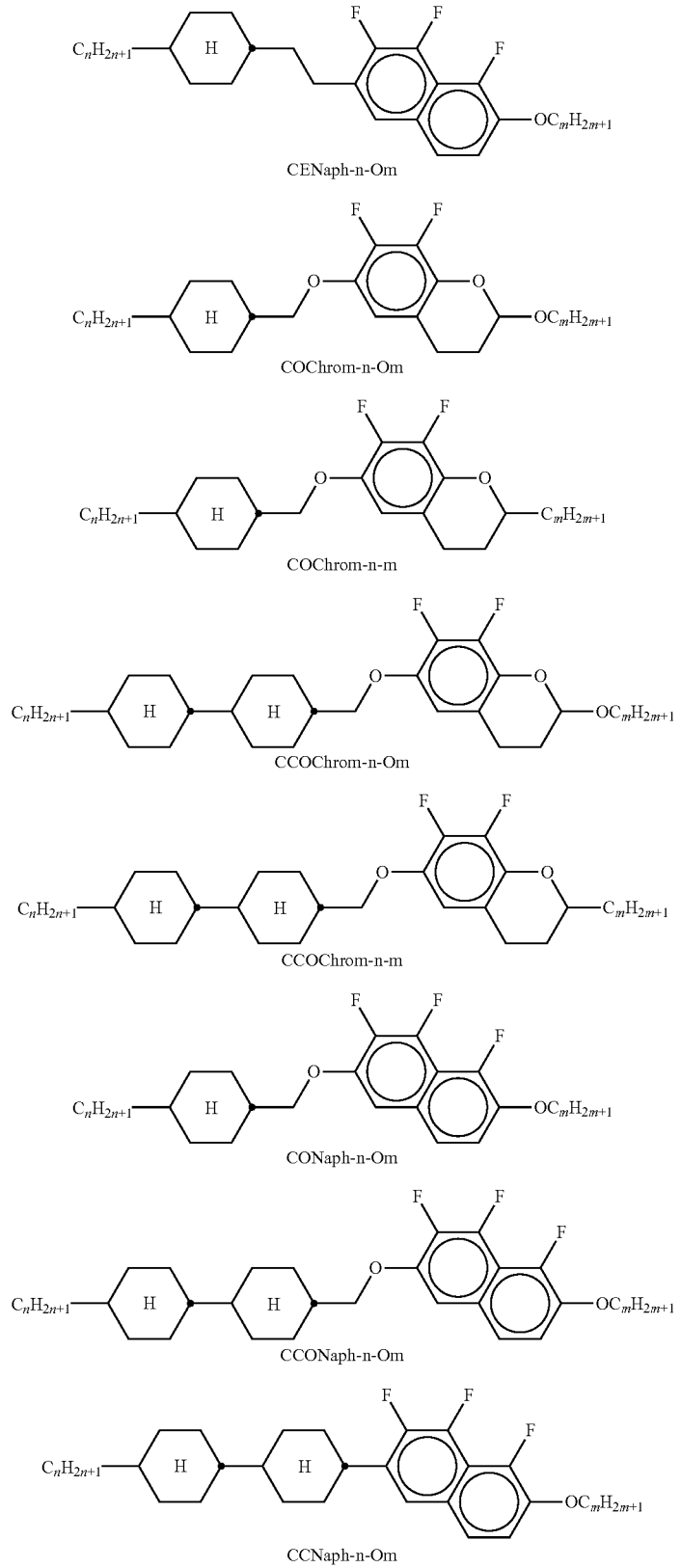

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
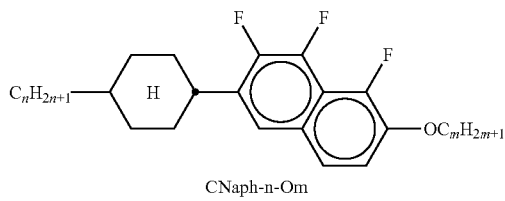
CNaph-n-Om
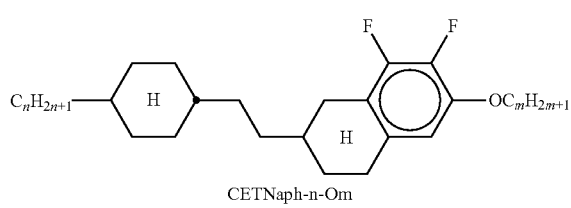
CETNaph-n-Om
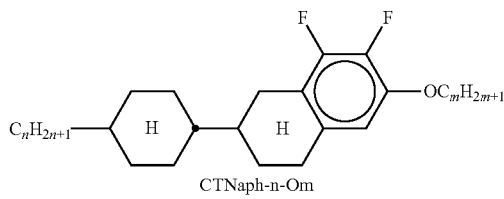
CTNaph-n-Om
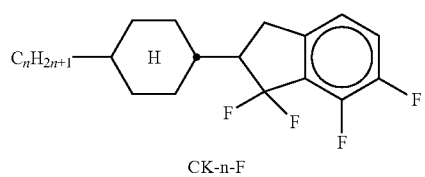
CK-n-F
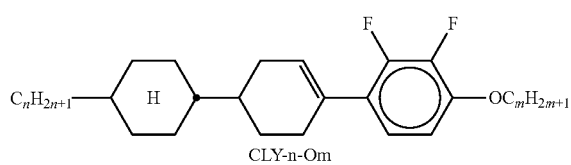
CLY-n-Om
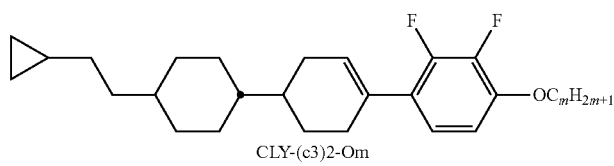
CLY-(c3)2-Om
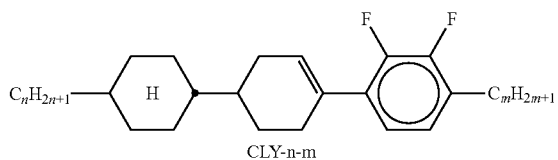
CLY-n-m
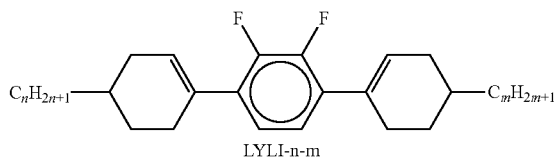
LYLI-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
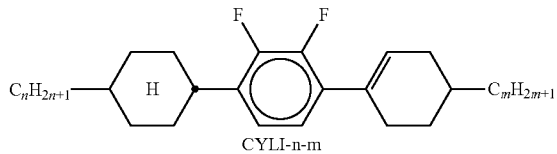
CYLI-n-m
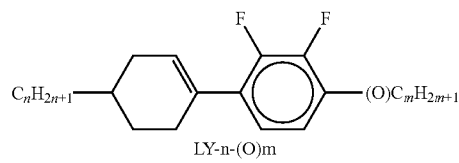
LY-n-(O)m
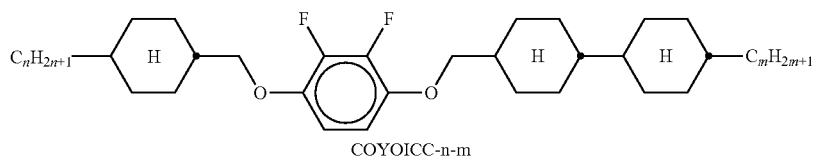
COYOICC-n-m
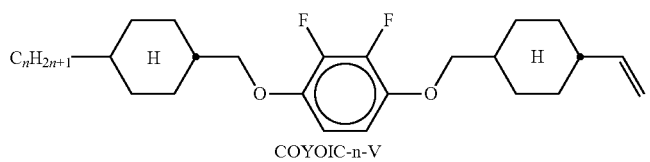
COYOIC-n-V
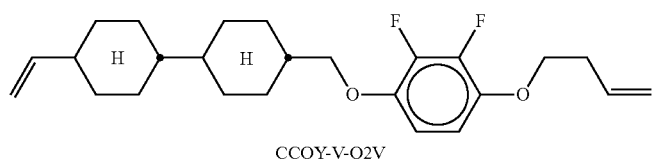
CCOY-V-O2V
CCOY-V-O3V
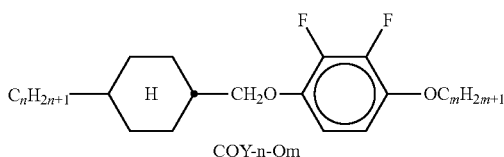
COY-n-Om
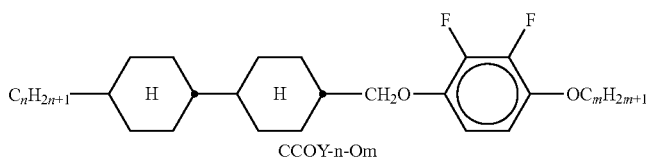
CCOY-n-Om
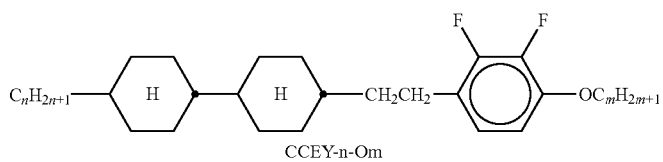
CCEY-n-Om

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
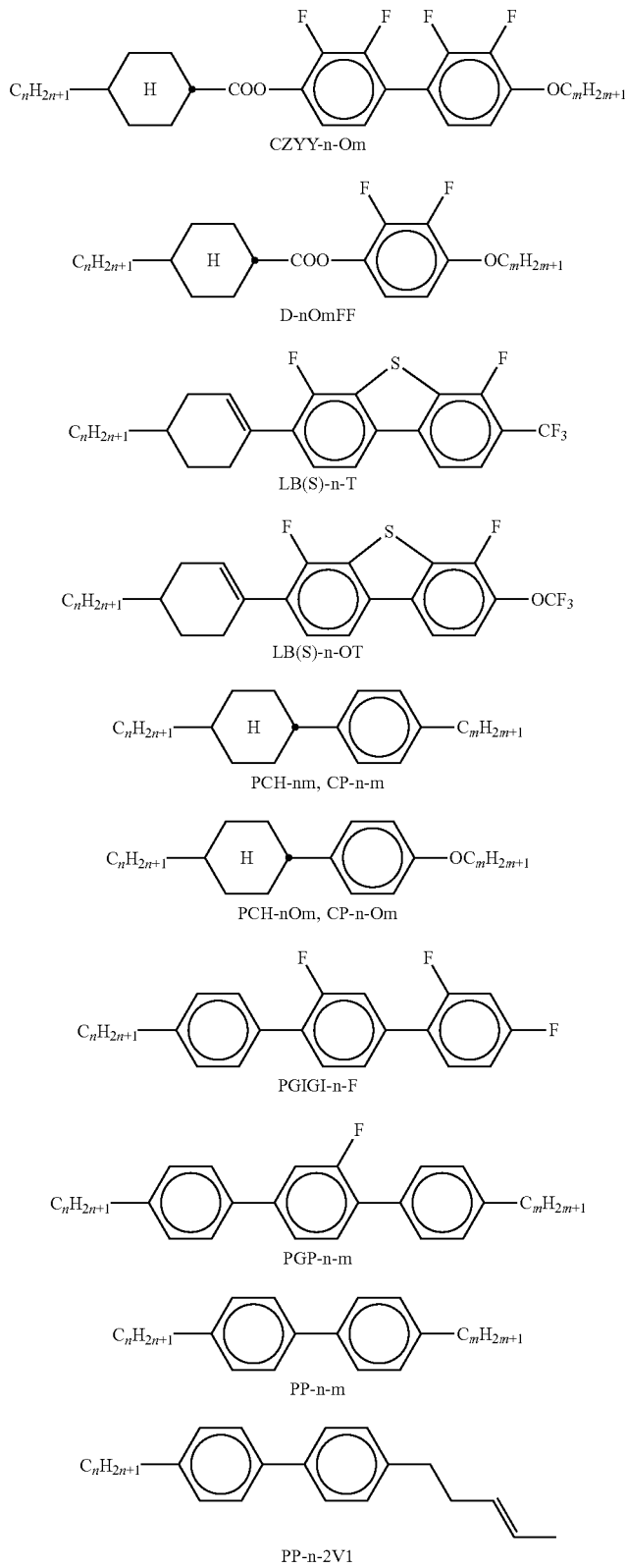

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
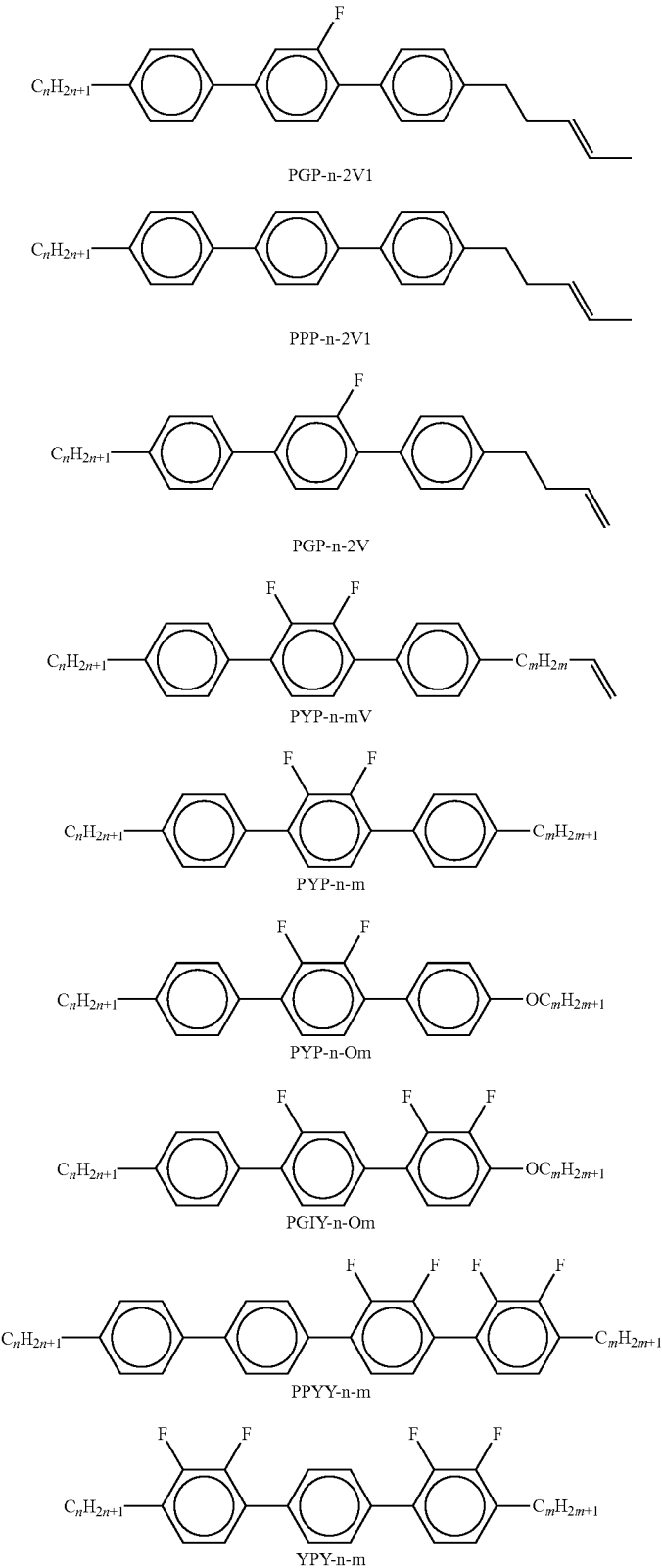

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
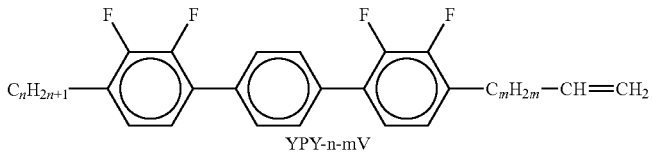
YPY-n-mV
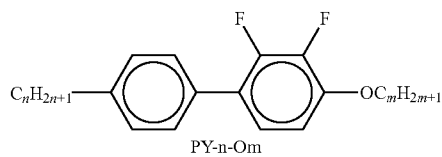
PY-n-Om
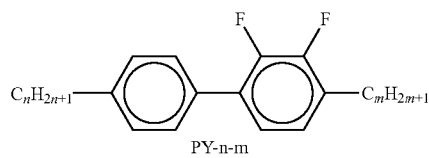
PY-n-m
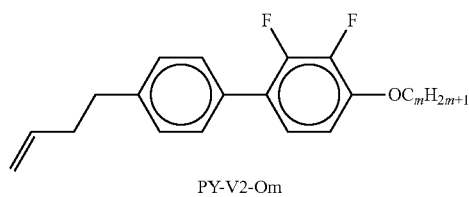
PY-V2-Om
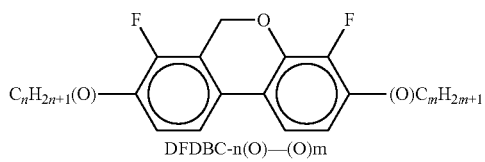
DFDBC-n(O)—(O)m
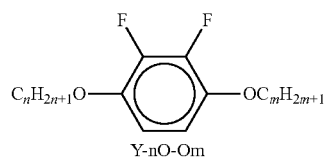
Y-nO-Om
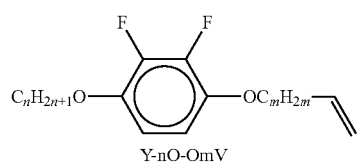
Y-nO-OmV
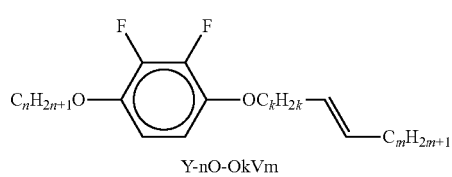
Y-nO-OkVm
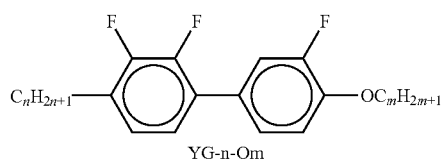
YG-n-Om

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
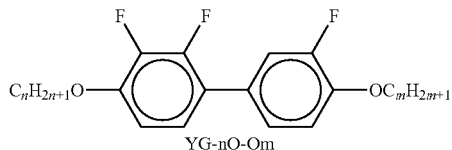
YG-nO-Om
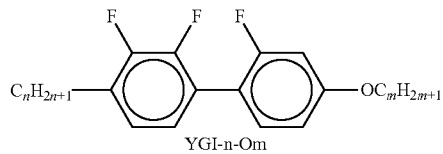
YGI-n-Om
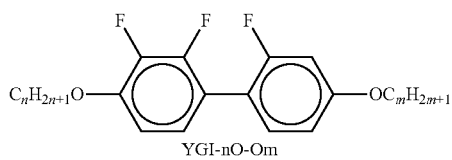
YGI-nO-Om
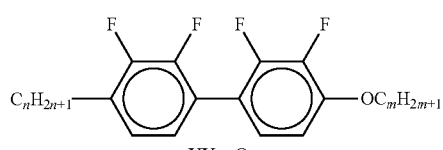
YY-n-Om
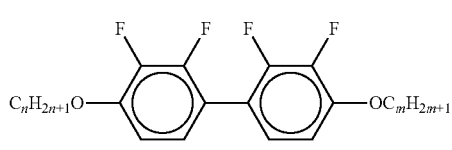
YY-nO-Om
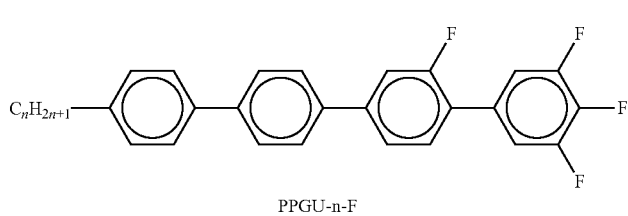
PPGU-n-F
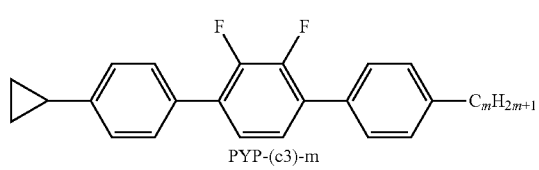
PYP-(c3)-m
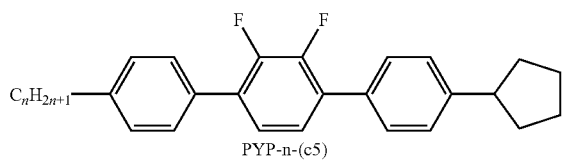
PYP-n-(c5)
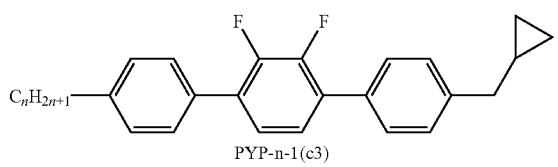
PYP-n-1(c3)

In a preferred embodiment of the present invention, the LC media according to the invention comprise one or more compounds selected from the group consisting of compounds from Table A.
TABLE B
Table B shows possible chiral dopants which can be added to the LC media according to the invention.
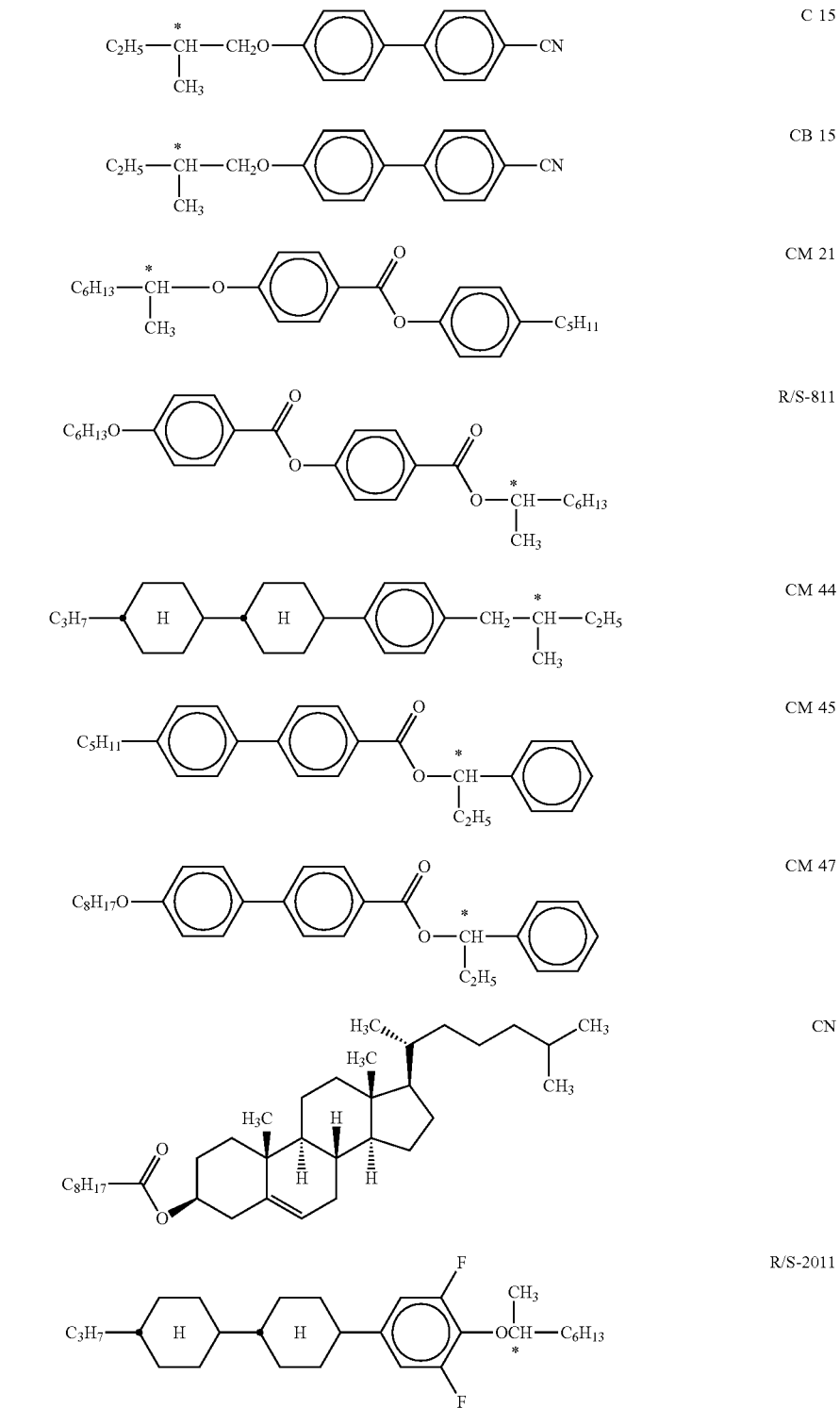

TABLE B-continued

Table B shows possible chiral dopants which can be added to the LC media according to the invention.

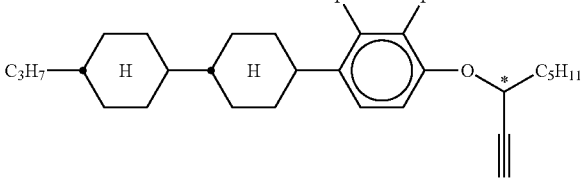
R/S-3011

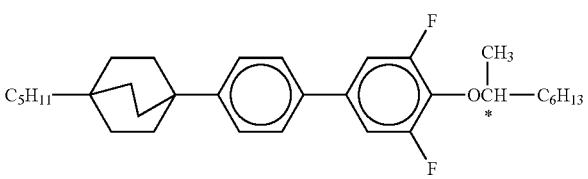
R/S-4011

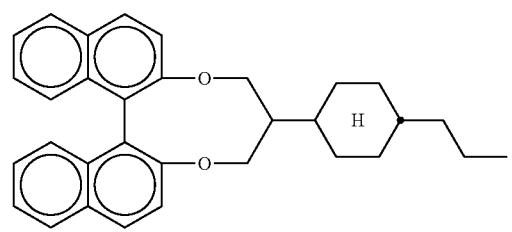
R/S-5011

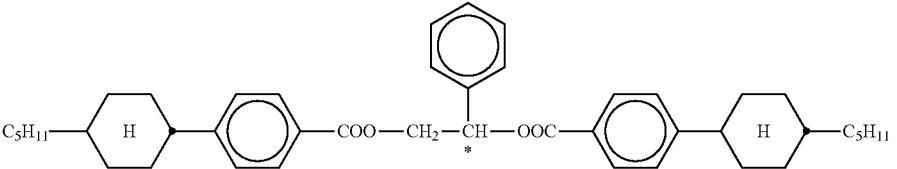
R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

Table C shows possible stabilizers which can be added to the LC media according to the invention. Therein n denotes an integer from 1 to 12, preferably 1, 2, 3, 4, 5, 6, 7 or 8, and terminal methyl groups are not shown.

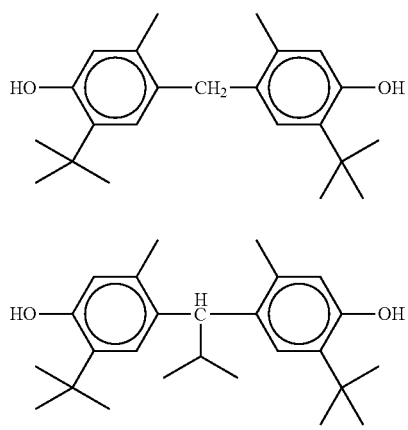

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
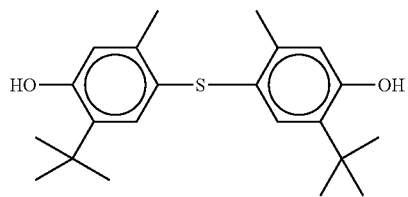
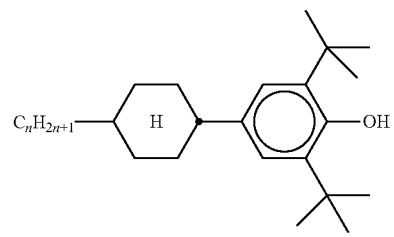
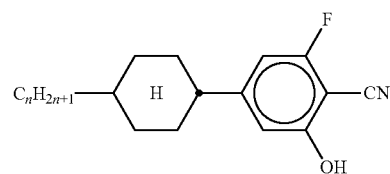
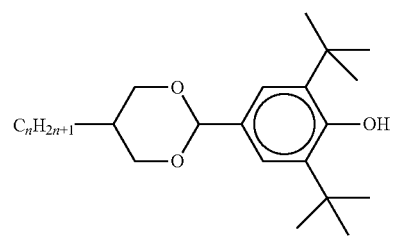
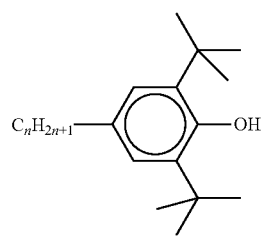
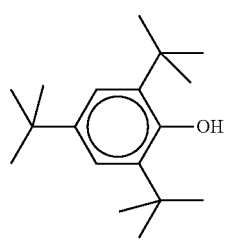

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
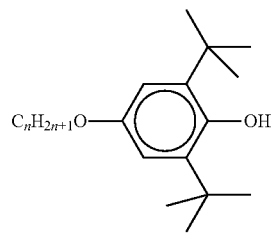
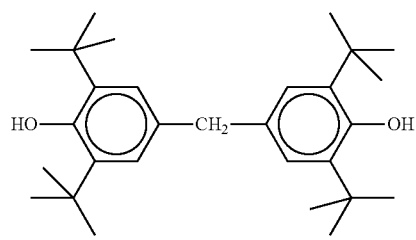
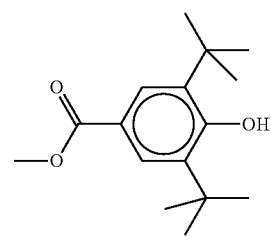
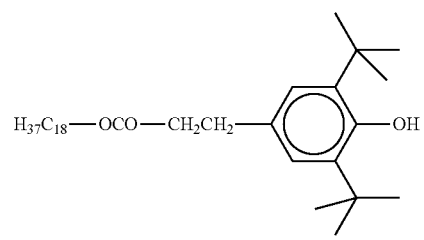
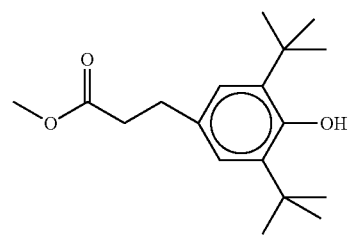
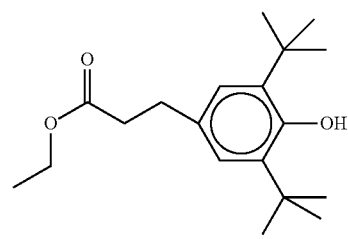

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
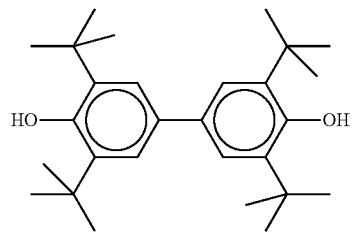
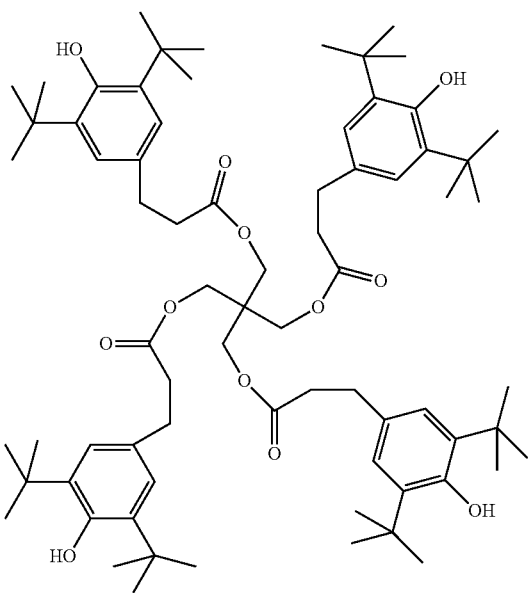 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
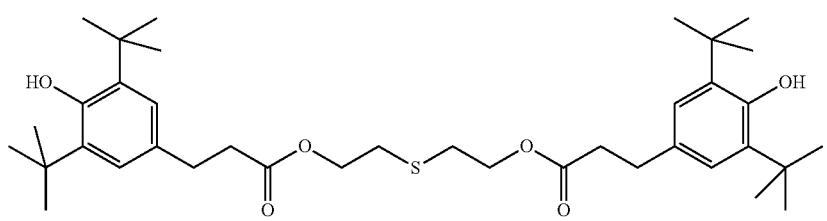 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
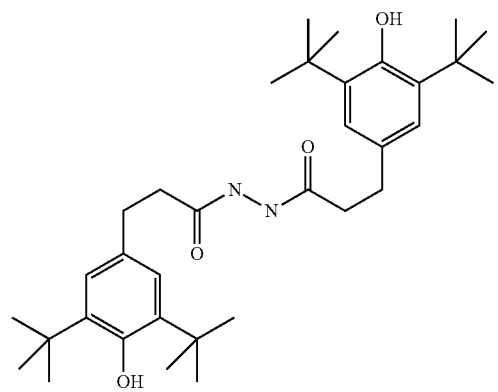 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
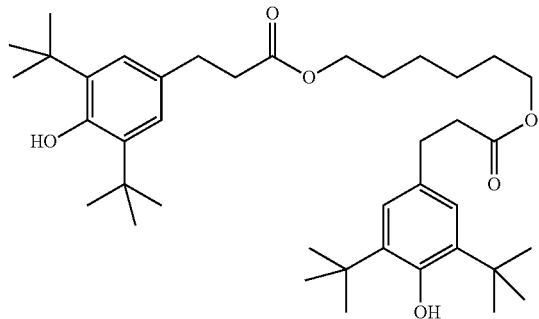 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
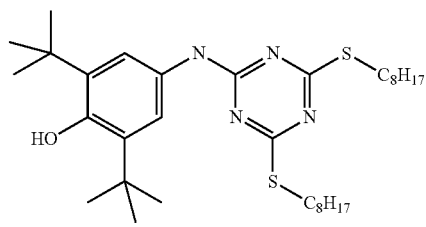
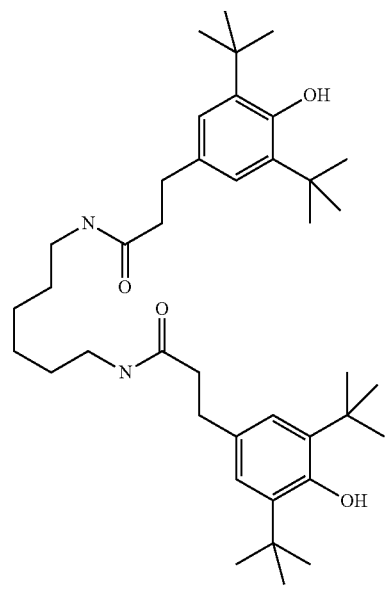 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
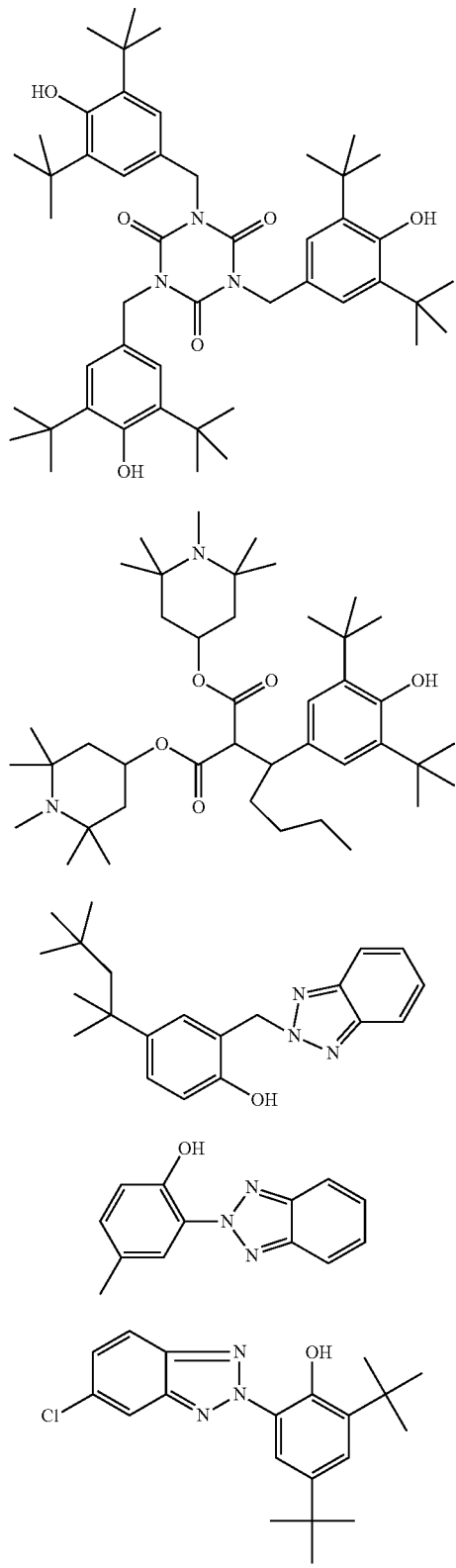

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
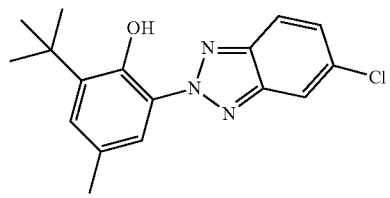 [SMILES: Cc1cc(-n2nc3ccc(Cl)cc3n2)c(O)c(C(C)(C)C)c1]
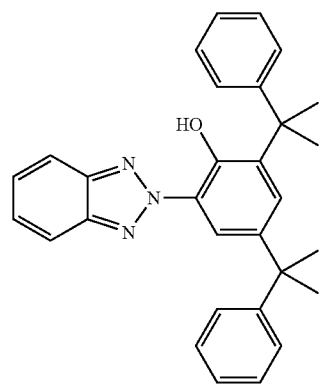 [SMILES: CC(C)(c1ccccc1)c1cc(-n2nc3ccccc3n2)c(O)c(C(C)(C)c2ccccc2)c1]
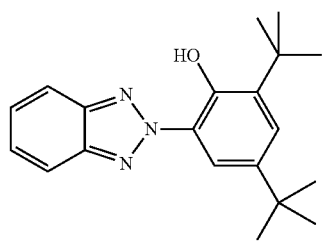 [SMILES: CC(C)(C)c1cc(-n2nc3ccccc3n2)c(O)c(C(C)(C)C)c1]
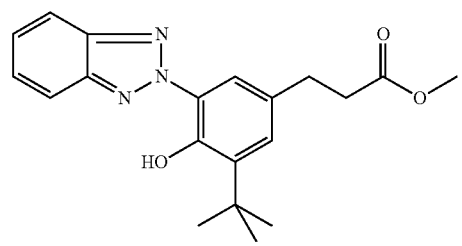 [SMILES: COC(=O)CCc1cc(-n2nc3ccccc3n2)c(O)c(C(C)(C)C)c1]
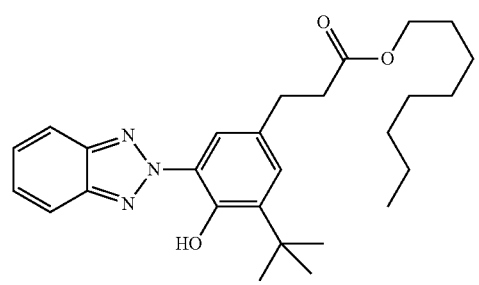 [SMILES: CCCCCCCCOC(=O)CCc1cc(-n2nc3ccccc3n2)c(O)c(C(C)(C)C)c1]

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
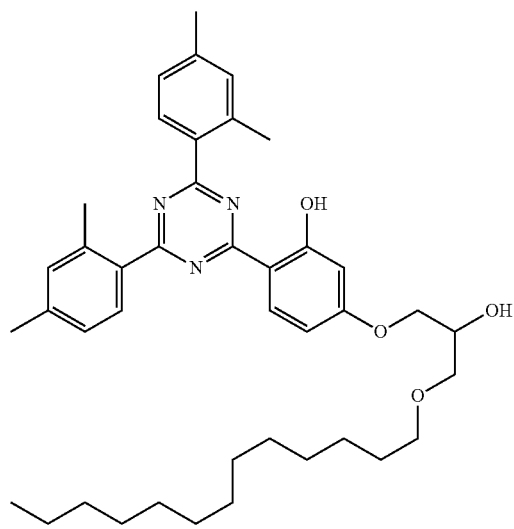 [SMILES: CCCCCCCCCCCCCOCC(O)COc1ccc(-c2nc(-c3ccc(C)cc3C)nc(-c3ccc(C)cc3C)n2)c(O)c1]
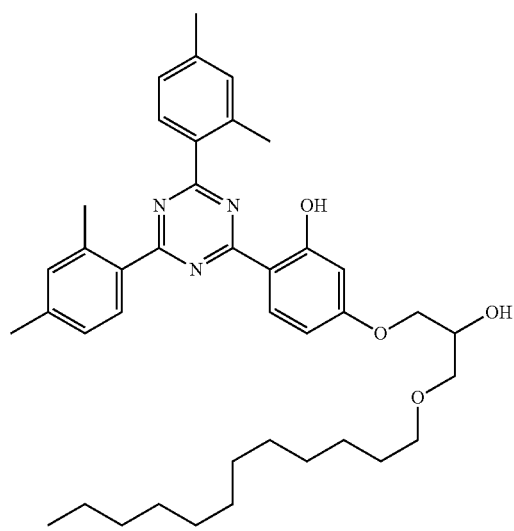 [SMILES: CCCCCCCCCCCCOCC(O)COc1ccc(-c2nc(-c3ccc(C)cc3C)nc(-c3ccc(C)cc3C)n2)c(O)c1]
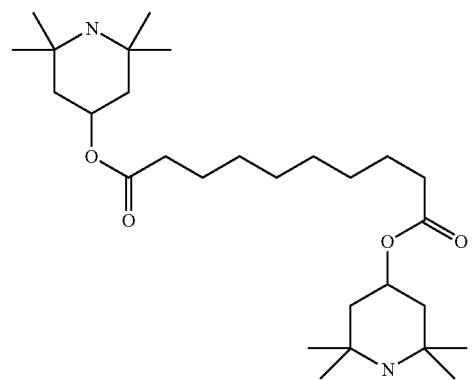

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
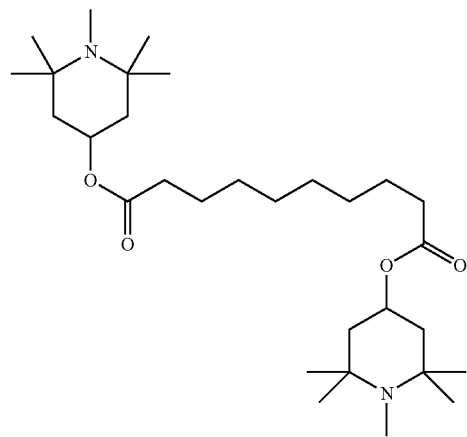
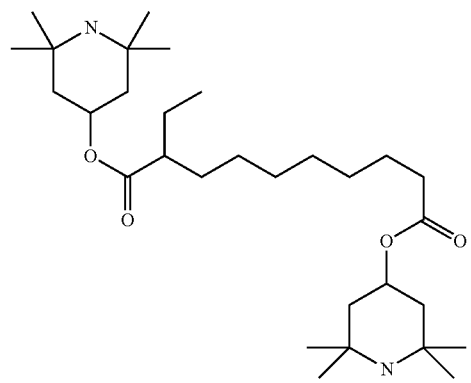
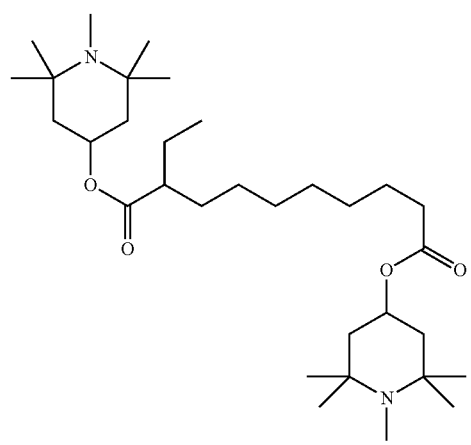

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
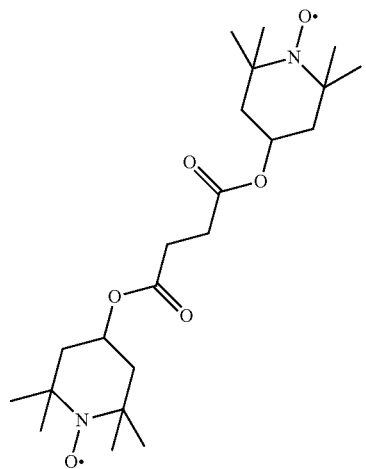
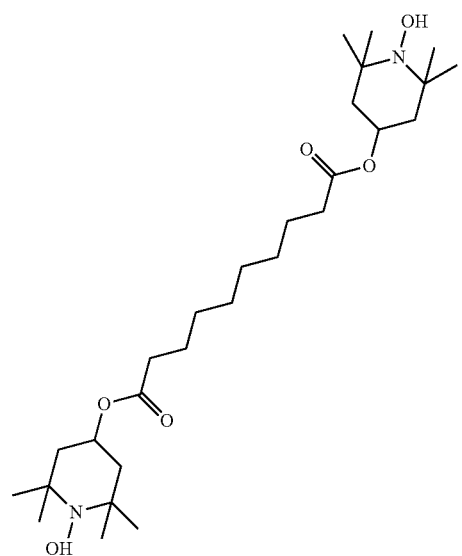
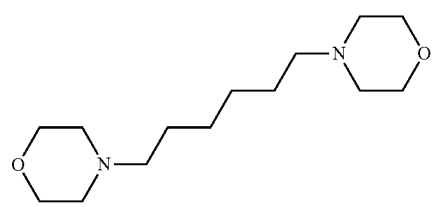 [SMILES: C(CCCN1CCOCC1)CCN1CCOCC1]

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
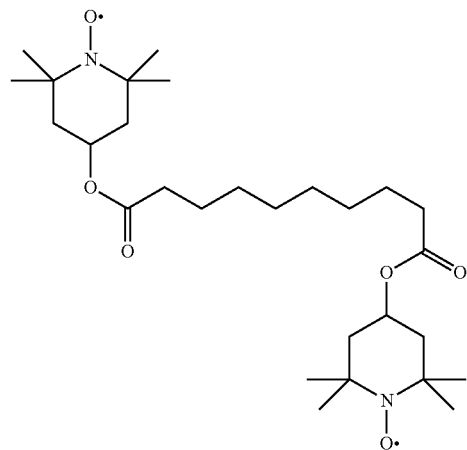
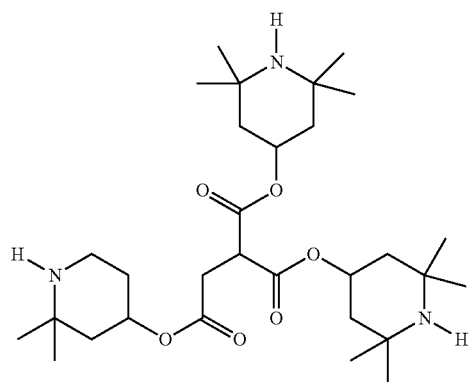 [SMILES: CC1(C)CC(OC(=O)CC(C(=O)OC2CC(C)(C)NC(C)(C)C2)C(=O)OC2CC(C)(C)NC(C)(C)C2)CCN1]
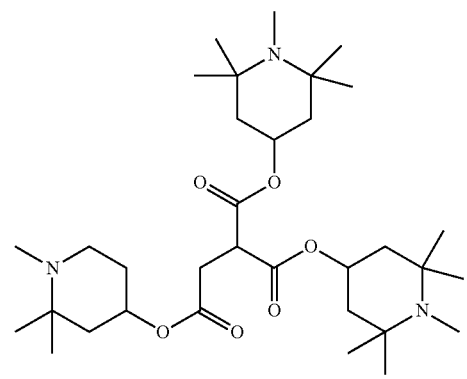

TABLE C-continued
Table C shows possible stabilizers which can be added to the LC media according to the invention. Therein n denotes an integer from 1 to 12, preferably 1, 2, 3, 4, 5, 6, 7 or 8, and terminal methyl groups are not shown.
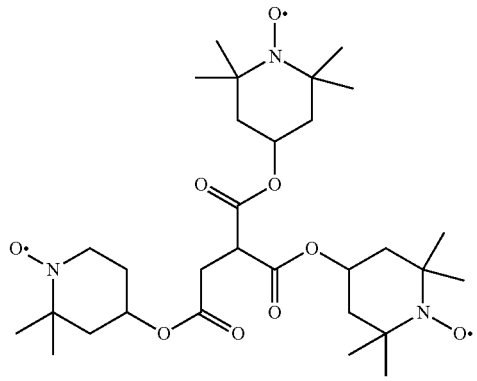
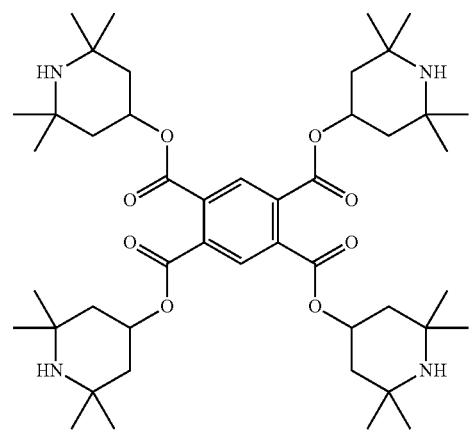
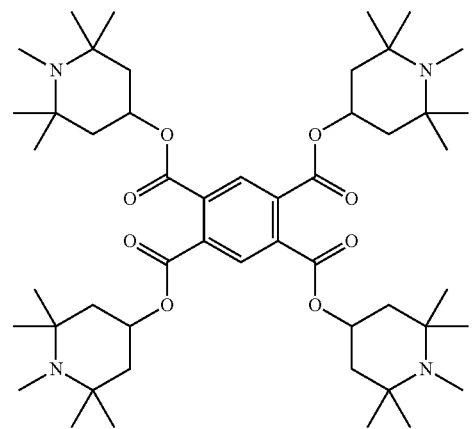

TABLE C-continued

Table C shows possible stabilizers which can be added to the LC media according to the invention. Therein n denotes an integer from 1 to 12, preferably 1, 2, 3, 4, 5, 6, 7 or 8, and terminal methyl groups are not shown.

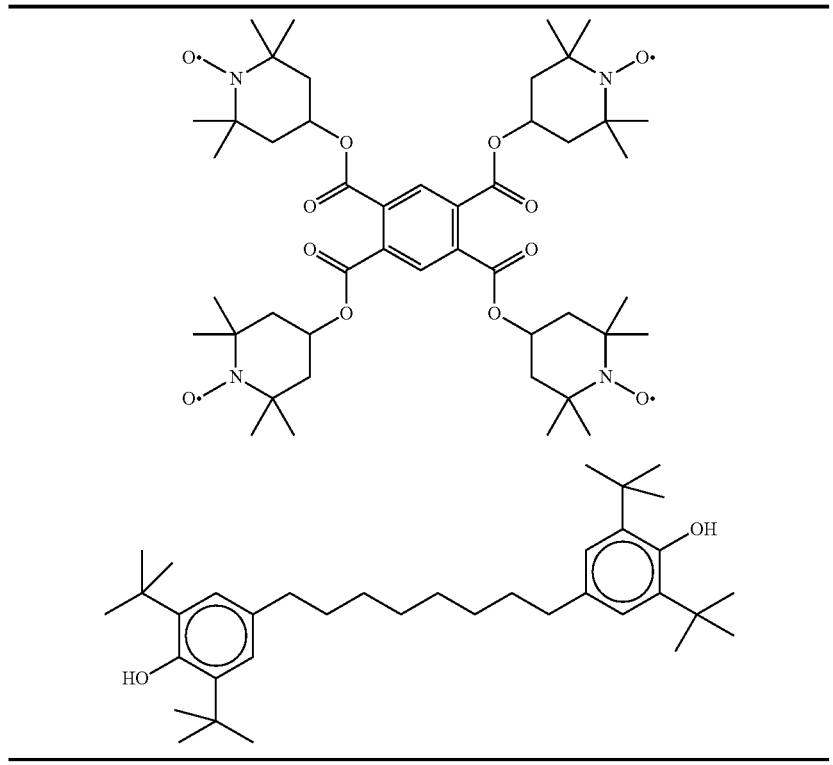

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table C.

TABLE D

Table D shows illustrative reactive mesogenic compounds which can be used in the LC media in accordance with the present invention.

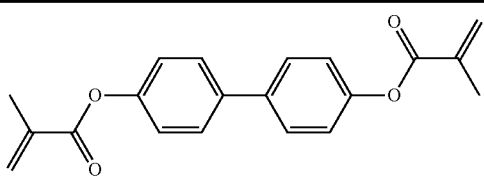

RM-1

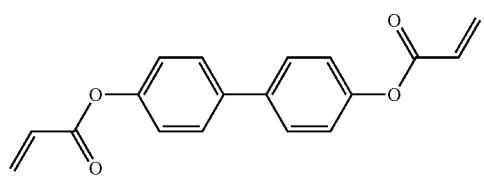 [SMILES: C=CC(=O)Oc1ccc(-c2ccc(OC(=O)C=C)cc2)cc1]

RM-2

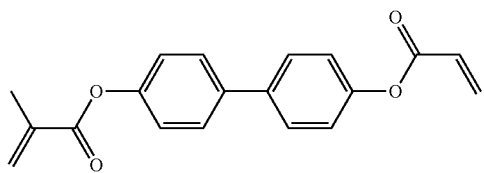 [SMILES: C=CC(=O)Oc1ccc(-c2ccc(OC(=O)C(=C)C)cc2)cc1]

RM-3

TABLE D-continued
Table D shows illustrative reactive mesogenic compounds which can be used in the LC media in accordance with the present invention.
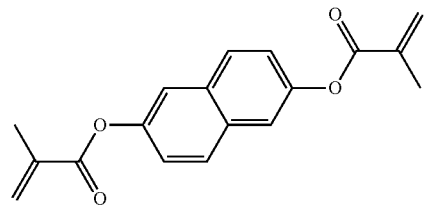 [SMILES: C=C(C)C(=O)Oc1ccc2cc(OC(=O)C(=C)C)ccc2c1]
RM-4
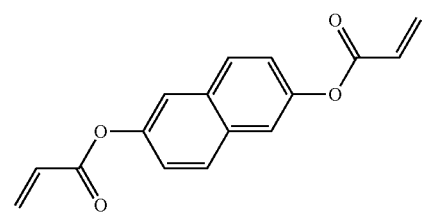 [SMILES: C=CC(=O)Oc1ccc2cc(OC(=O)C=C)ccc2c1]
RM-5
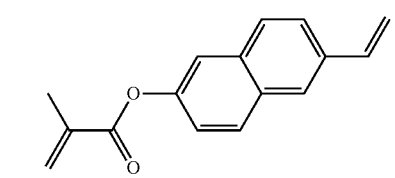 [SMILES: C=Cc1ccc2cc(OC(=O)C(=C)C)ccc2c1]
RM-6
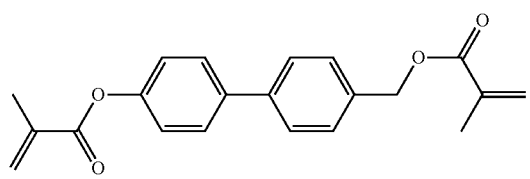 [SMILES: C=C(C)C(=O)OCc1ccc(-c2ccc(OC(=O)C(=C)C)cc2)cc1]
RM-7
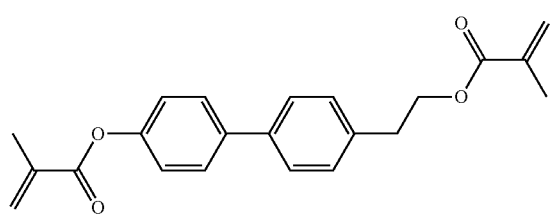 [SMILES: C=C(C)C(=O)OCCc1ccc(-c2ccc(OC(=O)C(=C)C)cc2)cc1]
RM-8
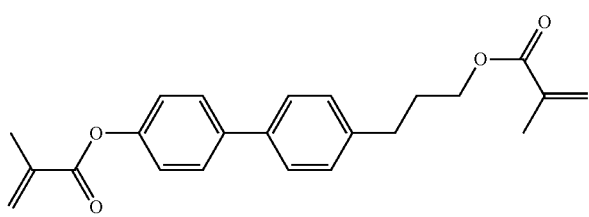 [SMILES: C=C(C)C(=O)OCCCc1ccc(-c2ccc(OC(=O)C(=C)C)cc2)cc1]
RM-9
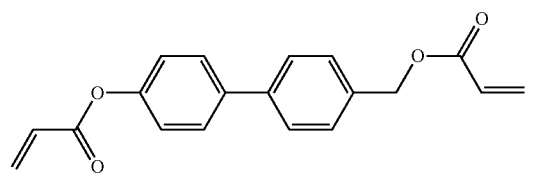 [SMILES: C=CC(=O)OCc1ccc(-c2ccc(OC(=O)C=C)cc2)cc1]
RM-10

TABLE D-continued
Table D shows illustrative reactive mesogenic compounds which can be used in the LC media in accordance with the present invention.
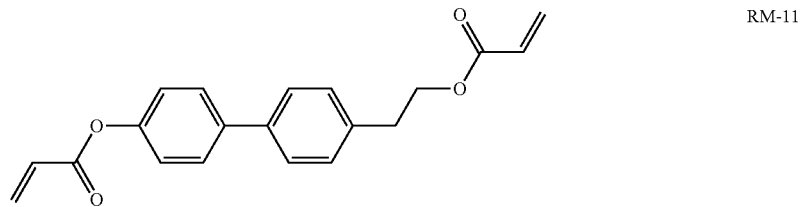 RM-11
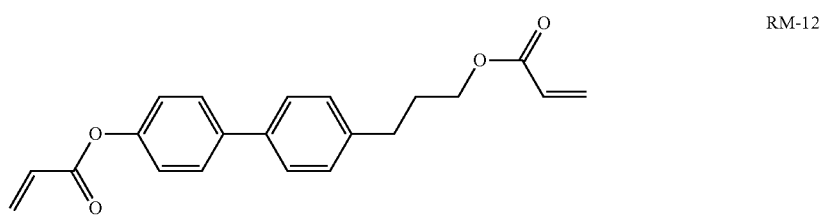 RM-12
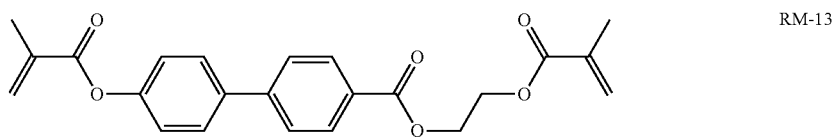 RM-13
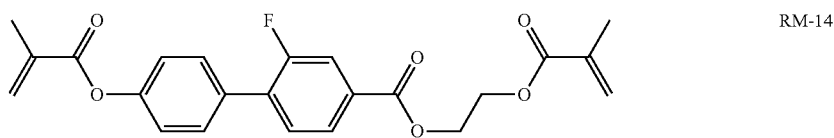 RM-14
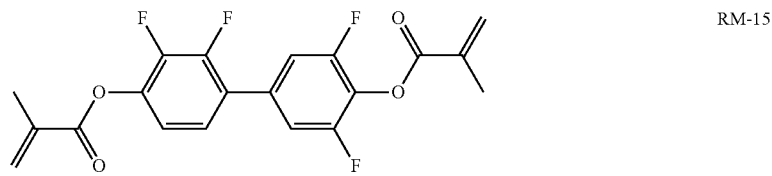 RM-15
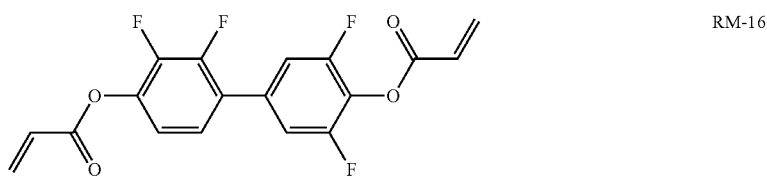 RM-16
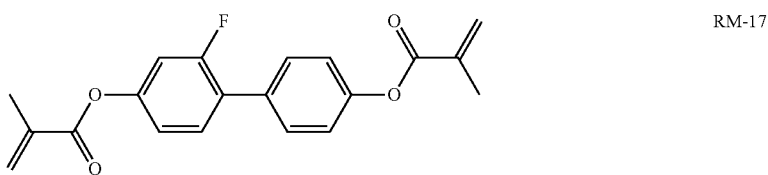 RM-17
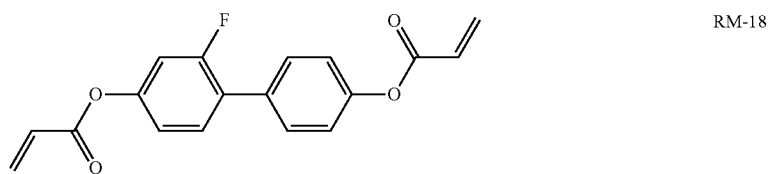 RM-18

TABLE D-continued
Table D shows illustrative reactive mesogenic compounds which can be used
in the LC media in accordance with the present invention.
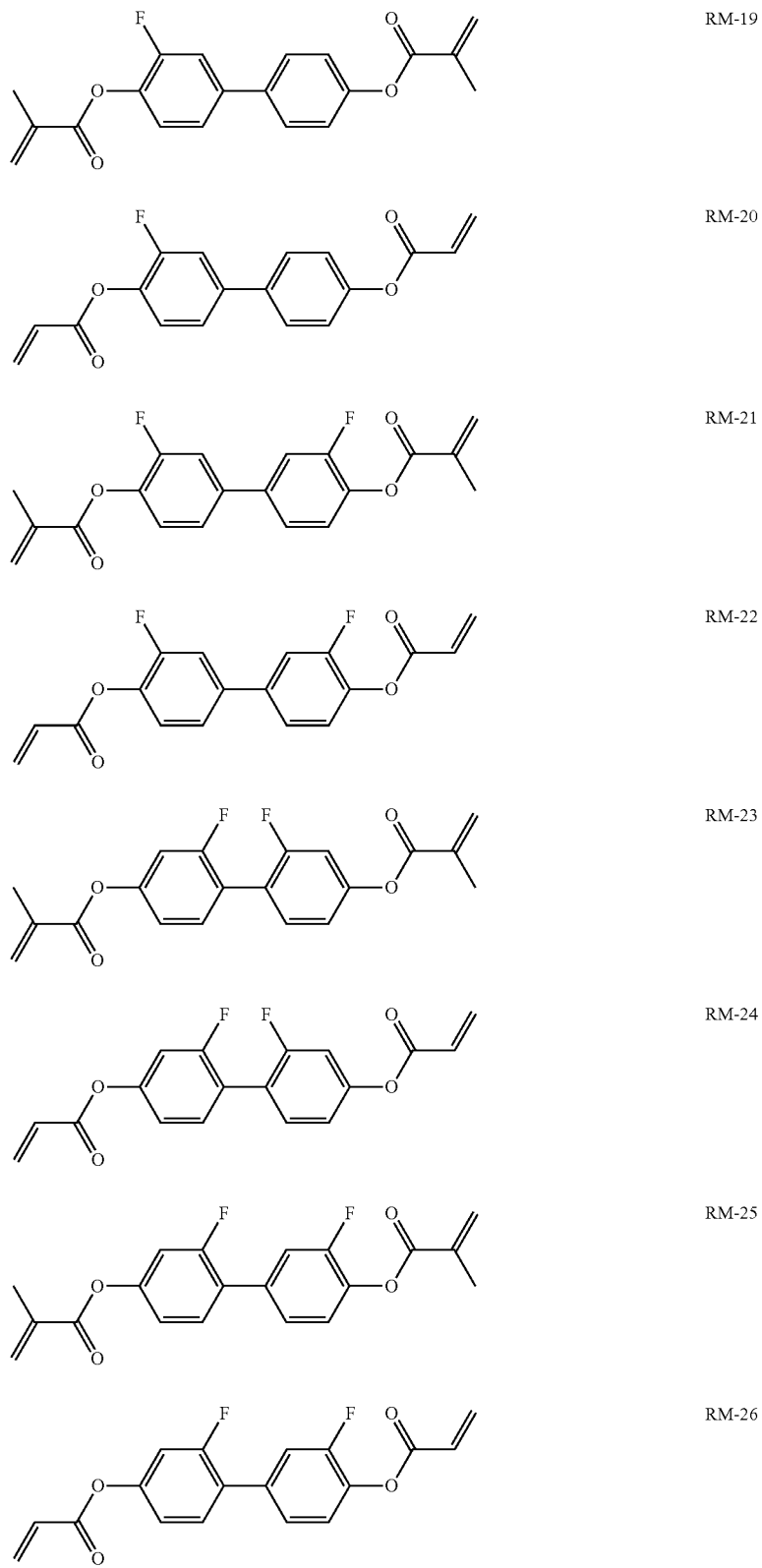
RM-19
RM-20
RM-21
RM-22
RM-23
RM-24
RM-25
RM-26

TABLE D-continued
Table D shows illustrative reactive mesogenic compounds which can be used in the LC media in accordance with the present invention.
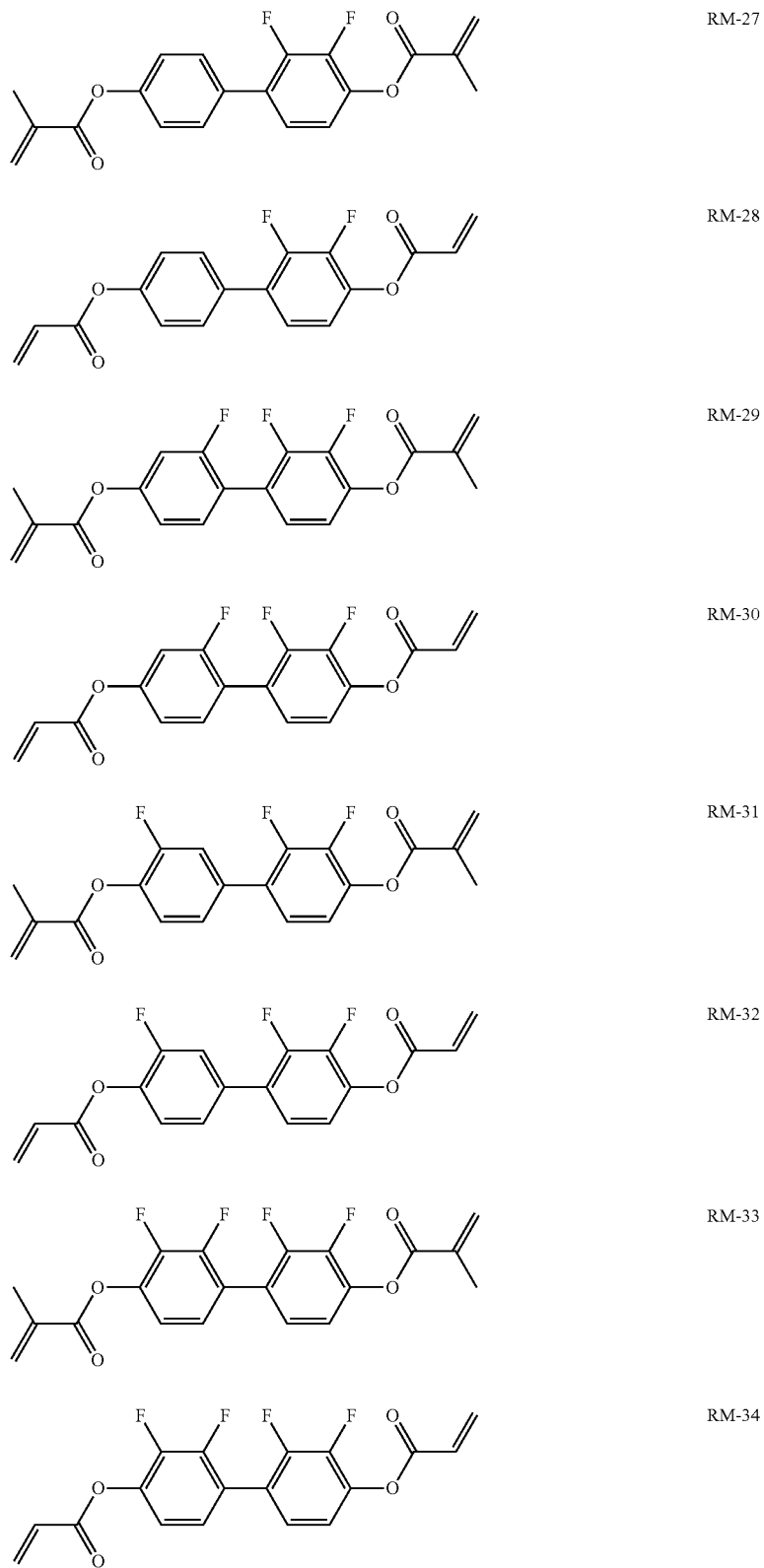

TABLE D-continued
Table D shows illustrative reactive mesogenic compounds which can be used in the LC media in accordance with the present invention.
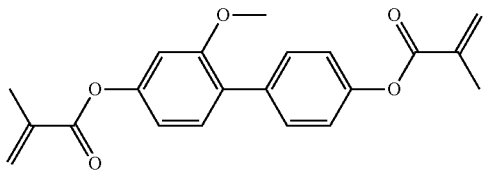 RM-35
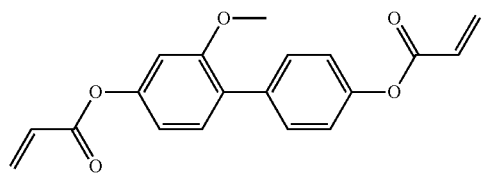 [SMILES: C=CC(=O)Oc1ccc(-c2ccc(OC(=O)C=C)cc2F)cc1] RM-36
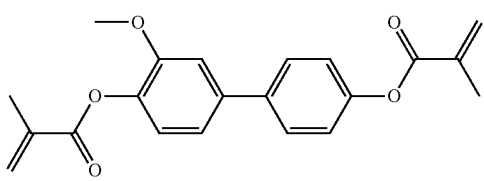 [SMILES: C=C(C)C(=O)Oc1ccc(-c2ccc(OC(=O)C(=C)C)c(F)c2)cc1] RM-37
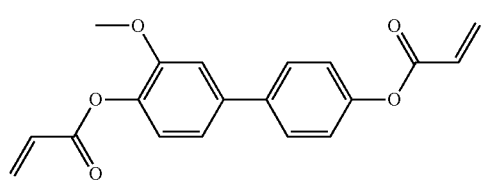 [SMILES: C=CC(=O)Oc1ccc(-c2ccc(OC(=O)C=C)c(OC)c2)cc1] RM-38
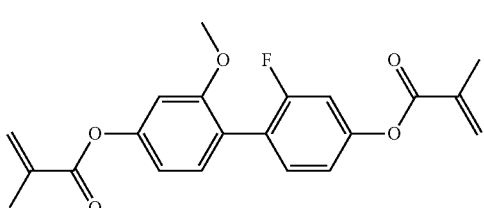 RM-39
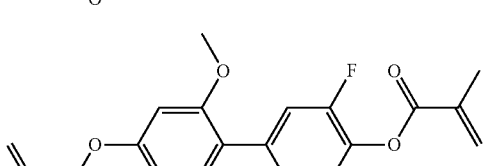 RM-40
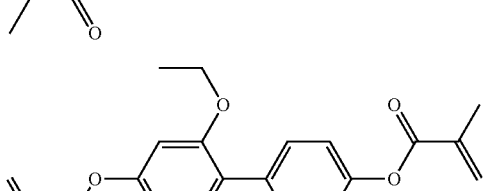 RM-41
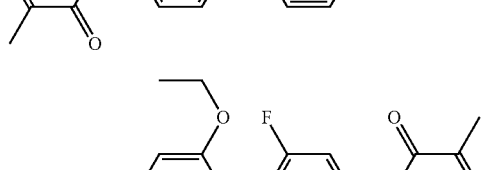 RM-42

TABLE D-continued
Table D shows illustrative reactive mesogenic compounds which can be used in the LC media in accordance with the present invention.
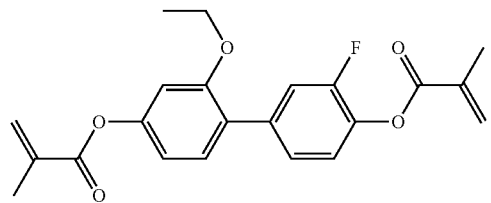 [SMILES: C=C(C)C(=O)Oc1ccc(-c2ccc(OC(=O)C(=C)C)c(F)c2)c(OCC)c1] RM-43
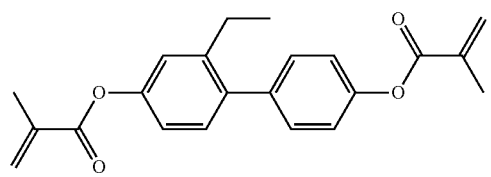 RM-44
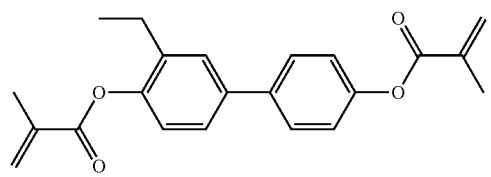 RM-45
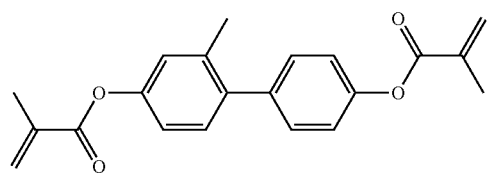 [SMILES: C=C(C)C(=O)Oc1ccc(-c2ccc(OC(=O)C(=C)C)cc2C)cc1] RM-46
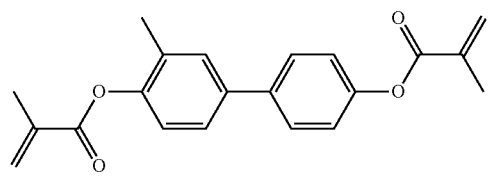 [SMILES: C=C(C)C(=O)Oc1ccc(-c2ccc(OC(=O)C(=C)C)c(C)c2)cc1] RM-47
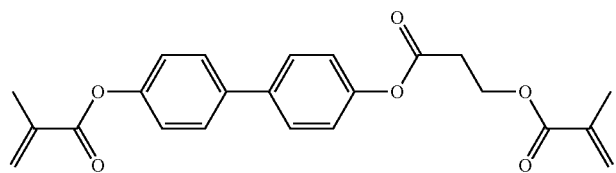 RM-48
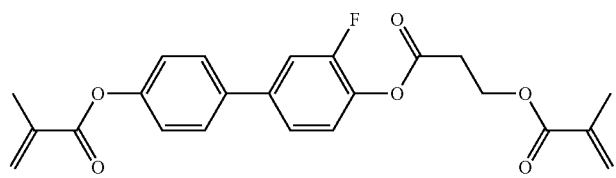 [SMILES: C=C(C)C(=O)OCCC(=O)Oc1ccc(-c2ccc(OC(=O)C(=C)C)cc2)cc1F] RM-49
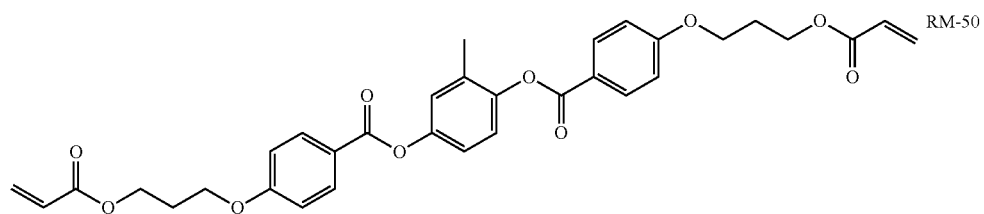 RM-50

TABLE D-continued
Table D shows illustrative reactive mesogenic compounds which can be used
in the LC media in accordance with the present invention.
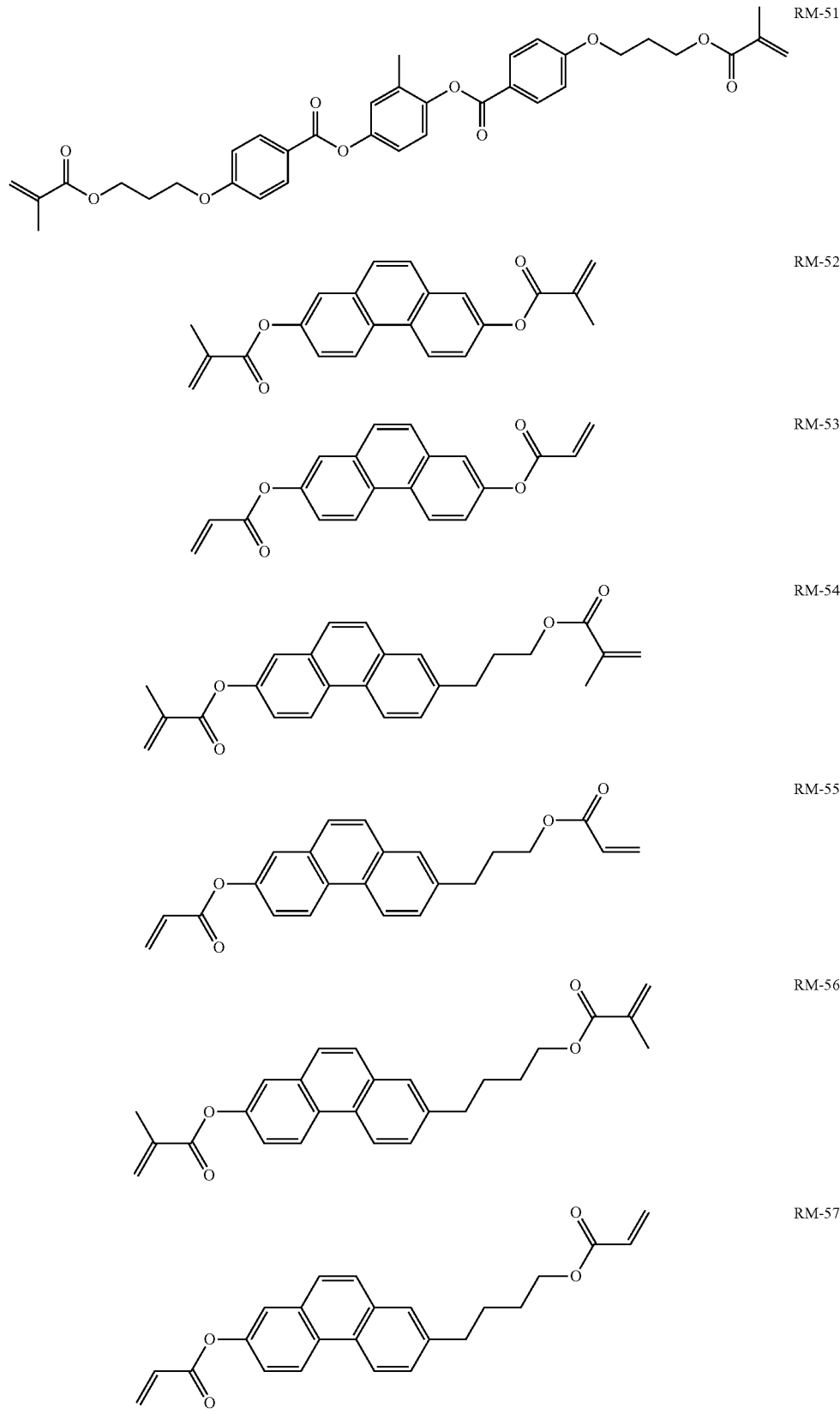

TABLE D-continued
Table D shows illustrative reactive mesogenic compounds which can be used in the LC media in accordance with the present invention.
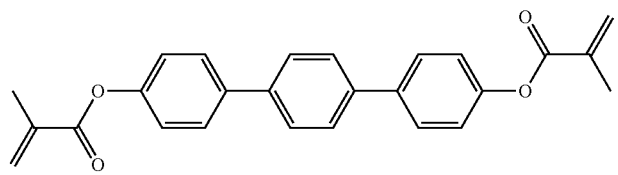 RM-58
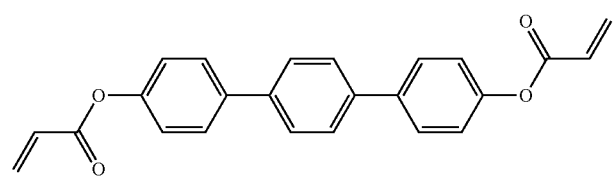 RM-59
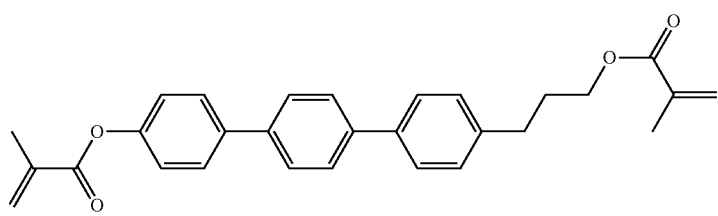 [SMILES: C=C(C)C(=O)OCCCc1ccc(-c2ccc(-c3ccc(OC(=O)C(=C)C)cc3)cc2)cc1] RM-60
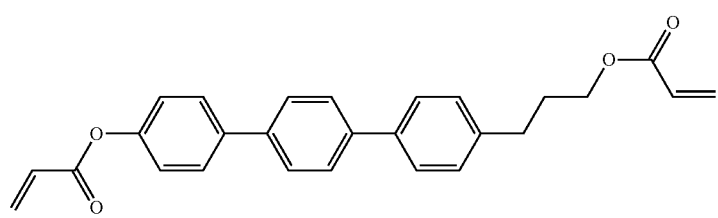 RM-61
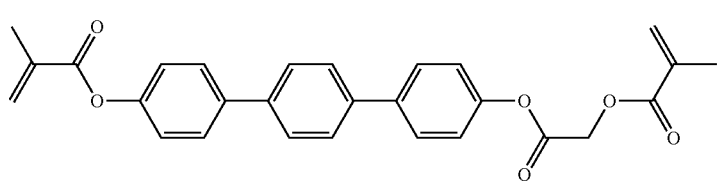 RM-62
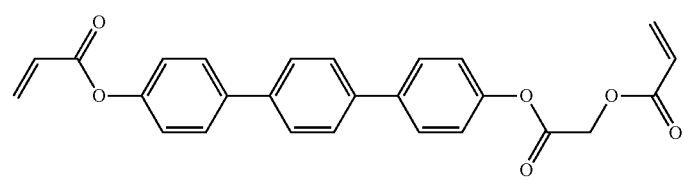 [SMILES: C=CC(=O)OCC(=O)Oc1ccc(-c2ccc(-c3ccc(OC(=O)C=C)cc3)cc2)cc1] RM-63
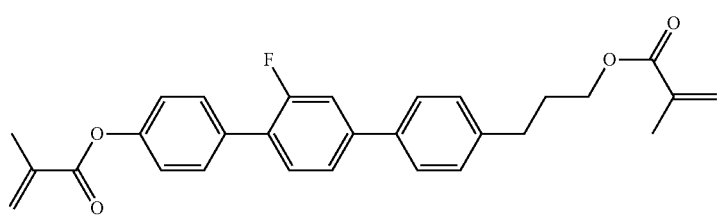 [SMILES: C=C(C)C(=O)OCCCc1ccc(-c2ccc(-c3ccc(OC(=O)C(=C)C)cc3)c(F)c2)cc1] RM-64

TABLE D-continued
Table D shows illustrative reactive mesogenic compounds which can be used in the LC media in accordance with the present invention.
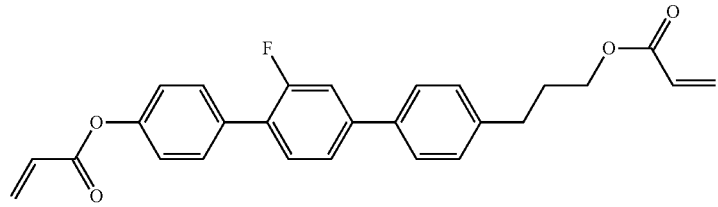 RM-65
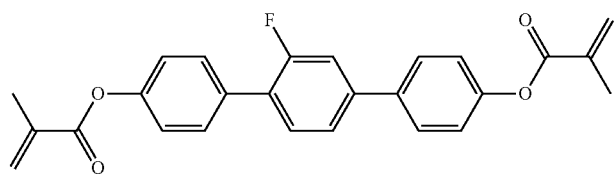 RM-66
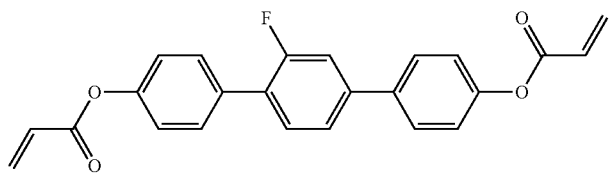 RM-67
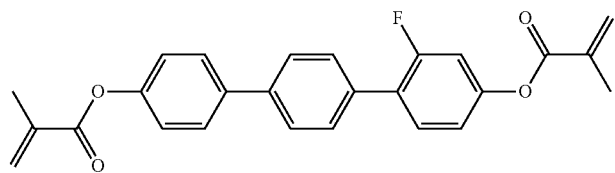 RM-68
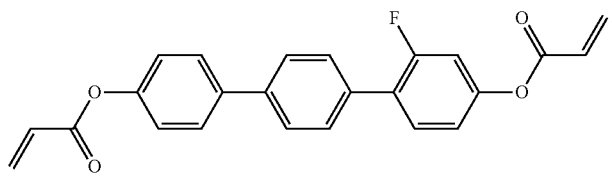 RM-69
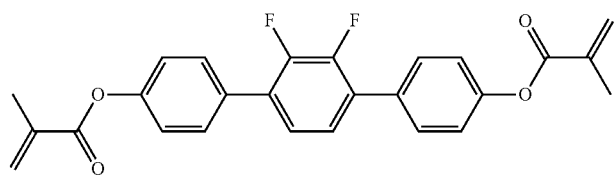 [SMILES: C=C(C)C(=O)Oc1ccc(-c2ccc(-c3ccc(OC(=O)C(=C)C)cc3)c(F)c2)cc1] RM-70
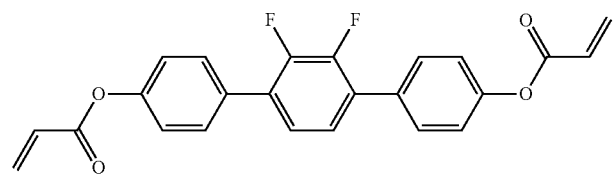 [SMILES: C=CC(=O)Oc1ccc(-c2ccc(-c3ccc(OC(=O)C=C)cc3)c(F)c2)cc1] RM-71
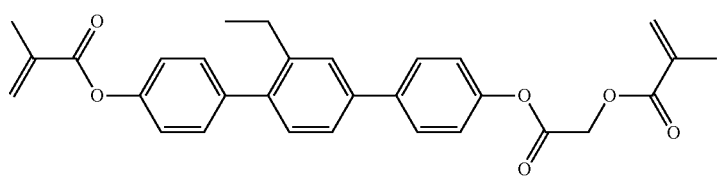 [SMILES: C=C(C)C(=O)OCC(=O)Oc1ccc(-c2ccc(-c3ccc(OC(=O)C(=C)C)cc3)c(CC)c2)cc1] RM-72

TABLE D-continued
Table D shows illustrative reactive mesogenic compounds which can be used in the LC media in accordance with the present invention.
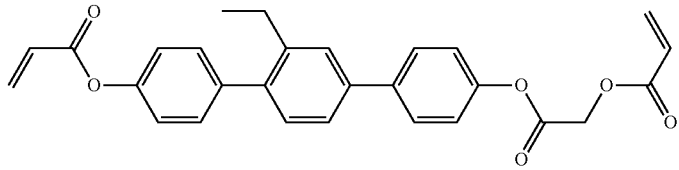 [SMILES: C=CC(=O)OCC(=O)Oc1ccc(-c2ccc(-c3ccc(OC(=O)C=C)cc3)c(CC)c2)cc1] RM-73
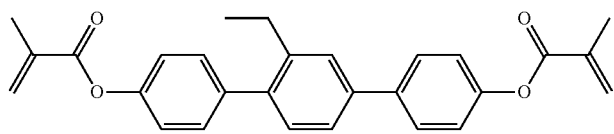 [SMILES: C=C(C)C(=O)Oc1ccc(-c2ccc(-c3ccc(OC(=O)C(=C)C)cc3)c(CC)c2)cc1] RM-74
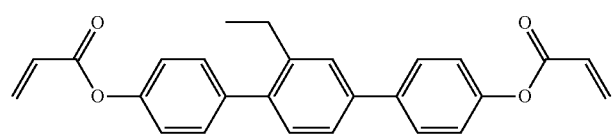 [SMILES: C=CC(=O)Oc1ccc(-c2ccc(-c3ccc(OC(=O)C=C)cc3)c(CC)c2)cc1] RM-75
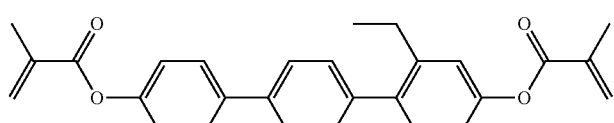 RM-76
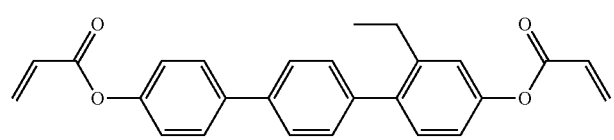 [SMILES: C=CC(=O)Oc1ccc(-c2ccc(-c3ccc(OC(=O)C=C)cc3CC)cc2)cc1] RM-77
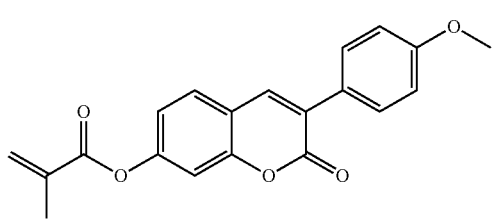 [SMILES: C=C(C)C(=O)Oc1ccc2cc(-c3ccc(OC)cc3)c(=O)oc2c1] RM-78
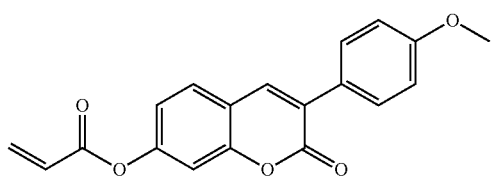 [SMILES: C=CC(=O)Oc1ccc2cc(-c3ccc(OC)cc3)c(=O)oc2c1] RM-79
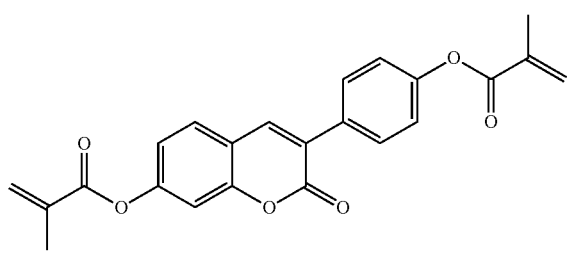 [SMILES: C=C(C)C(=O)Oc1ccc(-c2cc3ccc(OC(=O)C(=C)C)cc3oc2=O)cc1] RM-80
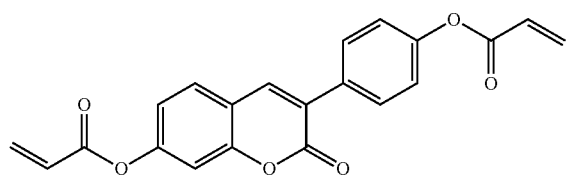 [SMILES: C=CC(=O)Oc1ccc(-c2cc3ccc(OC(=O)C=C)cc3oc2=O)cc1] RM-81

TABLE D-continued
Table D shows illustrative reactive mesogenic compounds which can be used in the LC media in accordance with the present invention.
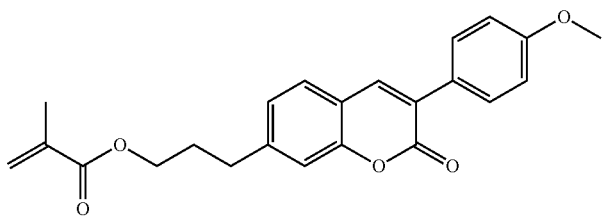 [SMILES: C=C(C)C(=O)OCCCc1ccc2cc(-c3ccc(OC)cc3)c(=O)oc2c1]
RM-82
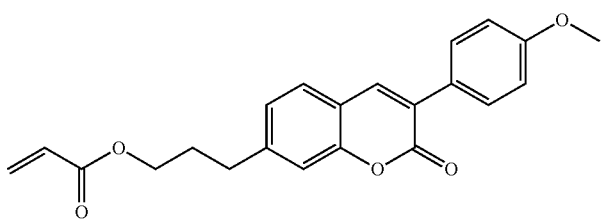 [SMILES: C=CC(=O)OCCCc1ccc2cc(-c3ccc(OC)cc3)c(=O)oc2c1]
RM-83
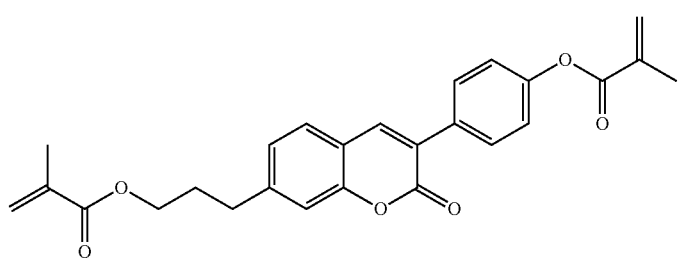 [SMILES: C=C(C)C(=O)OCCCc1ccc2cc(-c3ccc(OC(=O)C(=C)C)cc3)c(=O)oc2c1]
RM-84
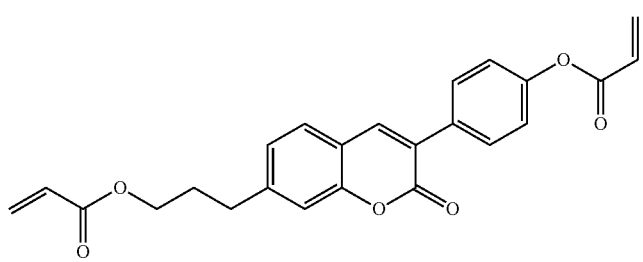 [SMILES: C=CC(=O)OCCCc1ccc2cc(-c3ccc(OC(=O)C=C)cc3)c(=O)oc2c1]
RM-85
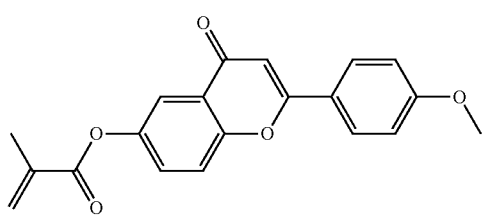 [SMILES: C=C(C)C(=O)Oc1ccc2oc(-c3ccc(OC)cc3)cc(=O)c2c1]
RM-86
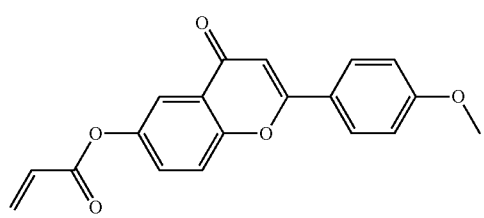 [SMILES: C=CC(=O)Oc1ccc2oc(-c3ccc(OC)cc3)cc(=O)c2c1]
RM-87

TABLE D-continued
Table D shows illustrative reactive mesogenic compounds which can be used in the LC media in accordance with the present invention.
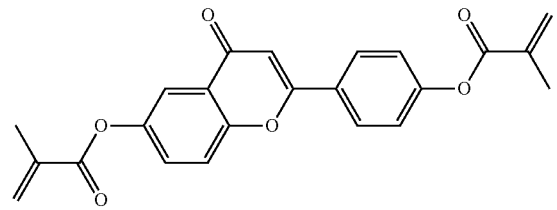 [SMILES: C=C(C)C(=O)Oc1ccc(-c2cc(=O)c3cc(OC(=O)C(=C)C)ccc3o2)cc1] RM-88
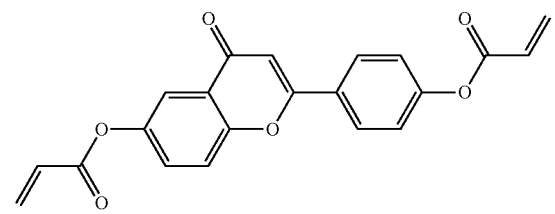 [SMILES: C=CC(=O)Oc1ccc(-c2cc(=O)c3cc(OC(=O)C=C)ccc3o2)cc1] RM-89
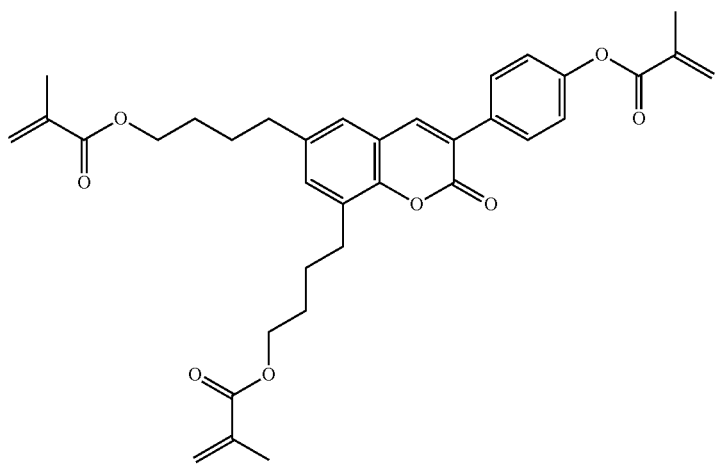 [SMILES: C=C(C)C(=O)OCCCCc1cc(CCCCOC(=O)C(=C)C)c2oc(=O)c(-c3ccc(OC(=O)C(=C)C)cc3)cc2c1] RM-90
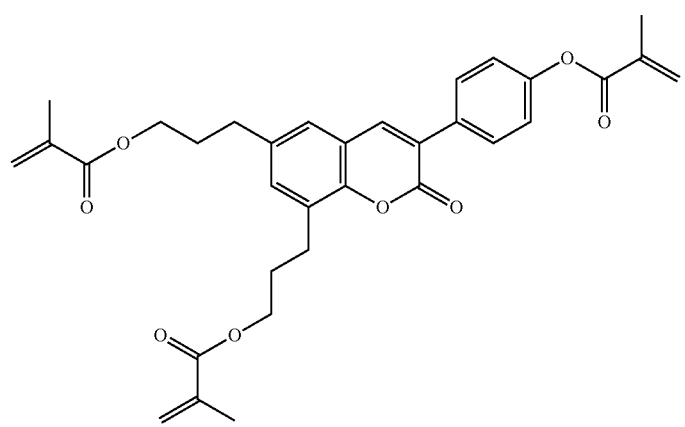 [SMILES: C=C(C)C(=O)OCCCc1cc(CCCOC(=O)C(=C)C)c2oc(=O)c(-c3ccc(OC(=O)C(=C)C)cc3)cc2c1] RM-91
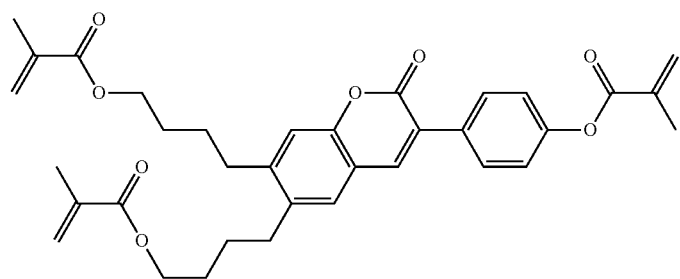 [SMILES: C=C(C)C(=O)OCCCCc1cc2cc(-c3ccc(OC(=O)C(=C)C)cc3)c(=O)oc2cc1CCCCOC(=O)C(=C)C] RM-92

TABLE D-continued
Table D shows illustrative reactive mesogenic compounds which can be used
in the LC media in accordance with the present invention.
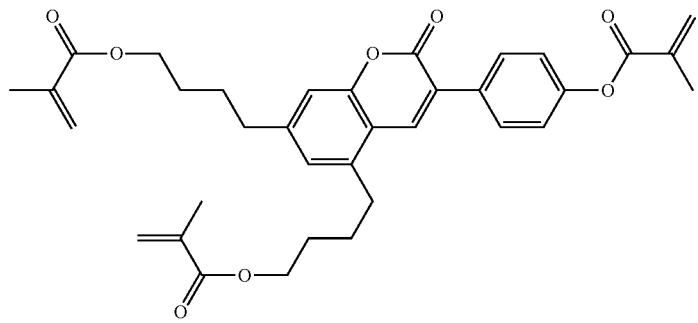 [SMILES: C=C(C)C(=O)OCCCCc1cc(CCCCOC(=O)C(=C)C)c2cc(-c3ccc(OC(=O)C(=C)C)cc3)c(=O)oc2c1]
RM-93
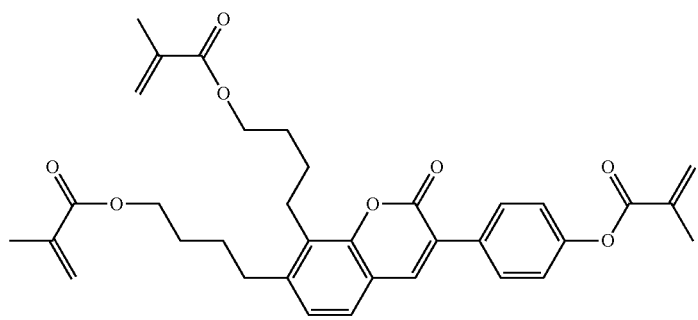 [SMILES: C=C(C)C(=O)OCCCCc1ccc2cc(-c3ccc(OC(=O)C(=C)C)cc3)c(=O)oc2c1CCCCOC(=O)C(=C)C]
RM-94
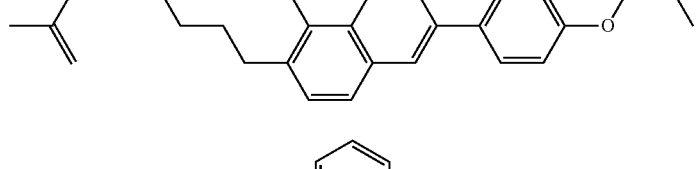
RM-95
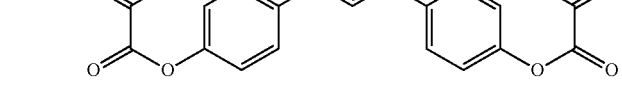
RM-96
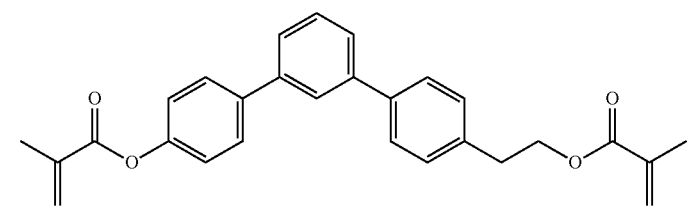 [SMILES: C=C(C)C(=O)OCCc1ccc(-c2cccc(-c3ccc(OC(=O)C(=C)C)cc3)c2)cc1]
RM-97
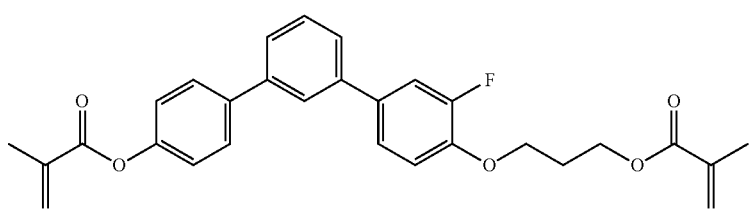 [SMILES: C=C(C)C(=O)OCCCOc1ccc(-c2cccc(-c3ccc(OC(=O)C(=C)C)cc3)c2)cc1F]
RM-98
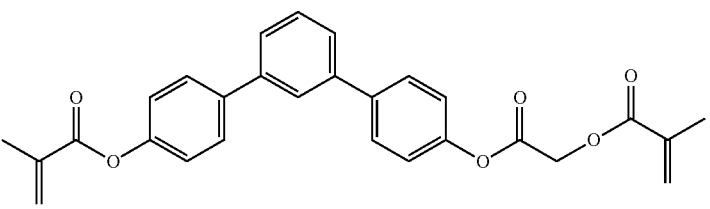 [SMILES: C=C(C)C(=O)OCC(=O)Oc1ccc(-c2cccc(-c3ccc(OC(=O)C(=C)C)cc3)c2)cc1]

TABLE D-continued
Table D shows illustrative reactive mesogenic compounds which can be used in the LC media in accordance with the present invention.
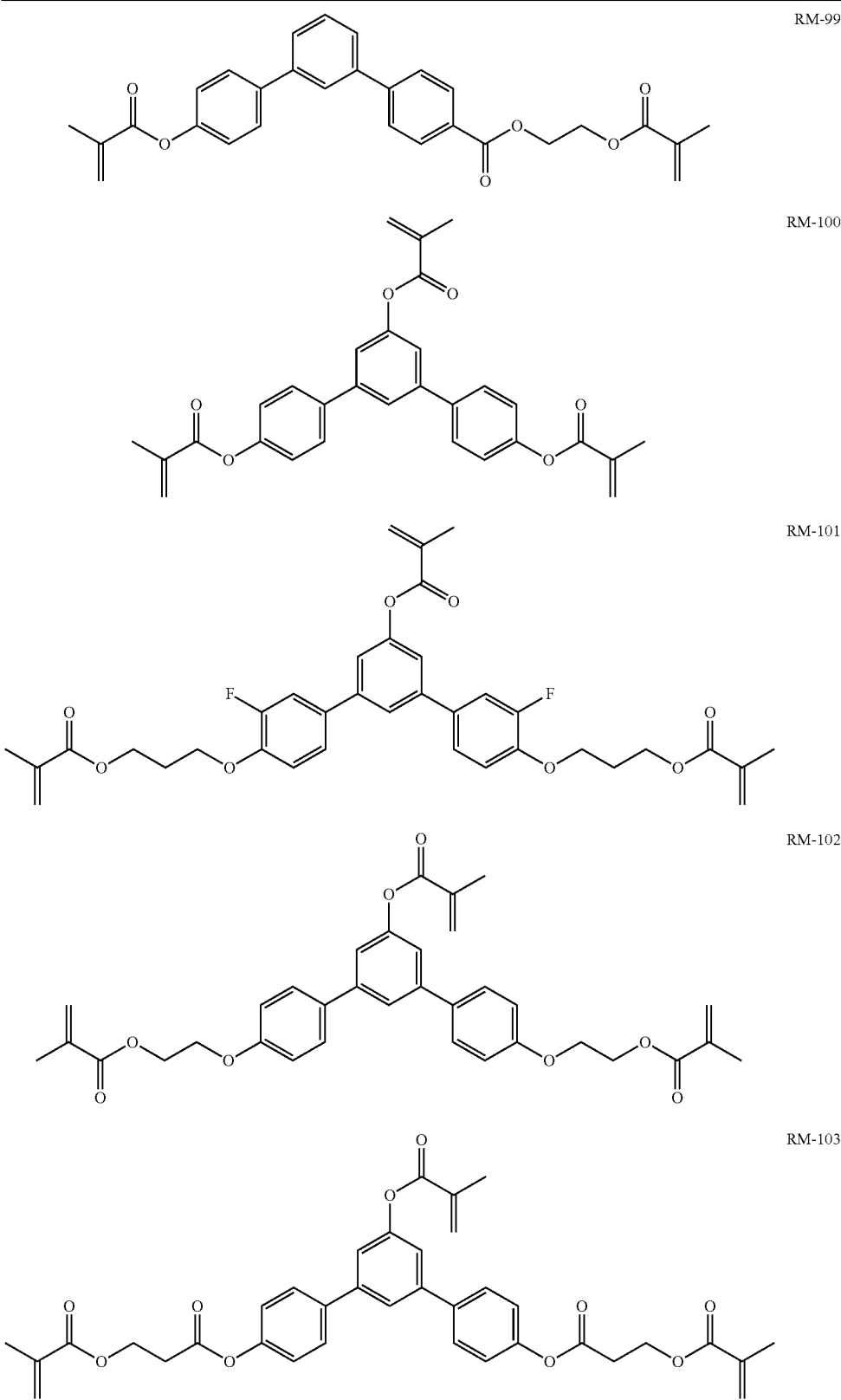

TABLE D-continued
Table D shows illustrative reactive mesogenic compounds which can be used in the LC media in accordance with the present invention.
RM-104
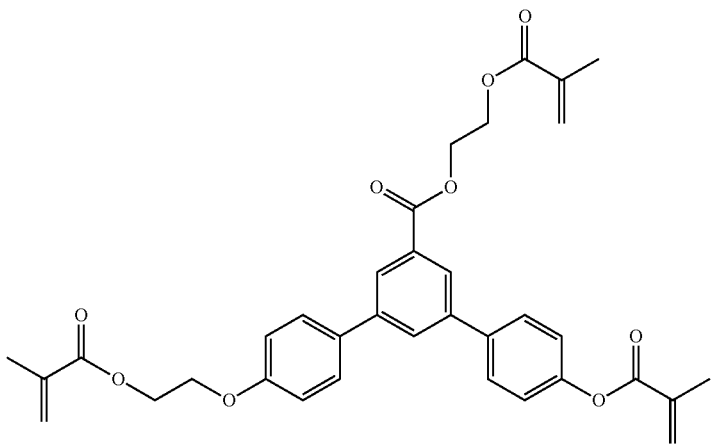 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
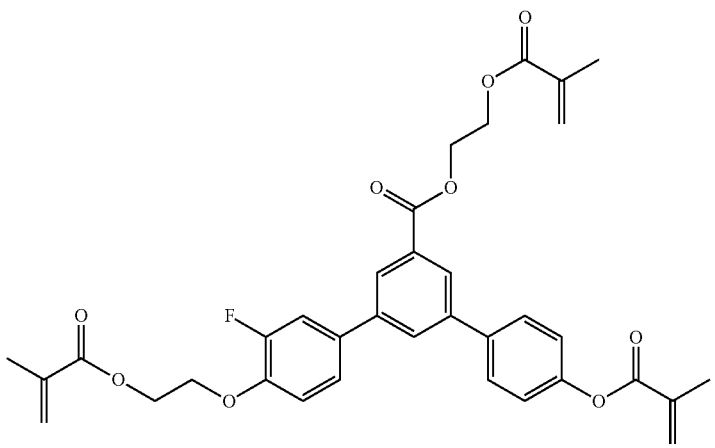 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-106
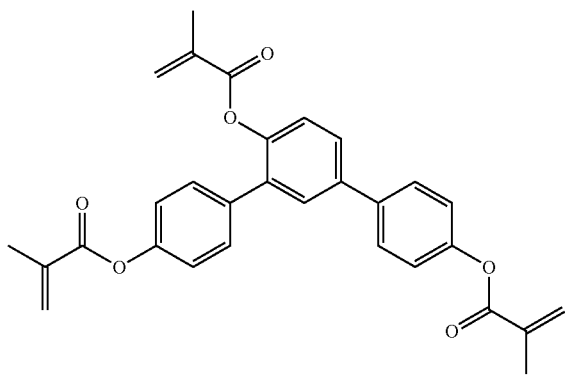 [SMILES: C=C(C)C(=O)Oc1ccc(-c2ccc(OC(=O)C(=C)C)c(-c3ccc(OC(=O)C(=C)C)cc3)c2)cc1]

TABLE D-continued
Table D shows illustrative reactive mesogenic compounds which can be used in the LC media in accordance with the present invention.
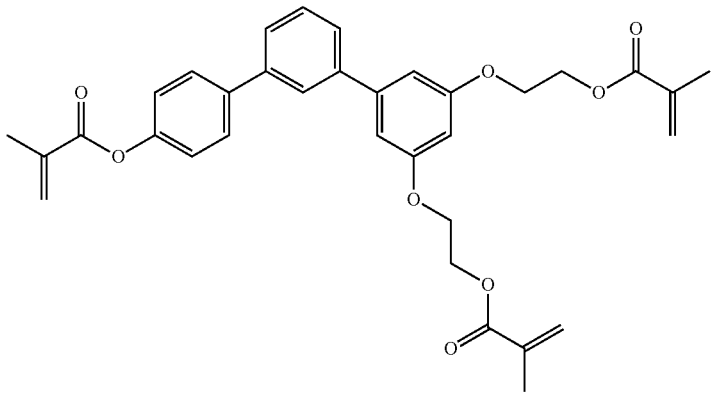 [SMILES: C=C(C)C(=O)OCCOc1cc(OCCOC(=O)C(=C)C)cc(-c2cccc(-c3ccc(OC(=O)C(=C)C)cc3)c2)c1]
RM-107
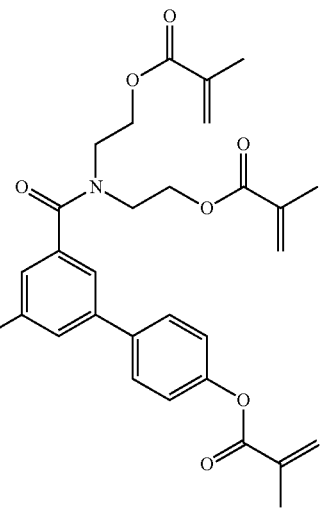
RM-108
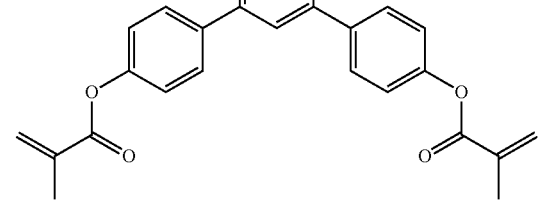
RM-109
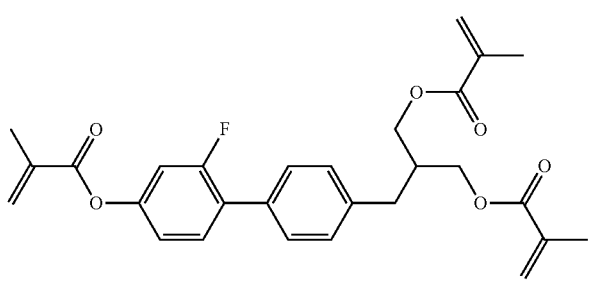 [SMILES: C=C(C)C(=O)OCC(COC(=O)C(=C)C)Cc1ccc(-c2ccc(OC(=O)C(=C)C)cc2F)cc1]
RM-110

TABLE D-continued
Table D shows illustrative reactive mesogenic compounds which can be used in the LC media in accordance with the present invention.
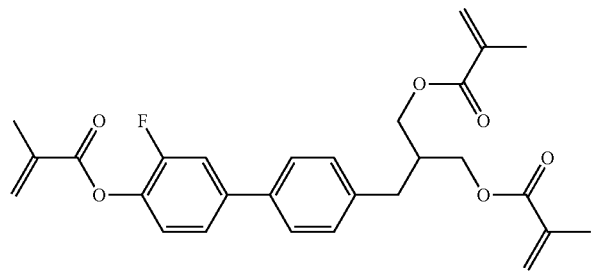 [SMILES: C=C(C)C(=O)OCC(COC(=O)C(=C)C)Cc1ccc(-c2ccc(OC(=O)C(=C)C)c(F)c2)cc1] RM-111
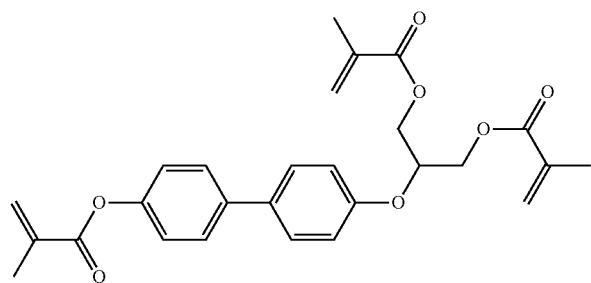 [SMILES: C=C(C)C(=O)OCC(COC(=O)C(=C)C)Oc1ccc(-c2ccc(OC(=O)C(=C)C)cc2)cc1] RM-112
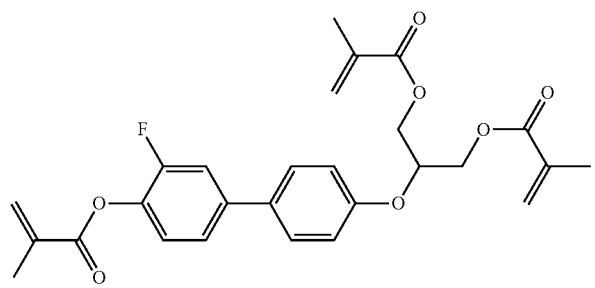 RM-113
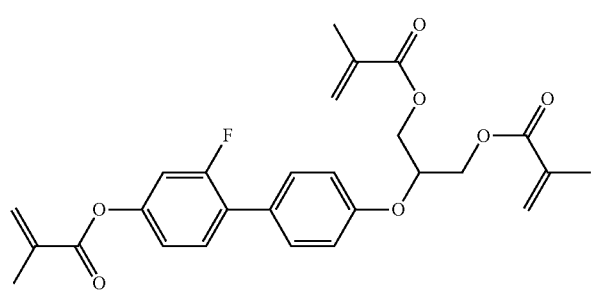 [SMILES: C=C(C)C(=O)OCC(COC(=O)C(=C)C)Oc1ccc(-c2ccc(OC(=O)C(=C)C)cc2F)cc1] RM-114
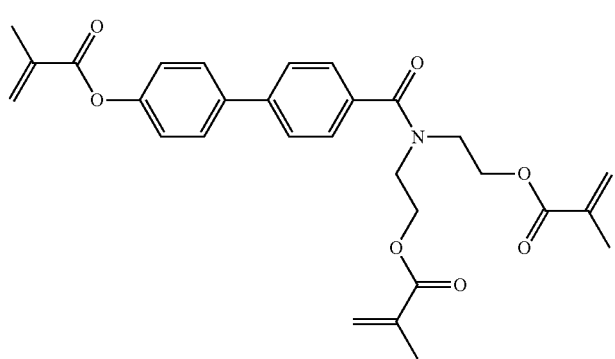 [SMILES: C=C(C)C(=O)OCCN(CCOC(=O)C(=C)C)C(=O)c1ccc(-c2ccc(OC(=O)C(=C)C)cc2)cc1] RM-115

TABLE D-continued
Table D shows illustrative reactive mesogenic compounds which can be used in the LC media in accordance with the present invention.
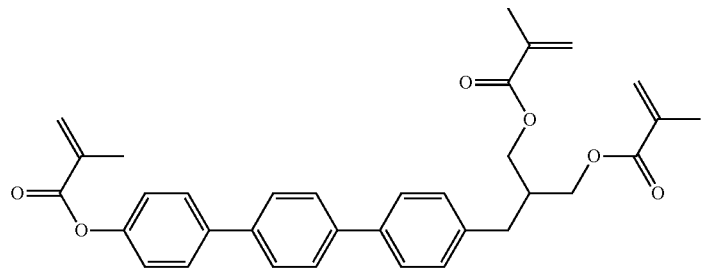 [SMILES: C=C(C)C(=O)OCC(COC(=O)C(=C)C)Cc1ccc(-c2ccc(-c3ccc(OC(=O)C(=C)C)cc3)cc2)cc1]
RM-116
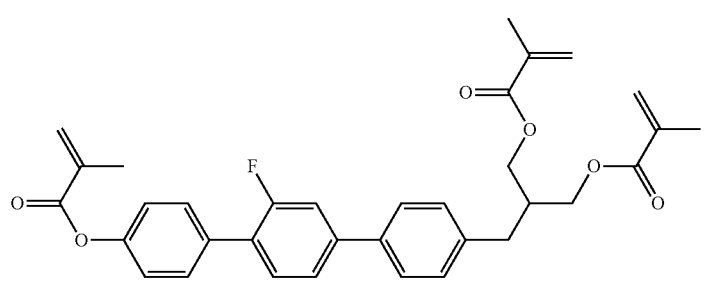
RM-117
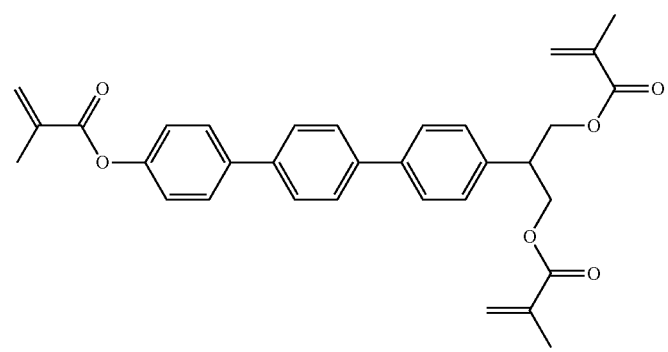 [SMILES: C=C(C)C(=O)OCC(COC(=O)C(=C)C)c1ccc(-c2ccc(-c3ccc(OC(=O)C(=C)C)cc3)cc2)cc1]
RM-118
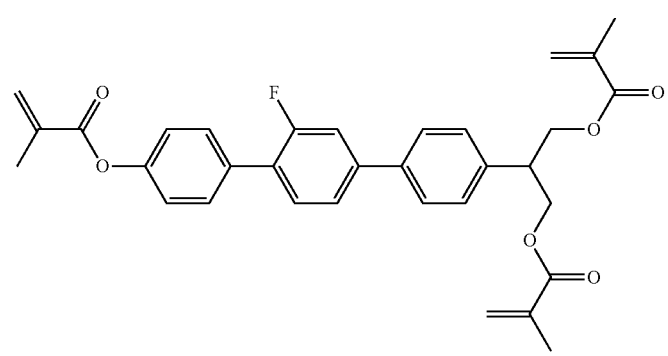 [SMILES: C=C(C)C(=O)OCC(COC(=O)C(=C)C)c1ccc(-c2ccc(-c3ccc(OC(=O)C(=C)C)cc3)c(F)c2)cc1]
RM-119
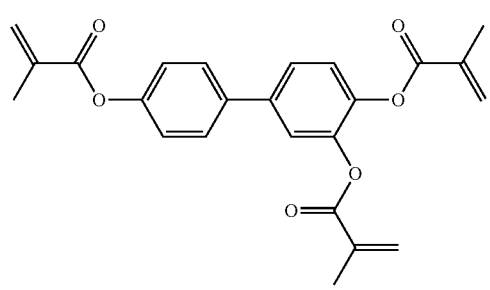 [SMILES: C=C(C)C(=O)Oc1ccc(-c2ccc(OC(=O)C(=C)C)c(OC(=O)C(=C)C)c2)cc1]
RM-120

TABLE D-continued
Table D shows illustrative reactive mesogenic compounds which can be used in the LC media in accordance with the present invention.
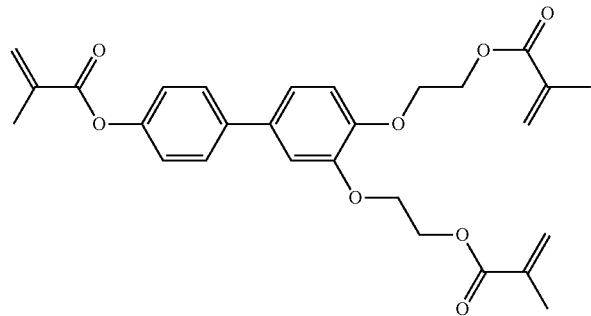 [SMILES: C=C(C)C(=O)OCCOc1ccc(-c2ccc(OC(=O)C(=C)C)cc2)cc1OCCOC(=O)C(=C)C]
RM-121
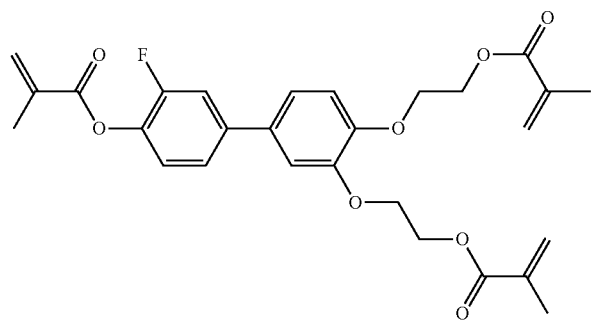 [SMILES: C=C(C)C(=O)OCCOc1ccc(-c2ccc(OC(=O)C(=C)C)c(F)c2)cc1OCCOC(=O)C(=C)C]
RM-122
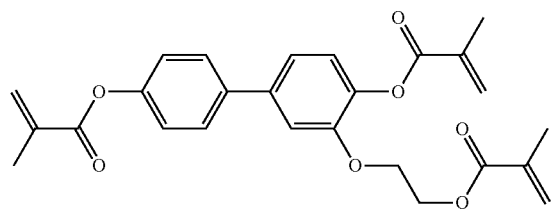 [SMILES: C=C(C)C(=O)OCCOc1cc(-c2ccc(OC(=O)C(=C)C)cc2)ccc1OC(=O)C(=C)C]
RM-123
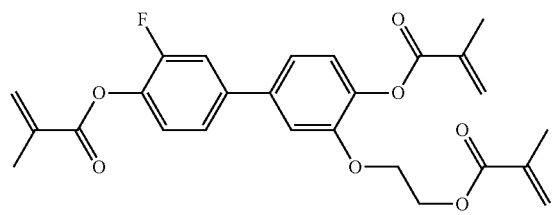
RM-124
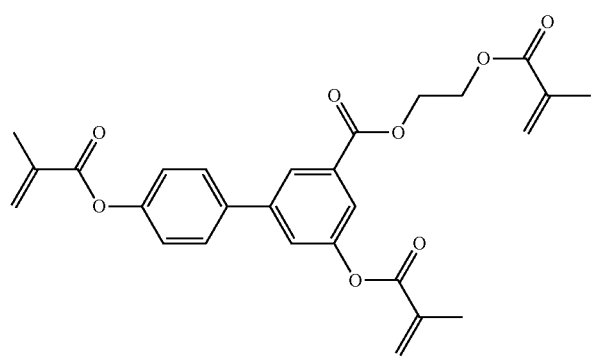 [SMILES: C=C(C)C(=O)OCCOC(=O)c1cc(OC(=O)C(=C)C)cc(-c2ccc(OC(=O)C(=C)C)cc2)c1]
RM-125

TABLE D-continued
Table D shows illustrative reactive mesogenic compounds which can be used
in the LC media in accordance with the present invention.
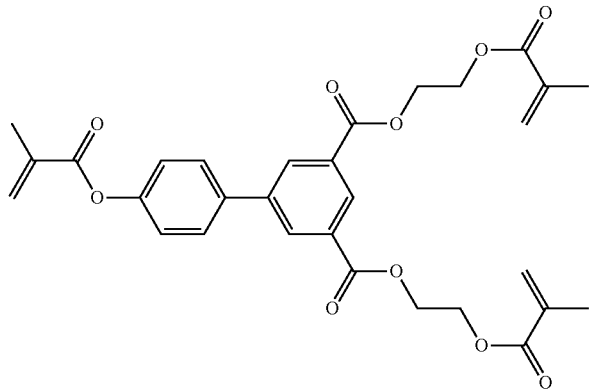 [SMILES: C=C(C)C(=O)OCCOC(=O)c1cc(C(=O)OCCOC(=O)C(=C)C)cc(-c2ccc(OC(=O)C(=C)C)cc2)c1]
RM-126
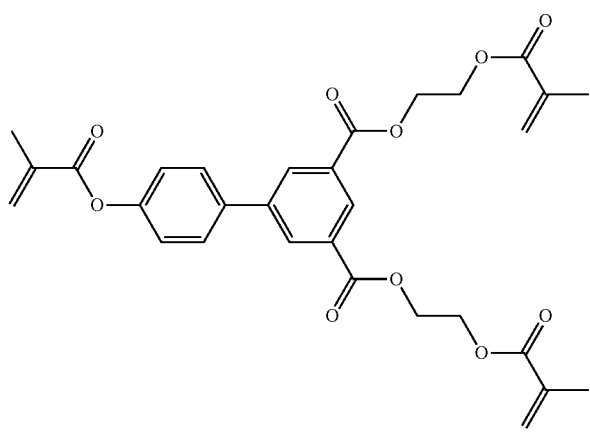 [SMILES: C=C(C)C(=O)OCCOC(=O)c1cc(C(=O)OCCOC(=O)C(=C)C)cc(-c2ccc(OC(=O)C(=C)C)cc2)c1]
RM-127
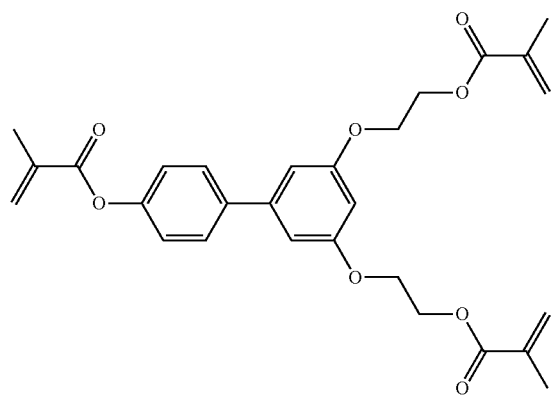 [SMILES: C=C(C)C(=O)OCCOc1cc(OCCOC(=O)C(=C)C)cc(-c2ccc(OC(=O)C(=C)C)cc2)c1]
RM-128

TABLE D-continued
Table D shows illustrative reactive mesogenic compounds which can be used
in the LC media in accordance with the present invention.
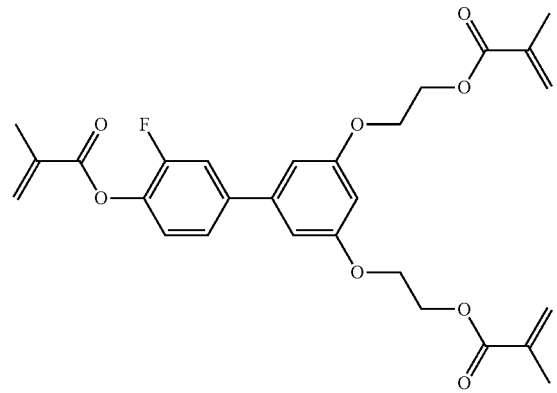 [SMILES: C=C(C)C(=O)OCCOc1cc(OCCOC(=O)C(=C)C)cc(-c2ccc(OC(=O)C(=C)C)c(F)c2)c1]
RM-129
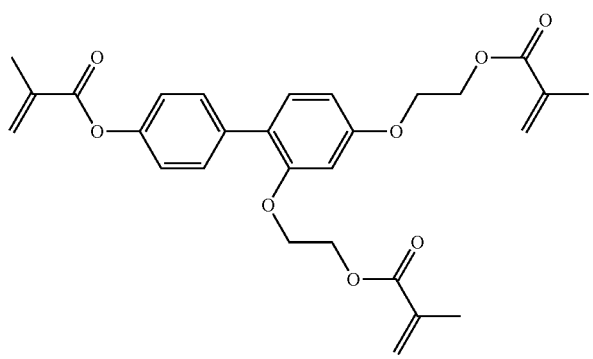 [SMILES: C=C(C)C(=O)OCCOc1ccc(-c2ccc(OC(=O)C(=C)C)cc2)c(OCCOC(=O)C(=C)C)c1]
RM-130
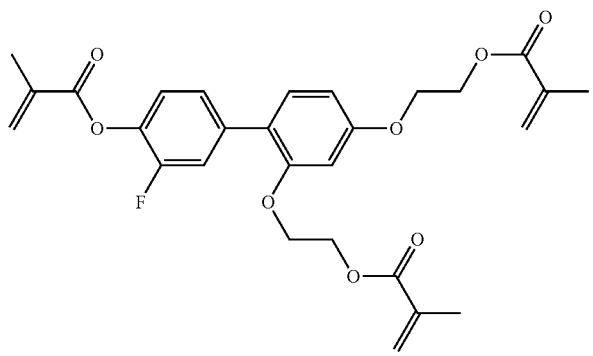 [SMILES: C=C(C)C(=O)OCCOc1ccc(-c2ccc(OC(=O)C(=C)C)c(F)c2)c(OCCOC(=O)C(=C)C)c1]
RM-131
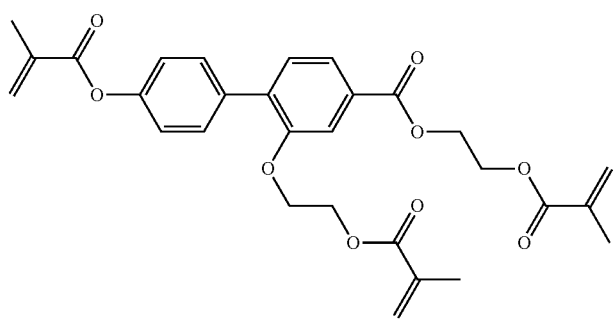 [SMILES: C=C(C)C(=O)OCCOC(=O)c1ccc(-c2ccc(OC(=O)C(=C)C)cc2)c(OCCOC(=O)C(=C)C)c1]
RM-132

TABLE D-continued
Table D shows illustrative reactive mesogenic compounds which can be used in the LC media in accordance with the present invention.
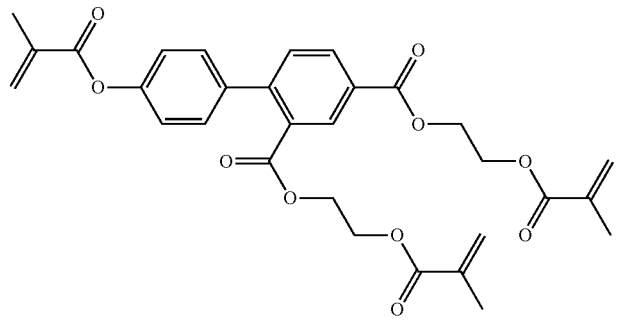 [SMILES: C=C(C)C(=O)OCCOC(=O)c1ccc(-c2ccc(OC(=O)C(=C)C)cc2)c(C(=O)OCCOC(=O)C(=C)C)c1]
RM-133
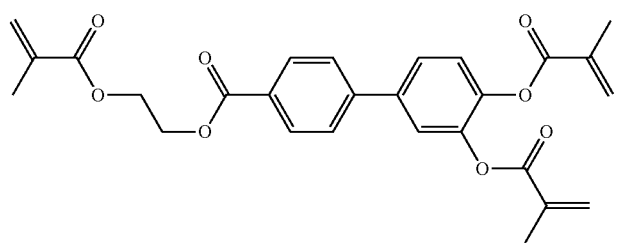 [SMILES: C=C(C)C(=O)OCCOC(=O)c1ccc(-c2ccc(OC(=O)C(=C)C)c(OC(=O)C(=C)C)c2)cc1]
RM-134
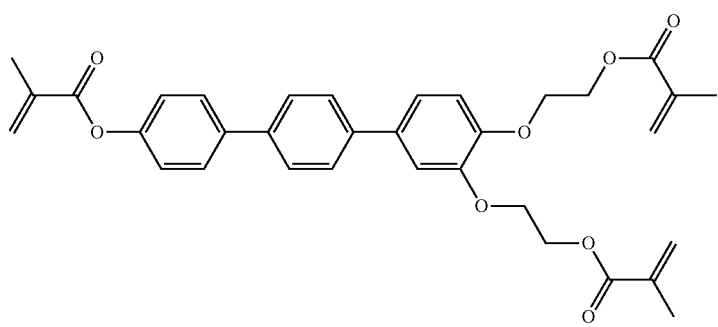
RM-135
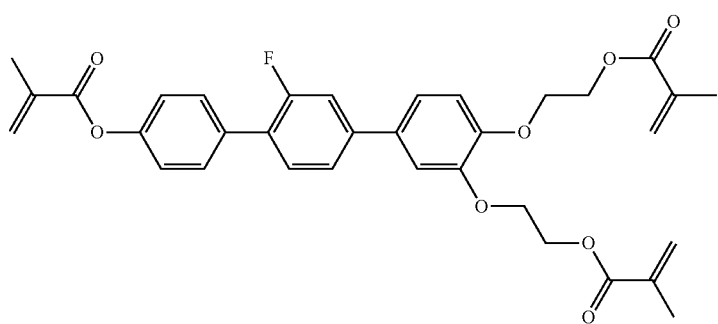 [SMILES: C=C(C)C(=O)OCCOc1ccc(-c2ccc(-c3ccc(OC(=O)C(=C)C)cc3)cc2)cc1OCCOC(=O)C(=C)C]
RM-136

TABLE D-continued
Table D shows illustrative reactive mesogenic compounds which can be used in the LC media in accordance with the present invention.
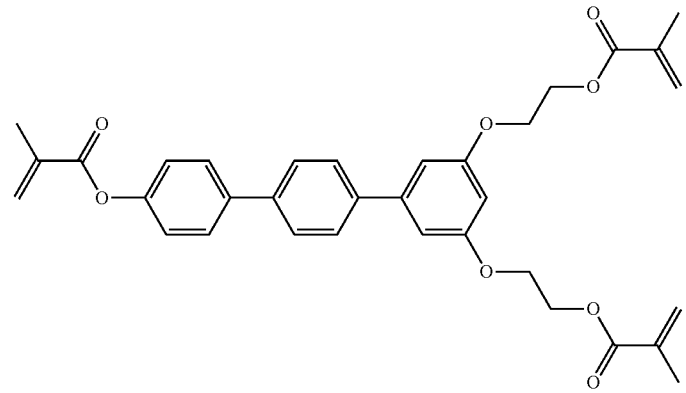 [SMILES: C=C(C)C(=O)OCCOc1cc(OCCOC(=O)C(=C)C)cc(-c2ccc(-c3ccc(OC(=O)C(=C)C)cc3)cc2)c1]
RM-137
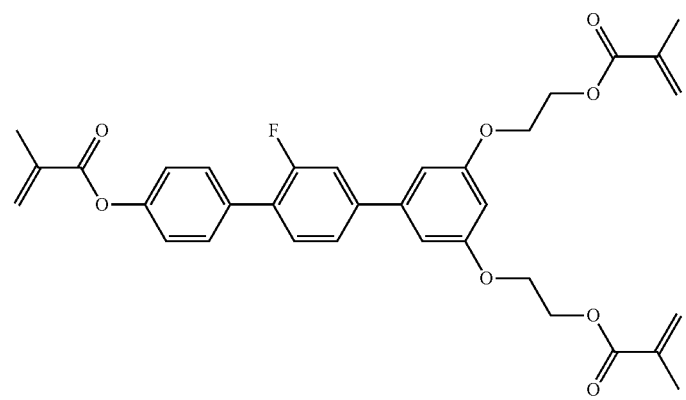 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
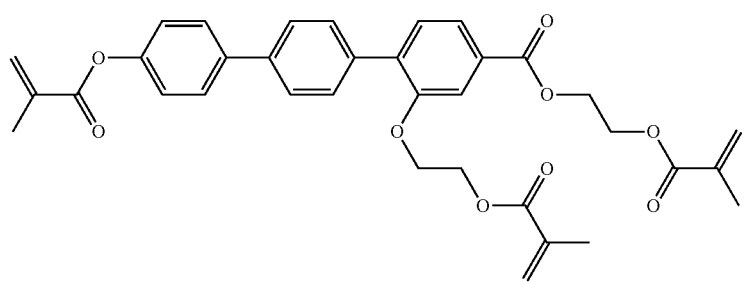 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
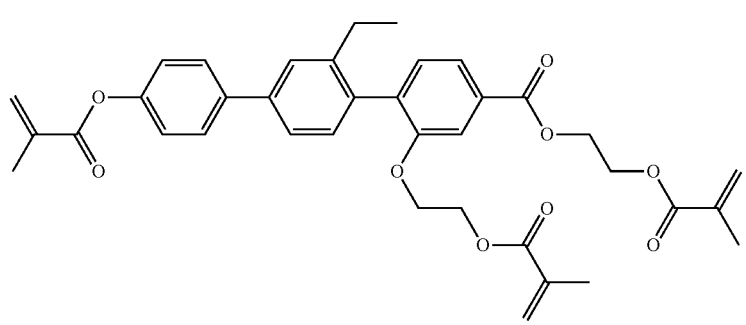 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140

TABLE D-continued
Table D shows illustrative reactive mesogenic compounds which can be used in the LC media in accordance with the present invention.
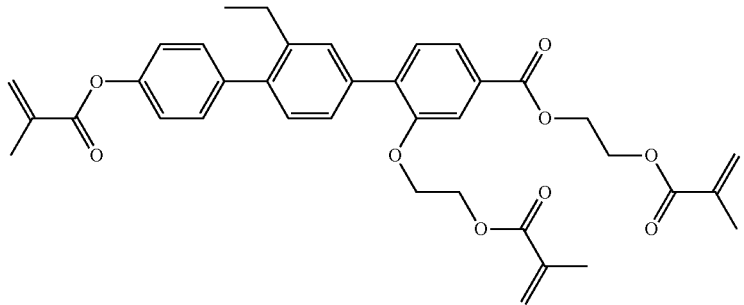 RM-141
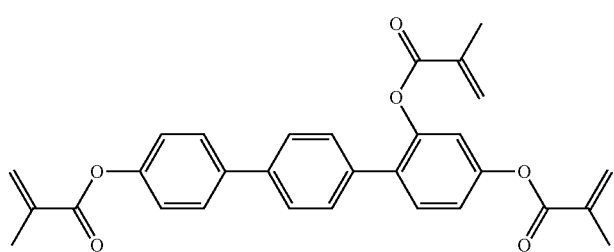 [SMILES: C=C(C)C(=O)Oc1ccc(-c2ccc(-c3ccc(OC(=O)C(=C)C)cc3OC(=O)C(=C)C)cc2)cc1] RM-142
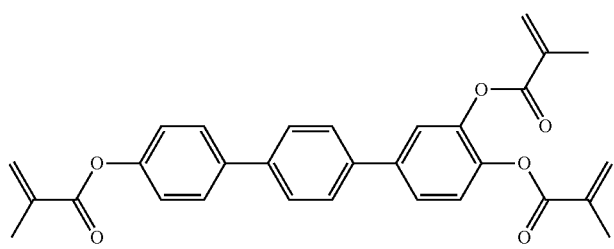 [SMILES: C=C(C)C(=O)Oc1ccc(-c2ccc(-c3ccc(OC(=O)C(=C)C)c(OC(=O)C(=C)C)c3)cc2)cc1] RM-143
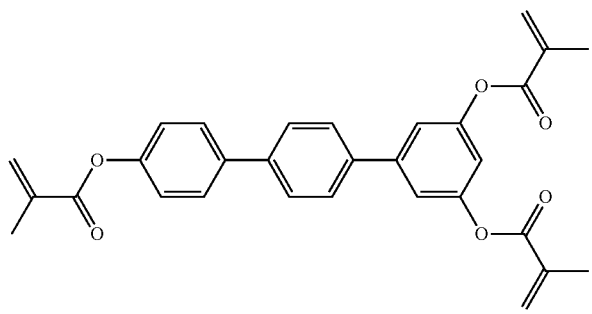 [SMILES: C=C(C)C(=O)Oc1ccc(-c2ccc(-c3cc(OC(=O)C(=C)C)cc(OC(=O)C(=C)C)c3)cc2)cc1] RM-144
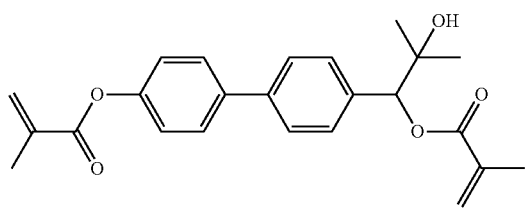 [SMILES: C=C(C)C(=O)Oc1ccc(-c2ccc(C(OC(=O)C(=C)C)C(C)(C)O)cc2)cc1] RM-145
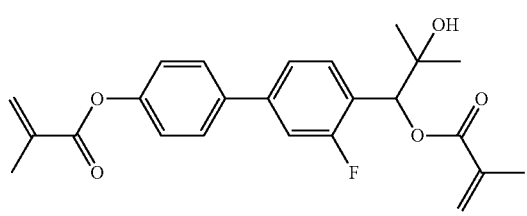 [SMILES: C=C(C)C(=O)Oc1ccc(-c2ccc(C(OC(=O)C(=C)C)C(C)(C)O)c(F)c2)cc1] RM-146

TABLE D-continued
Table D shows illustrative reactive mesogenic compounds which can be used in the LC media in accordance with the present invention.
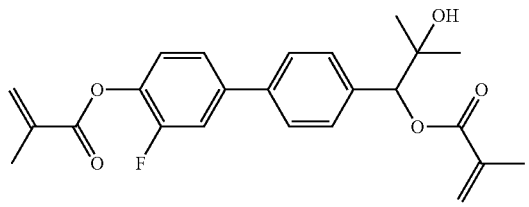 [SMILES: C=C(C)C(=O)Oc1ccc(-c2ccc(C(OC(=O)C(=C)C)C(C)(C)O)cc2)cc1F]
RM-147
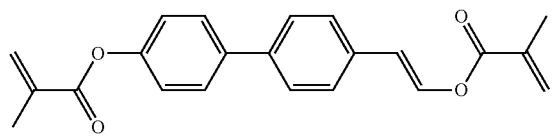 [SMILES: C=C(C)C(=O)O/C=C/c1ccc(-c2ccc(OC(=O)C(=C)C)cc2)cc1]
RM-148
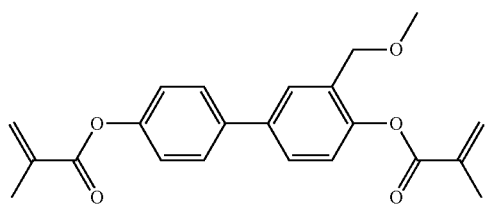 [SMILES: C=C(C)C(=O)Oc1ccc(-c2ccc(OC(=O)C(=C)C)c(COC)c2)cc1]
RM-149
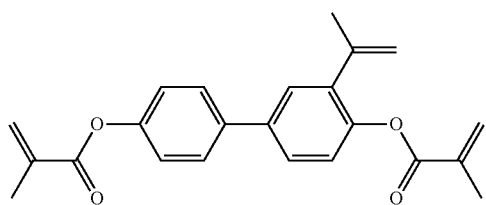 [SMILES: C=C(C)C(=O)Oc1ccc(-c2ccc(OC(=O)C(=C)C)c(C(=C)C)c2)cc1]
RM-150
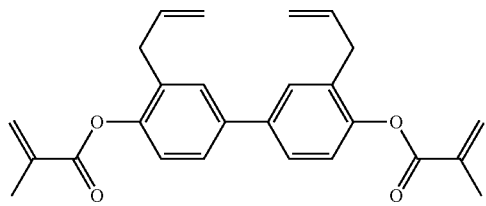 [SMILES: C=CCc1cc(-c2ccc(OC(=O)C(=C)C)c(CC=C)c2)ccc1OC(=O)C(=C)C]
RM-151
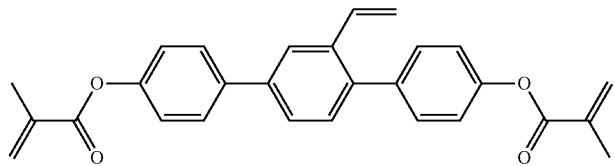 [SMILES: C=Cc1cc(-c2ccc(OC(=O)C(=C)C)cc2)ccc1-c1ccc(OC(=O)C(=C)C)cc1]
RM-152
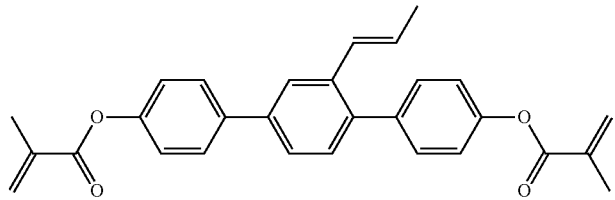 [SMILES: C=C(C)C(=O)Oc1ccc(-c2ccc(-c3ccc(OC(=O)C(=C)C)cc3)c(/C=C/C)c2)cc1]
RM-153

TABLE D-continued
Table D shows illustrative reactive mesogenic compounds which can be used in the LC media in accordance with the present invention.
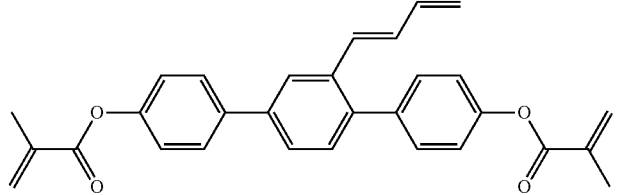 [SMILES: C=C/C=C/c1cc(-c2ccc(OC(=O)C(=C)C)cc2)ccc1-c1ccc(OC(=O)C(=C)C)cc1] RM-154
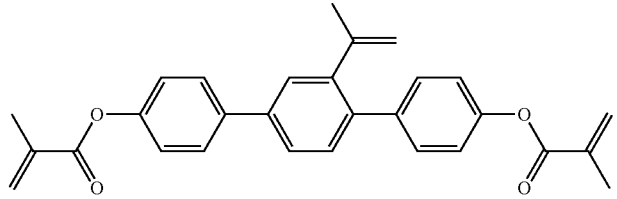 [SMILES: C=C(C)C(=O)Oc1ccc(-c2ccc(-c3ccc(OC(=O)C(=C)C)cc3)c(C(=C)C)c2)cc1] RM-155
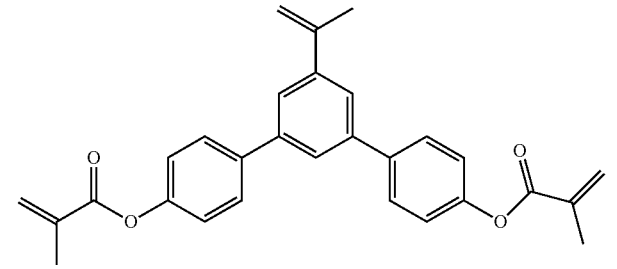 [SMILES: C=C(C)C(=O)Oc1ccc(-c2cc(C(=C)C)cc(-c3ccc(OC(=O)C(=C)C)cc3)c2)cc1] RM-156
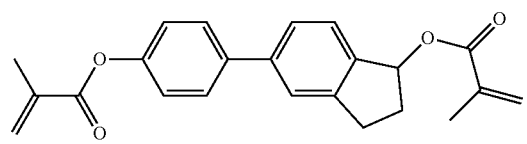 [SMILES: C=C(C)C(=O)Oc1ccc(-c2ccc3c(c2)CCC3OC(=O)C(=C)C)cc1] RM-157
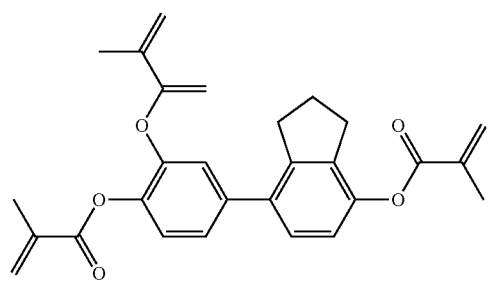 [SMILES: C=C(C)C(=C)Oc1cc(-c2ccc(OC(=O)C(=C)C)c3c2CCC3)ccc1OC(=O)C(=C)C] RM-158
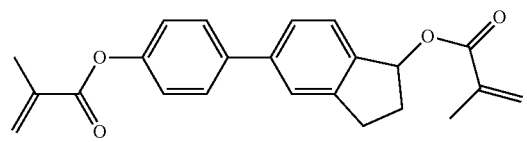 [SMILES: C=C(C)C(=O)Oc1ccc(-c2ccc3c(c2)CCC3OC(=O)C(=C)C)cc1] RM-159
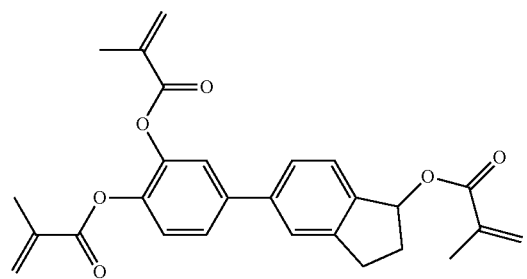 [SMILES: C=C(C)C(=O)Oc1ccc(-c2ccc3c(c2)CCC3OC(=O)C(=C)C)cc1OC(=O)C(=C)C] RM-160

TABLE D-continued
Table D shows illustrative reactive mesogenic compounds which can be used in the LC media in accordance with the present invention.
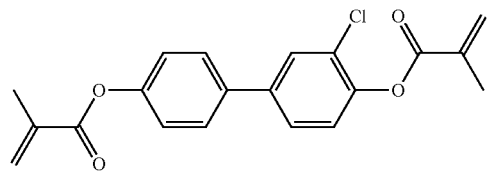 [SMILES: C=C(C)C(=O)Oc1ccc(-c2ccc(OC(=O)C(=C)C)c(Cl)c2)cc1] RM-161
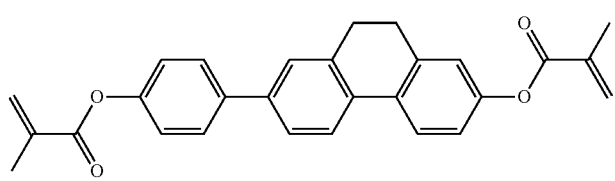 RM-162
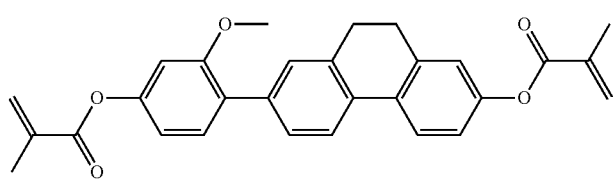 [SMILES: C=C(C)C(=O)Oc1ccc2c(c1)CCc1cc(-c3ccc(OC(=O)C(=C)C)cc3OC)ccc1-2] RM-163
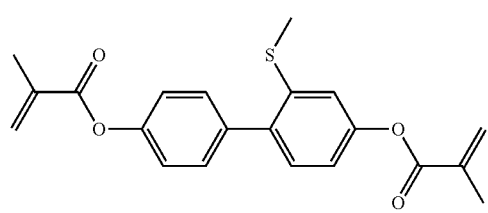 RM-164
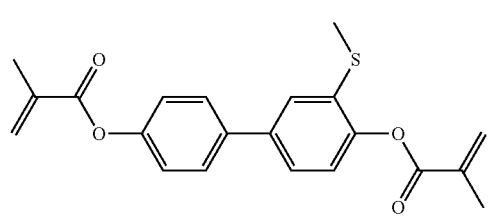 [SMILES: C=C(C)C(=O)Oc1ccc(-c2ccc(OC(=O)C(=C)C)c(SC)c2)cc1] RM-165
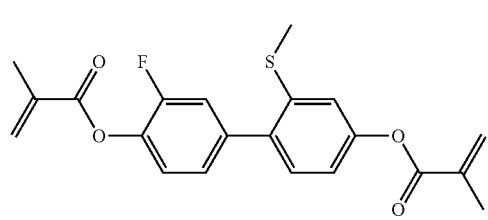 [SMILES: C=C(C)C(=O)Oc1ccc(-c2ccc(OC(=O)C(=C)C)c(F)c2)c(SC)c1] RM-166
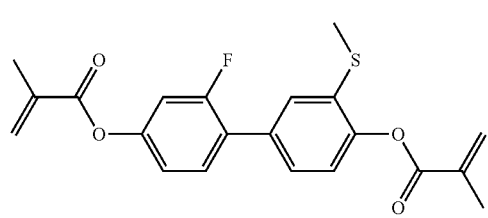 [SMILES: C=C(C)C(=O)Oc1ccc(-c2ccc(OC(=O)C(=C)C)c(SC)c2)c(F)c1] RM-167

TABLE D-continued
Table D shows illustrative reactive mesogenic compounds which can be used in the LC media in accordance with the present invention.
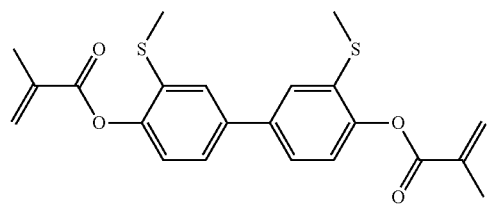 [SMILES: C=C(C)C(=O)Oc1ccc(-c2ccc(OC(=O)C(=C)C)c(SC)c2)cc1F] RM-168
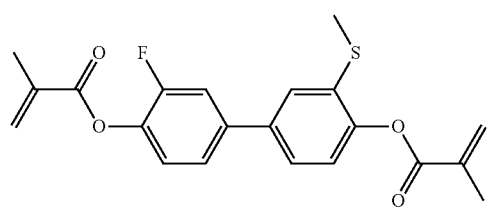 RM-169
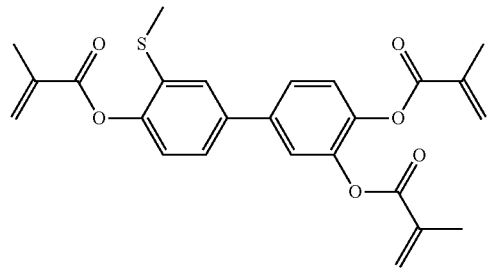 [SMILES: C=C(C)C(=O)Oc1ccc(-c2ccc(OC(=O)C(=C)C)c(SC)c2)cc1OC(=O)C(=C)C] RM-170
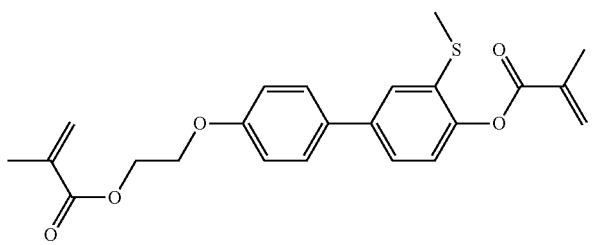 [SMILES: C=C(C)C(=O)OCCCc1ccc(-c2ccc(OC(=O)C(=C)C)c(SC)c2)cc1] RM-171
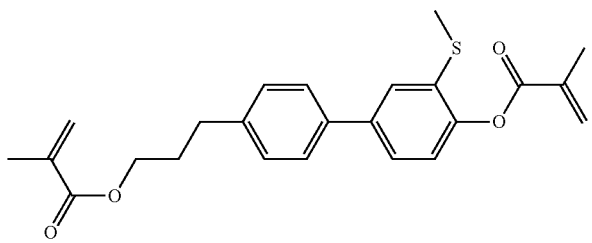 RM-172
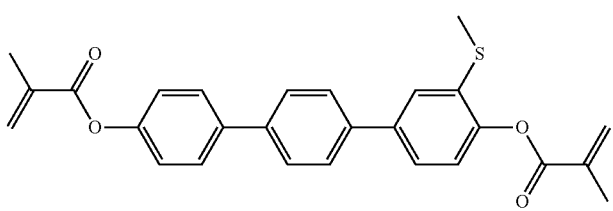 [SMILES: C=C(C)C(=O)Oc1ccc(-c2ccc(-c3ccc(OC(=O)C(=C)C)c(SC)c3)cc2)cc1] RM-173

TABLE D-continued

Table D shows illustrative reactive mesogenic compounds which can be used in the LC media in accordance with the present invention.

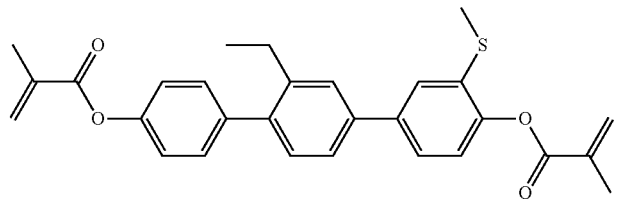 [SMILES: C=C(C)C(=O)Oc1ccc(-c2ccc(-c3ccc(OC(=O)C(=C)C)c(SC)c3)cc2CC)cc1]
RM-174

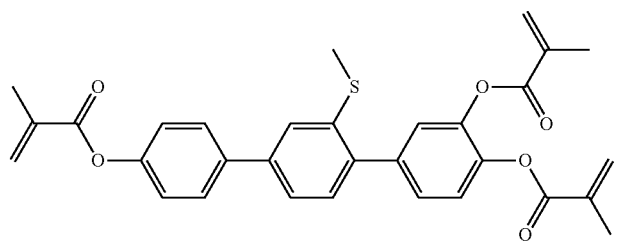 [SMILES: C=C(C)C(=O)Oc1ccc(-c2ccc(-c3ccc(OC(=O)C(=C)C)c(OC(=O)C(=C)C)c3)c(SC)c2)cc1]
RM-175

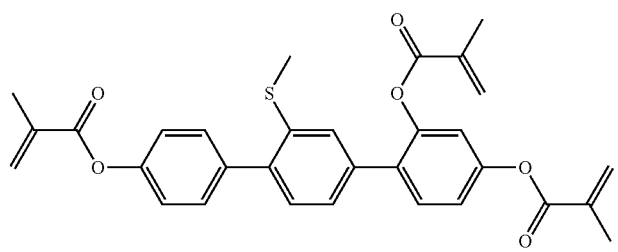 [SMILES: C=C(C)C(=O)Oc1ccc(-c2ccc(-c3ccc(OC(=O)C(=C)C)cc3OC(=O)C(=C)C)cc2SC)cc1]
RM-176

In a preferred embodiment, the mixtures according to the invention comprise one or more polymerizable compounds, preferably selected from the polymerizable compounds of the formulae RM-1 to RM-176. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-150 to RM-156, RM-162, RM-163 and RM-164 to RM-176 are particularly preferred.

TABLE E

Table E shows self-alignment additives for vertical alignment which can be used in LC media for SA-VA and SA-FFS displays according to the present invention together with the polymerizable compounds of formula M:

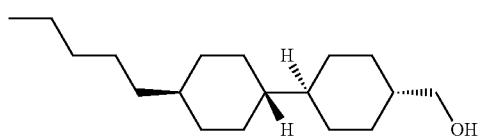 [SMILES: CCCCC[C@H]1CC[C@H]([C@H]2CC[C@H](CO)CC2)CC1]
SA-1

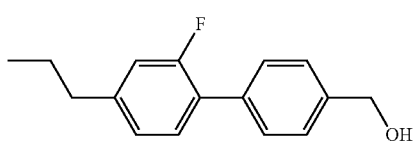 [SMILES: CCCc1ccc(-c2ccc(CO)cc2)c(F)c1]
SA-2

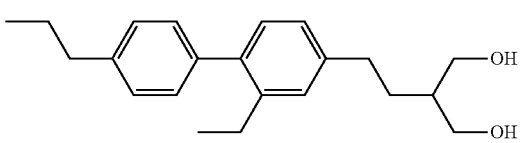
SA-3

TABLE E-continued
Table E shows self-alignment additives for vertical alignment which can be used in LC media for SA-VA and SA-FFS displays according to the present invention together with the polymerizable compounds of formula M:
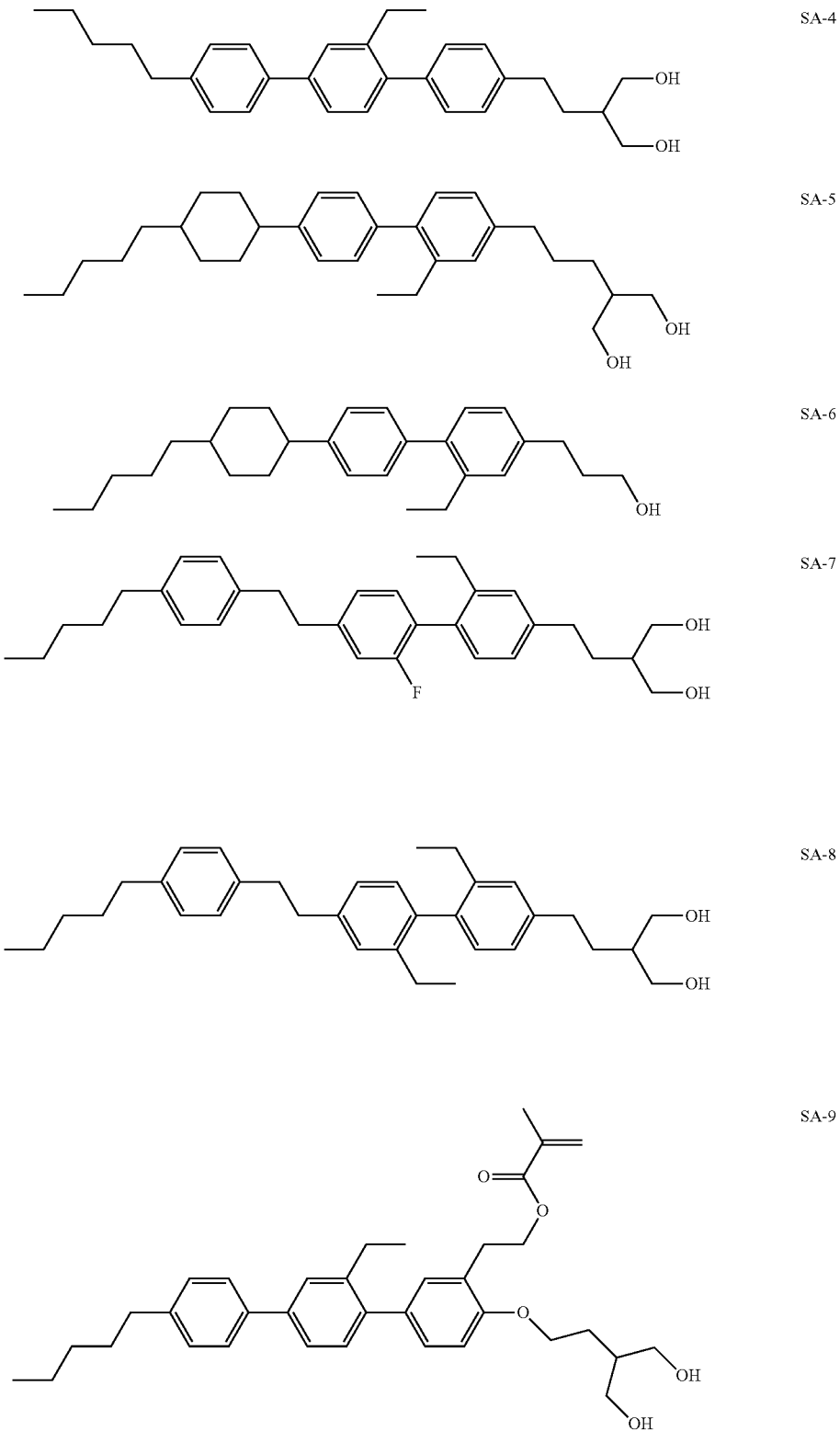

TABLE E-continued
Table E shows self-alignment additives for vertical alignment which can be used in LC media for SA-VA and SA-FFS displays according to the present invention together with the polymerizable compounds of formula M:
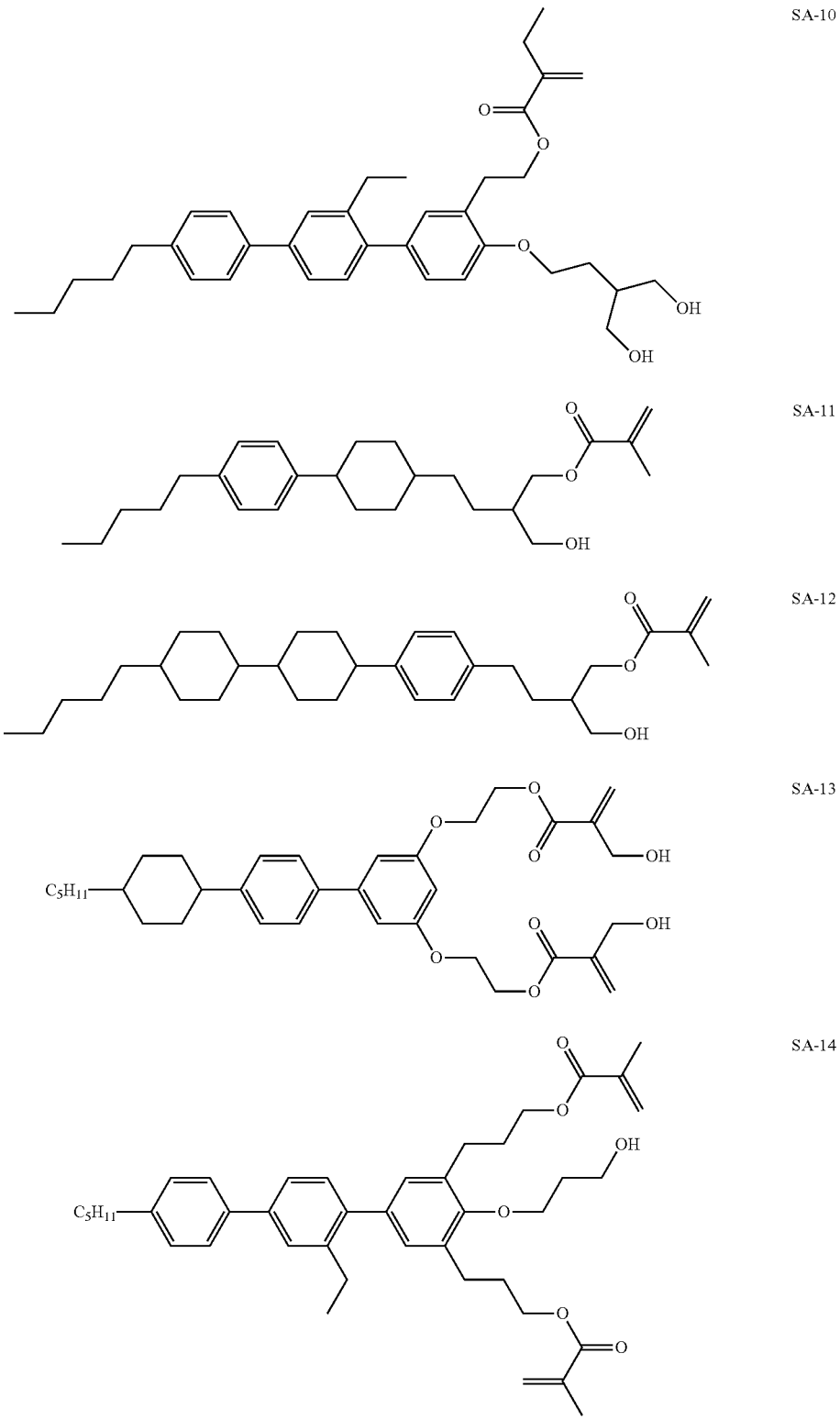

TABLE E-continued
Table E shows self-alignment additives for vertical alignment which can be used in LC media for SA-VA and SA-FFS displays according to the present invention together with the polymerizable compounds of formula M:
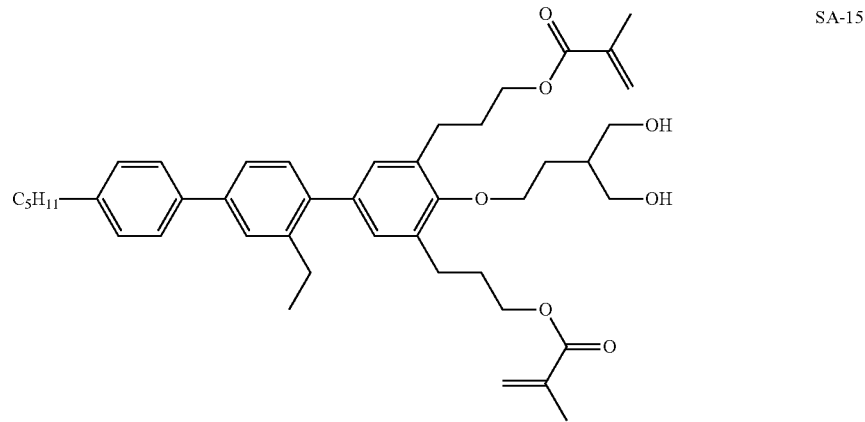
SA-15
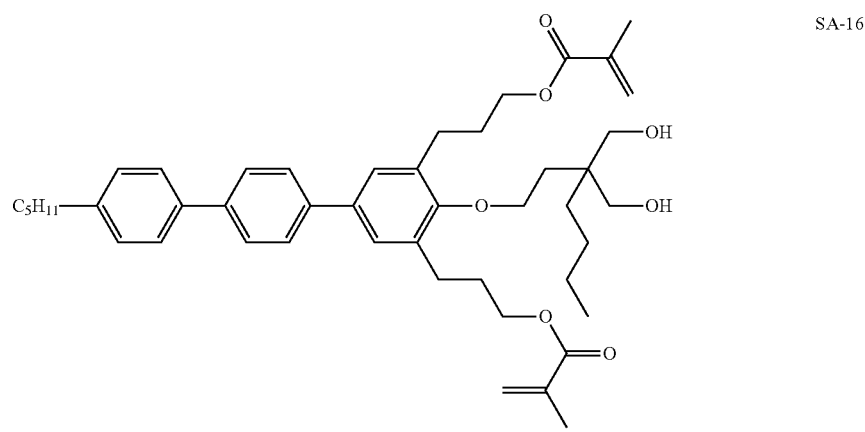
SA-16
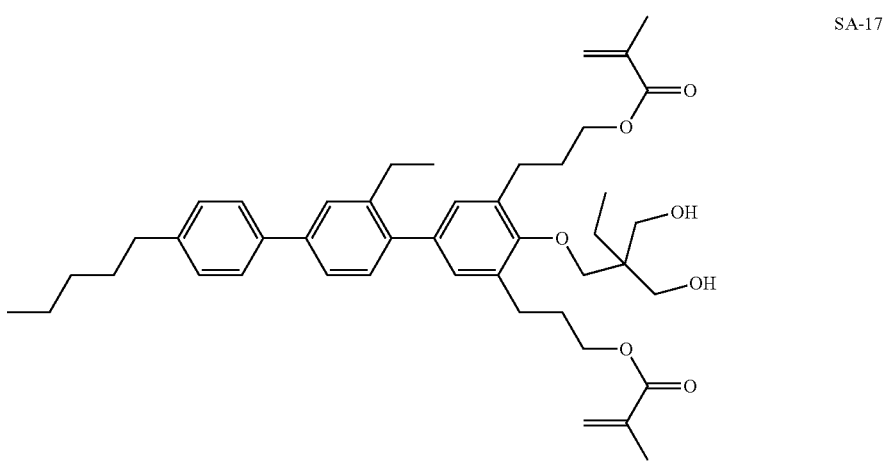
SA-17

TABLE E-continued
Table E shows self-alignment additives for vertical alignment which can be used in LC media for SA-VA and SA-FFS displays according to the present invention together with the polymerizable compounds of formula M:
SA-18
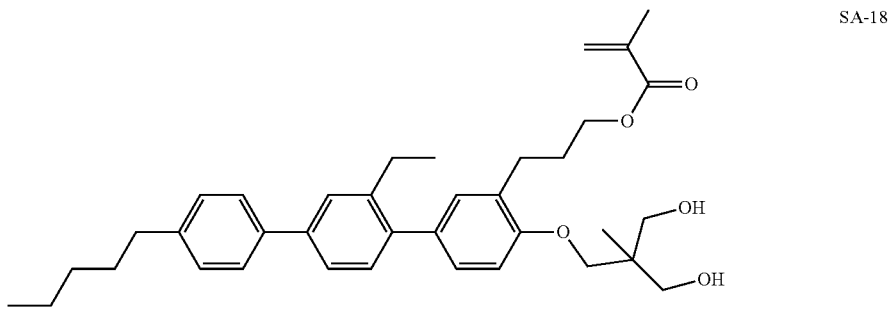
SA-19
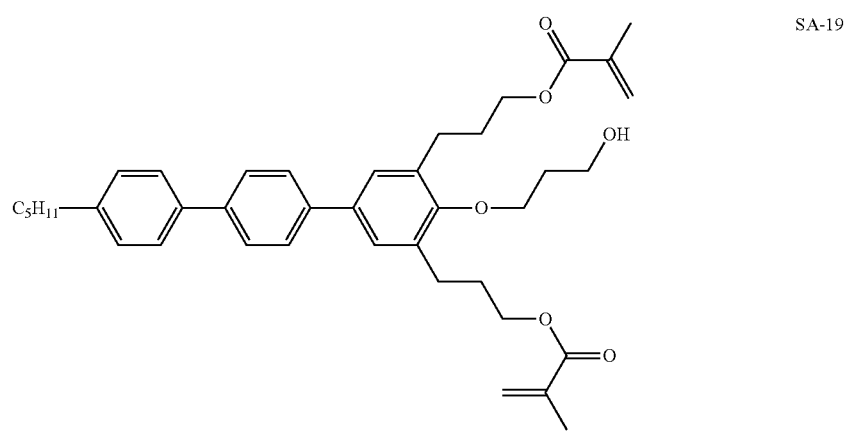
SA-20
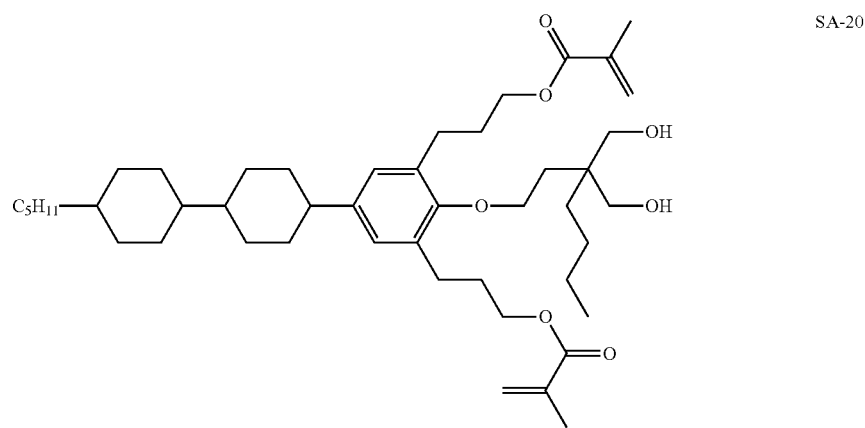

TABLE E-continued
Table E shows self-alignment additives for vertical alignment which can be used in LC media for SA-VA and SA-FFS displays according to the present invention together with the polymerizable compounds of formula M:
SA-21
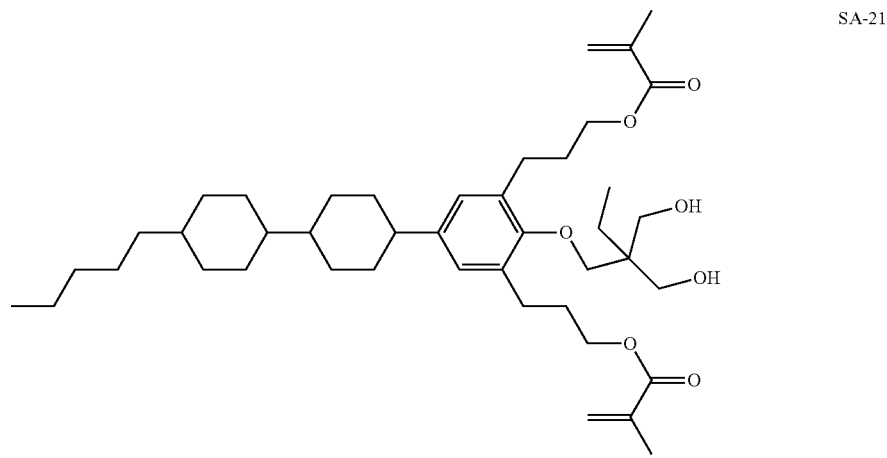
SA-22
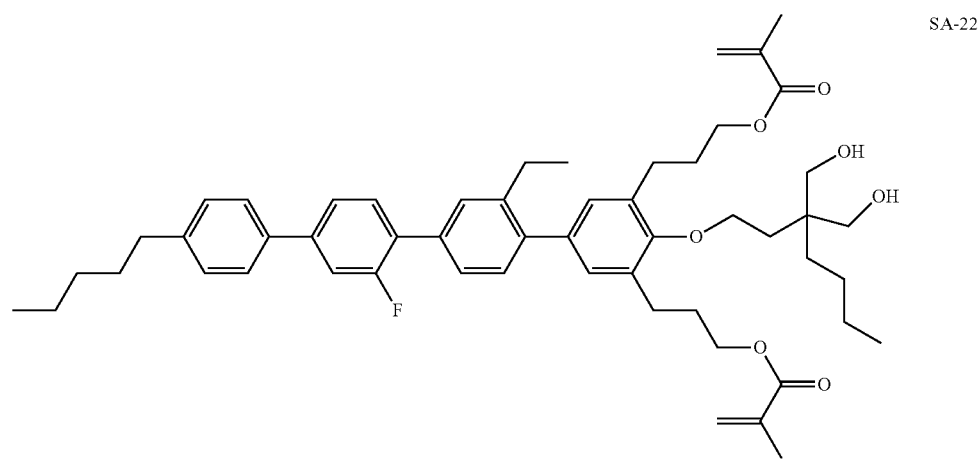
SA-23
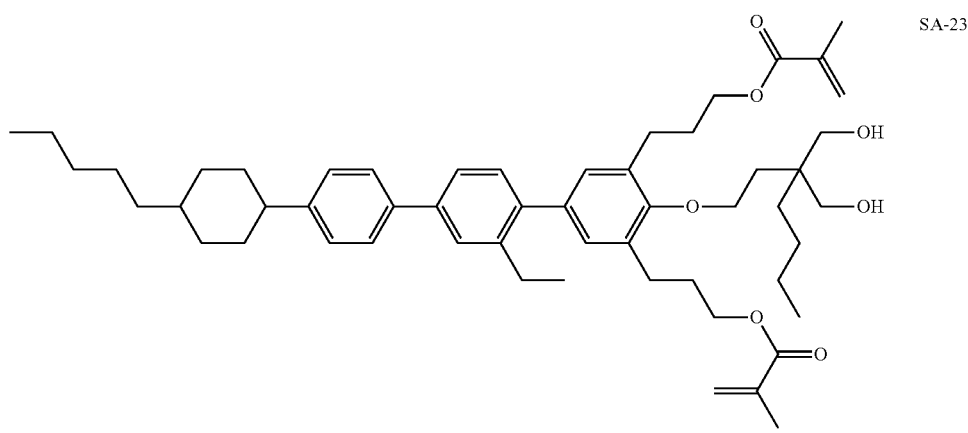

TABLE E-continued
Table E shows self-alignment additives for vertical alignment which can be used in LC media for SA-VA and SA-FFS displays according to the present invention together with the polymerizable compounds of formula M:
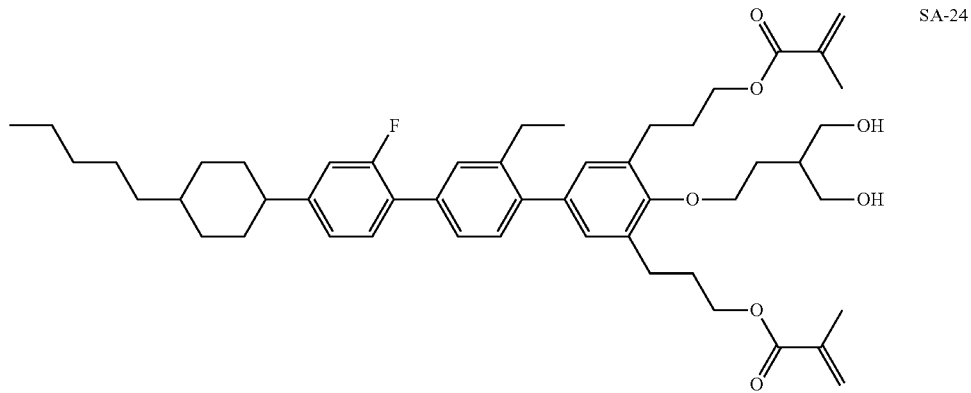
SA-24
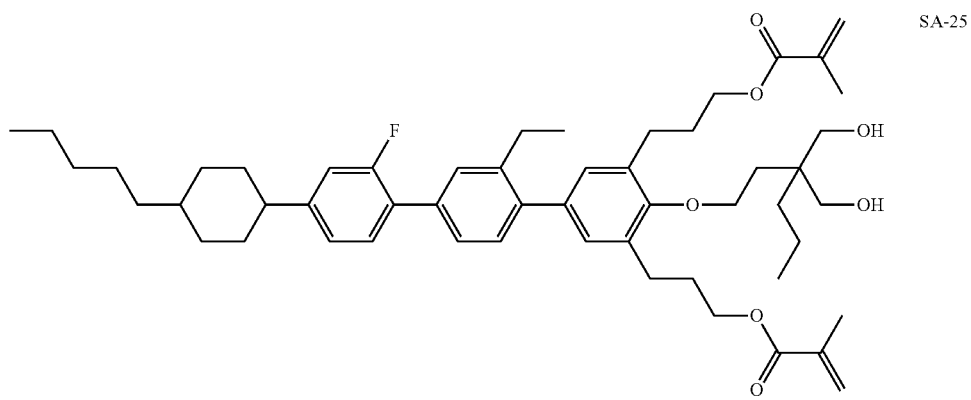
SA-25
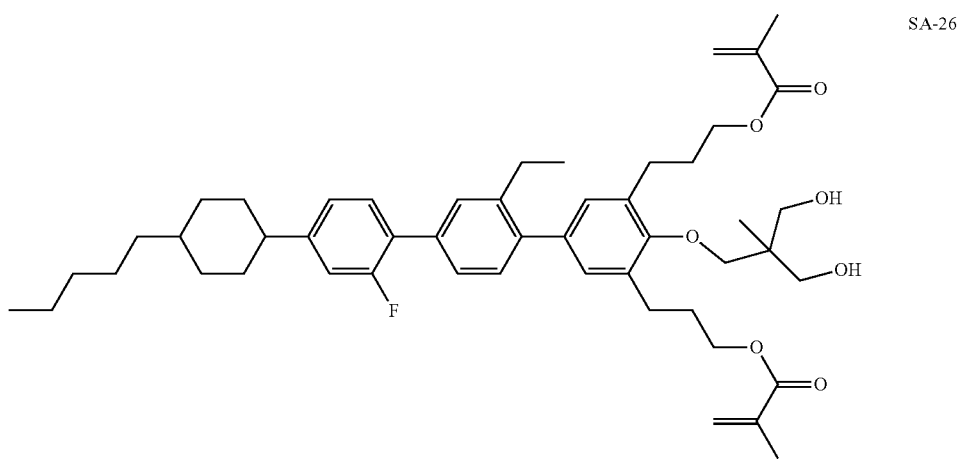
SA-26

TABLE E-continued
Table E shows self-alignment additives for vertical alignment which can be used in LC media for SA-VA and SA-FFS displays according to the present invention together with the polymerizable compounds of formula M:
SA-27
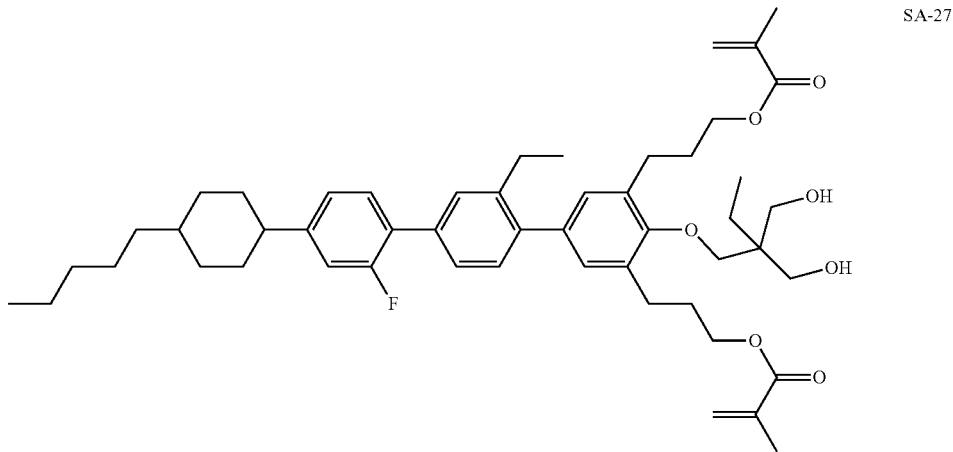
SA-28
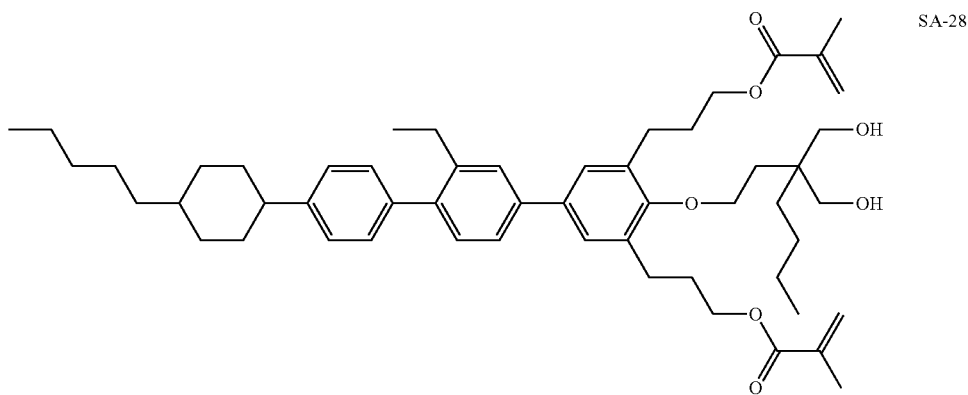
SA-29
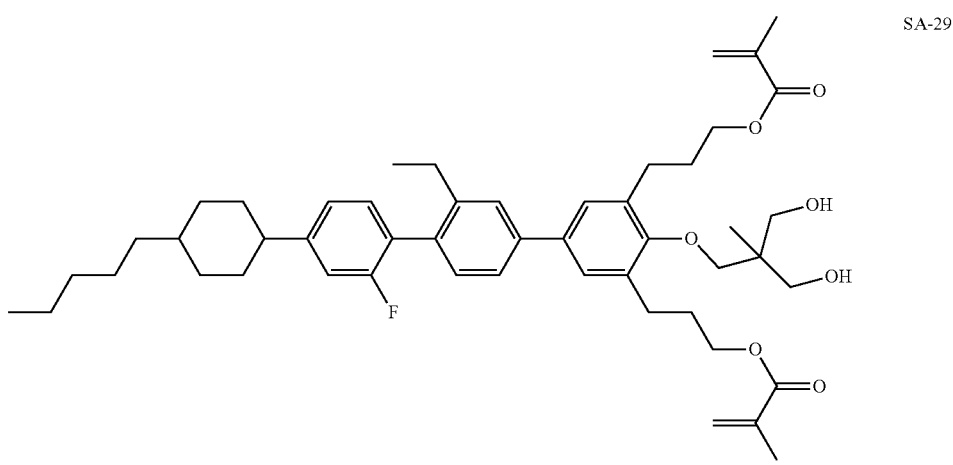

TABLE E-continued
Table E shows self-alignment additives for vertical alignment which can be used in LC media for SA-VA and SA-FFS displays according to the present invention together with the polymerizable compounds of formula M:
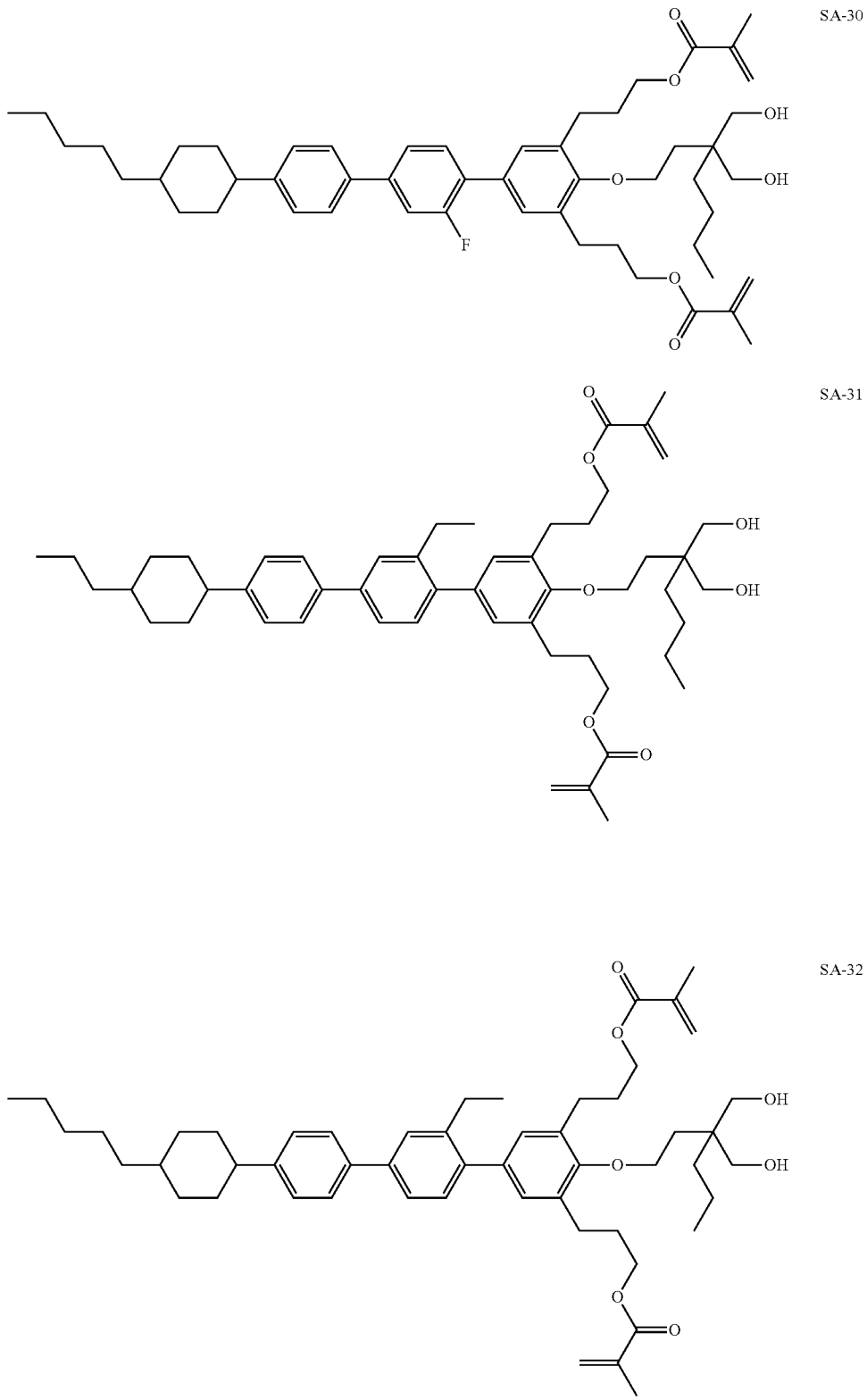
SA-30
SA-31
SA-32

TABLE E-continued
Table E shows self-alignment additives for vertical alignment which can be used in LC media for SA-VA and SA-FFS displays according to the present invention together with the polymerizable compounds of formula M:
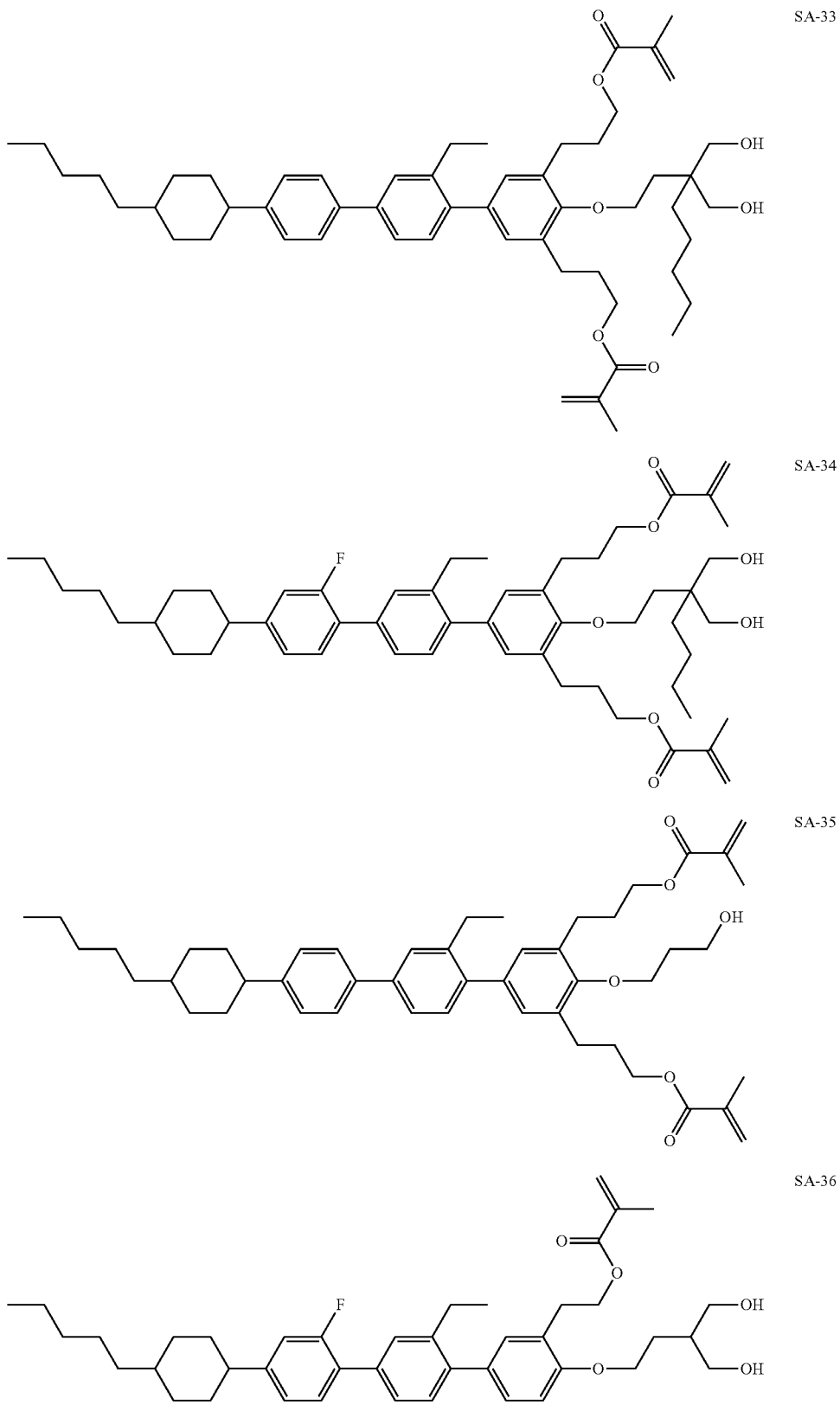

TABLE E-continued
Table E shows self-alignment additives for vertical alignment which can be used in LC media for SA-VA and SA-FFS displays according to the present invention together with the polymerizable compounds of formula M:
SA-37
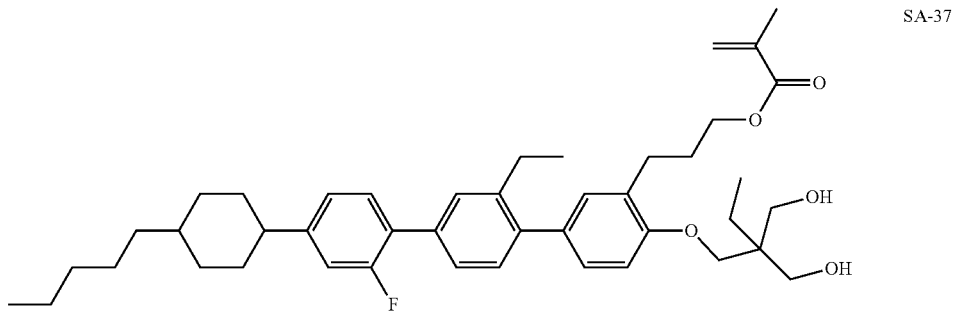
SA-38
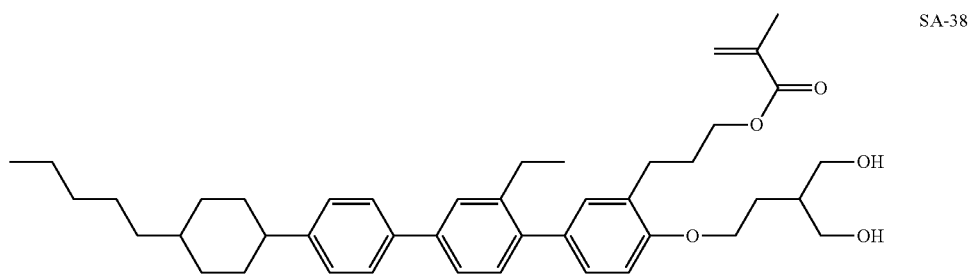
SA-39
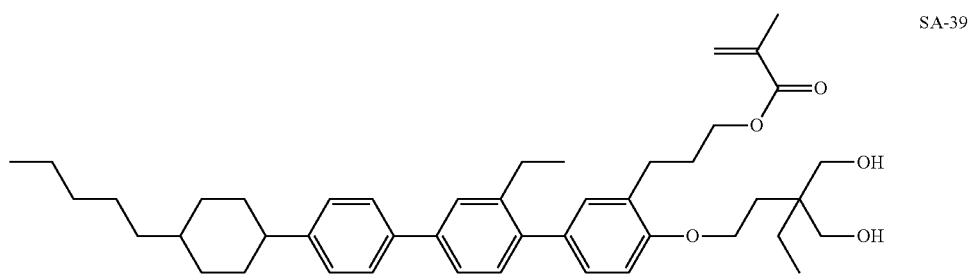
SA-40
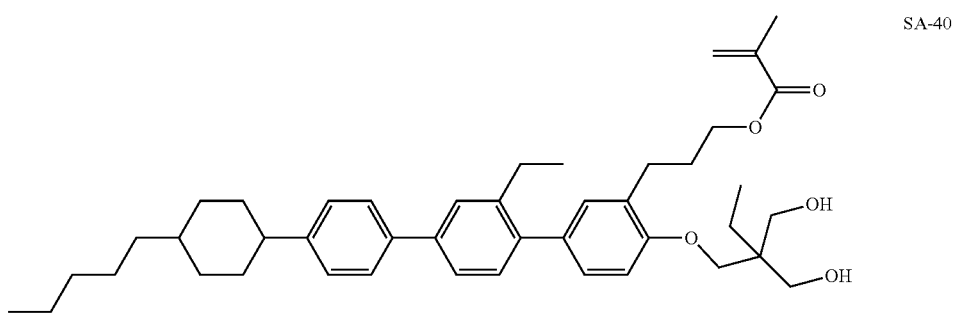
SA-41
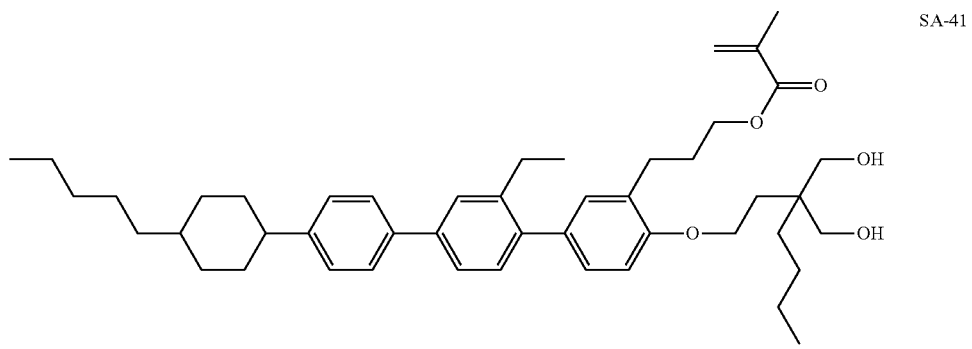

TABLE E-continued
Table E shows self-alignment additives for vertical alignment which can be used in LC media for SA-VA and SA-FFS displays according to the present invention together with the polymerizable compounds of formula M:
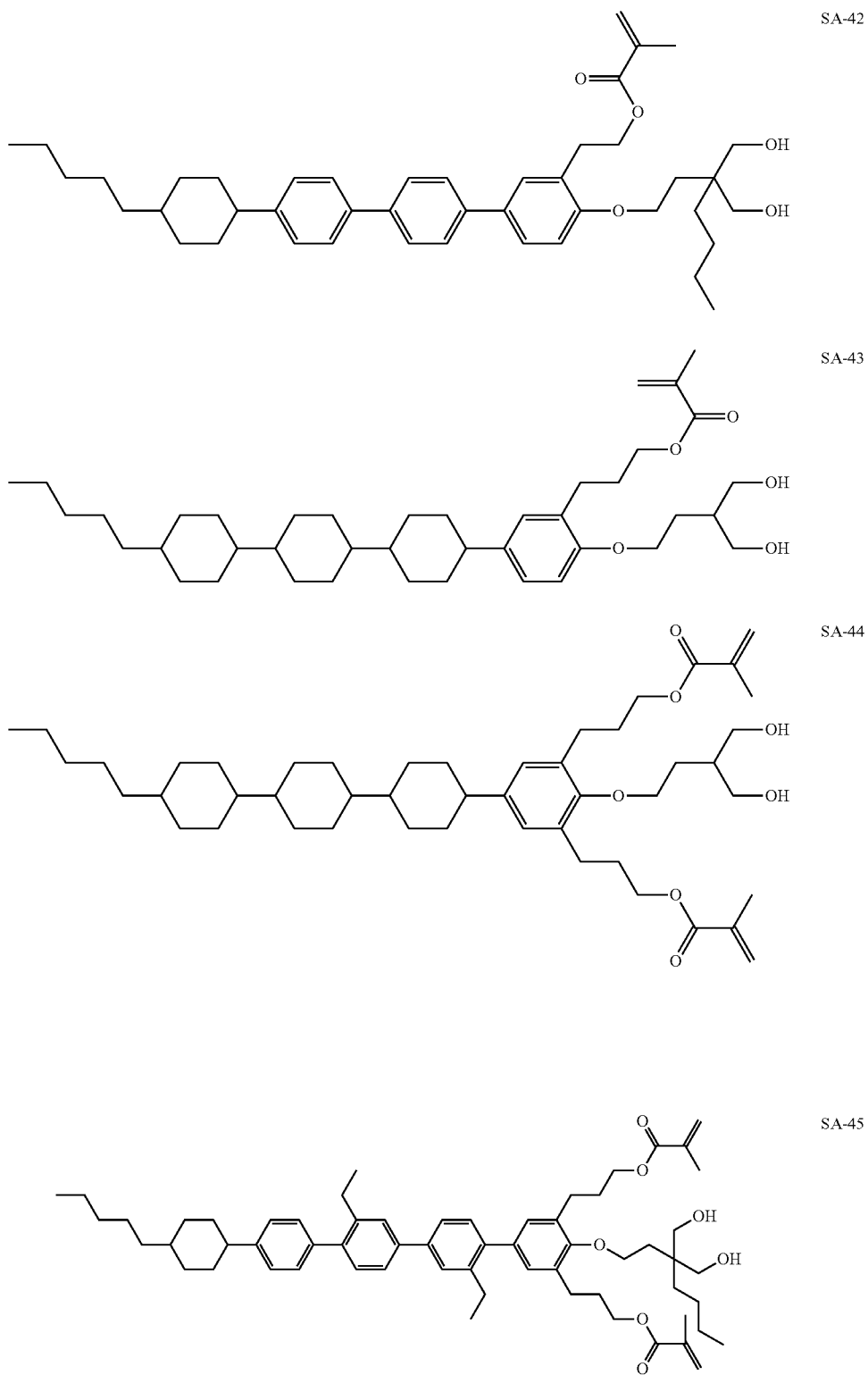
SA-42
SA-43
SA-44
SA-45

TABLE E-continued

Table E shows self-alignment additives for vertical alignment which can be used in LC media for SA-VA and SA-FFS displays according to the present invention together with the polymerizable compounds of formula M:

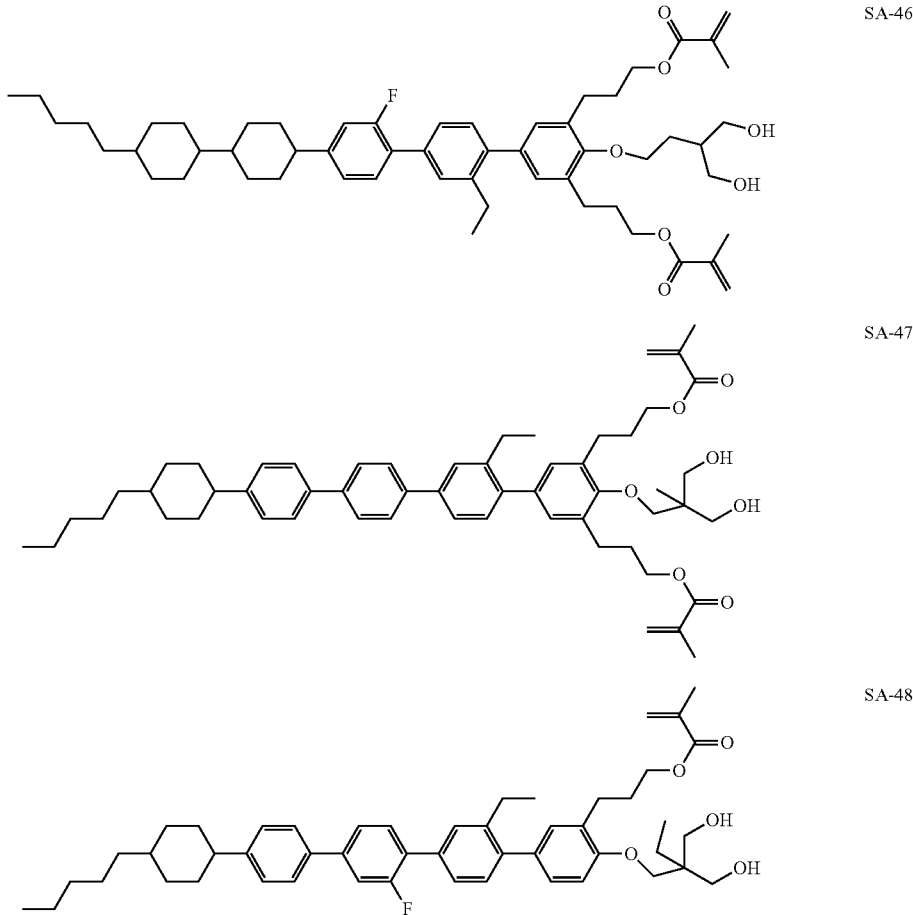

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula M.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The PSVA display or PSVA test cell used for photopolymerization and measurement of the tilt angles etc. consists of two plane-parallel glass outer plates at a separation of 3-4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are polymerized in the display or test cell by irradiation with UV light of defined intensity for a prespecified time, with a voltage simultaneously being applied to the display (usually 10 V to 30 V alternating current, 1 kHz).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Comparison Example 1

The nematic LC host mixture C1 is formulated as follows

| | | | |
|---|---|---|---|
| B(S)-2O-O5 | 2.00% | cl.p. | 74.5° C. |
| BCH-32 | 9.50% | Δn | 0.1052 |
| CC-3-V1 | 6.50% | Δε | −3.2 |
| CCH-301 | 8.50% | $\varepsilon_\parallel$ | 3.7 |
| CCH-34 | 3.00% | $\gamma_1$ | 94 mPa · s |
| CCP-3-1 | 9.50% | $K_1$ | 12.6 |
| CCY-3-O1 | 6.50% | $K_3$ | 14.9 |
| CCY-5-O2 | 9.50% | $\gamma_1/K_1$ | 6.31 |
| CLY-3-O2 | 1.00% | $V_0$ | 2.29 V |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |

The mixture does not contain a dopant of formula IA.

Example 1

The nematic LC host mixture N1 is formulated as follows

| | | | |
|---|---|---|---|
| B(S)-2O-O5 | 2.00% | cl.p. | 74.3° C. |
| BCH-32 | 9.50% | Δn | 0.1057 |
| CC-3-V1 | 6.50% | Δε | −3.2 |
| CCH-301 | 8.50% | $\varepsilon_\parallel$ | 3.6 |
| CCH-34 | 3.00% | $\gamma_1$ | 95 mPa · s |
| CCP-3-1 | 9.30% | $K_1$ | 12.6 |
| CCY-3-O1 | 6.50% | $K_3$ | 14.9 |
| CCY-5-O2 | 9.50% | $\gamma_1/K_1$ | 6.38 |
| CLY-3-O2 | 1.00% | $V_0$ | 2.29 V |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |
| PYP-2-3 | 0.20% | | |

The mixture contains 0.2% of the dopant PYP-2-3 of formula IA2, and shows almost the same low viscosity, low threshold voltage and low ratio $\gamma_1/K_3$ as the mixture C1.

Polymerizable Mixtures

Polymerizable comparison mixture PC1 is prepared by adding 0.35% of the polymerizable compound RM-1 and 0.005% of the stabiliser S1 to the nematic LC host mixture C1.

Polymerizable mixture P1 according to the invention is prepared by adding 0.35% of the polymerizable compound RM-1 and 0.005% of the stabiliser S1 to the nematic LC host mixture N1.

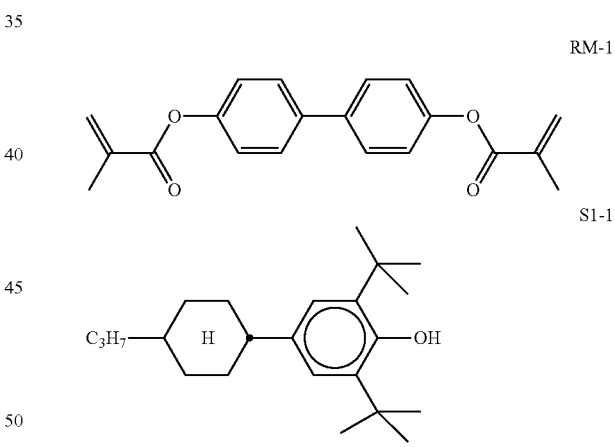

The polymerizable mixtures are filled into test cells and exposed to UV light in a two step process, the first step (UV1) for generating a tilt angle and the second step (UV2) for polymerizing any residual monomer that was not polymerized in the first step. In UV1 step a voltage is applied (20 $V_{pp}$ square wave, 200 Hz). In UV2 step no voltage is applied. The lamps were equipped with a cut-off filter of 313 nm. The other conditions are as follows, unless stated otherwise:

UV1 (UV Fe-I lamp): 0.53 mW/cm² at 40° C. for 40-190 s
UV2 (UV C-type lamp): 0.28 mW/cm² at RT for 60-120 min
Tilt Angle The test cells were given at least 12 hours to relax before the final tilt angle was measured and calculated with an Axometrics AxoScan®. The results are shown in Table 1.

TABLE 1

Tilt angle

| Mixture | PC1 | P1 |
|---|---|---|
| Tilt angle (°) after 100 s | 1.16 | 0.99 |
| Tilt angle (°) after 130 s | 2.65 | 2.62 |
| Tilt angle (°) after 160 s | 3.85 | 3.93 |
| Tilt angle (°) after 190 s | 5.00 | 5.01 |

It can be seen that the tilt angle generated in polymerizable mixture P1 according to the invention is as good as in the reference mixture PC1.

Tilt Stability

Tilt stability, i.e. the change of the tilt angle after repeated electric stress, is a criterion for evaluating the risk of image sticking. A low value for the change of the tilt angle indicates a high tilt stability and a low potential risk of image sticking.

For determining the tilt stability the test cells after polymerization as described above are electrically stressed with a square wave of $60V_{PP}$ at 200 Hz for 72 h. After a relaxation time of 5-10 min the tilt angles are measured using the Otsuka T_RETS-10 system.

The change of the tilt angle Δtilt is determined according to equation (1)

$$\text{tilt}_{after\ stress} - \text{tilt}_{after\ tilt\ generation} = \Delta\text{tilt} \quad (1)$$

and is shown in Table 2 below.

The lower the value of Δtilt, the higher is the tilt stability.

TABLE 2

Tilt Stability

| Mixture | Δtilt/° |
|---|---|
| PC1 | 0.17 |
| P1 | 0.17 |

From Table 2 it can be seen that polymerizable mixture P1 according to the invention shows a tilt stability as good as in reference mixture PC1.

VHR

The VHR of the polymerizable mixtures was measured with a TOYO 6254 equipment at 60° C. in VA-VHR test cells at 1V and 0.6 Hz before and after UV exposure for 60 min under the conditions of UV2 step as described above.

Light stress usually causes the decrease of VHR in LC mixtures, therefore the smaller the absolute decrease of VHR value after stress, the better performance for display applications.

The results are shown in Table 3.

TABLE 3

VHR

| Mixture | VHR (%) Initial | VHR (%) after 60 min UV load |
|---|---|---|
| PC1 | 96.5 | 92.4 |
| P1 | 96.6 | 92.5 |

From Table 3 it can be seen that the VHR values of the polymerizable mixture P1 according to the invention are as high as for the reference mixture PC1.

Residual RM

The residual content of unpolymerized RM (in % by weight) in the mixture was determined after UV photopolymerization. The smaller the residual RM content after a given time interval, the faster the polymerization. For this purpose the polymerizable mixtures were filled in test cells and polymerized by UV exposure for varying time under the conditions of UV2 step as described above.

After photopolymerization the test cells were opened, and the mixture was dissolved and rinsed out of the test cell with methyl ethyl ketone and analyzed by Ultra Performance Liquid Chromatography (UPLC).

The results are shown in Table 4.

TABLE 4

Residual RM

| Mixture | PC1 | P1 |
|---|---|---|
| RM % Initial | 0.3500 | 0.3500 |
| RM % 40 min | 0.0247 | 0.0193 |
| RM % 50 min | 0.0190 | 0.0138 |
| RM % 60 min | 0.0136 | 0.0098 |
| RM % 100 min | 0.0067 | 0.0048 |

It can be seen that the residual RM content after UV2 step in mixture P1 according to the invention is significantly lower after a given time compared to the reference mixture PC1. This does also mean that in mixture P1 the time needed for achieving a similar low residual RM amount as in mixture PC1 is significantly reduced. This can be seen for example when comparing the time needed to achieve a residual RM concentration of ca. 0.014%, which is 50 min in mixture P1 as compared to 60 min in mixture PC1.

In conclusion, the above results demonstrate that the addition of a small amount of a dopant of formula IA to a polymerizable LC medium comprising a compound of formula IB enables a significant reduction of the UV2 step time, while maintaining advantageous physical properties like a low viscosity, a low threshold voltage and a low ratio $\gamma_1/K_3$, and keeping the tilt generation, tilt stability and VHR at the desired high level.

Example 2

The nematic LC host mixture N2 is formulated as follows

| | | | |
|---|---|---|---|
| B(S)-2O-O4 | 3.00% | cl.p. | 74.7° C. |
| B(S)-2O-O5 | 5.00% | | |
| BCH-32 | 7.00% | | |
| CC-3-V | 29.50% | | |
| CC-3-V1 | 9.00% | | |
| CCP-3-1 | 10.80% | | |
| CCP-3-3 | 2.00% | | |
| CLY-3-O2 | 2.00% | | |
| CPY-2-O2 | 6.50% | | |
| CPY-3-O2 | 5.50% | | |
| PY-1-O2 | 10.50% | | |
| PY-2-O2 | 9.00% | | |
| PYP-2-3 | 0.20% | | |

Polymerizable mixture P2 is prepared by adding 0.3% of polymerizable compound RM-1 and 0.01% of stabiliser S1-1 to nematic LC host mixture N2.

Example 3

The nematic LC host mixture N3 is formulated as follows

| | | | |
|---|---|---|---|
| B(S)-2O-O4 | 3.50% | cl.p. | 74.7° C. |
| B(S)-2O-O5 | 5.00% | | |
| BCH-32 | 7.50% | | |
| CC-3-V | 29.50% | | |
| CC-3-V1 | 5.50% | | |
| CCP-3-1 | 6.90% | | |
| CCP-V-1 | 11.50% | | |
| CLY-3-O2 | 5.00% | | |
| CPY-2-O2 | 4.00% | | |
| CPY-3-O2 | 10.00% | | |
| PY-1-O2 | 0.50% | | |
| PY-2-O2 | 11.00% | | |
| PYP-2-3 | 0.10% | | |

Polymerizable mixture P3 is prepared by adding 0.3% of polymerizable compound RM-1 and 0.01% of stabiliser S1-1 to nematic LC host mixture N3.

Example 4

The nematic LC host mixture N4 is formulated as follows

| | | | |
|---|---|---|---|
| B(S)-2O-O4 | 4.00% | cl.p. | 74.7° C. |
| B(S)-2O-O5 | 5.00% | | |
| CC-3-V | 28.20% | | |
| CC-3-V1 | 8.00% | | |
| CCP-3-1 | 3.70% | | |
| CCP-V-1 | 10.60% | | |
| CPY-2-O2 | 7.80% | | |
| CPY-3-O2 | 12.00% | | |
| PP-1-2V1 | 7.60% | | |
| PY-1-O2 | 10.00% | | |
| PY-3-O2 | 3.00% | | |
| PYP-2-3 | 0.10% | | |

Polymerizable mixture P4 is prepared by adding 0.35% of polymerizable compound RM-17 and 0.015% of stabiliser S1-1 to nematic LC host mixture N4.

RM-17

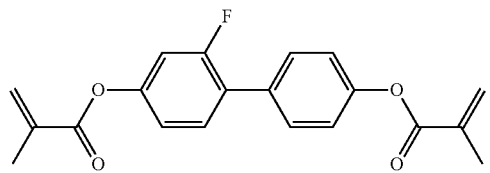

Example 5

The nematic LC host mixture N5 is formulated as follows

| | | | |
|---|---|---|---|
| B(S)-2O-O4 | 4.50% | cl.p. | 75.1° C. |
| B(S)-2O-O5 | 5.00% | | |
| B(S)-2O-O6 | 2.00% | | |
| CC-3-V | 29.80% | | |
| CC-4-V1 | 17.50% | | |
| CLY-3-O2 | 8.00% | | |
| CPY-2-O2 | 10.00% | | |
| CPY-3-O2 | 10.00% | | |
| PY-1-O2 | 3.00% | | |
| PY-2-O2 | 10.00% | | |
| PYP-2-3 | 0.20% | | |

Polymerizable mixture P5 is prepared by adding 0.3% of polymerizable compound RM-1 and 0.015% of stabiliser S1-1 to nematic LC host mixture N5.

Example 6

The nematic LC host mixture N6 is formulated as follows

| | | | |
|---|---|---|---|
| B(S)-2O-O4 | 4.50% | cl.p. | 75.7° C. |
| B(S)-2O-O5 | 5.00% | | |
| BCH-32 | 6.00% | | |
| CC-3-V | 29.70% | | |
| CC-3-V1 | 8.00% | | |
| CCY-3-O1 | 7.50% | | |
| CCY-3-O2 | 11.00% | | |
| CLY-3-O2 | 8.00% | | |
| PY-1-O2 | 10.50% | | |
| PY-2-O2 | 9.50% | | |
| PYP-2-3 | 0.30% | | |

Polymerizable mixture P6 is prepared by adding 0.3% of polymerizable compound RM-1 and 0.01% of stabiliser S2-1 to nematic LC host mixture N6.

S2-1

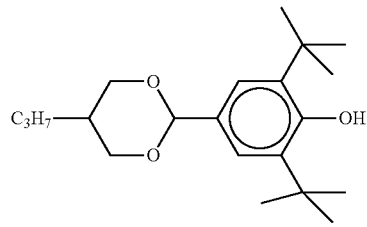

Example 7

Polymerizable mixture P7 is prepared by adding 0.3% of polymerizable compound RM-35 and 0.015% of stabiliser S1-1 to nematic LC host mixture N1.

RM-35

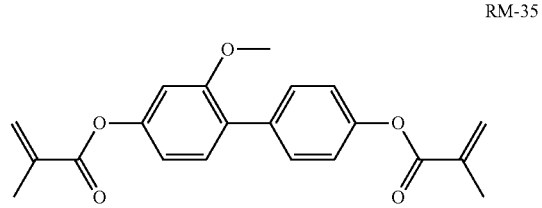 [SMILES: C=C(C)C(=O)Oc1ccc(-c2ccc(OC(=O)C(=C)C)cc2OC)cc1]

Example 8

Polymerizable mixture P8 is prepared by adding 0.3% of polymerizable compound RM-64 and 0.01% of stabiliser S1-1 to nematic LC host mixture N1.

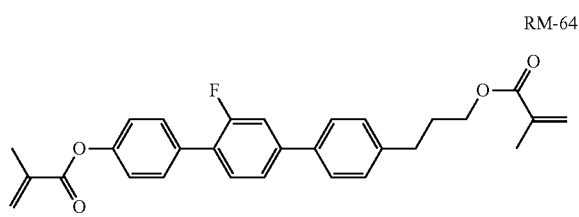 [SMILES: C=C(C)C(=O)OCCCc1ccc(-c2ccc(-c3ccc(OC(=O)C(=C)C)cc3)c(F)c2)cc1]

RM-64

Example 9

Polymerizable mixture P9 is prepared by adding 0.2% of polymerizable compound RM-120 and 0.01% of stabiliser S1-1 to nematic LC host mixture N1.

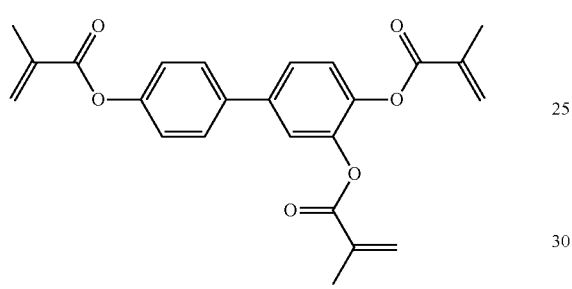

RM-120

Example 10

Polymerizable mixture P10 is prepared by adding 0.3% of polymerizable compound RM-1, 0.2% of polymerizable compound RM-120 and 0.01% of stabiliser S1-1 to nematic LC host mixture N1.

Example 11

Polymerizable mixture P11 is prepared by adding 0.35% of polymerizable compound RM-1 and 0.01% of stabiliser S3-1 to nematic LC host mixture N2.

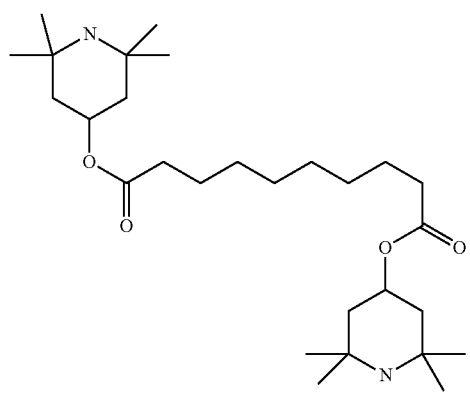

S3-1

Example 12

Polymerizable mixture P12 is prepared by adding 0.3% of polymerizable compound RM-1, 0.2% of polymerizable compound RM-35 and 0.01% of stabiliser S2-1 to nematic LC host mixture N2.

Example 13

Polymerizable mixture P13 is prepared by adding 0.2% of polymerizable compound RM-145 and 0.01% of stabiliser S1-1 to nematic LC host mixture N1.

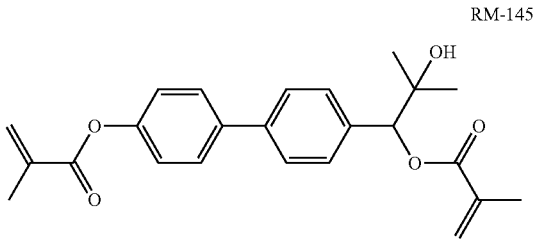 [SMILES: C=C(C)C(=O)Oc1ccc(-c2ccc(C(OC(=O)C(=C)C)C(C)(C)O)cc2)cc1]

RM-145

Example 14

Polymerizable mixture P14 is prepared by adding 0.2% of polymerizable compound RM-142 and 0.01% of stabiliser S1-1 to nematic LC host mixture N1.

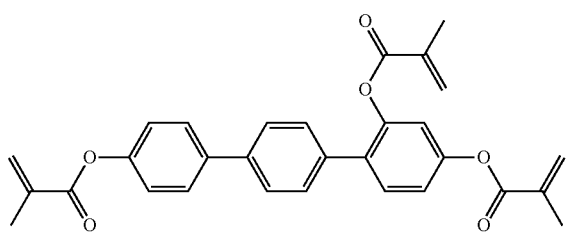

RM-142

Example 11-1

Polymerizable mixture P11-1 is prepared by adding 0.2% of polymerizable compound RM-150 and 0.01% of stabiliser S2-1 to nematic LC host mixture N1.

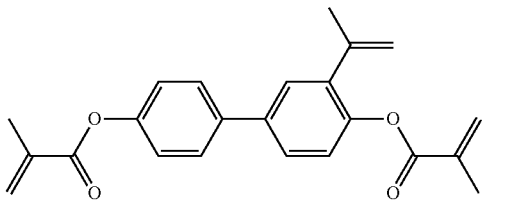

RM-150

Example 12-1

Polymerizable mixture P12-1 is prepared by adding 0.2% of polymerizable compound RM-156 and 0.01% of stabiliser S1-1 to nematic LC host mixture N3.

RM-156

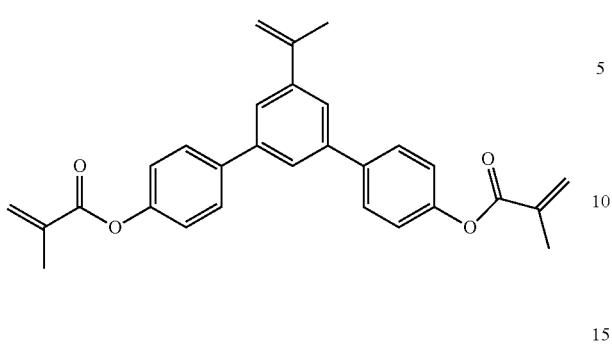

Example 13-1

Polymerizable mixture P13-1 is prepared by adding 0.35% of polymerizable compound RM-164 and 0.01% of stabiliser S1-1 to nematic LC host mixture

RM-164

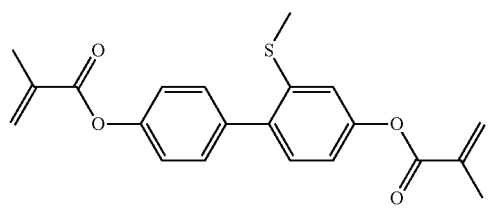

Example 14-1

Polymerizable mixture P14-1 is prepared by adding 0.35% of polymerizable compound RM-165 and 0.01% of stabiliser S1-1 to nematic LC host mixture N1.

RM-165

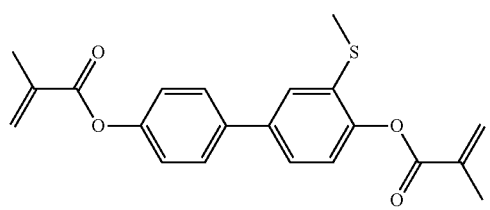

Example 15

Polymerizable mixture P15 is prepared by adding 0.3% of polymerizable compound RM-164, 0.2% of polymerizable compound RM-1 and 0.01% of stabiliser S2-1 to nematic LC host mixture N1.

Example 16

Polymerizable mixture P16 is prepared by adding 0.35% of polymerizable compound RM-164, 0.2% of polymerizable compound RM-64 and 0.015% of stabiliser S1-1 to nematic LC host mixture N2.

Example 17

Polymerizable mixture P17 is prepared by adding 0.3% of polymerizable compound RM-162 and 0.01% of stabiliser S1-1 to nematic LC host mixture N1.

RM-162

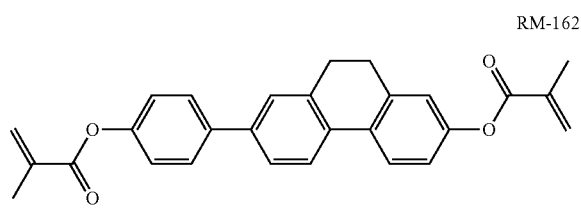 [SMILES: C=C(C)C(=O)Oc1ccc(-c2ccc3c(c2)CCc2cc(OC(=O)C(=C)C)ccc2-3)cc1]

Example 18

Polymerizable mixture P18 is prepared by adding 0.35% of polymerizable compound RM-1 and 0.01% of stabiliser S3-2 to nematic LC host mixture N4.

S3-2

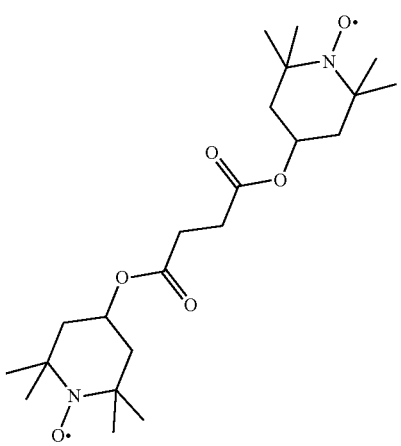

Example 19

Polymerizable mixture P19 is prepared by adding 0.35% of polymerizable compound RM-35 and 0.01% of stabiliser S3-3 to nematic LC host mixture N5.

S3-3

Example 20

Polymerizable mixture P20 is prepared by adding 0.35% of compound RM-1, 0.15% of compound RM-35 and 0.005% of stabiliser S1-1 to nematic LC host mixture N1.

Example 21

The nematic LC host mixture N8 is formulated as follows

| | | | |
|---|---|---|---|
| B(S)-2O-O4 | 4.00% | cl.p. | 74.8° C. |
| B(S)-2O-O5 | 5.00% | | |
| BCH-32 | 7.00% | | |
| CC-3-V1 | 8.00% | | |
| CC-4-V1 | 10.70% | | |
| CCH-34 | 8.00% | | |
| CCH-35 | 6.00% | | |
| CCY-3-O2 | 11.00% | | |
| CPY-2-O2 | 3.00% | | |
| CPY-3-O2 | 5.00% | | |
| CY-3-O2 | 15.00% | | |
| PCH-302 | 5.00% | | |
| PPGU-3-F | 1.00% | | |
| PY-1-O2 | 4.00% | | |
| PY-2-O2 | 7.00% | | |
| PYP-2-3 | 0.30% | | |

Polymerizable mixture P21 is prepared by adding 0.2% of compound RM-165, 0.2% of compound RM-64 and 0.015% of stabiliser S2-1 to the nematic LC host mixture N8.

Example 22

The nematic LC host mixture N9 is formulated as follows

| | | | |
|---|---|---|---|
| B(S)-2O-O4 | 2.00% | cl.p. | 73.8° C. |
| B(S)-2O-O5 | 2.50% | | |
| BCH-32 | 8.00% | | |
| CC-3-V | 30.00% | | |
| CC-4-V1 | 7.00% | | |
| CCP-3-1 | 10.90% | | |
| CLY-3-O2 | 3.00% | | |
| CPY-2-O2 | 2.00% | | |
| CPY-3-O2 | 12.00% | | |
| PY-1-O2 | 11.50% | | |
| PY-2-O2 | 11.00% | | |
| PYP-2-3 | 0.10% | | |

Polymerizable mixture P22 is prepared by adding 0.3% of compound RM-164, 0.2% of compound RM-1 and 0.6% of the SA additive SA23 to the nematic LC host mixture N9.

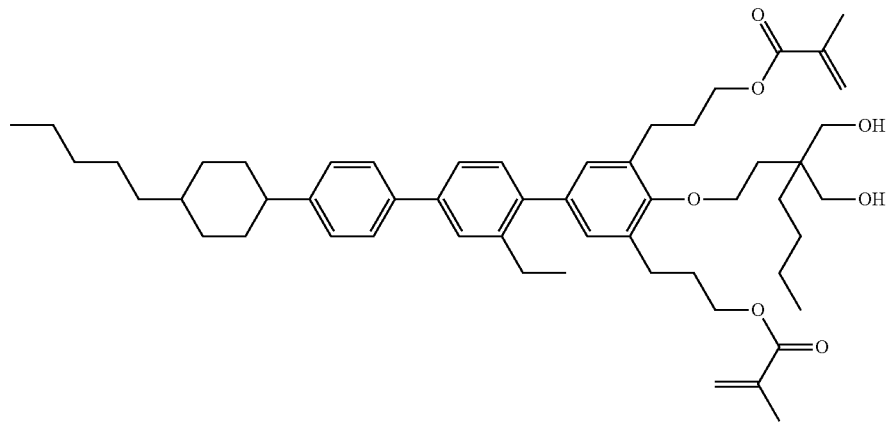

Example 23

The nematic LC host mixture N10 is formulated as follows

| | | | |
|---|---|---|---|
| B(S)-2O-O4 | 4.50% | cl.p. | 75.8° C. |
| B(S)-2O-O5 | 3.00% | | |
| CC-3-V | 50.70% | | |
| CCP-3-1 | 1.00% | | |
| CLY-3-O2 | 9.00% | | |
| CPY-2-O2 | 10.00% | | |
| CPY-3-O2 | 12.00% | | |
| PY-1-O2 | 9.50% | | |
| PYP-2-3 | 0.30% | | |

Polymerizable mixture P23 is prepared by adding 0.3% of compound RM-164, 0.2% of compound RM-156, 0.05% of compound RM-120 and 0.01% of stabiliser S1-1 to nematic LC host mixture N10.

Example 24

Polymerizable mixture P24 is prepared by adding 0.2% of compound RM-1, 0.3% of compound RM-156 and 0.015% of stabiliser S2-1 to nematic LC host mixture N1.

Example 25

Polymerizable mixture P25 is prepared by adding 0.3% of compound RM-1, 0.2% of compound RM-35, 0.1% of compound RM-120 and 0.015% of stabiliser S1-1 to nematic LC host mixture N1.

Example 26

The nematic LC host mixture N11 is formulated as follows

| | | | |
|---|---|---|---|
| CCP-3-1 | 3.80% | cl.p. | 93.3° C. |
| CCP-V-1 | 11.00% | | |
| CLY-2-O4 | 4.00% | | |
| CLY-3-O2 | 5.00% | | |
| CLY-3-O3 | 5.00% | | |
| CLY-4-O2 | 4.00% | | |
| CLY-5-O2 | 3.00% | | |
| CPY-3-O2 | 5.00% | | |
| COB(S)-2-O4 | 9.00% | | |
| B(S)-2O-O1(c5) | 4.50% | | |
| CC-3-V1 | 7.50% | | |
| CC-4-V1 | 18.50% | | |
| CC-2-3 | 9.70% | | |
| Y-4O-O4 | 9.50% | | |
| CCQU-3-F | 0.30% | | |
| PYP-2-3 | 0.20% | | |

Polymerizable mixture P26 is prepared by adding 0.1% of compound RM-1, 0.3% of compound RM-35 and 0.01% of stabiliser S1-1 to nematic LC host mixture N11.

Example 27

Polymerizable mixture P27 is prepared by adding 0.3% of compound RM-164, 0.2% of compound RM-156 and 0.005% of stabiliser S1-1 to nematic LC host mixture N2.

Example 28

The nematic LC host mixture N12 is formulated as follows

| | | | |
|---|---|---|---|
| B(S)-2O-O5 | 2.00% | cl.p. | 74.1° C. |
| BCH-32 | 9.50% | | |
| CC-3-V1 | 6.50% | | |
| CCH-301 | 8.50% | | |
| CCH-34 | 3.00% | | |
| CCP-3-1 | 9.30% | | |
| CCY-3-O1 | 6.50% | | |
| CCY-5-O2 | 9.50% | | |
| CLY-3-O2 | 1.00% | | |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |
| PYP-(c3)-3 | 0.20% | | |

Polymerizable mixture P28 is prepared by adding 0.3% of compound RM-164 and 0.005% of stabiliser S1-1 to nematic LC host mixture N12.

Example 29

The nematic LC host mixture N13 is formulated as follows

| | | | |
|---|---|---|---|
| B(S)-2O-O4 | 0.25% | cl.p. | 74.8° C. |
| BCH-32 | 4.50% | | |
| CC-3-V1 | 12.80% | | |
| CCH-23 | 15.00% | | |
| CCH-301 | 1.00% | | |
| CCH-34 | 2.00% | | |
| CCH-35 | 0.50% | | |
| CCY-3-O2 | 6.50% | | |
| CPY-2-O2 | 12.00% | | |
| CPY-3-O2 | 15.00% | | |
| CY-3-O2 | 15.50% | | |
| CY-3-O4 | 0.25% | | |
| PCH-301 | 13.00% | | |
| PP-1-2V1 | 0.50% | | |
| PYP-2-3 | 0.20% | | |

Polymerizable mixture P29 is prepared by adding 0.3% of compound RM-1, 0.2% of compound RM-165 and 0.0150% of stabiliser S2-1 to nematic LC host mixture N13.

Example 30

The nematic LC host mixture N14 is formulated as follows

| | | | |
|---|---|---|---|
| CCP-3-1 | 3.80% | cl.p. | 90.8° C. |
| CCP-V-1 | 13.00% | | |
| CLY-2-O4 | 4.00% | | |
| CLY-3-O2 | 5.50% | | |
| CLY-3-O3 | 5.00% | | |
| CLY-4-O2 | 4.00% | | |
| CLY-(c3)2-O2 | 4.00% | | |
| CPY-3-O2 | 5.00% | | |
| COB(S)-2-O4 | 3.00% | | |
| B(S)-2O-O5 | 5.00% | | |
| B(S)-2O-O6 | 4.00% | | |
| CC-3-V1 | 8.00% | | |
| CC-4-V1 | 16.00% | | |
| CC-2-3 | 9.70% | | |
| Y-4O-O4 | 9.50% | | |
| CCQU-3-F | 0.30% | | |
| PYP-2-3 | 0.20% | | |

Polymerizable mixture P30 is prepared by adding 0.3% of compound RM-164 and 0.005% of stabiliser S1-1 to nematic LC host mixture N14.

Example 31

Polymerizable mixture P31 is prepared by adding 0.3% of compound RM-165, 0.2% of compound RM-142 and 0.01% of stabiliser S2-1 to nematic LC host mixture N2.

Example 32

The nematic LC host mixture N15 is formulated as follows

| | | | |
|---|---|---|---|
| B(S)-2O-O5 | 0.25% | cl.p. | 74.3° C. |
| BCH-32 | 5.50% | | |
| CC-3-V | 10.00% | | |
| CC-3-V1 | 7.50% | | |
| CC-4-V1 | 16.50% | | |
| CCH-35 | 0.25% | | |
| CCP-3-1 | 7.30% | | |
| CCY-3-O2 | 11.00% | | |
| CCY-3-O3 | 1.00% | | |
| CCY-4-O2 | 7.00% | | |
| CCY-5-O2 | 2.00% | | |
| CY-3-O2 | 9.00% | | |
| PY-1-O2 | 9.00% | | |
| PY-2-O2 | 9.00% | | |
| PY-3-O2 | 4.50% | | |
| PYP-2-(c5) | 0.20% | | |

Polymerizable mixture P32 is prepared by adding 0.4% of compound RM-164 and 0.015% of stabiliser S1-1 to nematic LC host mixture N15.

Example 33

The nematic LC host mixture N16 is formulated as follows

| | | | |
|---|---|---|---|
| B(S)-2O-O5 | 2.00% | cl.p. | 74.3° C. |
| BCH-32 | 9.50% | | |
| CC-3-V1 | 6.50% | | |
| CCH-301 | 8.50% | | |
| CCH-34 | 3.00% | | |
| CCP-3-1 | 9.30% | | |
| CCY-3-O1 | 6.50% | | |
| CCY-5-O2 | 9.50% | | |
| CLY-3-O2 | 1.00% | | |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |
| PYP-2-(c5) | 0.20% | | |

Polymerizable mixture P33 is prepared by adding 0.3% of compound RM-1 and 0.01% of stabiliser S1-1 to nematic LC host mixture N16.

Example 34

Polymerizable mixture P34 is prepared by adding 0.3% of compound RM-165, 0.2% of compound RM-150 and 0.015% of stabiliser S1-1 to nematic LC host mixture N2.

Example 35

The nematic LC host mixture N17 is formulated as follows

| | | | |
|---|---|---|---|
| B(S)-2O-O4 | 4.50% | cl.p. | 75.1° C. |
| B(S)-2O-O5 | 5.00% | | |
| B(S)-2O-O6 | 2.00% | | |
| CC-3-V | 29.80% | | |
| CC-4-V1 | 17.50% | | |
| CLY-3-O2 | 8.00% | | |
| CPY-2-O2 | 10.00% | | |
| CPY-3-O2 | 10.00% | | |
| PY-1-O2 | 3.00% | | |
| PY-2-O2 | 10.00% | | |
| PYP-2-3 | 0.20% | | |

Polymerizable mixture P35 is prepared by adding 0.2% of compound RM-1, 0.25% of compound RM-35 and 0.005% of stabiliser S1-1 to nematic LC host mixture N17.

Example 36

Polymerizable mixture P36 is prepared by adding 0.3% of compound RM-1, 0.3% of compound R-35 and 0.6% of the SA additive SA32 to the nematic LC host mixture N2.

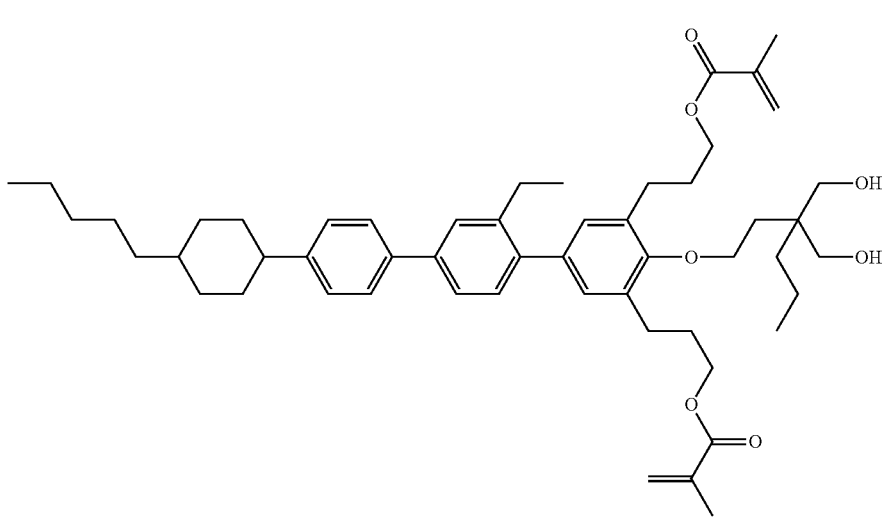

SA32

Example 37

The nematic LC host mixture N18 is formulated as follows

| | | | |
|---|---|---|---|
| B(S)-2O-O4 | 4.00% | cl.p. | 75.4° C. |
| B(S)-2O-O5 | 5.00% | | |
| CC-3-V | 28.20% | | |
| CC-3-V1 | 8.00% | | |
| CCP-3-1 | 3.70% | | |
| CCP-V-1 | 10.60% | | |
| CPY-2-O2 | 7.80% | | |
| CPY-3-O2 | 12.00% | | |
| PP-1-2V1 | 7.60% | | |
| PY-1-O2 | 10.00% | | |
| PY-3-O2 | 3.00% | | |
| PYP-2-KC3) | 0.10% | | |

Polymerizable mixture P37 is prepared by adding 0.35% of polymerizable compound RM-164 and 0.015% of stabiliser S1-1 to nematic LC host mixture N18.

Example 38

Polymerizable mixture P38 is prepared by adding 0.3% of compound RM-1, 0.2% of compound RM-35 and 0.015% of stabiliser S1-1 to nematic LC host mixture N3.

Example 39

Polymerizable mixture P39 is prepared by adding 0.3% of compound RM-1, 0.4% of compound RM-164 and 0.6% of the SA additive SA23 to the nematic LC host mixture N3.

Example 40

Polymerizable mixture P40 is prepared by adding 0.4% of compound RM-1, 0.2% of compound RM-35, 0.6% of the SA additive SA23 and 0.015% of stabiliser S3-3 to the nematic LC host mixture N3.

Example 41

Polymerizable mixture P41 is prepared by adding 0.3% of compound RM-1, 013% of compound RM-120, 0.6% of the SA additive SA23 and 0.015% of stabiliser S1-1 to nematic LC host mixture N2.

Example 42

The nematic LC host mixture N19 is formulated as follows

| | | | |
|---|---|---|---|
| B(S)-2O-O4 | 4.50% | cl.p. | 74.7° C. |
| B(S)-2O-O5 | 5.00% | | |
| B(S)-2O-O6 | 2.00% | | |
| CC-3-V | 29.80% | | |
| CC-4-V1 | 17.50% | | |
| CLY-3-O2 | 8.00% | | |
| CPY-2-O2 | 10.00% | | |
| CPY-3-O1(c3) | 10.00% | | |
| PY-1-O2 | 3.00% | | |
| PY-2-O2 | 10.00% | | |
| PYP-2-3 | 0.20% | | |

Polymerizable mixture P42 is prepared by adding 0.2% of compound RM-1, 0.2% of compound RM-156 and 0.015% of stabiliser S3-3 to nematic LC host mixture N19.

Example 43

The nematic LC host mixture N30 is formulated as follows

| | | | |
|---|---|---|---|
| B(S)-2O-O4 | 4.00% | cl.p. | 75.5 |
| B(S)-2O-O5 | 5.00% | | |
| CC-3-V | 28.20% | | |
| CC-3-V1 | 8.00% | | |
| CCP-3-1 | 3.70% | | |
| CCP-V-1 | 10.60% | | |
| CPY-2-O2 | 7.80% | | |
| CPY-3-O2 | 6.00% | | |
| CPY-(c5)-O2 | 6.00% | | |
| PP-1-2V1 | 7.60% | | |
| PY-1-O2 | 10.00% | | |
| PY-3-O2 | 3.00% | | |
| PYP-2-3 | 0.10% | | |

Polymerizable mixture P43 is prepared by adding 0.2% of compound RM-1, 0.1% of compound RM-142 and 0.015% of stabiliser S2-1 to nematic LC host mixture N30.

Example 44

The nematic LC host mixture N31 is formulated as follows

| | | | |
|---|---|---|---|
| CY-5-O2 | 11.00% | cl.p. | 60° C. |
| PY-3-O2 | 9.00% | | |
| COY-3-O2 | 17.00% | | |
| B(S)-(c5)1O-O4 | 4.00% | | |
| PP-1-5 | 10.00% | | |
| CC-3-V1 | 26.00% | | |
| CCH-32 | 5.00% | | |
| CCP-3-1 | 11.80% | | |
| BCH-32 | 6.00% | | |
| PYP-2-3 | 0.20% | | |

Polymerizable mixture P44 is prepared by adding 0.4% of compound RM-165 and 0.01% of stabiliser S2-1 to nematic LC host mixture N31.

Example 45

Polymerizable mixture P45 is prepared by adding 0.2% of compound RM-64, 0.3% of compound RM-165 and 0.015% of stabiliser S3-2 to nematic LC host mixture N3.

Example 46

The nematic LC host mixture N32 is formulated as follows

| | | | |
|---|---|---|---|
| CCP-3-1 | 3.80% | cl.p. | 90.8° C. |
| CCP-V-1 | 13.00% | | |
| CLY-2-O4 | 4.00% | | |
| CLY-3-O2 | 5.50% | | |
| CLY-3-O3 | 5.00% | | |
| CLY-4-O2 | 4.00% | | |
| CLY-5-O2 | 4.00% | | |
| CPY-3-O2 | 5.00% | | |
| COB(S)-2-O1(c3) | 3.00% | | |
| B(S)-2O-O5 | 5.00% | | |
| B(S)-2O-O6 | 4.00% | | |
| CC-3-V1 | 8.00% | | |
| CC-4-V1 | 16.00% | | |
| CC-2-3 | 9.70% | | |
| Y-4O-O4 | 9.50% | | |
| CCQU-3-F | 0.30% | | |
| PYP-2-3 | 0.20% | | |

Polymerizable mixture P46 is prepared by adding 0.3% of compound RM-1, 0.2% of compound RM-164 and 0.015% of stabiliser S1-1 to nematic LC host mixture N32.

Example 47

The nematic LC host mixture N33 is formulated as follows

| | | | |
|---|---|---|---|
| B(S)-(c5)1O-O2 | 2.00% | cl.p. | 74.1° C. |
| BCH-32 | 9.50% | | |
| CC-3-V1 | 6.50% | | |
| CCH-301 | 8.50% | | |
| CCH-34 | 3.00% | | |
| CCP-3-1 | 9.30% | | |
| CCY-3-O1 | 6.50% | | |
| CCY-5-O2 | 9.50% | | |
| CLY-3-O2 | 1.00% | | |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |
| PYP-(c3)-3 | 0.20% | | |

Polymerizable mixture P47 is prepared by adding 0.3% of compound RM-1, and 0.015% of stabiliser S3-1 to nematic LC host mixture N33.

Example 48

The nematic LC host mixture N34 is formulated as follows

| | | | |
|---|---|---|---|
| B(S)-2O-O5 | 2.00% | cl.p. | 74.3° C. |
| BCH-32 | 9.50% | | |
| CC-3-V1 | 6.50% | | |
| CCH-301 | 8.50% | | |
| CCH-34 | 3.00% | | |
| CCP-3-1 | 9.30% | | |
| CCY-3-O1 | 6.50% | | |
| CCY-5-O2 | 9.50% | | |
| CLY-(c3)2-O2 | 1.00% | | |
| CPY-3-O2 | 5.50% | | |
| CY-3-O2 | 15.50% | | |
| PCH-301 | 5.00% | | |
| PCH-302 | 6.50% | | |
| PY-2-O2 | 11.50% | | |
| PYP-2-3 | 0.20% | | |

Polymerizable mixture P48 is prepared by adding 0.3% of compound RM-1, and 0.015% of stabiliser S3-1 to nematic LC host mixture N34.

Example 49

The nematic LC host mixture N35 is formulated as follows

| | | | |
|---|---|---|---|
| B(S)-2O-O4 | 4.00% | cl.p. | 74.8° C. |
| COB(S)-2-O4 | 5.00% | | |
| CCP-3-1 | 7.80% | | |
| CCY-3-O2 | 10.50% | | |
| CLY-3-O2 | 1.00% | | |
| CPY-3-O2 | 2.00% | | |
| CC-3-V1 | 8.00% | | |
| CC-4-V1 | 16.00% | | |
| CCH-34 | 7.00% | | |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |
| PYP-2-3 | 0.20% | | |

Polymerizable mixture P49 is prepared by adding 0.3% of compound RM-164 and 0.015% of stabiliser S1-1 to nematic LC host mixture N35.

Example 50

The nematic LC host mixture N36 is formulated as follows

| | | | |
|---|---|---|---|
| B(S)-2O-O5 | 4.00% | cl.p. | 74.4° C. |
| COB(S)-2-O1(c3) | 5.00% | | |
| CCP-3-1 | 6.80% | | |
| CCY-3-O2 | 10.50% | | |

| | | | |
|---|---|---|---|
| CLY-3-O2 | 1.00% | | |
| CPY-3-O2 | 3.00% | | |
| CC-3-V1 | 8.00% | | |
| CC-4-V1 | 16.00% | | |
| CCH-34 | 7.00% | | |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |
| PYP-2-3 | 0.20% | | |

Polymerizable mixture P50 is prepared by adding 0.3% of compound RM-1, 0.2% of compound RM-35 and 0.01% of stabiliser S2-1 to nematic LC host mixture N36.

Example 51

The nematic LC host mixture N37 is formulated as follows

| | | | |
|---|---|---|---|
| B(S)-2O-O6 | 4.00% | cl.p. | 73.8° C. |
| COB(S)-2-O4 | 5.00% | | |
| CCP-3-1 | 6.70% | | |
| CCY-3-O2 | 10.50% | | |
| CLY-(c3)2-O2 | 1.00% | | |
| CPY-3-O2 | 3.00% | | |
| CC-3-V1 | 8.00% | | |
| CC-4-V1 | 16.00% | | |
| CCH-34 | 7.00% | | |
| CCH-35 | 9.00% | | |
| CY-3-O2 | 4.00% | | |
| PCH-302 | 4.50% | | |
| PY-1-O2 | 11.00% | | |
| PY-2-O2 | 10.00% | | |
| PYP-2-3 | 0.30% | | |

Polymerizable mixture P51 is prepared by adding 0.4% of compound RM-1, 0.2% of compound RM-156 and 0.01% of stabiliser S2-1 to nematic LC host mixture N37.

Example 52

The nematic LC host mixture N38 is formulated as follows

| | | | |
|---|---|---|---|
| B(S)-2O-O4 | 4.00% | cl.p. | 74.3° C. |
| B(S)-2O-O5 | 5.00% | | |
| CCP-3-1 | 8.20% | | |
| CCY-3-O2 | 8.00% | | |
| CLY-3-O2 | 1.00% | | |
| CPY-3-O2 | 6.00% | | |
| CC-3-V1 | 8.00% | | |
| CC-4-V1 | 16.00% | | |
| CCH-34 | 8.00% | | |
| CCH-35 | 7.50% | | |
| CY-3-O2 | 6.50% | | |
| PCH-302 | 5.00% | | |
| PY-1-O2 | 8.00% | | |
| PY-2-O2 | 8.50% | | |
| PYP-2-1(c3) | 0.30% | | |

Polymerizable mixture P52 is prepared by adding 0.3% of compound RM-1 and 0.015% of stabiliser S1-1 to nematic LC host mixture N38.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. CN 202210113187.0, filed Jan. 30, 2022 are incorporated by reference herein.

The invention claimed is:

1. An LC medium having negative dielectric anisotropy and comprising
one or more polymerizable compounds
and
one or more dopants of formula IA

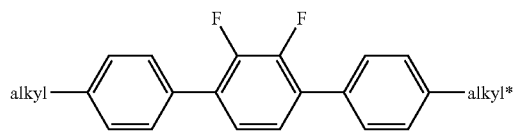

IA wherein
alkyl and alkyl* each, independently of one another, denote a $C_{1-6}$-straight-chain, $C_{3-6}$-branched or $C_{3-6}$-cyclic alkyl radical,
and
wherein the total proportion of the one or more dopants of formula IA in the LC medium is 0.05 to 0.3% by weight,
wherein said LC medium has the property of being UV polymerizable and has a UV polymerization time that is reduced compared to a UV polymerization time of an otherwise identical LC medium, but which does not contain the one or more dopants of formula IA, when polymerized under the same conditions as the otherwise identical LC medium.

2. The LC medium according to claim 1, wherein the one or more dopants of formula IA are selected from compounds of the following formulae:

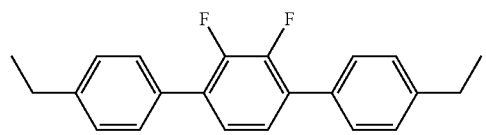

IA1

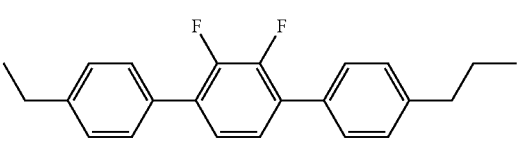

IA2

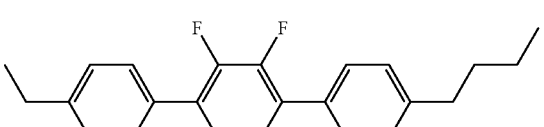

IA3

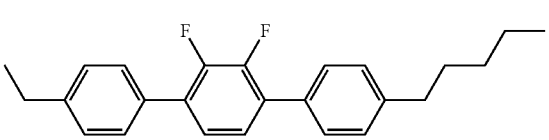

IA4

-continued

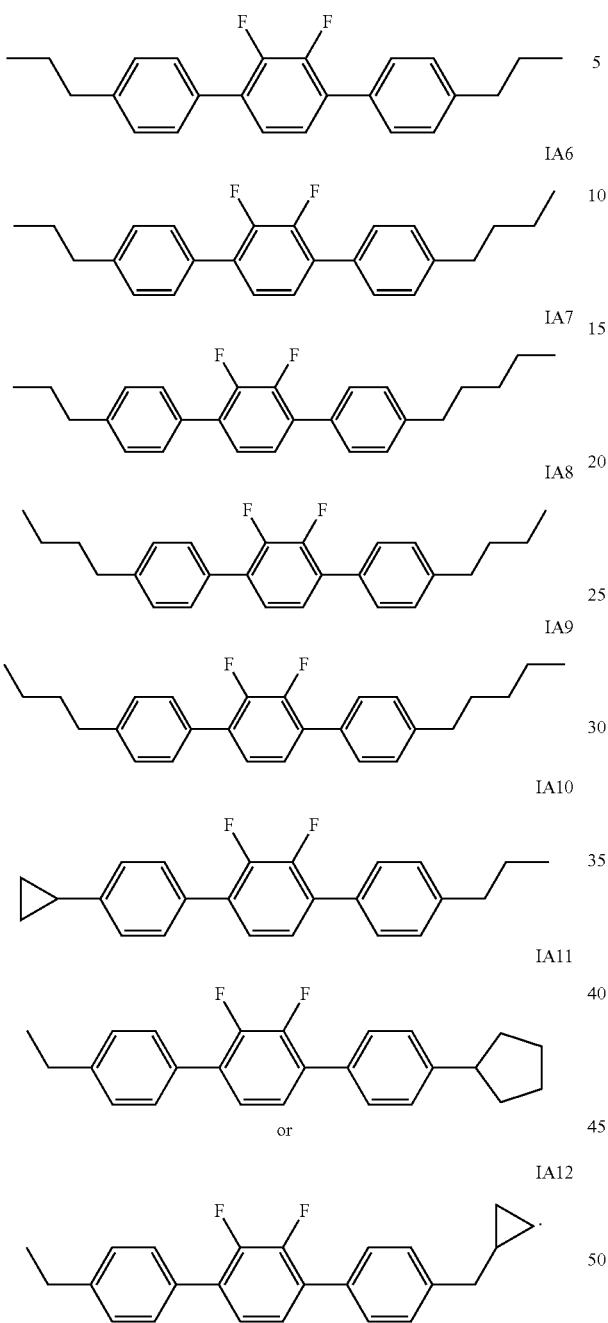

3. The LC medium according to claim 1, further comprising one or more compounds of formula IB

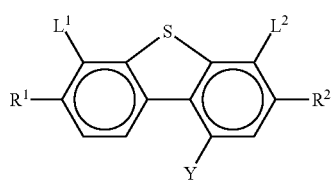

in which, individual radicals, on each occurrence identically or differently, and each, independently of one another, have the following meaning:

$R^1$, $R^2$ are $C_{1-25}$-straight chain, $C_{3-25}$-branched or $C_{3-25}$-cyclic alkyl, wherein one or more non-adjacent $CH_2$-groups are optionally replaced by —O—, —S—, —CO—, —CO—O—, —O—CO—, —O—CO—O—, —$CR^0$=$CR^{00}$—, —C≡C—,

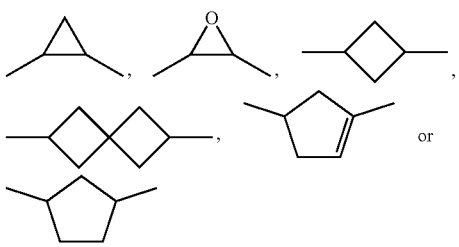

in such a manner that O- and/or S-atoms are not directly connected with each other, and wherein one or more H atoms are each optionally replaced by F or Cl, $R^0$, $R^{00}$ are H or alkyl having 1 to 12 C atoms, $L^1$, $L^2$ are F or Cl, Y are H, F, Cl, $CF_3$, $CHF_2$ or $CH_3$.

4. The LC medium according to claim 3, wherein the one or more compounds of formula IB are selected from compounds of the following formulae:

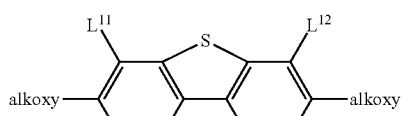

IB1

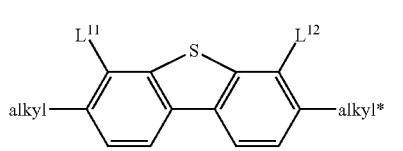

IB2

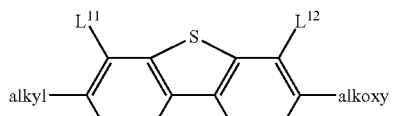

IB3

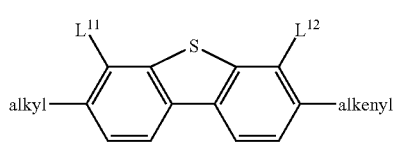

IB4

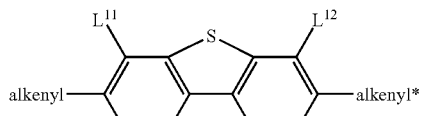

IB5

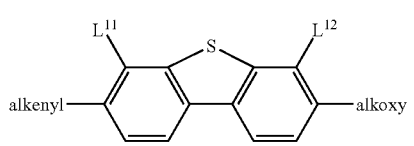

IB6

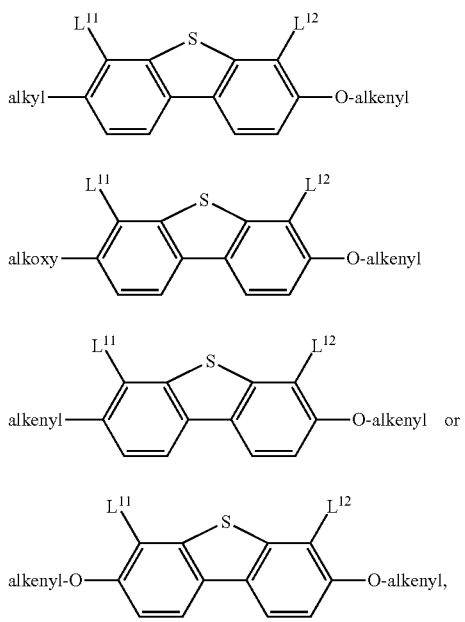

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl.

5. The LC medium according to claim 3, wherein the one or more compounds of formula IB are selected from compounds of the following formulae:

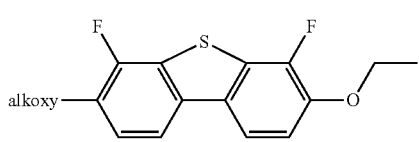

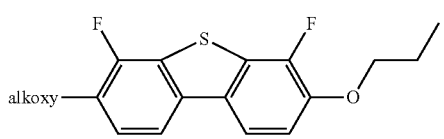

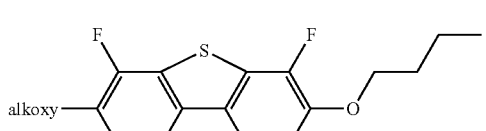

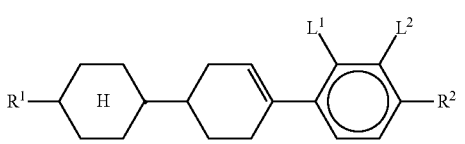

in which alkoxy denotes a straight-chain alkoxy radical having 1-6 C atoms.

6. The LC medium according to claim 1, additionally comprising one or more compounds of formula IC

IC wherein $R^1$, $R^2$ are, each independently, $C_{1-25}$-straight chain, $C_{3-25}$-branched or $C_{3-25}$-cyclic alkyl, wherein one or more non-adjacent $CH_2$-groups are optionally replaced by —O—, —S—, —CO—, —CO—O—, —O—CO—, —O—CO—O—, —CR⁰=CR⁰⁰—, —C≡C—,

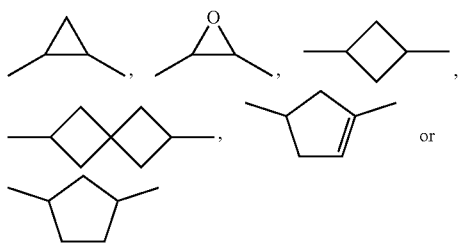

in such a manner that O- and/or S-atoms are not directly connected with each other, and wherein one or more H atoms are each optionally replaced by F or Cl, $R^0$, $R^{00}$ are, each independently, H or alkyl having 1 to 12 C atoms, and $L^1$, $L^2$ are, each independently, F or Cl.

7. The LC medium according to claim 6, wherein the one or more compounds of formula IC are selected from compounds of the following formulae:

IC1
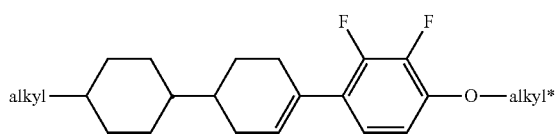

IC2
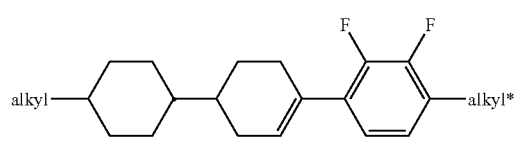

IC3
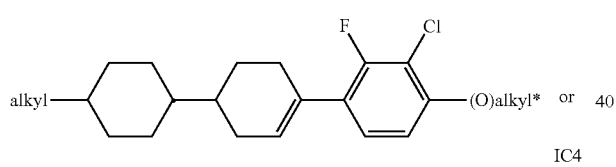

IC4
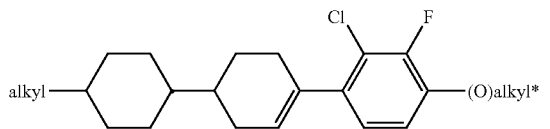

in which
alkyl and alkyl* independently of each other denote a straight-chain alkyl radical having 1-6 C atoms, and
(O) denotes an oxygen atom or a single bond.

8. The LC medium according to claim 1, additionally comprising one or more compounds of formulae IIA, IIB and IID and optionally one or more compounds of formula IIC which are different from formula IA IIA
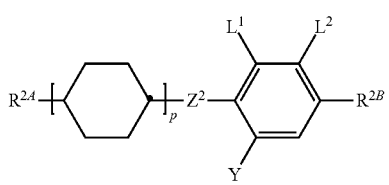

-continued

IIB
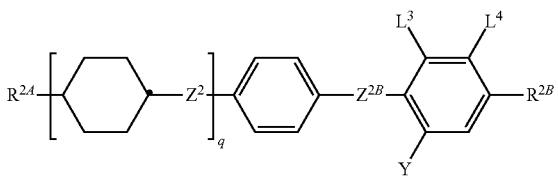

IIC
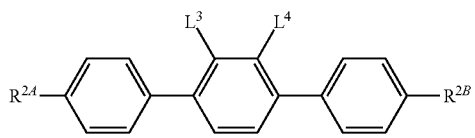

IID
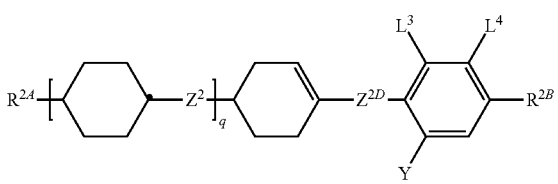

in which $R^{2A}$ and $R^{2B}$ each, independently of one another, denote H, a $C_{1-15}$-alkyl or $C_{2-15}$-alkenyl radical which is unsubstituted, monosubstituted by CN or $CF_3$ or at least monosubstituted by halogen, in which one or more $CH_2$ groups may be replaced by —O—, —S—,

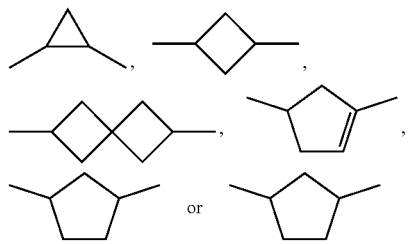

—C≡C—, —$CF_2$O—, —$OCF_2$—, —OC—O— or —O—CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, $Z^2$, $Z^{2B}$, $Z^{2D}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF—, or —CH=CH$CH_2$O—, p denotes 0, 1 or 2, and q on each occurrence, identically or differently, denotes 0 or 1.

9. The LC medium according to claim 1, additionally comprising one or more compounds of formula IV IV
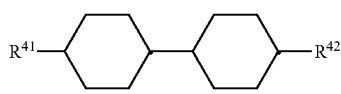

in which

R$^{41}$ denotes an unsubstituted alkyl radical having 1 to 7 C atoms or an unsubstituted alkenyl radical having 2 to 7 C atoms, and R$^{42}$ denotes an unsubstituted alkyl radical having 1 to 7 C atoms, an unsubstituted alkoxy radical having 1 to 6 C atoms, or an unsubstituted alkenyl radical having 2 to 7 C atoms.

10. The LC medium according to claim 1, additionally comprising one or more compounds of formula V

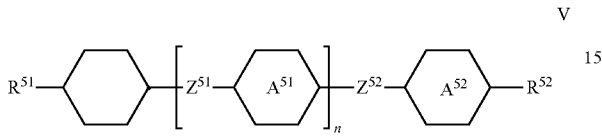

V in which

R$^{51}$ denotes an unsubstituted alkyl radical having 1 to 7 C atoms or an unsubstituted alkenyl radical having 2 to 7 C atoms, and R$^{52}$ denotes an unsubstituted alkyl radical having 1 to 7 C atoms, an unsubstituted alkoxy radical having 1 to 6 C atoms, or an unsubstituted alkenyl radical having 2 to 7 C atoms,

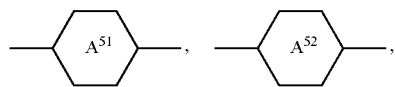

identically or differently, denote

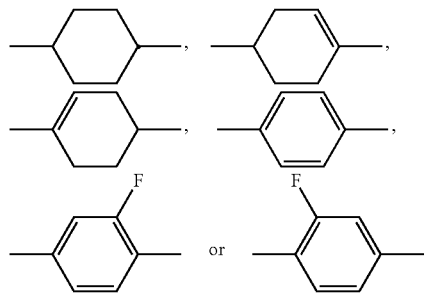

Z$^{51}$, Z$^{52}$ each, independently of one another, denote —CH$_2$—CH$_2$—, —CH$_2$—O—, —CH═CH—, —C≡C—, —COO— or a single bond, and n is 1 or 2.

11. The LC medium according to claim 1, additionally comprising one or more additives that are stabilizers, chiral dopants, polymerization initiators or self-alignment additives.

12. The LC medium according to claim 1, wherein the one or more polymerizable compounds are of formula M

M in which the individual radicals, on each occurrence identically or differ-ently, and each, independently of one another, have the following meaning:

R$^a$, R$^b$ are P, P-Sp-, H, F, Cl, Br, I, —CN, —NO$_2$, —NCO, —NCS, —OCN, —SCN, —SF$_5$ or C$_{1-25}$-straight-chain or C$_{3-25}$-branched alkyl, in which, one or more non-adjacent CH$_2$ groups may each be replaced, independently of one another, by —C(R$^0$)═C(R$^{00}$)—, —C≡C—, —N(R$^{00}$)—, —O—, —S—, —CO—, —CO—O—, —O—CO—, or —O—CO—O— in such a way that O and/or S atoms are not linked directly to one another, and in which one or more H atoms may be replaced by F, Cl, Br, I, CN, P or P-Sp-, where, if B$^1$ and/or B$^2$ contain a saturated C atom, R$^a$ and/or R$^b$ may also denote a radical which is spiro-linked to this saturated C atom, wherein at least one of the radicals R$^a$ and R$^b$ denotes or contains a group P or P-Sp-, P is a polymerizable group, Sp is a spacer group or a single bond, B$^1$, B$^2$ are an aromatic, heteroaromatic, alicyclic or heterocyclic group, which may also contain fused rings, and which is unsubstituted, or mono- or polysubstituted by L, Z$^m$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —CH═CF—, —CF═CH—, —C≡C—, —CH═CH—COO—, —OCO—CH═CH—, —CH2CH2-CO—O—, O—CO—CH$_2$—CH$_2$—, —CR$_0$R$^{00}$— or a single bond, R$^0$, R$^{00}$ are H or alkyl having 1 to 12 C atoms, m is 0, 1, 2, 3 or 4, n1 is 1, 2, 3 or 4, L is P, P-Sp-, OH, CH$_2$OH, F, Cl, Br, I, —CN, —NO$_2$, —NCO, —NCS, —OCN, —SCN, —C(═O)N(R$^x$)$_2$, —C(═O)Y$^1$, —C(═O)R$^x$, —N(R$^x$)$_2$, optionally substituted silyl, optionally substituted aryl having 6 to 20 C atoms, or C$_{1-25}$-straight-chain or C$_{3-25}$-branched alkyl, alkoxy, alkylcarbonyl, alkoxycarbonyl, alkylcarbonyloxy or alkoxy-carbonyloxy, in which one or more H atoms may be replaced by F, Cl, P or P-Sp-, Y$^1$ is halogen, R$^x$ is P, P-Sp-, H, halogen, C$_{1-25}$-straight-chain, C$_{3-25}$-branched or C$_{3-25}$-cyclic alkyl, in which one or more non-adjacent CH$_2$ groups may be replaced by —O—, —S—, —CO—, —CO—O—, —O—CO—, or —O—CO—O— in such a way that O and/or S atoms are not linked directly to one another, and in which one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

13. The LC medium according to claim 1, wherein the one or more polymerizable compounds are selected of the following formulae:

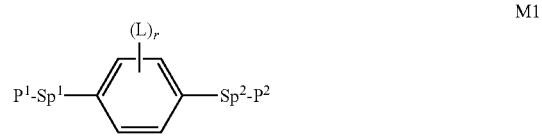

M1

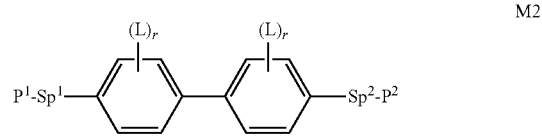

M2

M3
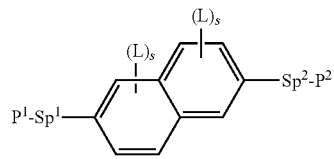
M4
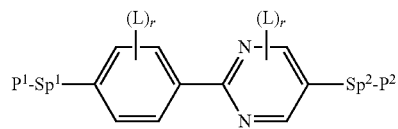
M5
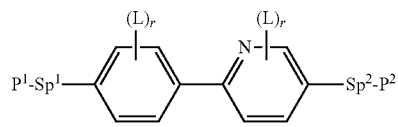
M6
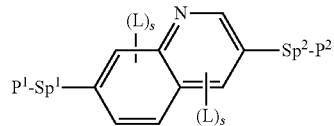
M7
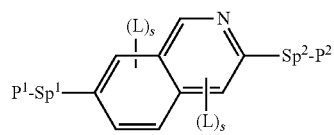
M8
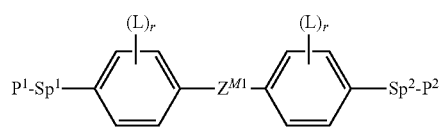
M9
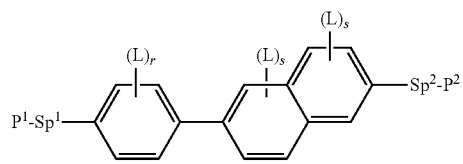
M10
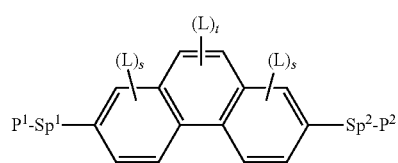
M11
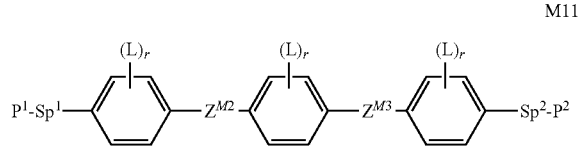
M12
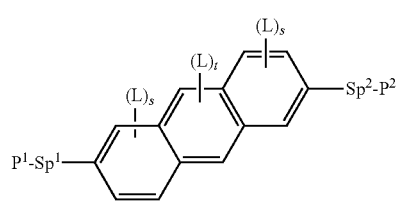
M13
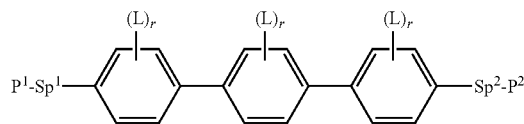
M14
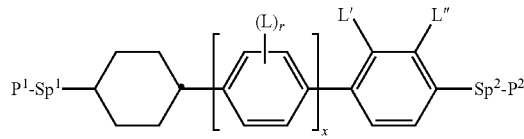
M15
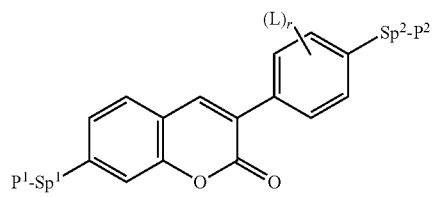
M16
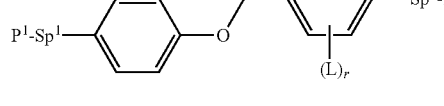
M17
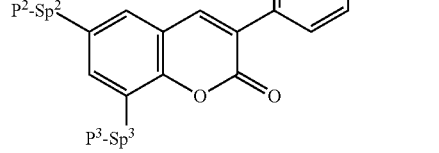
M18
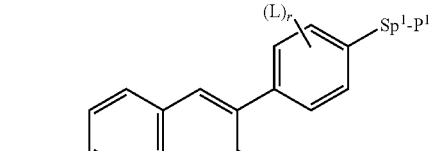
M19
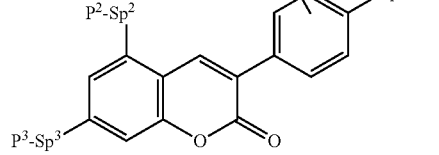
M20
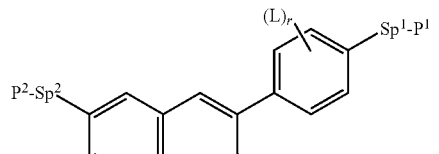

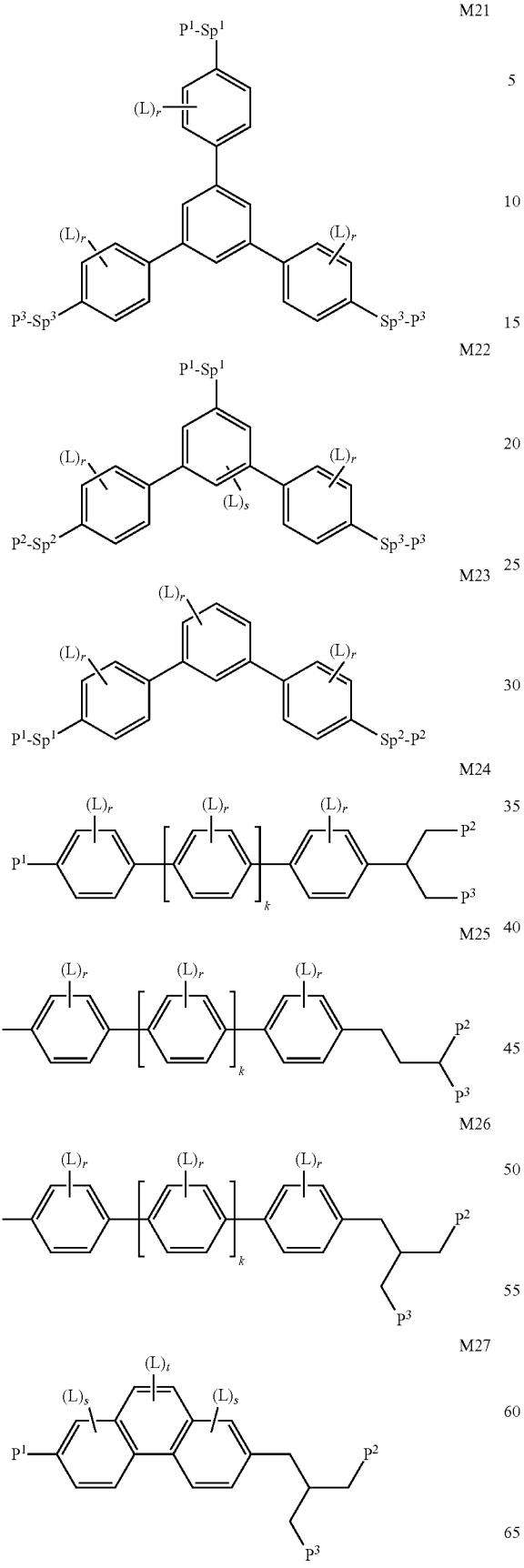

in which the individual radicals, on each occurrence identically or differ-ently, and each, independently of one another, have the following meaning:

$P^1$, $P^2$, $P^3$ are a polymerizable group, $Sp^1$, $Sp^2$, $Sp^3$ are a single bond or a spacer group where one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ is H, F, Cl, CN or $C_{1-25}$-straight-chain or $C_{3-25}$-branched alkyl, in which one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which one or more H atoms may be replaced by F, Cl, CN or $P^1$-$Sp^1$-, and wherein $R^{aa}$ does not denote or contain a group $P^1$, $P^2$ or $P^3$, $R^0$, $R^{00}$ are H or alkyl having 1 to 12 C atoms, $R^y$ and $R^z$ are H, F, $CH_3$ or $CF_3$, $X^1$, $X^2$, $X^3$ are —CO—O—, —O—CO— or a single bond, $Z^{M1}$ is —O—, —CO—, —C($R^yR^z$)— or —$CF_2CF_2$—, $Z^{M2}$, $Z^{M3}$ are —CO—O—, —O—CO—, —$CH_2$O—, —O$CH_2$—, —$CF_2$O—, —O$CF_2$— or $(CH_2)_n$—, where n is 2, 3 or 4, L is F, Cl, CN or $C_{1-12}$-straight-chain or $C_{3-12}$-branched, optionally mono- or polyfluorinated alkyl, alkoxy, thioalkyl, alkenyl, alkynyl, alkylcarbonyl, alkoxycarbonyl, alkylcarbonyloxy or alkoxycarbonyloxy, L', L'' are H, F or Cl, k is 0 or 1, r is 0, 1, 2, 3 or 4, S is 0, 1, 2 or 3, t is 0, 1 or 2, and x is 0 or 1.

14. A process of preparing an LC medium according to claim 3, comprising mixing one or more compounds of formula IA and IB with one or more polymerizable compounds of formula M

   M in which the individual radicals, on each occurrence identically or differ-ently, and each, independently of one another, have the following meaning:

$R^a$, $R^b$ are P, P-Sp-, H, F, Cl, Br, I, —CN, —$NO_2$, —NCO, —NCS, —OCN, —SCN, —$SF_5$ or $C_{1-25}$-straight-chain or $C_{3-25}$-branched alkyl, in which one or more non-adjacent $CH_2$ groups may each be replaced, independently of one another, by —C($R^0$)=C($R^{00}$)—, —C≡C—, —N($R^{00}$)—, —O—, —S—, —CO—, —CO—O—, —O—CO—, or —O—CO—O— in such a way that O and/or S atoms are not linked directly to one another, and in which one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P is a polymerizable group, Sp is a spacer group or a single bond, $B^1$, $B^2$ are an aromatic, heteroaromatic, alicyclic or heterocyclic group, which may also contain fused rings, and which is unsubstituted, or mono- or polysubstituted by L, $Z^m$ is —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —CH=CF—, —CF=CH—, —C≡C—, —CH=CH—COO—, —OCO—CH=CH—, —$CH_2CH_2$—CO—O—, O—CO—$CH_2$—$CH_2$—, —$CR^0R^{00}$— or a single bond, $R^0$, $R^{00}$ are H or alkyl having 1 to 12 C atoms, m is 0, 1, 2, 3 or 4, n1 is 1, 2, 3 or 4, L is P, P-Sp-, OH, $CH_2OH$, F, Cl, Br, I, —CN, —$NO_2$, —NCO, —NCS, —OCN, —SCN, —C(=O)N($R^x$)$_2$, —C(=O) $Y^1$, —C(=O) $R^x$, —N($R^x$)$_2$, optionally substituted silyl, optionally substituted aryl having 6 to 20 C atoms, or $C_{1-25}$-straight-chain or $C_{3-25}$-branched alkyl, alkoxy, alkylcarbonyl, alkoxycarbonyl, alkylcarbonyloxy or alkoxy-carbonyloxy, in which one or more H atoms may be replaced by F, Cl, P or P-Sp-, $Y^1$ is halogen, and $R^x$ is P, P-Sp-, H, halogen, $C_{1-25}$-straight-chain, $C_{3-25}$-branched or $C_{3-25}$-cyclic alkyl, in which one or more non-adjacent $CH_2$ groups may be replaced by —O—, —S—, —CO—, —CO—O—, —O—CO—, or —O—CO—O— in such a way that O and/or S atoms are not linked directly to one another, and in which one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, and optionally with one or more further liquid-crystalline compounds and/or additives.

15. An LC display comprising an LC medium as defined in claim 1.

16. The LC display of claim 15, that is a PS-VA, PS-IPS, PS-FFS or SA-VA display.

17. The LC display of claim 15, comprising two substrates, at least one of which is transparent to light, an electrode provided on each substrate or two electrodes provided on only one of the substrates, and located between the substrates a layer of the LC medium, wherein the one or more polymerizable compounds are polymerized between the substrates of the display by UV photopolymerization.

18. A process for the production of an LC display according to claim 17, comprising providing the LC medium between the substrates of the display, and exposing the LC medium to UV light causing photopolymerization of the one or more polymerizable compounds, while a voltage is applied to the electrodes of the display at least for a part of the time of UV exposure.

19. The process according to claim 18, wherein the LC medium is exposed to UV light in a two-step process, including a first UV exposure where a voltage is applied to the electrodes, and a second UV exposure where no voltage is applied to the electrodes.

20. The LC medium according to claim 1, wherein the LC medium contains only one dopant of formula IA.

21. The LC medium according to claim 1, wherein the total proportion of the one or more dopants of formula IA in the LC medium is from 0.05 to 0.2% by weight.

22. The LC medium according to claim 1, wherein the total proportion of the one or more dopants of formula IA in the LC medium is from 0.05 to 0.1% by weight.

* * * * *